US009448353B2

(12) United States Patent
Holman et al.

(10) Patent No.: US 9,448,353 B2
(45) Date of Patent: *Sep. 20, 2016

(54) ILLUMINATION DEVICE HAVING A TAPERED LIGHT GUIDE

(71) Applicant: QUALCOMM MEMS Technologies, Inc., San Diego, CA (US)

(72) Inventors: Robert Louis Holman, San Jose, CA (US); Matthew Brian Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/627,460

(22) Filed: Feb. 20, 2015

(65) Prior Publication Data

US 2015/0168635 A1    Jun. 18, 2015

Related U.S. Application Data

(63) Continuation of application No. 14/272,174, filed on May 7, 2014, now Pat. No. 9,244,212, which is a continuation of application No. 13/563,377, filed on Jul. 31, 2012, now Pat. No. 8,721,149, which is a (Continued)

(51) Int. Cl.
   *F21V 7/04*      (2006.01)
   *F21V 8/00*      (2006.01)
   (Continued)

(52) U.S. Cl.
   CPC ............. *G02B 6/0061* (2013.01); *F21V 5/02* (2013.01); *G02B 6/005* (2013.01); *G02B 6/0008* (2013.01); *G02B 6/0028* (2013.01);
   (Continued)

(58) Field of Classification Search
   CPC .. G02B 6/0031; G02B 6/008; G02B 6/0046; G02B 6/23
   See application file for complete search history.

(56) References Cited

U.S. PATENT DOCUMENTS

| 4,282,862 A | 8/1981 | Soleau |
| 4,306,716 A | 12/1981 | James et al. |

(Continued)

FOREIGN PATENT DOCUMENTS

| CN | 2056903 U | 5/1990 |
| DE | 3402746 | 8/1985 |

(Continued)

OTHER PUBLICATIONS

ColorLink, A brighter future for projection product description, Color Quade, 2003, 2 pp.

(Continued)

*Primary Examiner* — Tracie Y Green
(74) *Attorney, Agent, or Firm* — Knobbe Martens Olson & Bear LLP

(57) ABSTRACT

This disclosure provides systems, methods and apparatus for illumination devices. In one aspect, an illumination device having a longitudinal axis includes a light source and a light guide. The light guide has a peripheral edge, a transmissive illumination surface, a center portion, and an upper surface. The transmissive illumination surface is oriented perpendicular to the longitudinal axis and disposed between the center portion and the peripheral edge. The upper surface is oriented relative to the illumination surface to define an angle α therebetween. In some implementations, the angle α can be greater than 15 degrees, for example.

21 Claims, 67 Drawing Sheets

Related U.S. Application Data continuation-in-part of application No. 12/864,857, filed as application No. PCT/US2009/000575 on Jan. 29, 2009, now Pat. No. 8,348,489.

(60) Provisional application No. 61/024,814, filed on Jan. 30, 2008.

(51) Int. Cl.
  *F21V 5/02* (2006.01)
  *F21Y 101/00* (2016.01)

(52) U.S. Cl.
  CPC ......... *G02B 6/0031* (2013.01); *G02B 6/0055* (2013.01); *G02B 6/0058* (2013.01); *G02B 6/0085* (2013.01); *F21Y 2101/00* (2013.01); *G02B 6/0016* (2013.01); *G02B 6/0046* (2013.01); *G02B 6/0053* (2013.01); *Y10T 156/1089* (2015.01)

(56) References Cited

U.S. PATENT DOCUMENTS

| | | |
|---|---|---|
| 4,375,312 A | 3/1983 | Tangonan |
| 4,383,740 A | 5/1983 | Bordovsky |
| 4,394,681 A | 7/1983 | Rowe |
| 4,425,028 A | 1/1984 | Gagnon et al. |
| 4,491,872 A | 1/1985 | Boldt et al. |
| 4,500,172 A | 2/1985 | Gagnon et al. |
| 4,578,710 A | 3/1986 | Hasegawa |
| 4,613,207 A | 9/1986 | Fergason |
| 4,623,223 A | 11/1986 | Kempf |
| 4,647,166 A | 3/1987 | Franken et al. |
| 4,824,214 A | 4/1989 | Ledebuhr |
| 4,850,682 A | 7/1989 | Gerritsen |
| 4,850,685 A | 7/1989 | Kamakura et al. |
| 4,861,142 A | 8/1989 | Tanaka et al. |
| 4,875,064 A | 10/1989 | Umeda et al. |
| 4,908,702 A | 3/1990 | Chao et al. |
| 4,915,479 A | 4/1990 | Clarke |
| 4,936,657 A | 6/1990 | Tejima et al. |
| 4,947,291 A | 8/1990 | McDermott |
| 4,961,642 A | 10/1990 | Ogino |
| 4,963,016 A | 10/1990 | Heijnemans et al. |
| 4,969,731 A | 11/1990 | Ogino et al. |
| 4,969,732 A | 11/1990 | Wright et al. |
| 4,971,436 A | 11/1990 | Aoki et al. |
| 4,976,536 A | 12/1990 | Vogeley et al. |
| 5,042,921 A | 8/1991 | Sato et al. |
| 5,046,837 A | 9/1991 | Stroomer et al. |
| 5,048,949 A | 9/1991 | Sato et al. |
| 5,092,664 A | 3/1992 | Miyatake et al. |
| 5,092,671 A | 3/1992 | Van Os |
| 5,116,117 A | 5/1992 | Miyashita |
| 5,121,983 A | 6/1992 | Lee |
| 5,123,729 A | 6/1992 | Kondo et al. |
| 5,142,387 A | 8/1992 | Shikama et al. |
| 5,153,752 A | 10/1992 | Kurematsu et al. |
| 5,184,238 A | 2/1993 | Wright |
| 5,187,510 A | 2/1993 | Vogeley et al. |
| 5,221,982 A | 6/1993 | Faris |
| 5,227,821 A | 7/1993 | Vogeley et al. |
| 5,237,641 A | 8/1993 | Jacobson et al. |
| 5,255,029 A | 10/1993 | Vogeley et al. |
| 5,268,775 A | 12/1993 | Zeidler |
| 5,272,496 A | 12/1993 | Nicolas et al. |
| 5,278,595 A | 1/1994 | Nishida et al. |
| 5,278,680 A | 1/1994 | Karasawa et al. |
| 5,283,600 A | 2/1994 | Imai |
| 5,299,036 A | 3/1994 | Nicolas et al. |
| 5,300,966 A | 4/1994 | Uehira et al. |
| 5,303,322 A * | 4/1994 | Winston ............ F21V 5/02 385/129 |
| 5,327,270 A | 7/1994 | Miyatake |
| 5,333,021 A | 7/1994 | Mitsutake et al. |
| 5,361,190 A | 11/1994 | Roberts et al. |
| 5,365,287 A | 11/1994 | Vollmer et al. |
| 5,374,968 A | 12/1994 | Haven et al. |
| 5,381,278 A | 1/1995 | Shingaki et al. |
| 5,387,953 A | 2/1995 | Minoura et al. |
| 5,387,991 A | 2/1995 | Mitsutake et al. |
| 5,394,198 A | 2/1995 | Janow |
| 5,394,204 A | 2/1995 | Shigeta et al. |
| 5,404,185 A | 4/1995 | Vogeley et al. |
| 5,408,282 A | 4/1995 | Nagashima et al. |
| 5,416,514 A | 5/1995 | Janssen et al. |
| 5,418,584 A | 5/1995 | Larson |
| 5,422,683 A | 6/1995 | Tanigaki |
| 5,438,379 A | 8/1995 | Kurematsu |
| 5,442,414 A | 8/1995 | Janssen et al. |
| 5,446,510 A | 8/1995 | Mitsutake et al. |
| 5,452,128 A | 9/1995 | Kimura |
| 5,453,859 A | 9/1995 | Sannohe et al. |
| 5,467,154 A | 11/1995 | Gale et al. |
| 5,467,417 A | 11/1995 | Nakamura et al. |
| 5,477,394 A | 12/1995 | Shibazaki |
| 5,486,884 A | 1/1996 | De Vaan |
| 5,491,525 A | 2/1996 | Yamasaki et al. |
| 5,495,306 A | 2/1996 | Shibazaki |
| 5,506,929 A | 4/1996 | Tai et al. |
| 5,515,184 A | 5/1996 | Caulfield et al. |
| 5,517,263 A | 5/1996 | Minich et al. |
| 5,517,366 A | 5/1996 | Togino |
| 5,528,720 A | 6/1996 | Winston et al. |
| 5,537,171 A | 7/1996 | Ogino et al. |
| 5,544,268 A | 8/1996 | Bischel et al. |
| 5,555,160 A | 9/1996 | Tawara et al. |
| 5,592,332 A | 1/1997 | Nishio et al. |
| 5,594,830 A | 1/1997 | Winston et al. |
| 5,601,351 A | 2/1997 | Van Den Brandt |
| 5,650,865 A | 7/1997 | Smith |
| 5,659,410 A | 8/1997 | Koike et al. |
| 5,668,913 A | 9/1997 | Tai et al. |
| 5,671,994 A | 9/1997 | Tai et al. |
| 5,703,667 A | 12/1997 | Ochiai |
| 5,712,694 A | 1/1998 | Taira et al. |
| 5,735,590 A | 4/1998 | Kashima et al. |
| 5,749,642 A | 5/1998 | Kimura et al. |
| 5,772,299 A | 6/1998 | Koo et al. |
| 5,777,589 A | 7/1998 | Gale et al. |
| 5,808,708 A | 9/1998 | Oyama et al. |
| 5,810,464 A | 9/1998 | Ishikawa et al. |
| 5,854,872 A | 12/1998 | Tai |
| 5,883,684 A | 3/1999 | Millikan et al. |
| 5,913,594 A | 6/1999 | Iimura |
| 5,975,703 A | 11/1999 | Holman et al. |
| 5,982,540 A | 11/1999 | Koike et al. |
| 6,002,829 A | 12/1999 | Winston et al. |
| 6,014,192 A | 1/2000 | Lehureau et al. |
| 6,021,007 A | 2/2000 | Murtha |
| 6,023,373 A | 2/2000 | Inoguchi et al. |
| 6,040,937 A | 3/2000 | Miles |
| 6,044,196 A | 3/2000 | Winston et al. |
| 6,048,071 A | 4/2000 | Sawayama |
| 6,091,195 A | 7/2000 | Forrest et al. |
| 6,094,285 A | 7/2000 | Wickham et al. |
| 6,151,089 A | 11/2000 | Yang et al. |
| 6,196,691 B1 | 3/2001 | Ochiai |
| 6,199,989 B1 | 3/2001 | Maeda et al. |
| 6,213,606 B1 | 4/2001 | Holman et al. |
| 6,259,854 B1 | 7/2001 | Shinji et al. |
| 6,273,577 B1 | 8/2001 | Goto et al. |
| 6,369,947 B1 | 4/2002 | Staub et al. |
| 6,375,327 B2 | 4/2002 | Holman et al. |
| 6,392,368 B1 | 5/2002 | Deller et al. |
| 6,402,325 B1 | 6/2002 | Yamamoto |
| 6,412,969 B1 | 7/2002 | Torihara et al. |
| 6,421,103 B2 | 7/2002 | Yamaguchi |
| 6,442,124 B1 | 8/2002 | Chung et al. |
| 6,480,634 B1 | 11/2002 | Corrigan |
| 6,520,643 B1 | 2/2003 | Holman et al. |
| 6,527,410 B2 | 3/2003 | Yamaguchi |
| 6,592,234 B2 | 7/2003 | Epstein et al. |
| 6,598,987 B1 | 7/2003 | Parikka |

(56) References Cited

U.S. PATENT DOCUMENTS

| | | |
|---|---|---|
| 6,630,968 B1 | 10/2003 | Tsuchihashi et al. |
| 6,657,683 B2 | 12/2003 | Richard |
| 6,667,782 B1 | 12/2003 | Taira et al. |
| 6,669,350 B2 | 12/2003 | Yamashita et al. |
| 6,674,562 B1 | 1/2004 | Miles |
| 6,773,126 B1 | 8/2004 | Hatjasalo et al. |
| 6,871,982 B2 | 3/2005 | Holman et al. |
| 6,883,924 B2 | 4/2005 | Maeda et al. |
| 6,891,530 B2 | 5/2005 | Umemoto et al. |
| 6,951,401 B2 | 10/2005 | Van Hees et al. |
| 6,967,779 B2 | 11/2005 | Fadel et al. |
| 6,972,753 B1 | 12/2005 | Kimura et al. |
| 6,998,196 B2 | 2/2006 | Rich et al. |
| 7,010,212 B2 | 3/2006 | Emmons et al. |
| 7,014,349 B2 | 3/2006 | Shinohara et al. |
| 7,018,088 B2 | 3/2006 | Yu et al. |
| 7,041,344 B2 | 5/2006 | Kusume et al. |
| 7,072,096 B2 | 7/2006 | Holman et al. |
| 7,123,216 B1 | 10/2006 | Miles |
| 7,210,806 B2 | 5/2007 | Holman et |
| 7,218,812 B2 | 5/2007 | Maxwell et al. |
| 7,223,010 B2 | 5/2007 | Min et al. |
| 7,262,916 B2 | 8/2007 | Kao et al. |
| 7,277,216 B2 | 10/2007 | Bloom |
| 7,278,774 B2 | 10/2007 | Chang |
| 7,327,510 B2 | 2/2008 | Cummings et al. |
| 7,360,899 B2 | 4/2008 | McGuire, Jr. et al. |
| 7,360,939 B2 | 4/2008 | Sugiura |
| 7,376,308 B2 | 5/2008 | Cheben et al. |
| 7,380,970 B2 | 6/2008 | Hwang et al. |
| 7,400,439 B2 | 7/2008 | Holman |
| 7,410,286 B2 | 8/2008 | Travis et al. |
| 7,520,642 B2 | 4/2009 | Holman et al. |
| 7,573,631 B1 | 8/2009 | Amm |
| 7,656,391 B2 | 2/2010 | Kimura et al. |
| 7,663,714 B2 | 2/2010 | Haga et al. |
| 7,766,531 B2 | 8/2010 | Anderson et al. |
| 7,780,330 B2 | 8/2010 | Aylward et al. |
| 7,976,208 B2 | 7/2011 | Travis |
| 8,079,743 B2 | 12/2011 | Bailey et al. |
| 8,138,479 B2 | 3/2012 | Kothari et al. |
| 8,231,257 B2 | 7/2012 | Griffiths et al. |
| 8,348,489 B2 | 1/2013 | Holman et al. |
| 8,721,149 B2 | 5/2014 | Holman et al. |
| 8,740,439 B2 | 6/2014 | Holman et al. |
| 2001/0019479 A1 | 9/2001 | Nakabayashi et al. |
| 2001/0022636 A1 | 9/2001 | Yang et al. |
| 2001/0030861 A1 | 10/2001 | Oda et al. |
| 2001/0055076 A1 | 12/2001 | Ochi et al. |
| 2002/0044445 A1 | 4/2002 | Bohler et al. |
| 2002/0054258 A1 | 5/2002 | Kondo et al. |
| 2002/0106182 A1 | 8/2002 | Kawashima |
| 2002/0113241 A1 | 8/2002 | Kubota et al. |
| 2002/0114168 A1 | 8/2002 | Pelka et al. |
| 2002/0149924 A1 | 10/2002 | Falicoff et al. |
| 2002/0172039 A1 | 11/2002 | Inditsky |
| 2002/0180910 A1 | 12/2002 | Umemoto et al. |
| 2003/0016930 A1 | 1/2003 | Inditsky |
| 2003/0026536 A1 | 2/2003 | Ho |
| 2003/0030764 A1 | 2/2003 | Lee |
| 2003/0034445 A1 | 2/2003 | Boyd et al. |
| 2003/0043568 A1 | 3/2003 | Suzuki et al. |
| 2003/0067760 A1 | 4/2003 | Jagt et al. |
| 2003/0071947 A1 | 4/2003 | Shiraogawa et al. |
| 2003/0081178 A1 | 5/2003 | Shimizu et al. |
| 2003/0086030 A1 | 5/2003 | Taniguchi et al. |
| 2003/0086031 A1 | 5/2003 | Taniguchi et al. |
| 2003/0090887 A1 | 5/2003 | Igarashi et al. |
| 2003/0103344 A1 | 6/2003 | Niida et al. |
| 2003/0123245 A1 | 7/2003 | Parker et al. |
| 2003/0128538 A1 | 7/2003 | Shinohara et al. |
| 2003/0160919 A1 | 8/2003 | Suzuki et al. |
| 2003/0165067 A1 | 9/2003 | Imamura et al. |
| 2003/0169385 A1 | 9/2003 | Okuwaki |
| 2003/0184989 A1 | 10/2003 | Matsumoto et al. |
| 2003/0210222 A1 | 11/2003 | Ogiwara et al. |
| 2004/0032659 A1 | 2/2004 | Drinkwater |
| 2004/0062028 A1* | 4/2004 | Winston ............... F21V 5/02 362/602 |
| 2004/0135494 A1 | 7/2004 | Miyatake |
| 2004/0170373 A1 | 9/2004 | Kim |
| 2004/0207995 A1 | 10/2004 | Park et al. |
| 2004/0228112 A1 | 11/2004 | Takata |
| 2004/0246743 A1 | 12/2004 | Lee et al. |
| 2005/0002175 A1 | 1/2005 | Matsui et al. |
| 2005/0024890 A1 | 2/2005 | Yamamoto et al. |
| 2005/0069254 A1 | 3/2005 | Schultheis et al. |
| 2005/0117190 A1 | 6/2005 | Iwauchi et al. |
| 2005/0133761 A1 | 6/2005 | Thielemans |
| 2005/0141065 A1 | 6/2005 | Masamoto |
| 2005/0157265 A1 | 7/2005 | Florence et al. |
| 2005/0185416 A1 | 8/2005 | Lee et al. |
| 2005/0185419 A1* | 8/2005 | Holman ............... G02B 5/045 362/561 |
| 2005/0231981 A1 | 10/2005 | Hoelen et al. |
| 2005/0259302 A9 | 11/2005 | Metz et al. |
| 2005/0259939 A1 | 11/2005 | Rinko |
| 2005/0270798 A1 | 12/2005 | Lee et al. |
| 2005/0271325 A1 | 12/2005 | Anderson et al. |
| 2006/0002675 A1 | 1/2006 | Choi et al. |
| 2006/0024017 A1 | 2/2006 | Page et al. |
| 2006/0044523 A1 | 3/2006 | Teijido et al. |
| 2006/0061705 A1 | 3/2006 | Onishi |
| 2006/0181903 A1 | 8/2006 | Okuwaki |
| 2006/0187676 A1 | 8/2006 | Ishikura |
| 2006/0215958 A1 | 9/2006 | Yeo et al. |
| 2006/0265919 A1 | 11/2006 | Huang |
| 2006/0268574 A1 | 11/2006 | Jung et al. |
| 2006/0274243 A1 | 12/2006 | Iijima et al. |
| 2006/0279558 A1 | 12/2006 | Van Delden et al. |
| 2007/0001187 A1 | 1/2007 | Kim |
| 2007/0116424 A1 | 5/2007 | Ting et al. |
| 2007/0127262 A1* | 6/2007 | Schultz ............... G02B 6/0008 362/609 |
| 2007/0133226 A1 | 6/2007 | Mi |
| 2007/0147087 A1 | 6/2007 | Parker et al. |
| 2007/0147088 A1* | 6/2007 | Chien ............... G02B 6/0038 362/616 |
| 2007/0159846 A1 | 7/2007 | Nishiyama et al. |
| 2007/0187852 A1 | 8/2007 | Parker et al. |
| 2007/0189036 A1 | 8/2007 | Chen et al. |
| 2007/0247842 A1 | 10/2007 | Zampini et al. |
| 2007/0247872 A1 | 10/2007 | Lee et al. |
| 2007/0292091 A1 | 12/2007 | Fujii et al. |
| 2008/0018617 A1 | 1/2008 | Ng et al. |
| 2008/0094853 A1 | 4/2008 | Kim et al. |
| 2008/0137004 A1 | 6/2008 | Iwasaki et al. |
| 2008/0192458 A1 | 8/2008 | Li |
| 2008/0212040 A1 | 9/2008 | Aksyuk |
| 2008/0232135 A1 | 9/2008 | Kinder et al. |
| 2008/0278460 A1 | 11/2008 | Arnett et al. |
| 2008/0278663 A1 | 11/2008 | Krishnan et al. |
| 2008/0285307 A1 | 11/2008 | Aylward et al. |
| 2009/0015753 A1 | 1/2009 | Ye |
| 2009/0033875 A1 | 2/2009 | King et al. |
| 2009/0086296 A1 | 4/2009 | Renaud-Goud |
| 2009/0086466 A1 | 4/2009 | Sugita et al. |
| 2009/0096956 A1 | 4/2009 | Uehara et al. |
| 2009/0105856 A1 | 4/2009 | Kurt et al. |
| 2009/0244690 A1 | 10/2009 | Lee |
| 2009/0273581 A1 | 11/2009 | Kim et al. |
| 2010/0052939 A1 | 3/2010 | Liang |
| 2010/0053959 A1 | 3/2010 | Ijzerman et al. |
| 2010/0096718 A1 | 4/2010 | Hynecek et al. |
| 2010/0118563 A1 | 5/2010 | Shen et al. |
| 2010/0141153 A1 | 6/2010 | Recker et al. |
| 2010/0142226 A1 | 6/2010 | Vogt et al. |
| 2010/0278480 A1 | 11/2010 | Vasylyev |
| 2011/0096570 A1 | 4/2011 | Vissenberg et al. |
| 2011/0101869 A1 | 5/2011 | Pope |
| 2011/0121703 A1 | 5/2011 | Karlicek, Jr. et al. |
| 2011/0156911 A1 | 6/2011 | Caglianone |
| 2011/0176089 A1 | 7/2011 | Ishikawa et al. |
| 2014/0140091 A1 | 5/2014 | Vasylyev |

(56) References Cited

U.S. PATENT DOCUMENTS

| | | | |
|---|---|---|---|
| 2014/0268873 A1 | 9/2014 | Holman et al. | |
| 2015/0036386 A1* | 2/2015 | Holman et al. | 362/615 |
| 2015/0168636 A1* | 6/2015 | Holman et al. | 362/615 |

FOREIGN PATENT DOCUMENTS

| | | |
|---|---|---|
| DE | 19942513 A1 | 3/2001 |
| EP | 0362993 A2 | 4/1990 |
| EP | 0879991 A2 | 11/1998 |
| EP | 0907050 A1 | 4/1999 |
| EP | 1003062 A1 | 5/2000 |
| EP | 1122586 A2 | 8/2001 |
| EP | 1251454 A2 | 10/2002 |
| EP | 1279892 A1 | 1/2003 |
| EP | 1329664 A1 | 7/2003 |
| EP | 1336876 A1 | 8/2003 |
| EP | 1347315 A1 | 9/2003 |
| EP | 1389775 A2 | 2/2004 |
| EP | 1413543 A1 | 4/2004 |
| EP | 1437610 A1 | 7/2004 |
| EP | 1544537 A1 | 6/2005 |
| EP | 1577701 A1 | 9/2005 |
| EP | 1698918 A1 | 9/2006 |
| EP | 1734401 A1 | 12/2006 |
| EP | 1843084 A1 | 10/2007 |
| EP | 1847858 A1 | 10/2007 |
| EP | 1975651 A1 | 10/2008 |
| GB | 2260203 A | 4/1993 |
| GB | 2321532 A | 7/1998 |
| GB | 2331615 | 5/1999 |
| GB | 2336933 | 11/1999 |
| GB | 2340281 | 2/2000 |
| JP | 60242408 A | 12/1985 |
| JP | 7199829 A | 8/1995 |
| JP | 09022012 | 1/1997 |
| JP | 9171111 A | 6/1997 |
| JP | 09281917 | 10/1997 |
| JP | 09311333 | 12/1997 |
| JP | 11052887 A | 2/1999 |
| JP | 11224524 A | 8/1999 |
| JP | 11227248 A | 8/1999 |
| JP | 11232919 | 8/1999 |
| JP | 11326898 A | 11/1999 |
| JP | 2000250032 A | 9/2000 |
| JP | 2000314882 A | 11/2000 |
| JP | 2001243822 A | 9/2001 |
| JP | 2001297615 A | 10/2001 |
| JP | 2001320092 A | 11/2001 |
| JP | 2002090549 | 3/2002 |
| JP | 2002108227 A | 4/2002 |
| JP | 2002163907 A | 6/2002 |
| JP | 2002163914 A | 6/2002 |
| JP | 2002174732 A | 6/2002 |
| JP | 2002222604 A | 8/2002 |
| JP | 2002245835 A | 8/2002 |
| JP | 2003018669 A | 1/2003 |
| JP | 2003045678 A | 2/2003 |
| JP | 2003057652 | 2/2003 |
| JP | 2003057653 A | 2/2003 |
| JP | 2003066451 | 3/2003 |
| JP | 2003100129 A | 4/2003 |
| JP | 2003140118 A | 5/2003 |
| JP | 2003149642 | 5/2003 |
| JP | 2003173713 A | 6/2003 |
| JP | 2003332629 A | 11/2003 |
| JP | 2004012918 | 1/2004 |
| JP | 2004062099 | 2/2004 |
| JP | 2004087409 A | 3/2004 |
| JP | 2004149643 A | 5/2004 |
| JP | 2004152719 A | 5/2004 |
| JP | 2004186024 A | 7/2004 |
| JP | 2004212673 A | 7/2004 |
| JP | 2005259365 | 9/2005 |
| JP | 2005316178 | 11/2005 |
| JP | 2006107993 | 4/2006 |
| JP | 2006185765 A | 7/2006 |
| JP | 2007287696 A | 11/2007 |
| JP | 2007294458 A | 11/2007 |
| JP | 2008103110 A | 5/2008 |
| KR | 100754400 B1 | 8/2007 |
| KR | 20080088683 A | 10/2008 |
| WO | WO-9501584 A1 | 1/1995 |
| WO | WO-9514256 A1 | 5/1995 |
| WO | WO-9819201 A1 | 5/1998 |
| WO | WO-9832047 A1 | 7/1998 |
| WO | WO-9963394 A1 | 12/1999 |
| WO | WO-0157434 A1 | 8/2001 |
| WO | WO-0184228 A1 | 11/2001 |
| WO | WO-0184229 A1 | 11/2001 |
| WO | WO-0206858 A2 | 1/2002 |
| WO | WO-0225359 A2 | 3/2002 |
| WO | WO-02097324 A1 | 12/2002 |
| WO | WO-03032058 A1 | 4/2003 |
| WO | WO-03038509 A2 | 5/2003 |
| WO | WO-03056876 A2 | 7/2003 |
| WO | WO-03062912 A1 | 7/2003 |
| WO | WO-2004088372 A1 | 10/2004 |
| WO | WO-2005011012 A1 | 2/2005 |
| WO | WO-2005073622 A1 | 8/2005 |
| WO | WO-2005088367 A1 | 9/2005 |
| WO | WO-2007014371 A2 | 2/2007 |
| WO | WO-2007064133 A1 | 6/2007 |
| WO | WO-2008038754 A1 | 4/2008 |
| WO | WO-2008062363 A2 | 5/2008 |
| WO | WO-2009011922 A1 | 1/2009 |
| WO | WO-2011033429 A1 | 3/2011 |
| WO | WO-2011039688 A1 | 4/2011 |

OTHER PUBLICATIONS

ColorLink, "Optical Assemblies Product Overview,"Color Quade, 2006, 2 pp.

Extended European Search Report dated Nov. 28, 2012 in App. No. 09708960.1.

ISR dated Sep. 16, 2009 for PCT/US09/000575.

Written Opinion—PCT/US2009/000575—ISA/EPO—Sep. 16, 2009.

\* cited by examiner

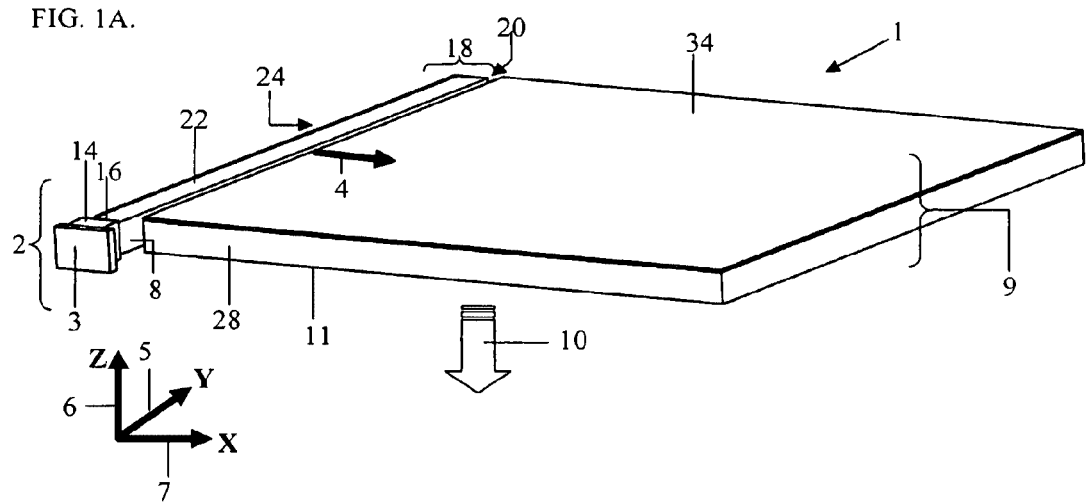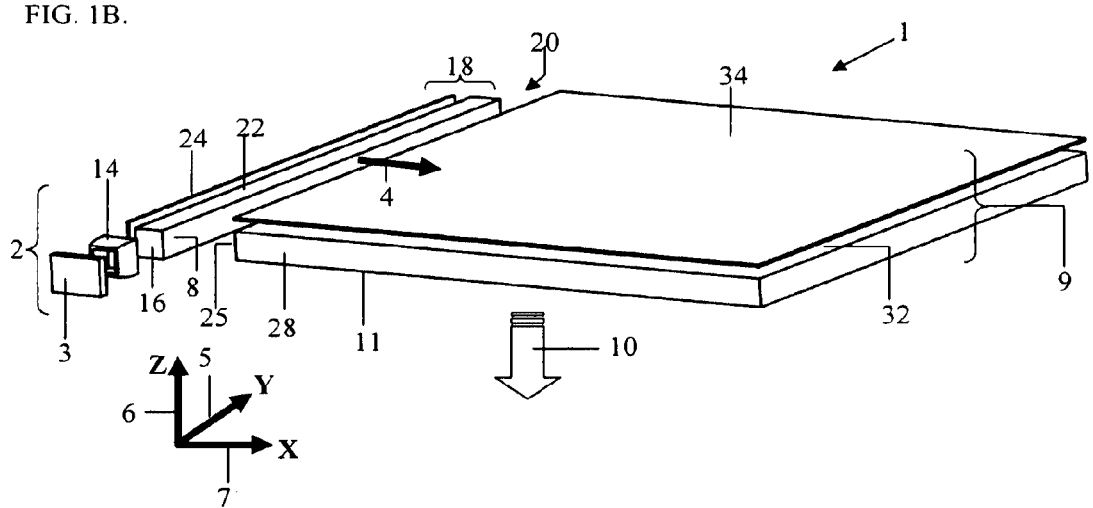

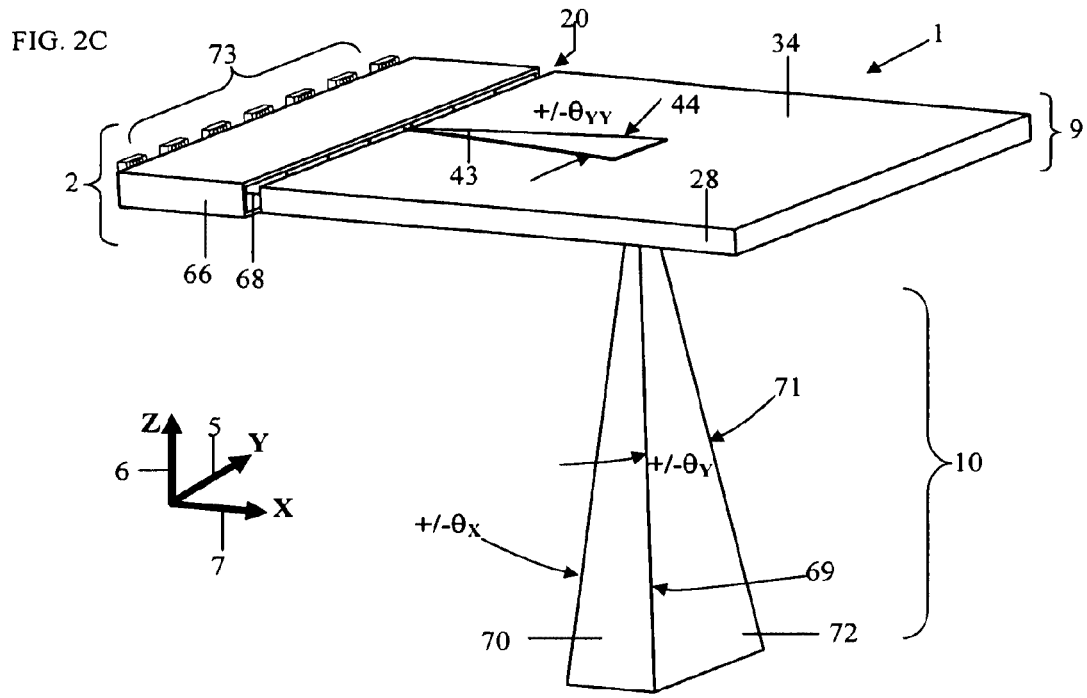
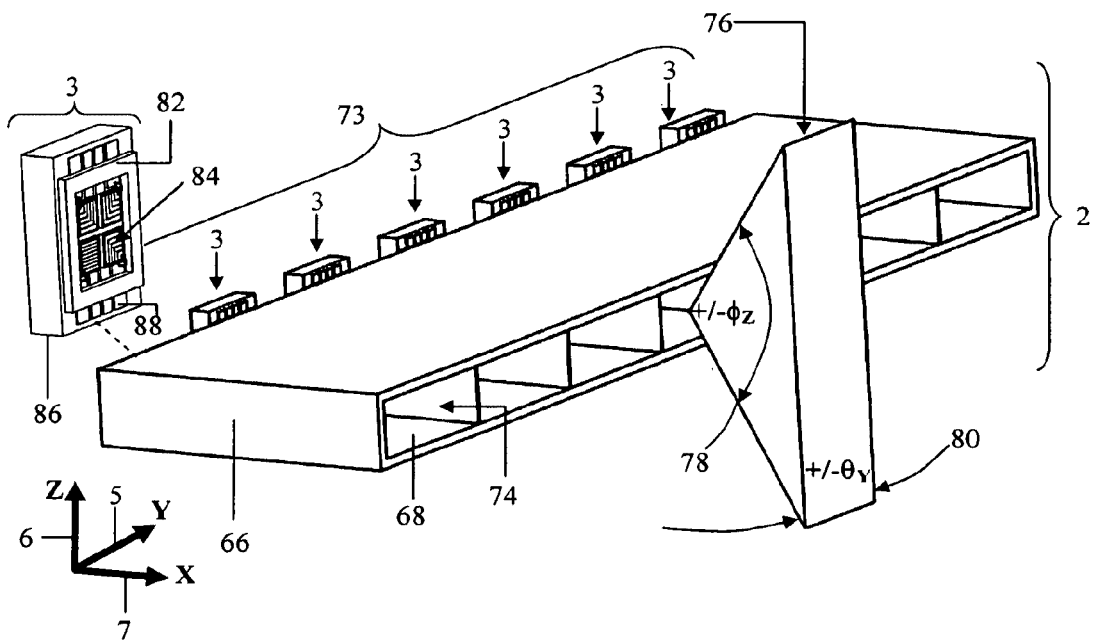

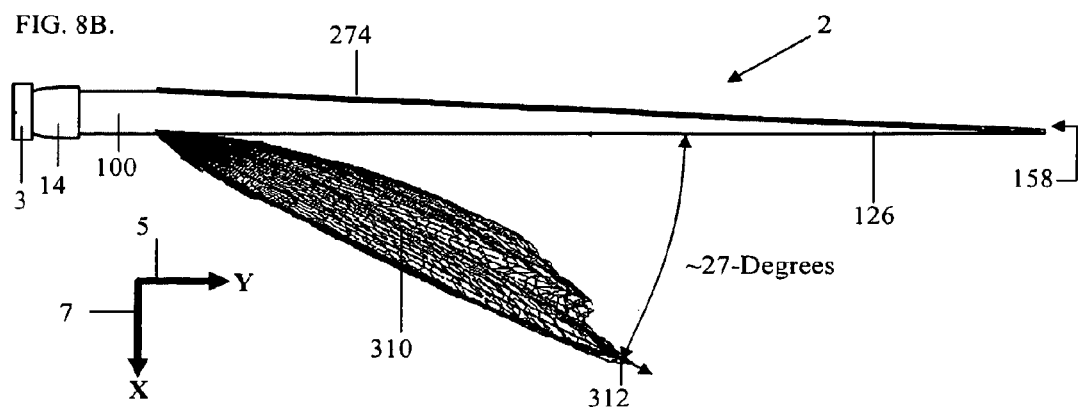
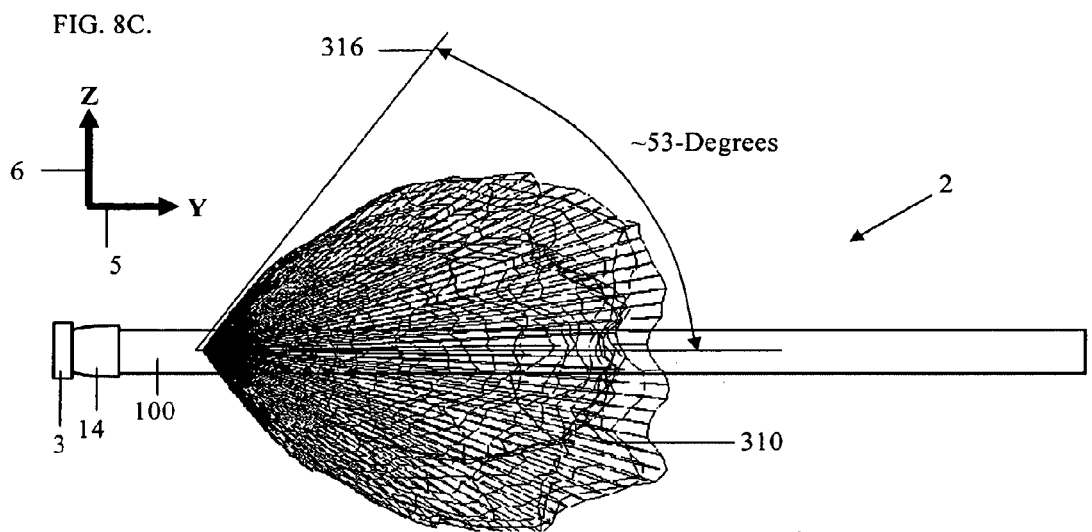
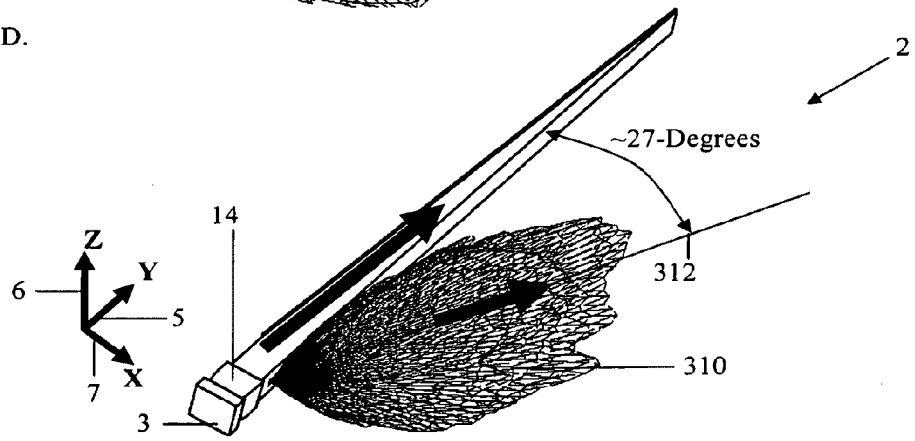

+/-6.0-Degrees, Air    +/-3.77-Degrees, Pipe

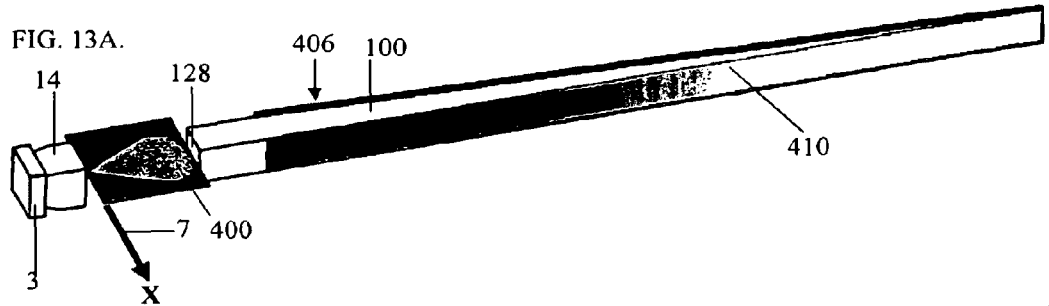
FIG. 13A.
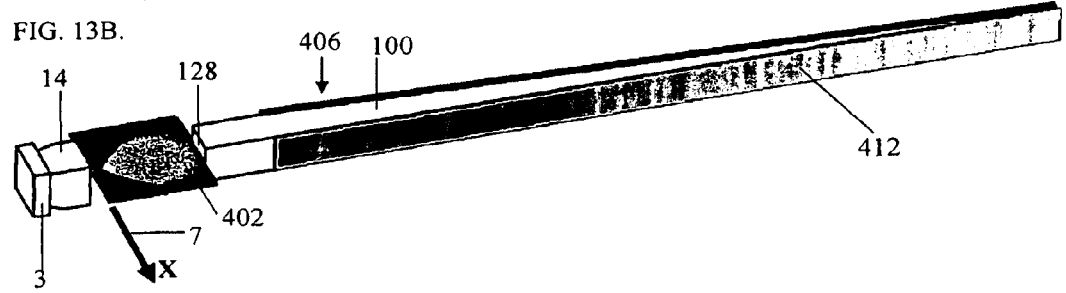
FIG. 13B.
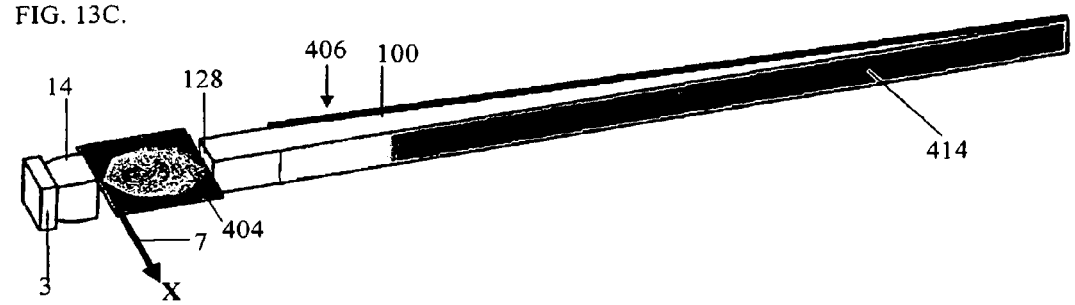
FIG. 13C.
FIG. 14A.     FIG. 14B.     FIG. 14C.     FIG. 14D
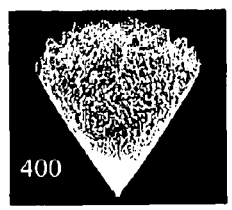 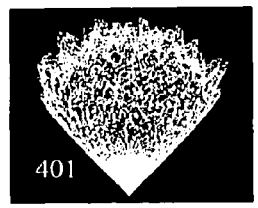 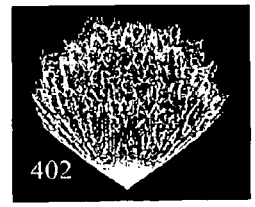 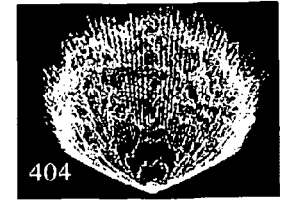

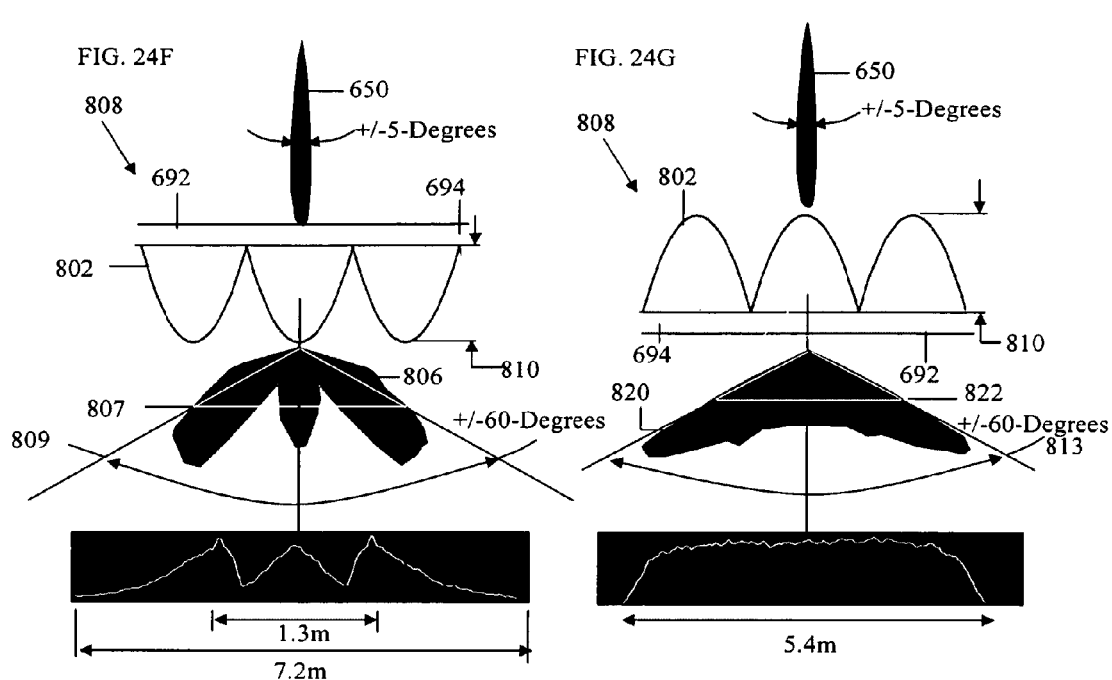
FIG. 24F
FIG. 24G
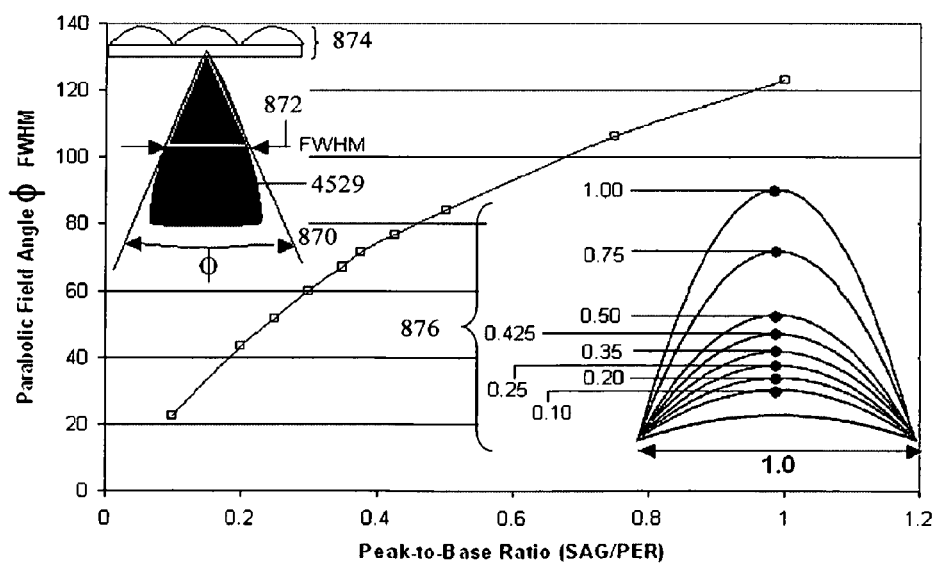
FIG. 25.

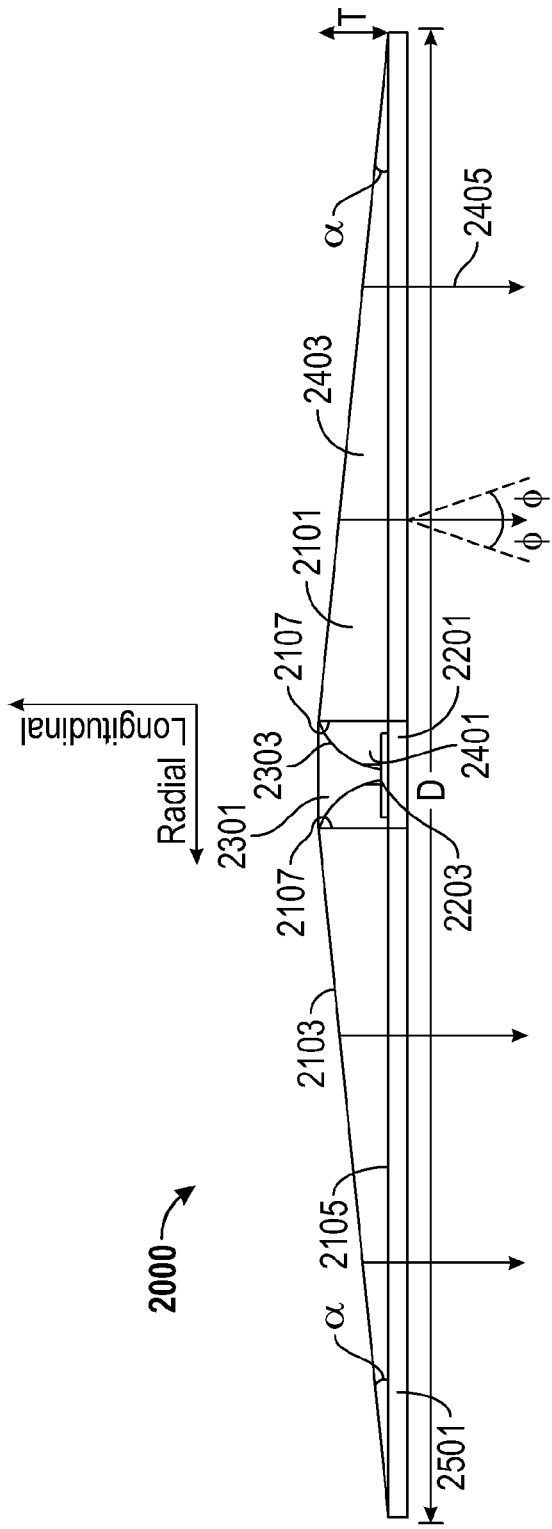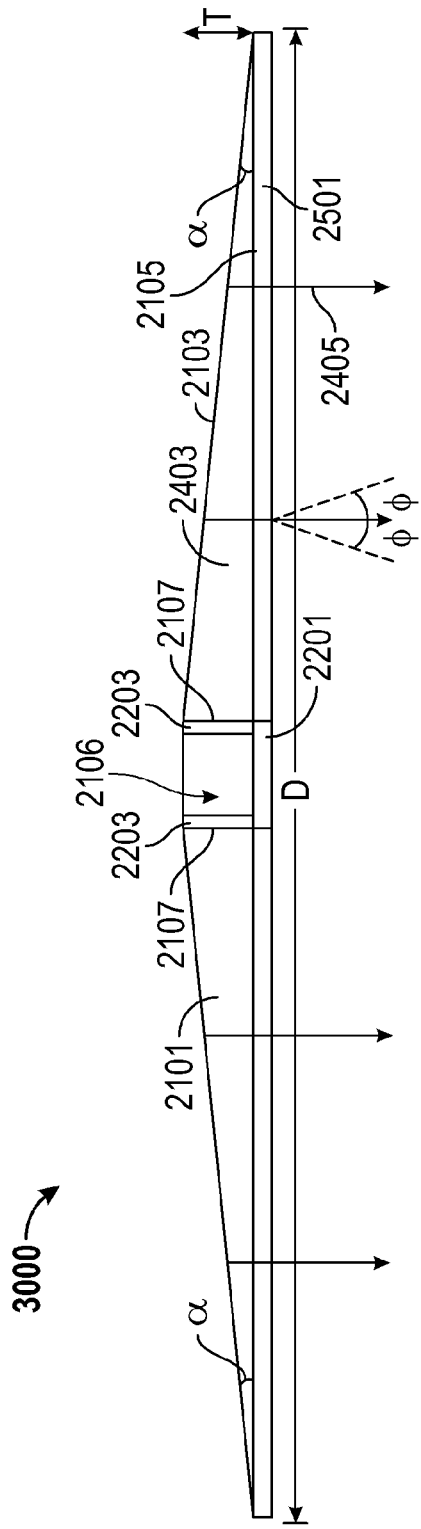

FIG. 36G.
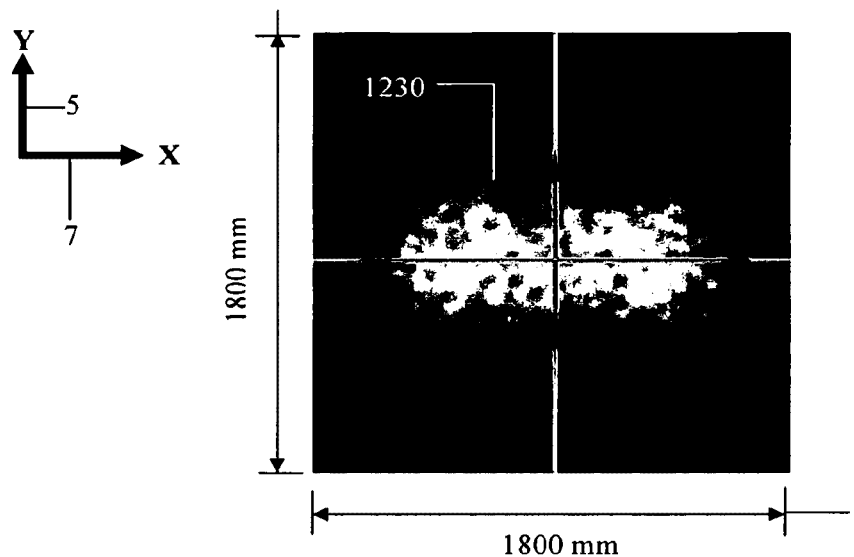
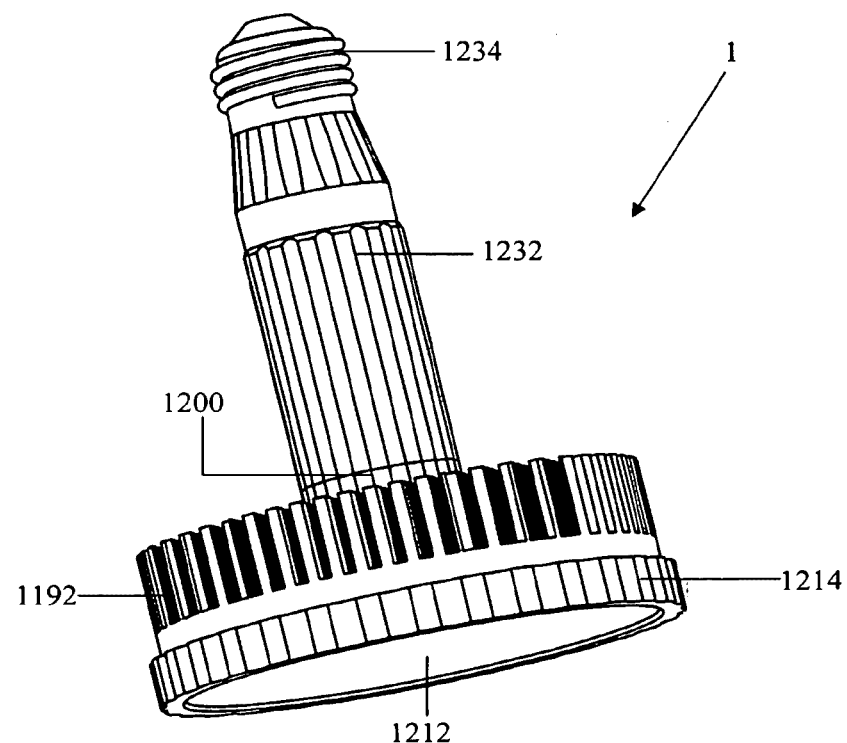
FIG. 37A

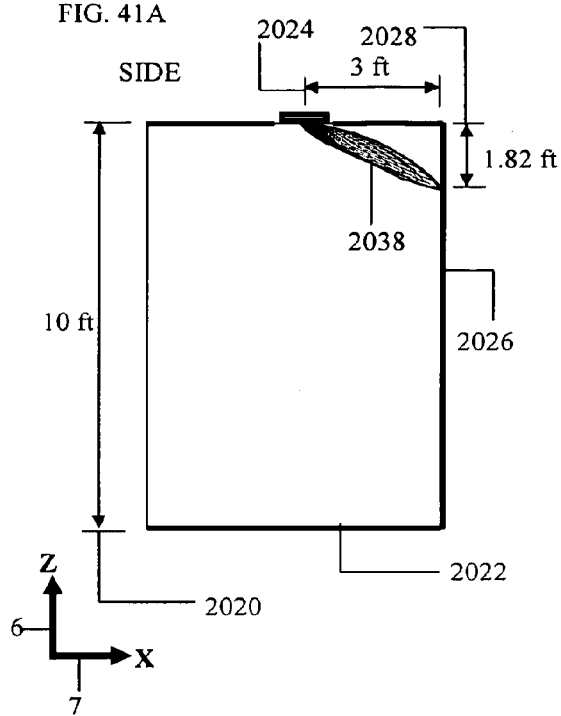
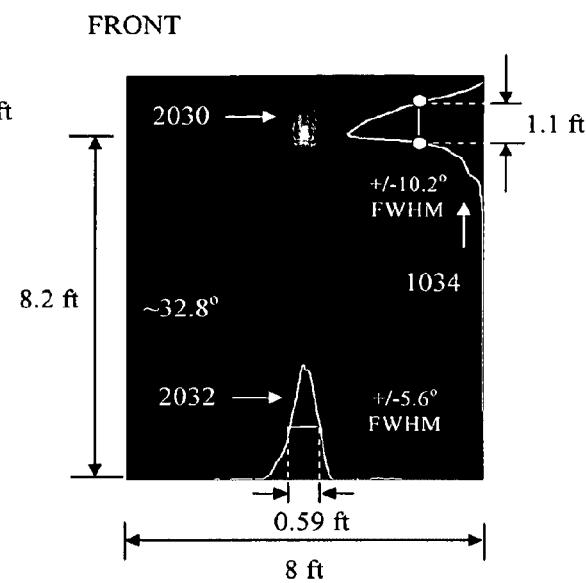
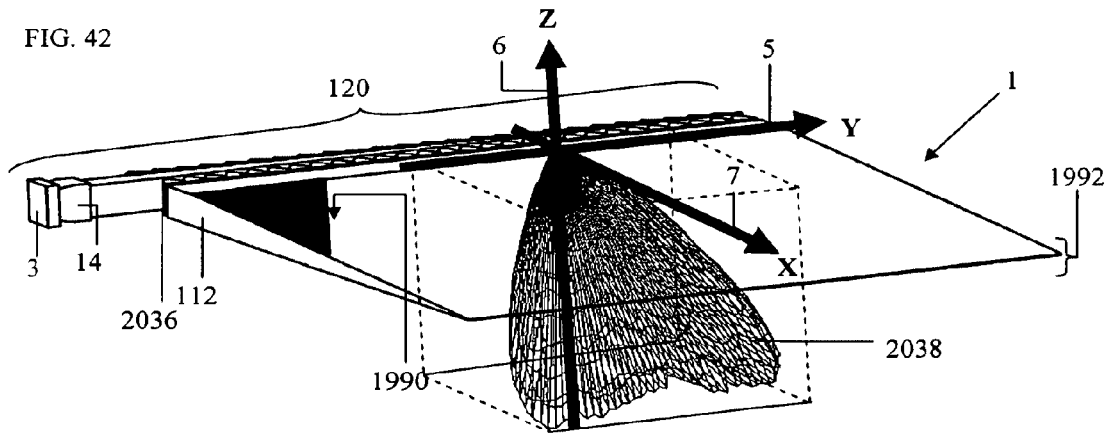

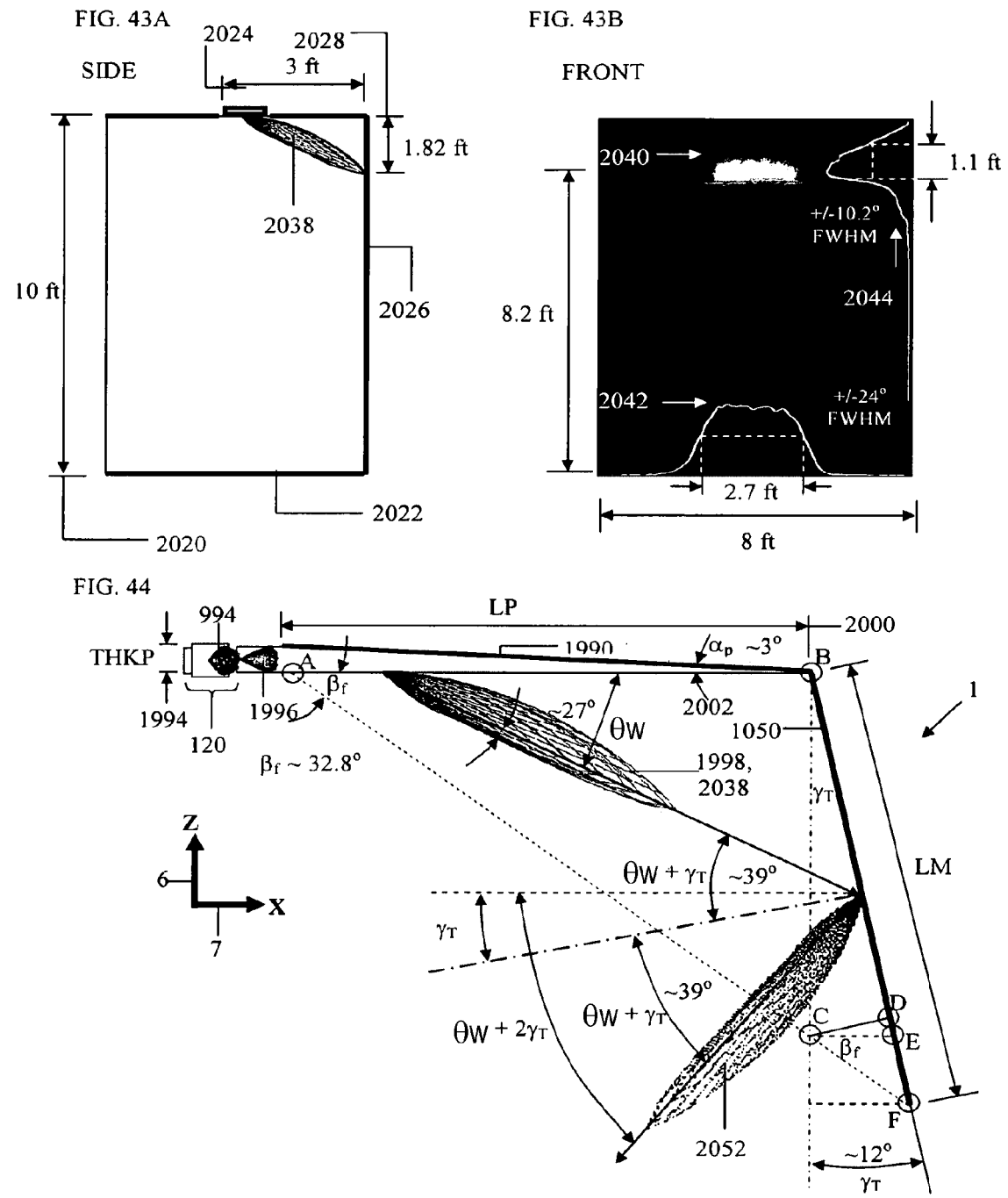

ILLUMINATION DEVICE HAVING A TAPERED LIGHT GUIDE

CROSS-REFERENCE TO RELATED APPLICATIONS

This application is a continuation of U.S. patent application Ser. No. 14/272,174, filed May 7, 2014, which is a continuation of U.S. patent application Ser. No. 13/563,377, filed Jul. 31, 2012, now U.S. Pat. No. 8,721,149, which claims priority to U.S. patent application Ser. No. 12/864,857, filed Jul. 27, 2010, entitled "THIN ILLUMINATION SYSTEM," now U.S. Pat. No. 8,348,489, which is a national stage application of International Patent Application No. PCT/US2009/000575, filed Jan. 29, 2009, entitled "THIN ILLUMINATION SYSTEM," which claims priority to U.S. Provisional Patent Application No. 61/024,814, filed Jan. 30, 2008, entitled "THIN ILLUMINATION SYSTEM," all of which are herein incorporated by reference in their entireties.

TECHNICAL FIELD

This disclosure relates to illumination devices.

DESCRIPTION OF THE RELATED TECHNOLOGY

The state of the conventional lighting fixtures used in commercial overhead lighting applications around the world, from the lighting fixtures or luminaries routinely mounted overhead in traditional office ceilings to the many types and shapes of fixtures used in outdoor street lighting, has not changed appreciably in a great many years. Standard lighting fixtures have remained typically large (24"×24"), thick (4"-10"), and weighty (7-30 lbs). The illumination they provide on surfaces below them is often brightest directly underneath, falling off in brightness quickly as distance from the fixture's location increases. Even though a given lighting application may require illumination held predominately to a limited geometric area (for example, a table top or work area), nearby viewers still receive unwanted glare when looking upwards at the fixture's physical aperture. While some conventional fixtures have been designed for limited-angle spotlighting purposes, they typically achieve net illumination efficiencies far lower than desired from a modern energy conservation perspective. Some light, is wasted by misdirection outside the area of interest, and other light, by the inefficiency the deliberate physical baffling added to block glare, which also adds significantly to the fixture's mechanical bulkiness.

A wide range of prior art has been associated with improvements in one aspect or another of the various lighting characteristics of this broad class of conventional lighting systems (for example, fluorescent troffers and recessed quartz-halogen or metal halide down lighting cans). While modest gains have been made in luminaire efficiency, uniformity of illumination, and glare reduction, to mention a few, the lighting fixtures themselves have still remained as bulky and imposing as ever.

The net weight of conventional lighting fixtures is too heavy for most standard commercial ceiling frameworks without costly and cumbersome mechanical reinforcements. The heaviest lighting fixtures in most industrial applications need be suspended from the building's structural utility ceiling, rather than from its more convenient decorative one, unless the decorative one is reinforced substantially. Even in the case of the lightest weight conventional fixtures, reinforcing guide wires need be added to provide the extra mechanical support.

Conventional recessed lighting fixtures are also quite thick, which adds to the overhead plenum space required above the decorative ceiling to accommodate them, thereby reducing the effective ceiling height. Ceiling height reduction is particularly an issue in high-rise buildings where ceiling height is already limited by the building's structural boundary conditions.

Recently, commercial lighting fixtures utilizing assemblies of miniature light emitting diodes (LEDs) have started to appear in early applications featuring lighter, more compact packaging. While this trend promises still greater lighting fixture advantages over time, early developments have yet to realize the full potential.

One reason the early LED lighting fixtures have lagged in achieving the compactness they promise is a consequence of their enormous brightness compared with that of the traditional light bulb alternatives. Light emitted by LEDs is created in very small geometric regions, and as a result, the associated brightness (i.e., lumens per square meter per solid angle in steradians) can be extremely hazardous to human view without additional packaging structures added to block, restrict or diffuse direct lines of view. One early solution to the LED's dangerous brightness levels has been to hide them from view in lighting fixtures, whose light is reflected indirectly upwards off wall and ceiling surfaces. While this approach prevents accidental view of the LED's directly, the associated fixtures are as bulky as conventional ones. Another solution involves diffusing the LED light over a larger output aperture. While this approach moderates aperture brightness in floodlighting applications, it does so at the expense of the fixture's thickness, and while also increasing the fixture's propensity for off-angle glare.

Looking at a bare LED emitter, even one combined with a reflector or a lens, is a quite unpleasant experience, typified by temporary blindness and a remnant image lasting minutes or longer. One of the most powerful of today's newest commercial LED emitters generates about 300 lumens in a 2.1 mm×2.1 mm emitting region. This is a brightness of 20 million $Cd/m^2$ (nits). Such brightness appears more than 65,000 times as bright as the background brightness of the typical LCD display screens used in modern desktop computer monitors. Such brightness also appears to be 200 times brighter than the 18" diameter aperture of commercial lighting fixtures using 250 W Hg arc lamps, which are already bright enough to cause viewers to see spots.

Modern LED light emitters require specialized lighting fixtures that capitalize on the LED's compactness potential, while providing a safe and desirable form of general illumination.

One of the more promising LED lighting adaptations involve a prior art LED illumination method, the so-called LED backlight. LED backlights are finding more frequent use as the source of rear illumination for the LCD screens used in large-format computer monitors and home televisions. The emerging LED backlights involved are about 1"-2" thick and spread light from hundreds of internally hidden LED emitters uniformly over their screen area. By spreading and homogenizing the LED light emission, the LED backlight package thereby hides direct visibility of the otherwise dangerous brightness levels imposed by the bare LEDs themselves.

LED backlighting systems could be applied directly, for example, replacing the traditional 24"×24"×8" fluorescent troffer in overhead office ceilings with significantly thinner and lighter weight alternatives.

As welcome as this possible LED lighting approach might be to commercial lighting use, the resulting fixture or luminaire is still a relatively thick and obtrusive one, veiling glare from its naturally wide angle emission remains an open issue, and beaming its output glow to limited task areas, is not provided. And while thinner than conventional light bulb based lighting fixture, LED backlights are still too thick to be conveniently embedded within the body of typical building materials such as ceiling tiles and wall board.

SUMMARY

It is, therefore, an object of this disclosure to provide a compact and slim-profile means of overhead LED illumination for commercial lighting applications, for example, having a prescribed degree of angular collimation in each of its two orthogonal output meridians and a square or rectangular far field illumination pattern.

It is another object of this disclosure to provide a compact and slim-profile means of overhead LED illumination having its degree of angular collimation modified in each of its two orthogonal output meridians by angle-spreading located in its output aperture that maintain the illumination system's rectangular far field illumination patterns.

It is a further object of this disclosure to provide a thin edge-emitting input light engine using a single LED emitter whose output light is collimated in one meridian and not in the other, working in conjunction with the input edge of a light guiding plate subsystem that preserves and transmits the collimated input light with out change in angular extent while collimating un-collimated input light, so that its output light is collimated in both output meridians.

It is also an object of this disclosure to provide a thin edge-emitting input light engine using an array of single LED emitters whose output light is collimated in one meridian and not in the other, working in conjunction with the input edge of a light guiding plate subsystem that preserves and transmits the collimated input light with out change in angular extent while collimating un-collimated input light, so that its output light is collimated in both output meridians.

It is still another object of this disclosure to provide a thin edge-emitting input light engine using a single LED emitter whose output light is collimated in one meridian and not in the other, working in conjunction with the input edge of a tapered light guiding plate subsystem that preserves and transmits the collimated input light with out change in angular extent while collimating un-collimated input light, so that its output light is collimated in both output meridians.

It is yet another object of this disclosure to provide a tapered light guiding plate subsystem that receives input light along its input edge and uses a specific arrangement of reflecting facets and associated optical films laminated to a plane face of the tapered plate so that the tapered light guide plate subsystem is able as to collectively extract, collimate and redirect a square or rectangular beam of output light into the far field.

It is further an object of this disclosure to provide a one-dimensionally operating angle spreading lenticular lens array film whose parabolic lens shape enables unique far field characteristics compared with prior art results.

It is still an additional object of this disclosure to provide for use of two orthogonally oriented one-dimensionally operating angle-spreading lenticular array films having parabollically shaped lenticules able to convert symmetrically collimated light input into either symmetrically or asymmetrically widened output light having square or rectangular beam cross-section and the ability to create square or rectangular illumination patterns.

It is yet further an object of this disclosure to provide for the use of tapered light guiding plates whose cross-section has been extruded linearly forming square and rectangular tapered light guiding plates with flat plane input edges.

It is still yet further an object of this disclosure to provide for the use of tapered light guiding plates whose cross-section has been extruded radially forming circular tapered light guiding plates having cylindrical light input edges at the center of the circular plates.

It is yet an additional an object of this disclosure to provide for the use of tapered light guiding plates whose cross-section has been extruded both radially and linearly so as to form square and rectangular tapered light guiding plates having cylindrical light input edges at the center of the square or rectangular plates.

It is still one other object of this disclosure to apply lenticular filmstrips to the input edge of light guiding plates for the purpose of widening the angle extent of an illumination system's output light in one meridian and not in the other.

It is still another object of this disclosure to apply geometrically shaped portions of lenticular filmstrips to the input edge of light guiding plates for the purpose of widening the angle extent only in a local region of an illumination system as a means of improving near field brightness uniformity.

It is yet one other object of this disclosure to deploy thin-profile illumination systems with symmetrically and asymmetrically collimated light for the purpose of lighting a specific work task or work area.

It is additionally an object of this disclosure to deploy thin-profile illumination systems having oblique illumination beams with symmetrically and asymmetrically collimated light for the purpose of lighting a specific wall mounted object, or for the purpose of providing a wash of light over a selected region of a wall.

It is yet an additional object of this disclosure to provide a thin-profile illumination system whose aperture brightness has been moderated by spreading light over an enlarged area, while doing so without compromise in the sharpness of angular cutoff displayed by the illuminating beams that are produced.

It is a further object of this disclosure to provide a thin-profile illumination system whose aperture brightness has been moderated by spreading light over an enlarged area, while doing so without compromise in the square-ness or rectangularity of the field patterns that are produced.

It is yet a further object of this disclosure to provide a thin-profile illumination system whose illumination remains largely within fixed square or rectangular angular beams as a means of reducing off-angle glare visible from below.

One innovative aspect of the subject matter described in this disclosure can be implemented in an illumination device. The illumination device includes a light guide and a light source. The light guide also includes a peripheral edge disposed about a longitudinal axis of the device, a center portion having a light entry surface through which light emitted from the light source propagates into the light guide, a transmissive illumination surface oriented perpendicular to the longitudinal axis and disposed between the center portion and the peripheral edge, and an upper surface. The upper surface is disposed between the center portion and the peripheral edge and oriented relative to the illumination surface to define an angle α therebetween. The angle α is less than 15 degrees.

In some aspects, the device can also include a reflective surface disposed adjacent to at least a portion of the upper surface to reflect light toward the illumination surface. The reflective surface can include a reflective coating disposed over at least a portion of the upper surface or a prism-like ejection film, for example. The reflective surface can be separated from the light guide by a material having an index of refraction less than an index of refraction of the light guide. In some aspects, at least a portion of the upper surface includes a reflective surface. The angle α can be greater than 2 degrees and less than 8 degrees.

In some aspects, the device can also include an optical coupler disposed in an optical path between the light source and the light guide entry surface. The optical coupler can be configured to receive light from the light source and direct light into the light guide through the light entry surface and can be a curved reflector. In some aspects, the light source can include at least one light emitting diode. For example, the light source can include a plurality of light emitting diodes angularly offset from one another about the longitudinal axis. In some aspects, the light entry surface can be disposed around the longitudinal axis and facing the longitudinal axis. Each light emitting diode can include a light emitting surface that is oriented to provide light through the light entry surface into the light guide in a radial direction relative to the longitudinal axis of the device.

In some aspects, the device can include an optical conditioner, for example, a lenticular structure, disposed below the illumination surface such that the illumination surface is between the optical conditioner and the upper surface. In some aspects, the light entry surface can be formed by a recess in the upper surface of the light guide.

In some aspects, the device can include an electrical coupling having at least two separate electrical connections for connecting the illumination device to a power source and an electronics chassis disposed between and electrically connecting the electrical coupling and the light source. In some aspects, the electronics chassis can include a heat transfer structure thermally coupled to the light source to dissipate heat from the light source, for example, a heat transfer structure disposed between the electronics chassis and the light guide. In some aspects, the electronics chassis has a maximum radial dimension that is less than a maximum radial dimension of the light guide. In some aspects, a chandelier can include the device and can include a connector that is offset on the longitudinal axis from the light source and electrically coupled to the light source. The chandelier can include a mounting plate disposed between the light source and the electrical coupling and configured to mechanically couple the chandelier to a fixed structure.

Another innovative aspect of the subject matter described in this disclosure can be implemented in a method of manufacturing an illumination device. The method includes forming a transparent structure including a tapered upper surface and a lower surface, and polishing the lower surface of the transparent structure to reduce a longitudinal dimension between the lower surface and the upper surface. A peripheral edge of the transparent structure between the upper surface and the lower surface after polishing defines an angle α greater than 1 degree and less than 8 degrees.

In some aspects, the transparent structure can have a maximum radial dimension that is less than or equal to 4 inches. Forming the transparent structure can include providing a substrate having a surface to support a tapered surface of the transparent structure. In some aspects, the method can include forming a light entry surface in a center portion of the transparent structure and positioning a light source near the center portion of the transparent structure. In some aspects, positioning a light source near the center portion of the transparent structure can include positioning the light source relative to the transparent structure such that light emitted from the light source is received into the transparent structure through the light entry surface and propagates in a radial direction from the light source toward the periphery of the transparent structure.

Yet another innovative aspect of the subject matter described in this disclosure can be implemented in a method of installing a lighting device within a lighting fixture having an opening and an electrical connection opposite to the opening and having a minimum radial dimension. The method includes providing a device including a light guide and an electrical coupling. The light guide has a maximum radial dimension and has an illumination surface configured to emit light from the light guide, and an upper surface configured to reflect light propagating in the light guide toward the illumination surface. The illumination surface and the upper surface meet at the peripheral edge of the light guide defining an angle α between the illumination surface and the upper surface. The angle α is less than 15 degrees, for example, between 2 degrees and 8 degrees. The method also includes coupling the electrical coupling of the device to the electrical connection of the lighting fixture.

In some aspects, the maximum radial dimension of the light guide can be less than the minimum radial dimension of the opening. In some aspects, the maximum radial dimension of the light guide can be greater than the minimum radial dimension of the opening.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 1A illustrates a perspective view of a thin profile illumination system containing two interconnected subcomponents, an edge-emitting light bar input engine using a single LED emitter and a light guide plate that outputs a beam of square or rectangular collimated light from one plate surface.

FIG. 1B contains an exploded view of the illumination system illustrated in the perspective view of FIG. 1A.

FIG. 2C illustrates a perspective view of a thin profile illumination system containing two interconnected subcomponents, an edge-emitting array-type input engine using a multiplicity of LED emitters as input and a multiplicity of angle-transforming reflectors as output, placed in conjunction with the same light guide plate illustrated in FIG. 1A that outputs a square or rectangular beam of collimated light from one plate surface as shown.

FIG. 2D provides an exploded perspective view of the output edge of the edge-emitting array-type input engine illustrated in FIG. 2A, including a perspective representation of the engine's output light collimated in one meridian, and not in the other.

FIG. 8B provides a topside view of the edge-emitting LED light emitter of FIG. 8A, showing the obliquely directed far field beam cross-section that results.

FIG. 8C provides a front view illustrating the light beam cross-section that is emitted from the output edge of the system of FIG. 8B.

FIG. 8D illustrates the LED light emitter of FIGS. 8A-8C in a topside perspective view showing the highly asymmetric nature of its obliquely directed output illumination.

FIG. 13A is a perspective view showing the adverse effect a very narrow-angle input source of light has on near field spatial uniformity along the length of the engine's output edge.

FIG. 13B is a perspective view showing the beneficial effects a wider-angle source of input light has on the near field spatial uniformity along the length of the engine's output edge.

FIG. 13C is a perspective view showing the adverse effects on near field spatial uniformity along the length of the engine's output edge when using an input source distribution with too large an angular range.

FIG. 14A is a graphic representation of one particularly narrow-angle light distribution provided as input to the light guiding pipe of the edge-emitting input engine of FIG. 12A.

FIG. 14B is a graphic representation of a slightly wider narrow-angle light distribution provided as input to the light guiding pipe of the edge-emitting input engine of FIG. 12A.

FIG. 14C is a graphic representation of an appropriately wide-angle light distribution provided as input to the light guiding pipe of the edge-emitting input engine of FIG. 12A.

FIG. 14D is a graphic representation of too wide an angular light distribution provided as input to the light guiding pipe of the edge-emitting input engine of FIG. 12A.

FIG. 24F shows the wide angle tri-modal far field beam cross section that results when +/−5 degree×+/−5 degree collimated light as from the light emitting system of FIG. 3A is applied to the plane side of a lenticular lens sheet having parabollically shaped lenticular elements with a very deep sag.

FIG. 24G shows the very wide angle far field beam cross section that results when +/−5 degree×+/−5 degree collimated light as from the light emitting system of FIG. 3A is applied to the lens side of a lenticular lens sheet having parabollically shaped lenticular elements with a very deep sag.

FIG. 25 is a graph summarizing the best mode geometric relationship found to exist between total far field angle and the parabolic lenticular peak-to-base ratios between 0.1 and 1.0, for lenticular diffuser sheets.

FIG. 35D shows a cross-sectional view of an example illumination device including a tapered light guide.

FIG. 35E shows a cross-sectional view of an example illumination device including the tapered light guide of FIG. 35D.

FIG. 36G shows the illustrative far field beam pattern from the thin illumination of FIG. 36F placed at a 1500 mm height above the 1800 mm×1800 mm surface to be illuminated.

FIG. 37A is a schematic perspective view illustrating the thin profile light engine example of FIG. 36E configured as screw-in style light bulb.

FIG. 40B is a side cross-sectional view of FIG. 40A.

FIG. 40C is a perspective view of the illumination system of FIGS. 40A-40B showing the collimated nature of the obliquely directed far field output beam the system produces.

FIG. 41A is a side elevation showing the illumination system of FIGS. 40A-40C mounted 10 feet above ground level and a horizontal distance of 3 feet from a vertical wall surface to be illuminated.

FIG. 41B shows a front view of an illuminated wall surface and the beam pattern made by illumination system 1 of FIG. 41A.

FIG. 42 is a perspective view of an illumination system similar to that of FIG. 40C, but including a one-dimensional angle-spreading lenticular filmstrip on the input-edge the system's tapered light guiding plate to widen the outgoing beam's horizontal angular extent.

FIG. 43A illustrates the side elevation of a wall and floor including the illumination system of FIG. 42.

FIG. 43B shows a front view of the wall surface illuminated using the illumination system of FIG. 42, including the resulting beam pattern.

FIG. 44 is a side view of a thin profile illumination system implementation based on the illumination systems of FIGS. 40A-40C, 41A, 42 and 43A combined with an external tilt mirror.

FIG. 45A is a side elevation showing the tilted-mirror illumination system of FIG. 44 for a 12-degree tilt mounted 10 feet above ground level and positioned 3 feet from the vertical wall surface to be illuminated.

FIG. 45B shows a front view wall surface illuminated by the 12-degree tilted mirror illumination system of FIG. 44 and its associated beam pattern.

FIG. 46A is a side elevation identical to FIG. 45A, but for the case of a 16-degree mirror tilt.

FIG. 46B shows a front view wall surface illuminated by the 16-degree tilted mirror illumination system of FIG. 46A and its associated beam pattern.

Figure 46A:
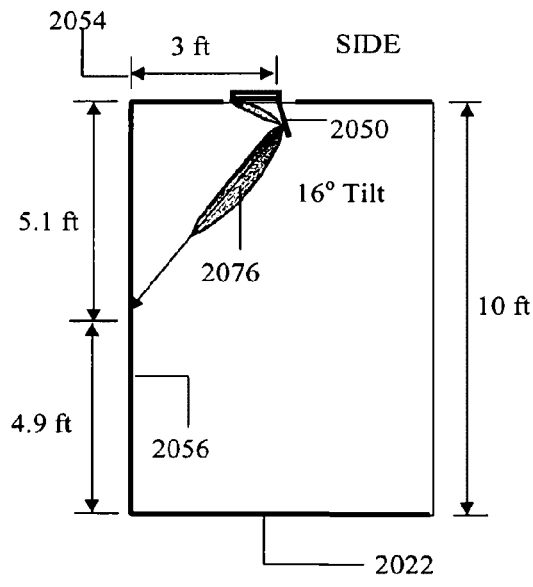
Figure 46B:
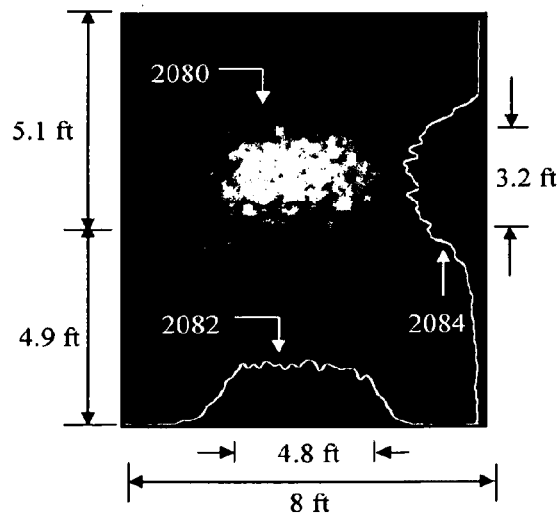
Figure 47:
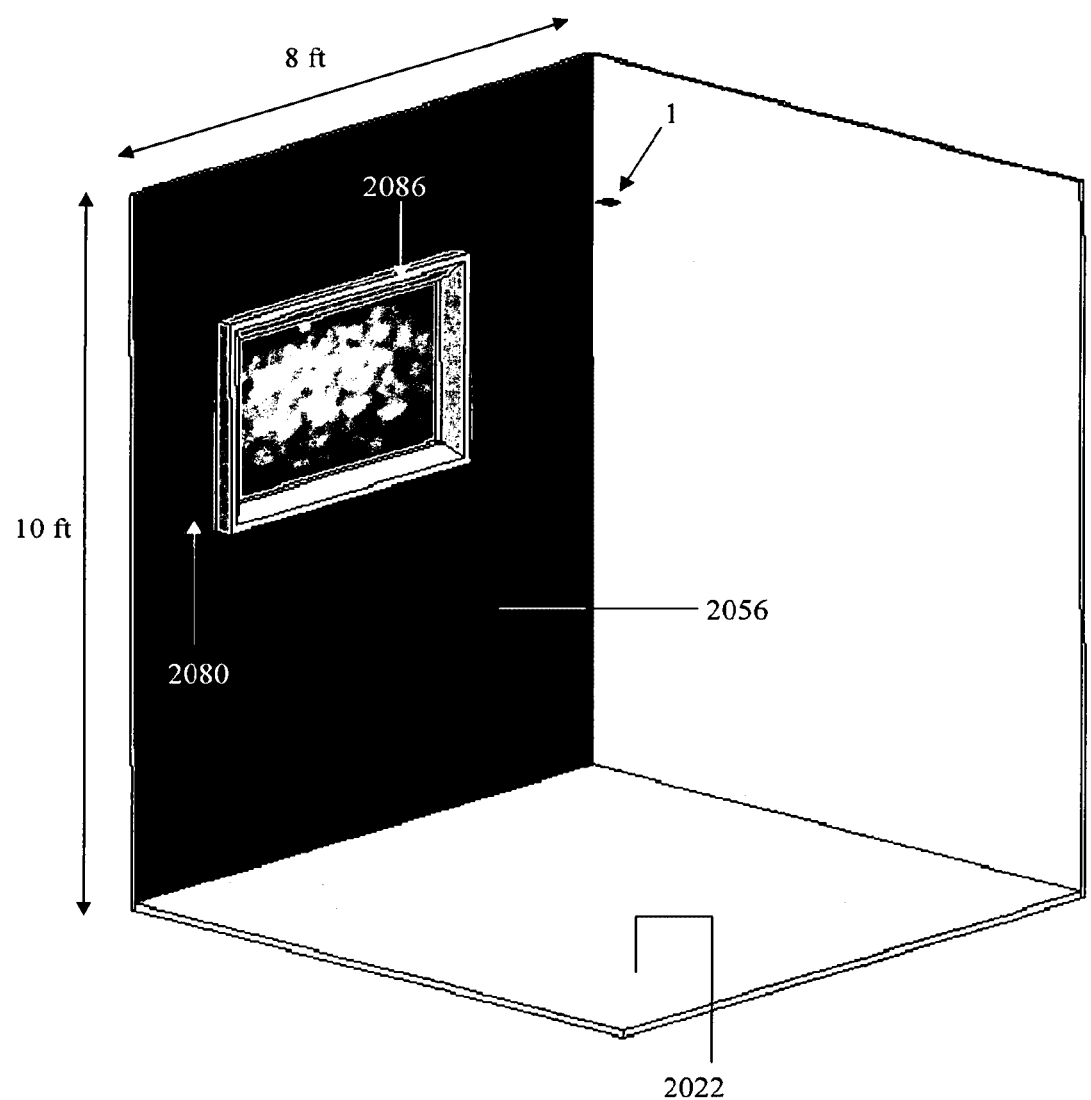

FIG. 47 is a perspective view of the corner of a room, showing its two walls, a floor, and a framed painting illuminated obliquely by the thin-profile tilted mirror illumination system of FIGS. 44, 46A and 46B.

Figure 48A:
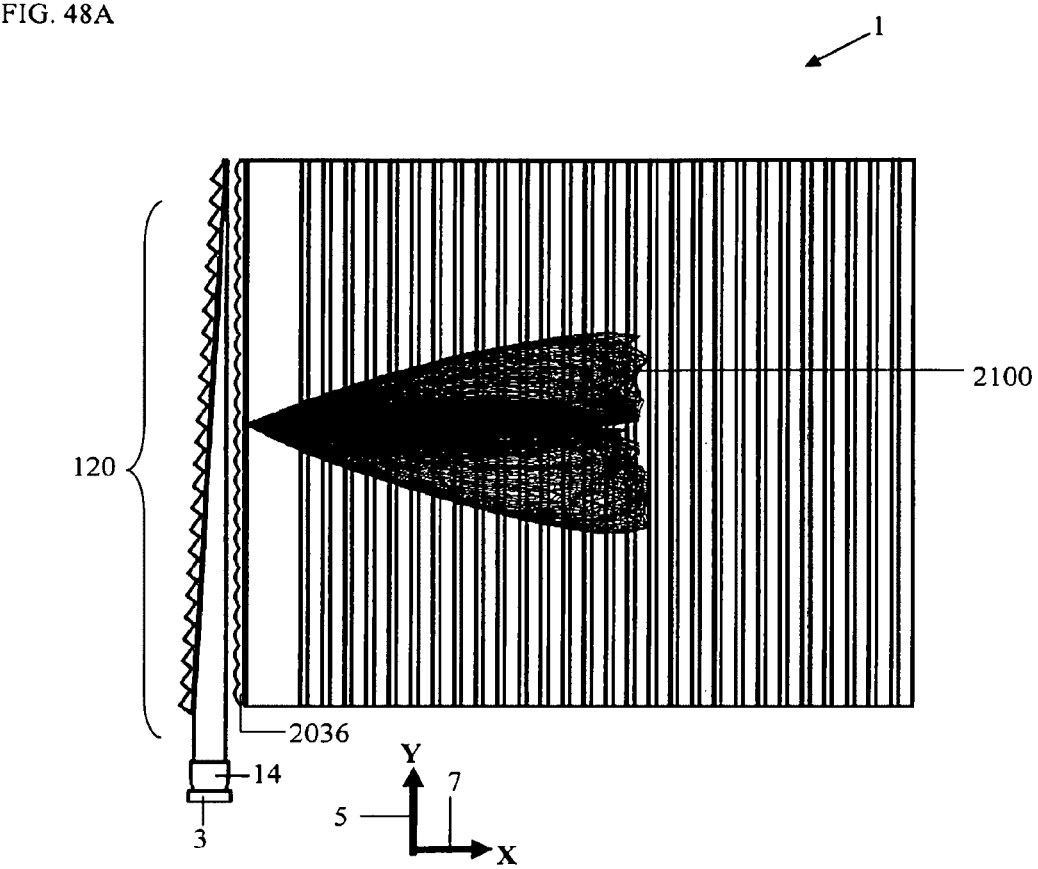

FIG. 48A shows a topside view similar to FIG. 42, adding a one-dimensional angle-spreading lenticular filmstrip to input edge of the system's light guiding plate to widen the outgoing beam's horizontal angular extent, using a prism sheet rather than a plane mirror atop tapered light guiding plate.

Figure 48B:
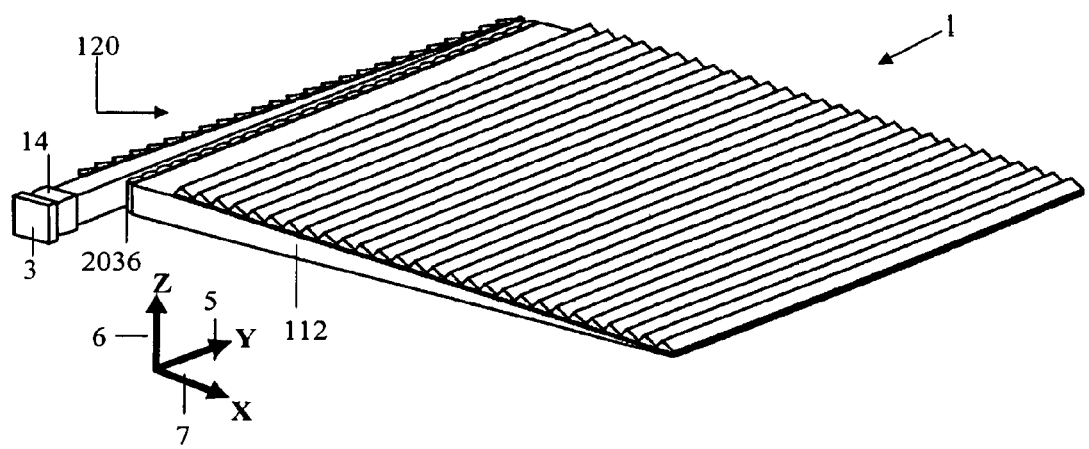

FIG. 48B shows the configuration of FIG. 48A in perspective view.

Figure 39A:
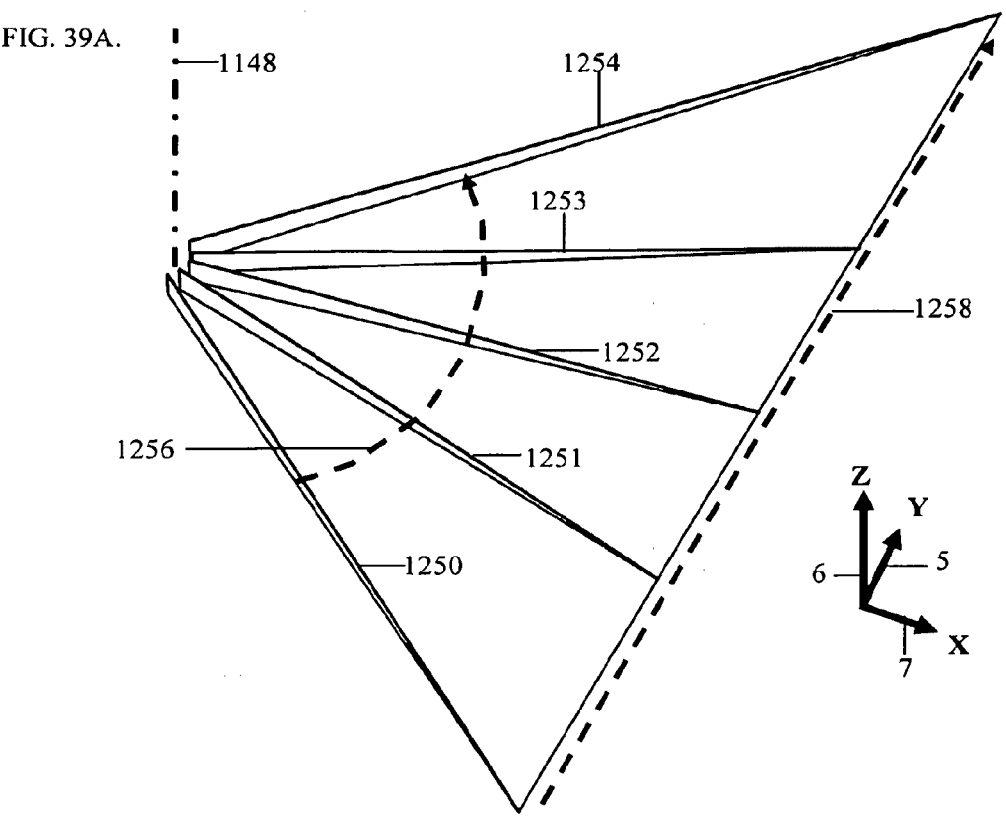
FIG. 39A illustrates a radially and linearly constrained extrusion with five prototype taper cross-sections, swept in a 90-degree radial arc segment about an axis line running parallel to system's Z-axis.
Figure 48C:
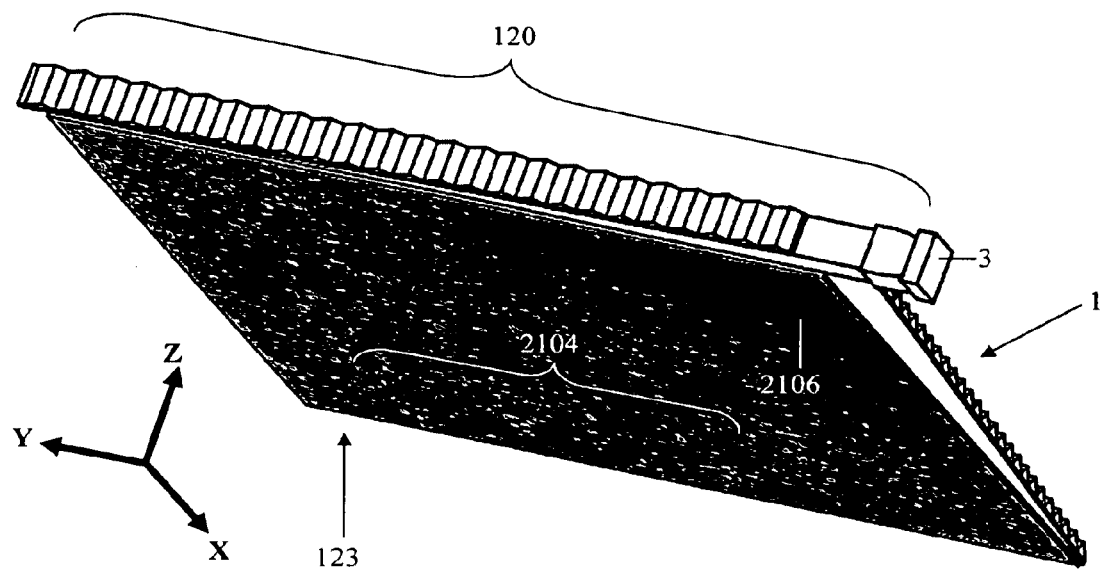

FIG. 48C is another perspective view of FIG. 39A, showing the illumination system's underside output aperture.

Figure 49:
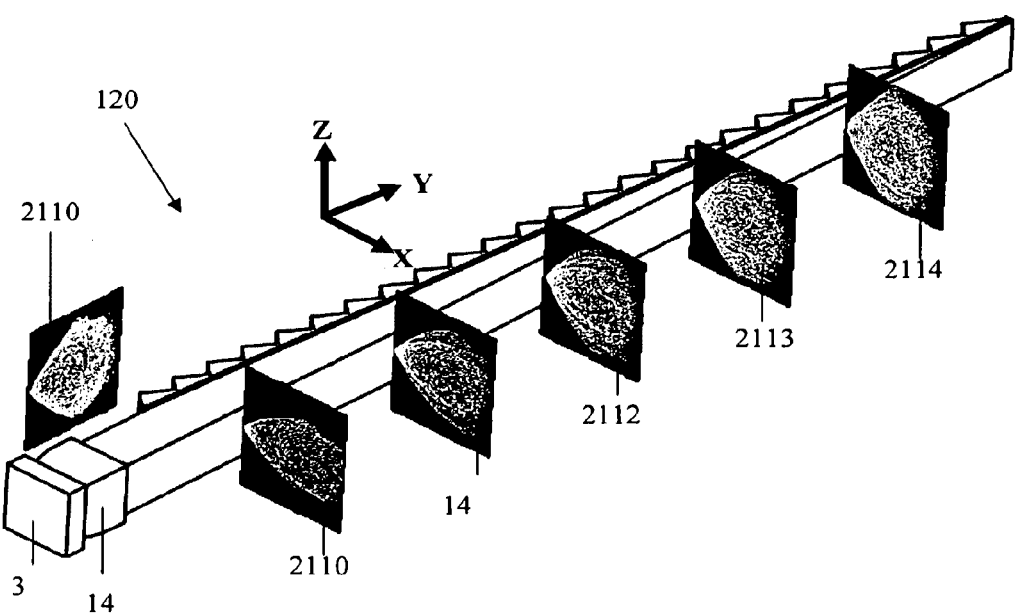

FIG. 49 is a perspective view of the tapered-version of the light guiding input engine 120, showing f angular extent of the light at the start of the light guiding pipe, plus a graphic simulation sequence of output light at various points along the pipe's output edge.

FIGS. 50A-50B, 50D, 50F and 50G all show perspective views of the slim profile illumination system differentiated by the various lenticular film section configurations that have been simulated.

Figure 50A:
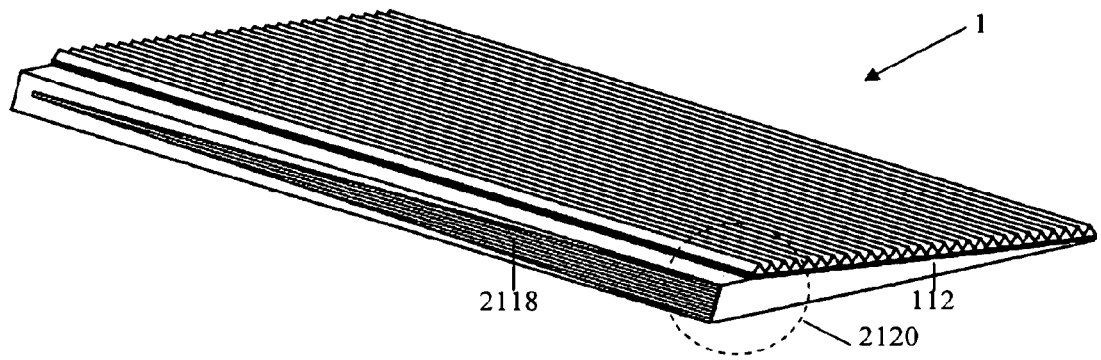
Figure 50B:
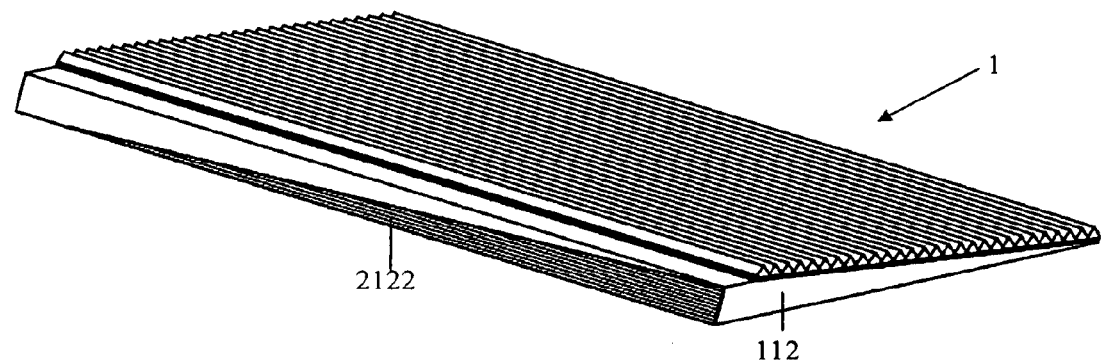
Figure 50C:
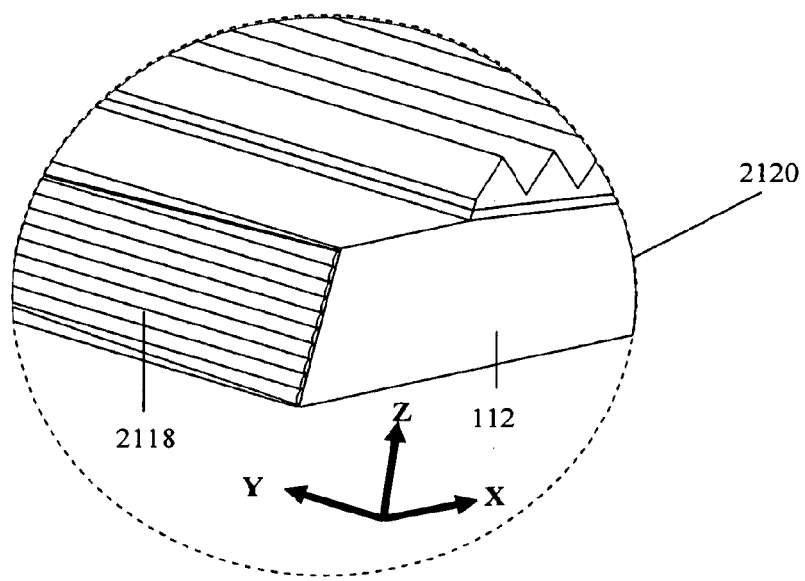
Figure 50D:
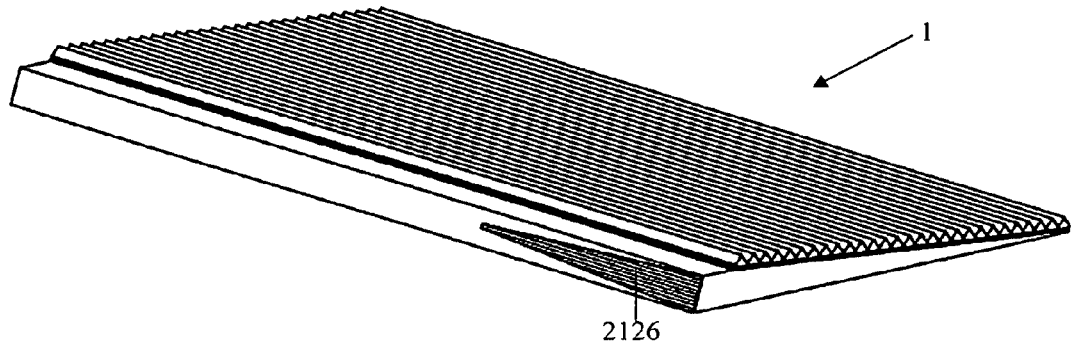

FIG. 50C shows a magnified view of the perspective of FIG. 50A.

Figure 50E:
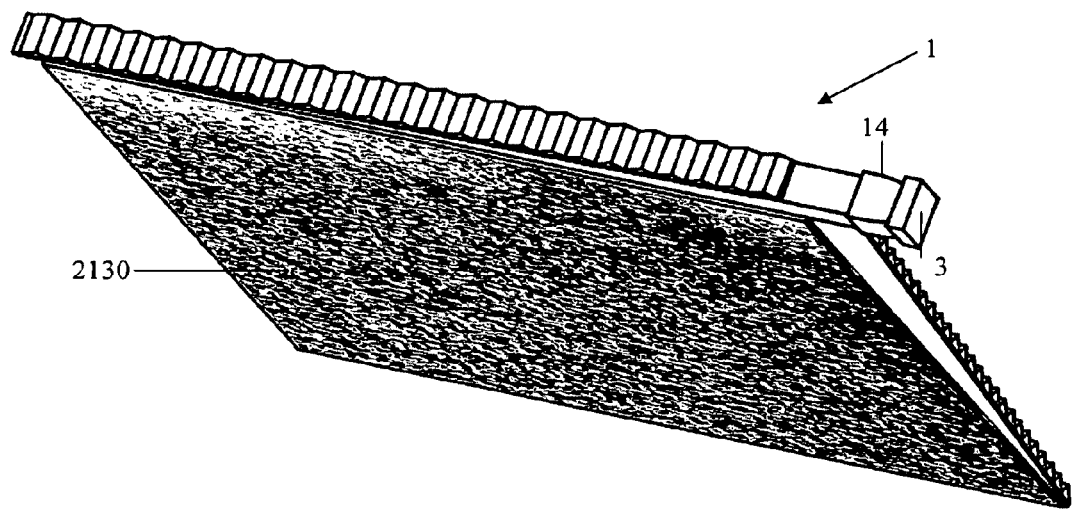
Figure 50F:
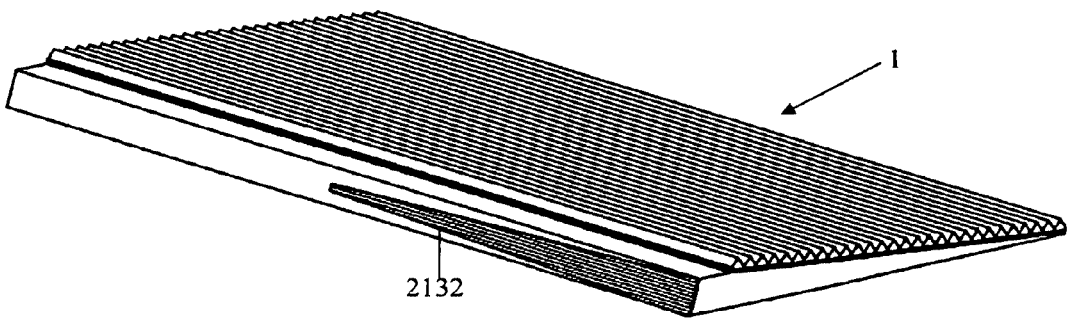
Figure 50G:
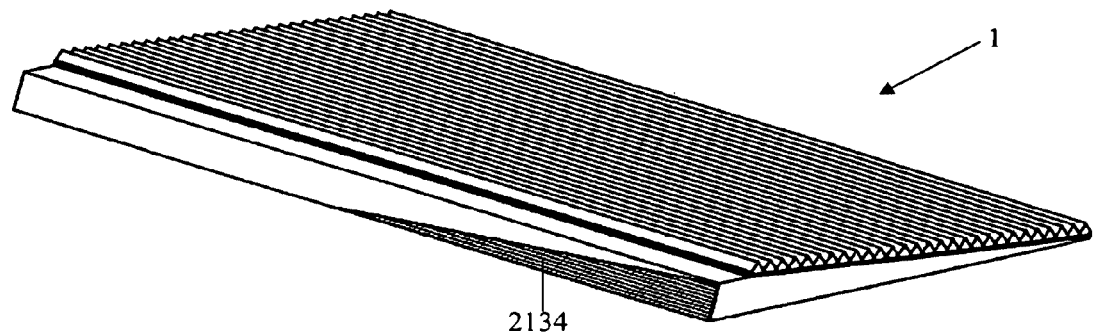
Figure 50H:
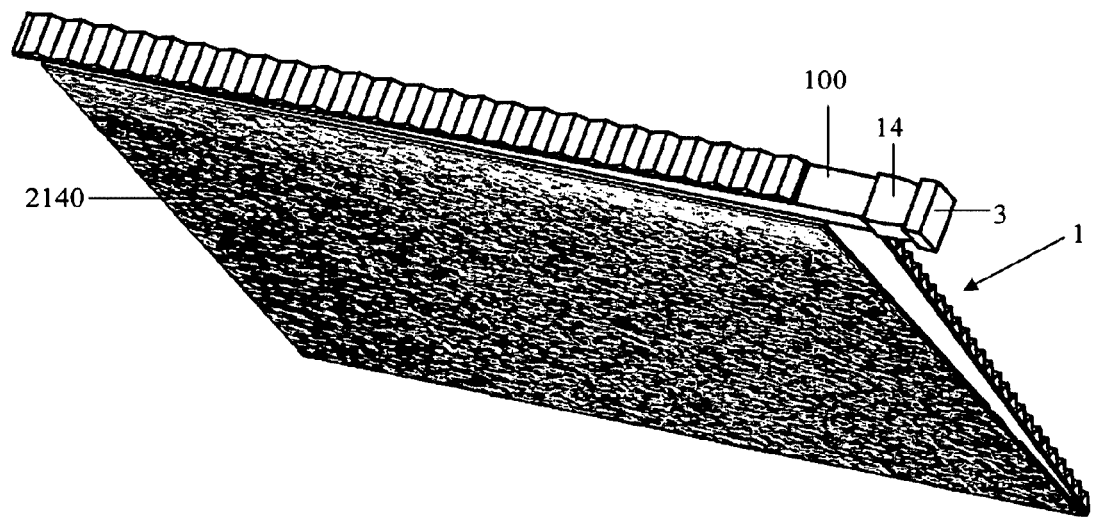

FIGS. 50E and 50H show perspective views of two different near field uniformity improvements.

Figure 51A:
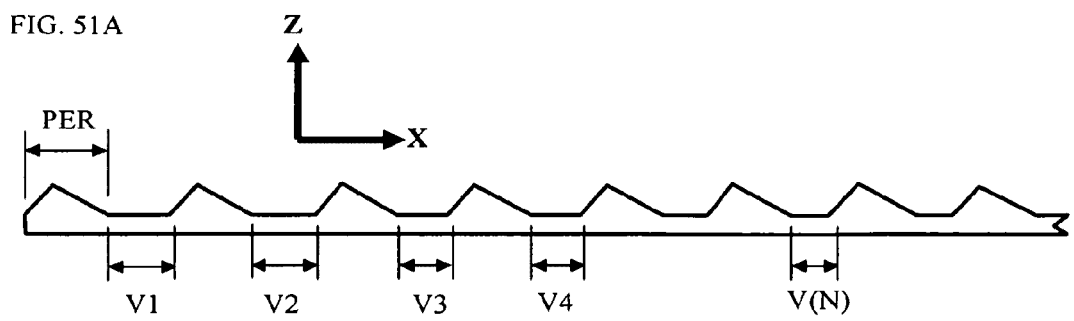

FIG. 51A shows a side view of a schematic light extraction film cross-section that underlies the concept behind a variable prism spacing design method, using conveniently enlarged prism coarseness.

Figure 51B:
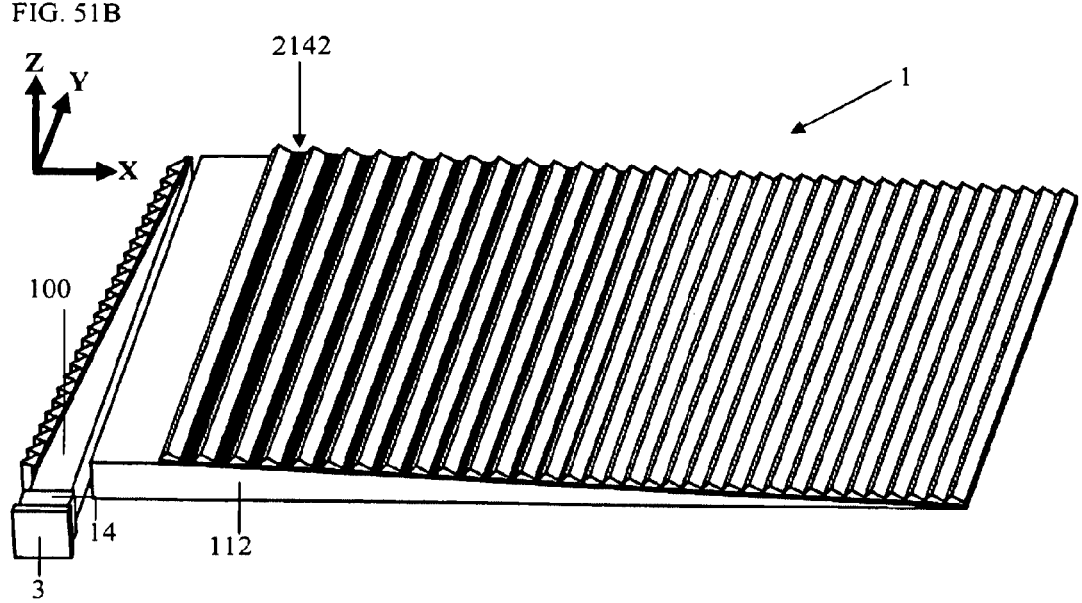

FIG. 51B shows a perspective view of the design concept illustrated in FIG. 51A.

Figure 51C:
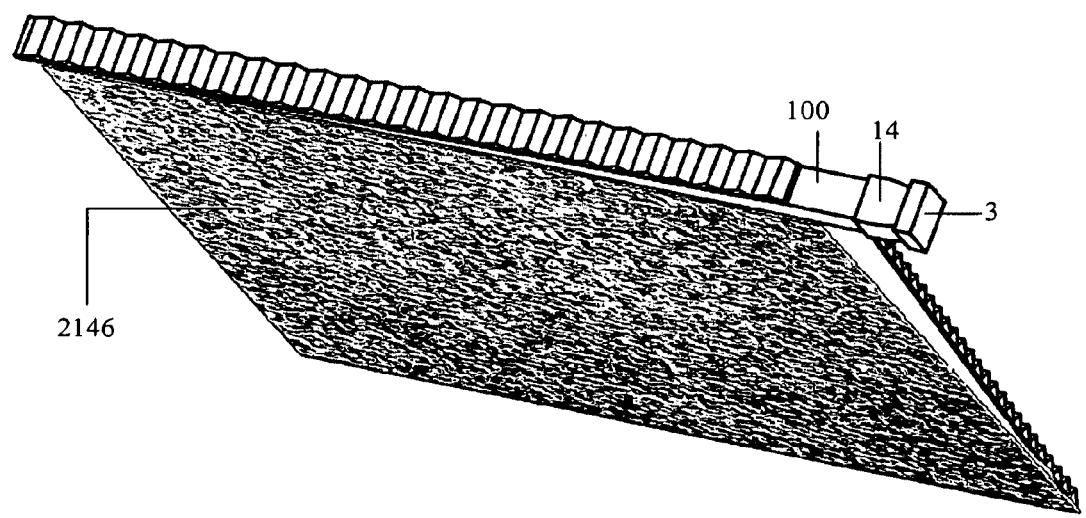

FIG. 51C shows a perspective view of a thin illumination system 1 with successfully homogenized near field using the variable prism-spacing method.

Figure 52:
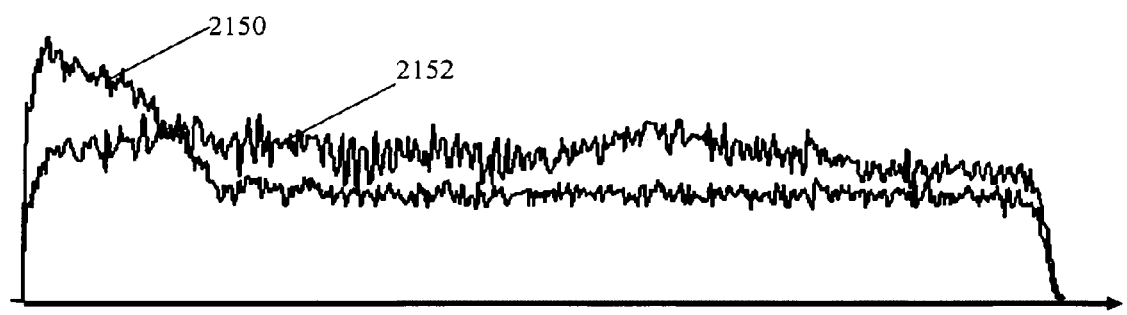

FIG. 52 shows a graphical comparison of near field spatial non-uniformity of one thin profile illumination system partially successful angular input edge correction as in FIG.

41H and one with the complete correction illustrated in FIG. 42C via the variable-prism spacing-method.

FIGS. 53A-53E show examples of cross-sectional schematic illustrations of various stages in a method of manufacturing an illumination device including a transparent structure.

Figure 54:
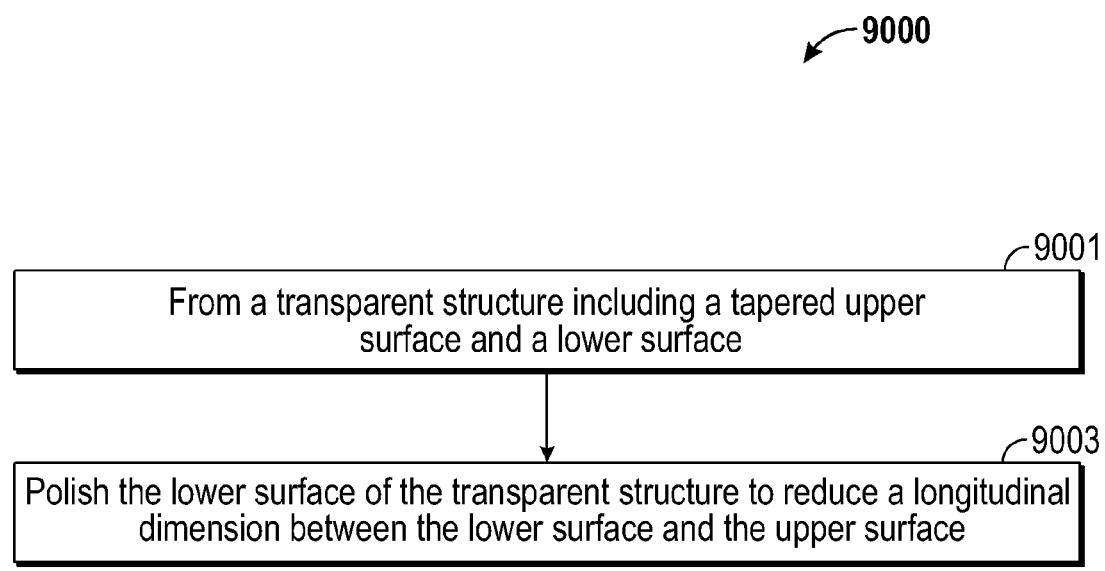

FIG. 54 shows an example of a flow diagram illustrating a method of manufacturing an illumination device.

Like reference numbers and designations in the various drawings indicate like elements.

DETAILED DESCRIPTION

The following detailed description is directed to certain implementations for the purposes of describing the innovative aspects. However, the teachings herein can be applied in a multitude of different ways. It is contemplated that the described implementations may be included in or associated with lighting used for a wide variety of applications such as, but not limited to: commercial, industrial, and residential lighting. Implementations may include but are not limited to lighting in homes, offices, manufacturing facilities, retail locations, hospitals and clinics, convention centers, cultural institutions, libraries, schools, government buildings, warehouses, military installations, research facilities, gymnasiums, sports arenas, or lighting in other types environments or applications. In various implementations the lighting may be overhead lighting and may project downward a spotlight having an area that is larger (for example, several times or many times larger) than an area of a light emitting surface of a lighting device. Thus, the teachings are not intended to be limited to the implementations depicted solely in the Figures, but instead have wide applicability as will be readily apparent to one having ordinary skill in the art.

Implementations disclosed herein include a new class of thin plate-like illumination systems (also, luminaries, illumination devices, lighting devices, and lighting fixtures) whose square, rectangular, circular, or otherwise shaped illuminating beams are distributed uniformly over enlarged output apertures of reduced brightness, while remaining sharply defined and well-directed in their illuminating extent from +/−5- to +/−60 degrees in each meridian, including all asymmetric combinations in between. Such light engines satisfy a wider range of general lighting services than any of the known alternatives, including wide area lighting, spot lighting, flood lighting, task lighting, and wall washing. In some implementations, a lighting device or illumination device can include a light guide or light guiding plate, a light source configured to emit light into the light guide, and an optical coupler disposed in an optical path between the light source and the light guide. Some implementations can include an optical conditioner disposed below an illumination surface of the light guide, for example, a light turning film or lenticular film. In some implementations, the light engine can be sized and/or shaped to fit within the recess of a standard lighting fixture, for example, a recess for a parabolic aluminized reflector ("PAR") fixture. In other implementations, the light engine can be differently sized and/or shaped than a standard lighting fixture recess such that the light guide does not fit within the recess or such that the light guide fits in the recess with clearance on one or more sides.

Some implementations disclosed herein can include semiconductor light emitting diodes (or LEDs) because of their intrinsic compactness, because of their rapidly improving light generating capacity, and because of their increasingly low cost commercial availability. Over time, other suitable luminaire types may emerge based on organic LEDs (referred to as OLED), thin flat fluorescent sources, and flat micro plasma discharge sources, to mention a few.

While LEDs can generally satisfy the need for thinness, applying LED light sources in accordance with the implementations disclosed herein involves a degree of adaptation for best mode usage. Such implementations can include light distributing engines including commercial LED emitters with appropriate heat extraction means, associated optical couplers, associated light distributing optics, and optional light spreading elements. Further, the implementations disclosed herein can incorporate low voltage DC power control electronics needed to achieve sources of far-field illumination whose cross-sectional thickness is less than about 1-inch. Moreover, the new light distributing engine configurations safely dilute the LED's dangerously high brightness levels, without losing any of its other favorable lighting characteristics, such as tightly controlled beams of illumination and well-defined illumination patterns.

Implementations disclosed herein enable luminaries notably more compact in their physical size (for example, approximately 2.5"×2.5") and especially thin in their cross-section (for example, approximately 5-10 mm). Though small in size, lumen outputs provided by these implementations range from hundreds of lumens per luminaire to thousands. And the resulting output illumination is constrained to beams organized as tightly as +/−5 degrees, as broadly as +/−60 degrees, or as any asymmetric combination in between—each with a sharp enough angular cutoff to reduce off-angle glare (i.e., veiling glare) along with the spatially-even square, rectangular and circular far-field illumination patterns sought by lighting architects and users alike.

Some examples of practical applications incorporating the present thin illumination systems and other disclosed implementations have been represented in U.S. Provisional Patent Application Ser. No. 61/104,606, entitled "Distributed Illumination System." Extended practical applications of the implementations disclosed in this reference involve more detailed system examples of the ease with which these thin illumination systems (also called luminaries and light distributing systems) may be incorporated within the physical body thickness of common building materials (as are used in forming commercial ceilings and walls), electrically interconnected, and electronically controlled (individually and as an interconnected distribution).

An optical system 1 constructed in accordance with one form of a thin-profile illumination system is indicated generally in the schematic perspective view shown in FIG. 1A and in the exploded perspective shown in FIG. 1B. This form can collect the light from a wide angle plane emitter (for example, an LED), uses a thin light guiding bar to provide a strong degree of collimation in one meridian (for example, in a direction parallel to the illustrated x-axis), and then further processes this light with an equally thin light guiding plate that retains the strong degree of pre-collimation in the first meridian while adding an equally strong degree of collimation to the light in a second meridian orthogonal to the first (for example, in a direction parallel to the illustrated y-axis), so as to produce a uniform source of doubly collimated far field output light from a significantly enlarged output aperture. The light distributing engine 1 can include at least two subcomponents. For example, in some implementations, the light distributing engine 1 can include a light emitter 2 (such as an LED-based light emitter or LED light emitter) whose output light 4 can be arranged to be redirected through output edge 8 into the corresponding edge of an adjacent light distributing optic 9 whose internal design can be arranged to transform incoming output light 4 into well-organized output light 10 that is evenly distributed over the light distributing optic's significantly enlarged output aperture 11 in a multiplicity of overlapping beams across that aperture whose light cones are limited in angle to $+/-\theta_1$, and $+/-\theta_2$ in the light distributing engine's two orthogonal output meridians (e.g., the ZX meridian and the ZY meridian). Light emitter 2, in this form, can include an edge-emitting light bar, an edge-emitting light pipe, an edge-emitting light guide, or a light spreading pipe 18 having a single LED emitter 3 at its input, and an internal design arranged so that the edge-emitting light pipe's output light 4 is distributed evenly along the length of its output edge 8, and pre-collimated more narrowly in one meridian (for example, ZY meridian inclusive of the plane common to Y-axis 5 and Z-axis 6) than in the other (for example, ZX meridian inclusive of the plane common to X-axis 6 and Z-axis 6). Light distributing optic 9, in this form, can receive output light 4 from light emitter 2 along output edge 8, and can comprise a transparent (for example, a dielectric material) light guiding plate or light guide 28 and associated light extracting and redirecting elements 34, whose internal design enables output light 10 to be directed outwards (downwards as shown) from just one of its plane aperture surfaces 11, collimated in both output meridians (ZX and ZY as above).

Orientation of parts, light directions and angular extents are related to the three orthogonal crystallographic axes 5, 6 and 7, or Y, Z and X respectively.

As one example, LED light emitter 2, consists of a single LED emitter 3 that may contain one or more LED chips within its output aperture (not illustrated), a coupling optic 14 that may be a rectangular etendue-preserving angle-transforming reflector (RAT) designed to collect and transport light efficiently from emitter 3 to input face 16 of transparent dielectric light guiding bar 18 with a pre-selected angular distribution in each orthogonal meridian, separated from light distributing optic 9 by a thin air-gap 20. Transparent light guiding bar 18 itself can include two co joined optical elements 22 and 24, transparent light guiding bar (pipe or guide) 22 having square (or rectangular) cross-section with smoothly polished sides (or edges) that transmits input light flowing within by total internal reflection, and light extracting film 24 placed adjacent to one edge of light guiding bar 22, whose detailed design and composition is explained in more detail further below, extracts a fraction of the light flowing within bar 22 striking it everywhere along its length, and thereby collimates that light in one meridian (Y, 5) without changing the angular distribution of the extracted light in the other meridian (Z, 6), while redirecting all extracted light over the bar's length substantially in an outwards direction through output edge 8 along the system's X axis 7.

Light distributing optic 9 can include two co joined optical elements, one being transparent light guiding plate 28, and the other being adjacent light extracting film 34. Light guiding plate 28 has a flat and polished input edge 25, and two flat and polished plane faces, 11 and 32. In some implementations, the light guiding plate 28 can include a dielectric material. Light extracting film 32, in the example of FIGS. 1A-1B is laminated to plane face 32 (in an analogous form, it may be placed just beyond plane face 11). Design and composition of light extracting film 32 (described further below) enables a fraction of the light striking everywhere along its length and over its area to be freed from total internal reflections within plate 28, collimated in one meridian (X, 7) without change to the pre-collimated angular distribution of light in the other (Y, 5), and redirected as a doubly-collimated output beam 10 heading outwards along the element's output axis (Z, 6) or some other output light direction at an angle to it.

The following meridian planes will be discuss with reference to the examples that follow. The horizontal meridian (for convenience also called the XY meridian) is taken as the XY plane parallel to the large face planes of light distributing optic 9. The first vertical meridian (for convenience also called the ZY meridian) is orthogonal to the horizontal meridian, and taken herein as the ZY plane parallel to input edge 25 of light distributing optic 9. The second vertical meridian (for convenience also called the ZX meridian) is orthogonal to both the horizontal meridian and the first vertical meridian, taken herein as the ZX plane. The Cartesian system of reference throughout comprises Y-axis 5, Z-axis 6 and X-axis 7.

Figure 1C:
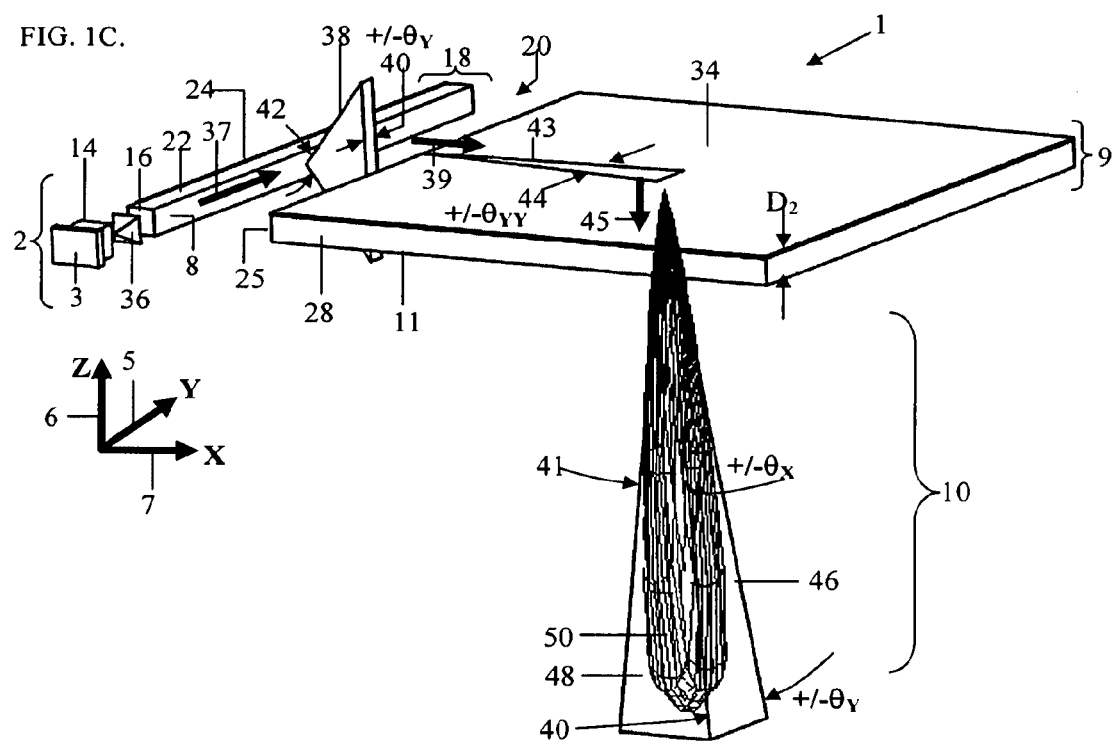
FIG. 1C provides an additional degree of explosion for the illumination system illustrated in FIG. 1B, adding perspective views of light output from the edge-emitting input bar and of the light output from the system as a whole.

FIG. 1C is a partially exploded perspective view that illustrates more clearly the system's various light-flows and the corresponding angular distributions created by the doubly collimating actions. In general, input light from LED emitter 3 can be collected by, and passes through, the input and output apertures of coupling optic 14, wherein the input light is transformed to beam 36 having an optimized angular distribution for coupling into input face 16 of light guiding bar 18 along Y-axis 5. As beam 37 passes through the length of bar 18, it can be arranged to turn 90 degrees from Y-axis 5 to X-axis 7 by the action of light extracting film 24, and is output everywhere along edge face 8 as edge-emitted light beam 38, collimated strongly in the horizontal XY meridian to angular width $+/-\theta_Y$ (in air) 40 and more weakly as angular width 42 in the vertical ZX meridian. Light beam 38 then couples through edge face 25 into the body of light distributing optic 9 and its light guiding plate 28 as beam 39 directed along X-axis 7. As beam 39 passes through the length and volume of light guiding plate 28, it turns 90 degrees everywhere from its initial propagating X-axis direction 7 to it output Z-axis direction 6 as beam 45 by the action of light extracting film 34. Beam 45 is collimated strongly in the vertical ZX meridian narrowing to angular width $+/-\theta_X$ (in air) 41 by its passage through light distributing optic 9, but retains its equally strong pre-collimation $+/-\theta_X$ in plate 28 ($+/-\theta_Y$ in air) in the horizontal ZX meridian as angular width 44. The result is well-collimated far field output illumination 10 emanating into air from the surface area of plane face 11 of light distributing optic 9, illumination 10 being equivalently well-collimated in both output meridians, $+/-\theta_Y$ in the vertical ZY meridian (pyramidal face 46) and $+/-\theta_X$ in the vertical ZX meridian (pyramidal face 48).

Wide angle light beam 36 can be output from coupling optic 14, in this example a rectangular etendue-preserving angle-transforming (RAT) reflector with an etendue-preserving angular distribution in each of its two orthogonal output meridians (XY and ZY), that can be chosen based at least in part on the efficiency of input coupling to input face 16 of transparent light guiding bar 18 and the spatial uniformity of output brightness produced along the length of the bar's output edge (or face) 8. The light guiding bar's resulting far-field output beam 38 (shown symbolically as a pyramidal solid) is well collimated in the horizontal XY meridian, and as such achieves a reduced angular width 40 (also referred to as a reduced angular extent), designated as $+/-\theta_Y$ ($2\theta_Y$ full angle). Angular distribution of output light 38 in the orthogonal ZX meridian is substantially unchanged by its passage through light guiding bar 18 and retains the original wide angle input beam 36 characteristic of coupling optic 14 in its vertical ZY meridian, in this case a RAT reflector. Angular cone 42 in this vertical ZX meridian is arranged to achieve the most efficient optical coupling of light passing from output edge 8 and into input edge 25 of corresponding light guiding plate 9. Input angle 42 is also chosen to achieve the highest spatial uniformity of the output light extracted across the component's full output aperture surface 11, as will be explained in more detail further below. As input light cone 38 enters through the input edge 25 of light distributing optic 9, it undergoes total internal reflection within plate or light guide 28. The angular width of light flowing in the plate's horizontal XY plane is represented symbolically by internal beam cross-section 43, and retains the angular extent 40 of the incoming light in this meridian. The angular relationship between this horizontal light in the air surrounding light distributing optic 9 and the corresponding light within in the medium of plate 28 is simply $Sin(\theta_Y)=n\ Sin(\theta_{YY})$ with n being the refractive index of transparent light guiding plate 28.

Etendue-preserving RAT reflector 14 has an input aperture dimensioned $d_1$ by $d_2$ (not illustrated) designed to match the output aperture of LED emitter 3 (not illustrated), also dimensioned substantially $d_1$ by $d_2$. RAT reflector 14 has an output aperture that is $D_1$ by $D_2$. RAT reflector 14 is four sided and with each reflector sidewalls mathematically-shaped to preserves etendue between input and output apertures, so transforming the LED's wide angle output emission to etendue-preserving output light that then passes through the RAT reflector's output aperture in both meridians of the light guiding pipe (or bar) 22 with an angular extent substantially equaling $+/-\theta_1$ by $+/-\theta_2$, where $+/-\theta_1$ and $+/-\theta_2$ can be determined by the applicable etendue preserving Sine Law, $\theta_1=Sin^{-1}(d_1/D_1)$, where $d_1$ and $D_1$ refer to the input and output aperture dimensions in each meridian, $d_1$ and $d_2$ (in spatial dimensions), $D_1$ and $D_2$ (in spatial dimensions) and $\theta_1$ and $\theta_2$ (in angular dimensions).

As will be established further below, the RAT reflector's output angles for light coupling to the input aperture of the light guiding pipe can be reduced to about 50-55 degrees in each half-angle in air, i.e., $+/-\theta_1$ and $+/-\theta_2$. The design values for $d_1$, $d_2$, $D_1$ and $D_2$ can be adjusted accordingly, depending on the dimensions of the LED emitter 3 being used. The length or physical separation between input and output apertures of RAT reflector 14, L, is substantially as prescribed by the Sine Law, $L=0.5\ (d_i+D_i)/Tan\ \theta_i$ with L being the larger of the lengths calculated in each of the RAT reflector's two meridians, but may be foreshortened by 10% to 40% without significant penalty in coupling performance.

Doubly collimated (or cross collimated) output light is distributed substantially uniformly over the surface area of its output aperture 11 by the light-distributing engine of system 1. The doubly collimated far-field beam 10 is further represented in FIG. 1C by computer-simulated profile 50 explained further below. When $\theta_Y=\theta_X$, as in the present example, output beam 10 has a square cross-section. When $\theta_Y>\theta_X$ or when $\theta_Y<\theta_X$, which is also possible, output beam 10 has a rectangular cross-section.

This particular form of the present disclosure can be distinguished not only by the cross-sectional thinness achieved with the combination of light emitter 2 and light distributing optic 9, but also by virtue of the doubly-collimated output beam that results from their collective optical behaviors, one degree of output beam collimation coming from edge-emitting light emitter 2 and the orthogonal degree of output beam collimation coming from the light guiding, extracting and redirecting nature of light distributing optic 9. While some prior art examples of thin illumination systems have produced collimated light in one output meridian and not in the other, the present disclosure produces independently collimated light in both orthogonal output meridians.

Figure 1D:
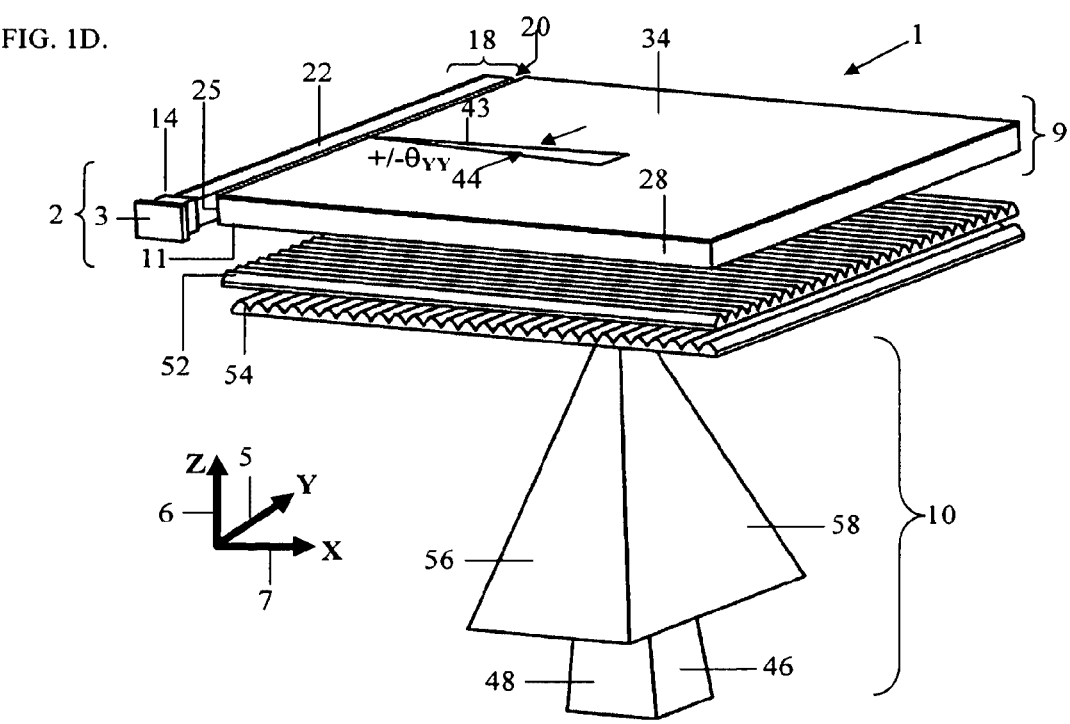
FIG. 1D contains a perspective view of the illumination system illustrated in FIG. 1A, with the addition of two angle-spreading lens sheets beneath the lighting guiding plate to process the outgoing beam profile in one or both output meridians.

Doubly-collimated output beam 50 may be expanded externally to create any orthogonal set of output beam angles larger than $+/-\theta_Y$ by $+/-\theta_{Y'}$ as shown in the perspective view of FIG. 1D by adding one or two angle-spreading film sheets 52 and 53 just beyond output aperture surface 11 of system 1. Such films can be relatively thin (for example, less than 0.250 mm), and thus add little additional thickness to the light distributing engine's slim cross-section.

A special lenticular class of angle-spreading film sheets will be introduced and described further below as an additional feature of at least some implementations of this disclosure. Such film sheets are applied to change (i.e., widen) the angular spread of light passing through them in only one meridian and not in the other. Orienting two such lenticular sheets with their lens axes oriented substantially orthogonal to each other, as in FIG. 1D, enables a complete family of wider far field beam patterns to be achieved, with a different angular width, 56 and 58, affected in each meridian. The lenticular sheets included within this disclosure can be distinguished by their ability to preserve the square and rectangular far field beam shapes (or illumination patterns) characteristic of these particular thin-profile doubly collimating light distributing engines of illumination systems 1. If the far field output beam from system 1 in FIGS. 1A-1C is +/-5 degrees by +/-5 degrees and makes a substantially square far-field illumination pattern, just as one example, some possible far field beam alternatives 56 and 58 for the system of FIG. 1D are +/-10 degrees by +/-10 degrees, +/-5 degrees by +/-20 degrees, +/-30 degrees by +/-30 degrees, and +/-25 degrees by +/-15 degrees, to mention but a few. When the expanded angular ranges are the same in each meridian, the resulting illumination pattern is substantially square. When the expanded angular ranges are different in each meridian, the resulting illumination pattern is substantially rectangular.

Output beam angle spreading may also be achieved using more-conventional diffusing materials as have been described in prior art, such as spherical lenticular lens sheets and highly asymmetric light shaping diffusers based on holographic (diffractive) principles. In neither case, however, are the characteristic advantages of sharp angular cutoff maintained nor are square or rectangular beam patterns achieved. The far field output beam patterns obtained using conventional prior art diffusers in the manner illustrated in FIG. 1D can be either circular or elliptical in nature. Additionally, similar output beams may be achieved using diffusers.

Figure 2A:
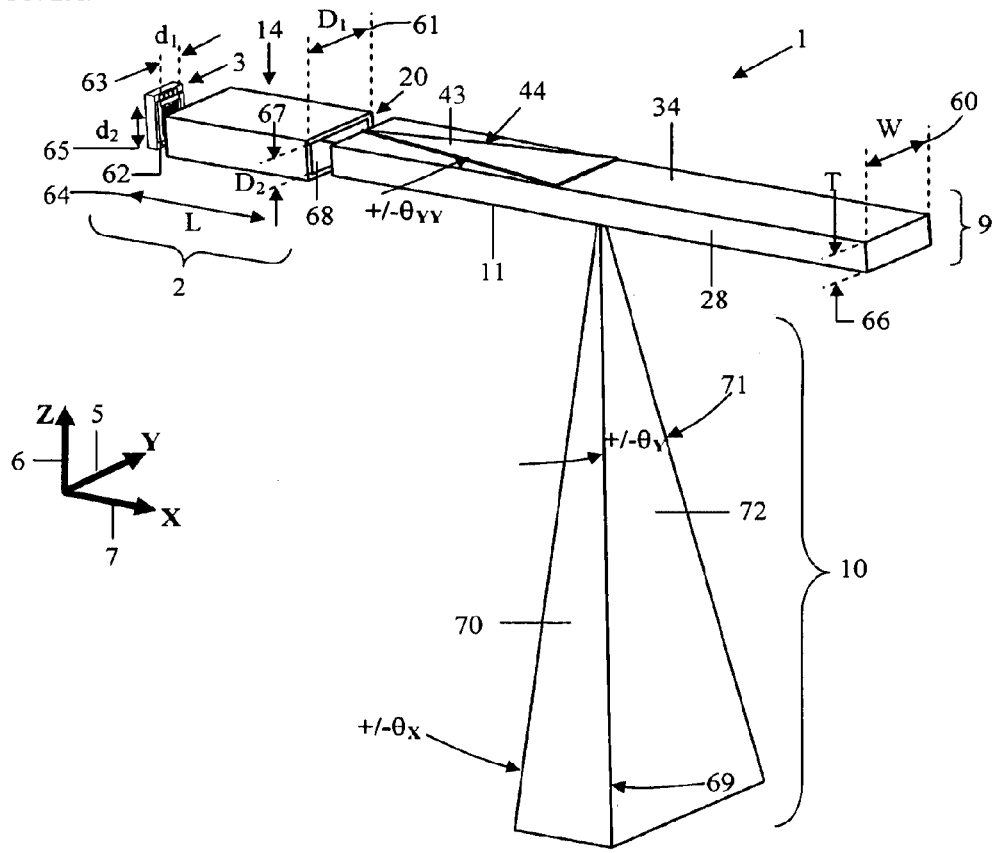
FIG. 2A illustrates a perspective view of a thin profile illumination system segment containing two interconnected subcomponents, one an edge-emitting input engine using a single LED emitter as input and a correspondingly single angle-transforming reflector as output, placed in conjunction with a rectangular version of the general light guide plate illustrated in FIG. 1A, that outputs a square or rectangular beam of collimated light from one plate surface as shown.

An optical system 1 constructed in accordance with another implementation of this thin-profile illumination system is shown generally in the perspective views of FIGS. 2A-2E. One example difference between this implementation and the implementation illustrated generally in FIGS. 1A-1D is that in this form the LED light emitter 2 provides strongly pre-collimated input light in one meridian directly from the output of coupling optic 14 to the input edge of light distributing optic 9, doing so without need of light guiding bar 18 as the pre-collimating intermediate. In this implementation, coupling optic 14 can be rectangular etendue-preserving angle-transforming reflector (RAT), whose collimating power is applied to narrow the LED emitter's angular extent in the horizontal XY meridian to $+/-\theta_Y$ (in air) becoming $+/-\theta_{YY}$ in light distributing optic 9 upon coupling (as in angular extent 44 of coupled beam representation 43 as shown in FIG. 2A). The RAT reflector's cross-meridian ZX is used as above to provide just enough collimation to optimize light coupling performance (efficiency and uniformity) with regard to light distributing optic 9. In this implementation, the width 60 of light distributing optic 9 (designated as W) approximately equals the XY meridian output aperture width 61 of RAT reflector 14 (designated $D_1$), with D1 established by the classical Sine Law as approximately $d_1/\sin \theta_1$, with $d_1$ being horizontal width 63 of output aperture frame 62 of LED emitter 3 (which as mentioned earlier is $d_1$ by $d_2$ horizontally and vertically).

While a more detailed example of this form is provided further below, an initial example is provided here to give scale to the generalized illustration of FIG. 2A. When $d_1$=3.6 mm, which is one possibility, and when the XY meridian's pre-collimation is to be $+/-\theta_1=+/-\theta_y$=10.5 degrees, which is another possibility, $D_1$=19.75 mm, and the RAT reflector's ideal length 64 (designated as L) is also by the Sine Law, $0.5(d_1+D_1)/\tan \theta_1$=63 mm, which as mentioned above, can be foreshortened by 10%-40% without serious penalty.

Cross-sectional thickness 66 of the light distributing engine 1 in FIG. 2A (designated as T) is approximately equal to the RAT reflector's vertical output aperture dimension 67 (designated as $D_2$), which in turn is driven by vertical dimension 65 (designated as $d_2$) of the LED emitter output aperture frame 62. When $d_2$ is for example 2.4 mm, which is another reasonable possibility, and when the desired collimating angle is +/−55 degrees, as explained further below, $D_2$, by the Sine Law, becomes $d_2/\sin \theta_2$=2.9 mm, which emphasizes the potential thinness of light distributing engines according to the implementations provided in this disclosure.

FIG. 2A is a partially exploded perspective view illustrating the general constituents of this form of doubly collimating light distributing engine 1, which are LED emitter 3, coupling optic 14, light distributing optic 9, and doubly collimated output illumination 10, generally directed along (or at an angle to) Z-axis 6. Substantially all emitted light from LED emitter 3 is collected by the correspondingly sized input aperture of coupling-optic 14 which can be a rectangular etendue preserving angle transforming (RAT) reflector. Then substantially all collected light (less reflection and absorption loss within the RAT reflector's 4-sided reflecting structure 68) is coupled from the reflector's rectangular $D_1$ by $D_2$ output aperture to the correspondingly sized rectangular input aperture of light distributing optic 9. The in-coupled light is represented symbolically, as above, by propagating beam 43, which has pre-collimated angular extent $+/-\theta_{YY}$ as shown within the horizontal XY meridian light distributing optic 9, but satisfies the boundary conditions of total internal reflection at each of the light distributing optic's four external surface boundaries. Then, as explained generally above, doubly collimated output illumination 10 emanates uniformly over the surface area of output aperture plane 11 as a result of pre-collimation in the horizontal XY meridian and interactions between propagating light 43 and light extracting film 34 in the vertical ZX meridian. In this implementation, $+/-\theta_X$ collimation 69 in the ZX meridian (pyramidal beam surface 70) is the result of actions within light distributing optic 9, and $+/-\theta_Y$ collimation 71 in the vertical ZY meridian (pyramidal beam surface 72) is the result of the RAT reflector's pre-collimation $+/-\theta_Y$ (in air) initially in the horizontal ZY meridian.

Figure 2B:
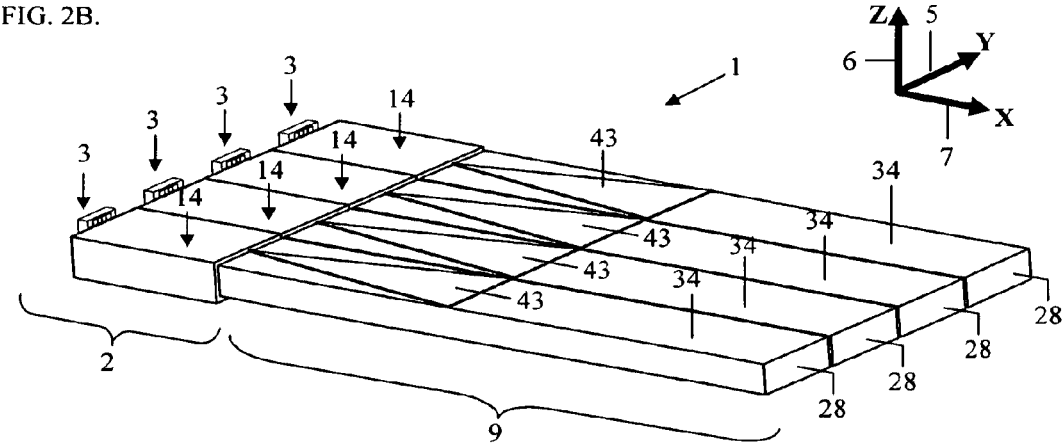
FIG. 2B illustrates a linear array of four thin profile illumination system segments as shown in FIG. 2A.

FIG. 2B is a perspective view similar to FIG. 2A but illustrating the multi-segment capacity of this form of this disclosure, in this case with four otherwise identical light distributing engines 1 of the form illustrated in FIG. 2A. The ability to assemble a contiguous, or substantially contiguous, array of parallel engine segments extends the range of output lumens significantly. About three light distributing engines of the geometrical dimensions illustrated in FIG. 2A can be used to replace each light distributing engine of the square aperture form shown in FIGS. 1A-1D, in some implementations.

FIG. 2C is a perspective view illustrating the combination of seven (7) separate light distributing engine segments in the form shown in FIG. 2A.

The multi-segment doubly-collimating engine variation illustrated in FIG. 2C shows no discrete, demarcation lines between the seven separate engine segments, either between the individual coupler elements (for example, individual etendue-preserving RAT reflectors) or between the seven corresponding light distributing optic segments into which each RAT reflector's output light is coupled. While each coupling optic 14 is as discretely separated from each other as the examples in FIGS. 2A-2B, the same degree of physical separation is not required for satisfactory performance of the corresponding light distributing optic 9. The general qualities of the resulting doubly-collimated output illumination 10 are substantially equivalent whether seven individual light distributing optic segments are used, as in FIG. 2B, or whether a single segment made to be the same size as covered by seven individual segments were used instead, as in FIG. 2C. The illumination system's far field output beam 10 exhibits essentially identical angular widths $+/-\theta_X$ in meridian ZX (e.g. pyramidal surface 70) and $+/-\theta_Y$ in meridian ZY (e.g., pyramidal surface 71).

Whether the resulting multi-segment light distributing engine 1 incorporates an LED light emitter array of physically discrete segments as illustrated in FIG. 2B, or is fabricated as a single body made with individual light transmission channels 68, as imagined in the example of FIG. 2C, depends on manufacturing and packaging preferences.

FIG. 2D is a partially exploded perspective showing the seven-segment LED light emitter array of FIG. 2C by itself at greater magnification. Element 74 is the first of 7 sequential coupling optic segments. Pyramidal solid 76 is a symbolic representation of the intermediately pre-collimated output light generated by the collective output of seven-segment LED light emitter 2, indicating its angular extent 78 in the vertical ZX meridian as $+/-\phi_Z$, and its more strongly-collimated angular extent 80 in the horizontal XY meridian as $+/-\theta_Y$. As in the examples above, a single beam representation is used for convenience, representing a continuum of illumination from the rectangular output apertures of all seven RAT reflectors. The illustration (FIG. 2D) also shows an exploded (and magnified) view of illustrative LED emitter 3, which in this example has a square aperture bounding ring 82 that surrounds the emitter's 4 separate chips 84, arranged internally in a 2×2 array, and electronic substrate 86 (containing means for electrical interconnections 88 and heat extraction).

Figure 2E:
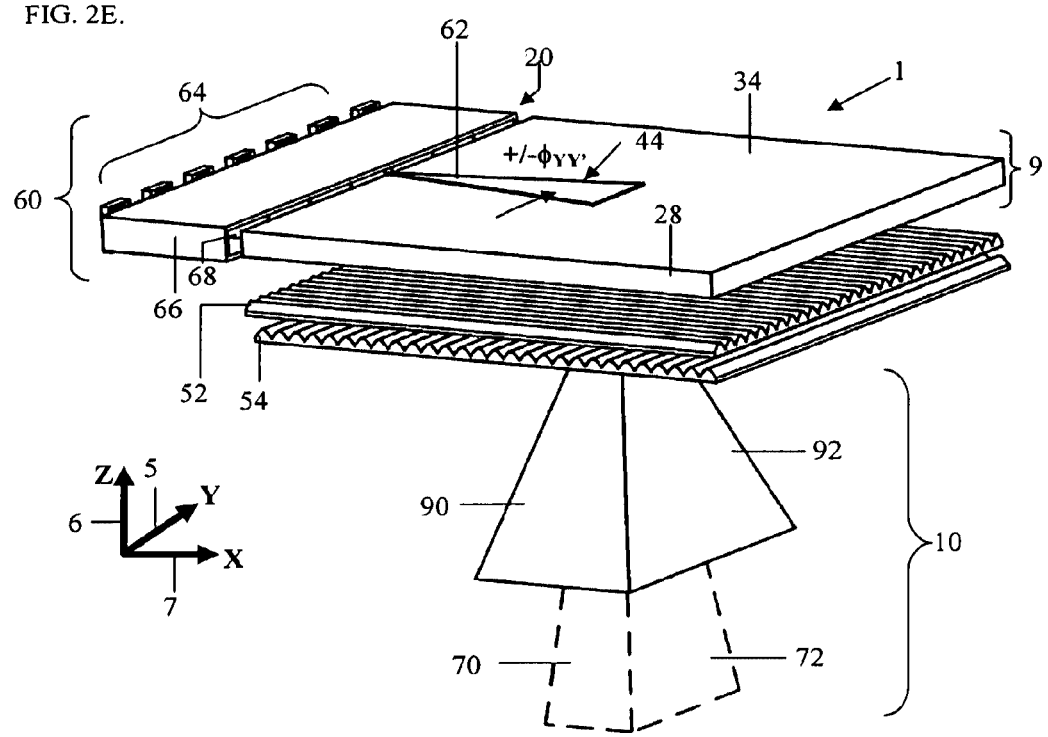
FIG. 2E contains the illumination system illustrated in FIG. 2A, with the addition of two angle-spreading lens sheets beneath the lighting guiding plate to process the outgoing beam profile in one or both output meridians.

The angle-spreading film sheets 52 and 54 introduced in FIG. 1D may be applied to both the single segment and multi-segment forms of the light distributing engines of FIGS. 2A-2D, as will be shown in FIG. 2E.

FIG. 2E is a perspective view of FIG. 2D exploded to reveal the individual sections of input engine 60, while adding two orthogonally-aligned angle-spreading sheets 52 and 54 (as in FIG. 1D). Such sheets are applied externally as illustrated just below light distributing optic 9 so as to modify (i.e., widen) the angular extents 90 and 92 of the system's resulting far field output beam in one or both meridians. The unmodified narrower angular extents 70 and 72 are shown dotted as a reference.

Practical operating applications of the thin doubly collimating light distributing engines 1, whether arranged in the square aperture form of FIGS. 1A-1D or the multi-segment form of FIGS. 2A-2E, require structural chassis plates to hold and align the individual constituents, including as well the associated power controlling electronic circuits interconnected with both an external supply of DC voltage and with the positive and negative electrical interconnections 88 provided on each LED emitter 3 (as in FIG. 2D). Moreover, heat sink fins and heat spreading elements can be incorporated to dissipate heat from the LED emitter 3. While such system level light distributing engine details have been introduced separately in U.S. Provisional Patent Application Ser. No. 61/104,606, representative illustrations for each case will be provided further below.

Figure 30A:
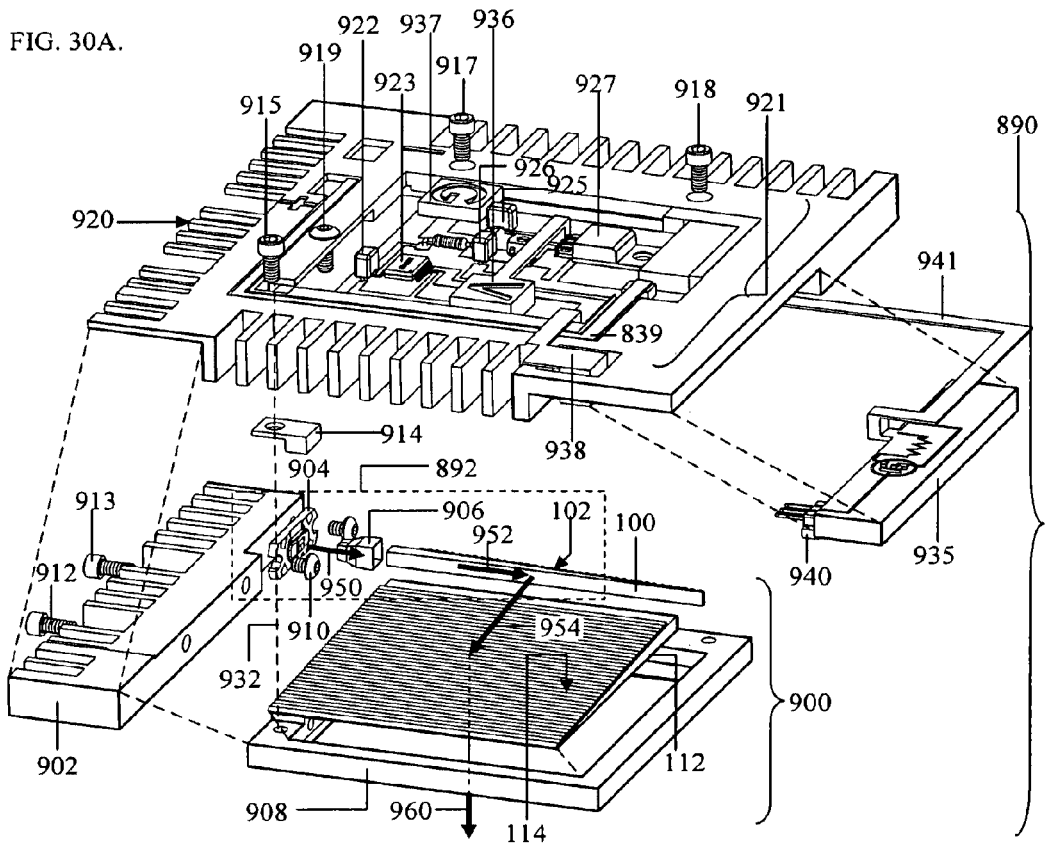
FIG. 30A provides an exploded top perspective view of one example of a fully configured light engine implementation based on the functional illustrations of FIGS. 1A-1D, 3A-3E, 4, 16A-16B, 26, and 28.
Figure 30B:
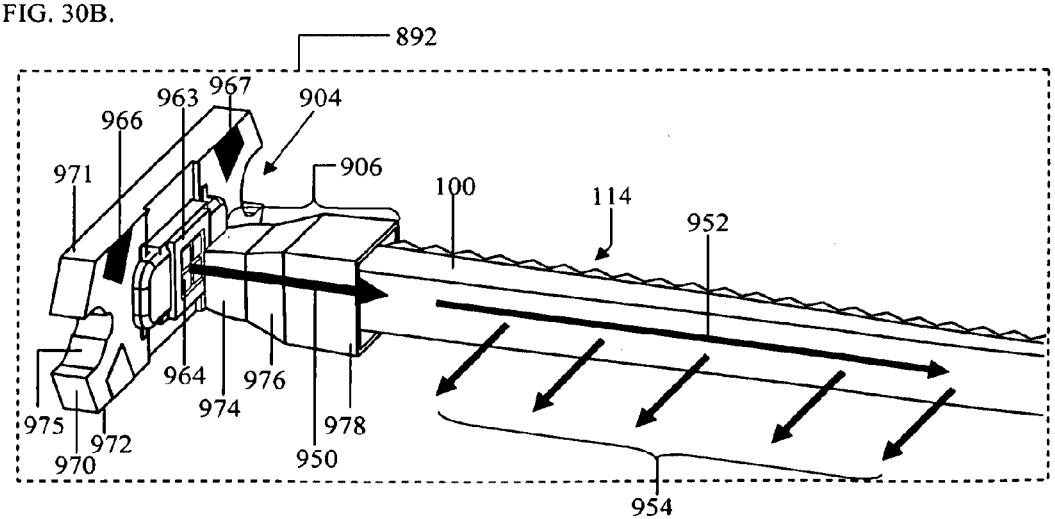
FIG. 30B provides a magnified perspective view of the coupling region existent between a commercial LED emitter that can be used, the corresponding square or rectangular reflector and a tapered light guiding bar with light extraction film.

Before doing so, the underlying details are described for some implementations of this disclosure, with FIGS. 3-21, 26-28, and 31-43 optionally associated with the doubly-collimating square aperture light distributing engine introduced generally by FIGS. 1A-1D, and with FIGS. 30A-30B optionally associated with the doubly collimating multi-segment light distributing engine introduced generally in FIGS. 2A-2E.

Figure 3A:
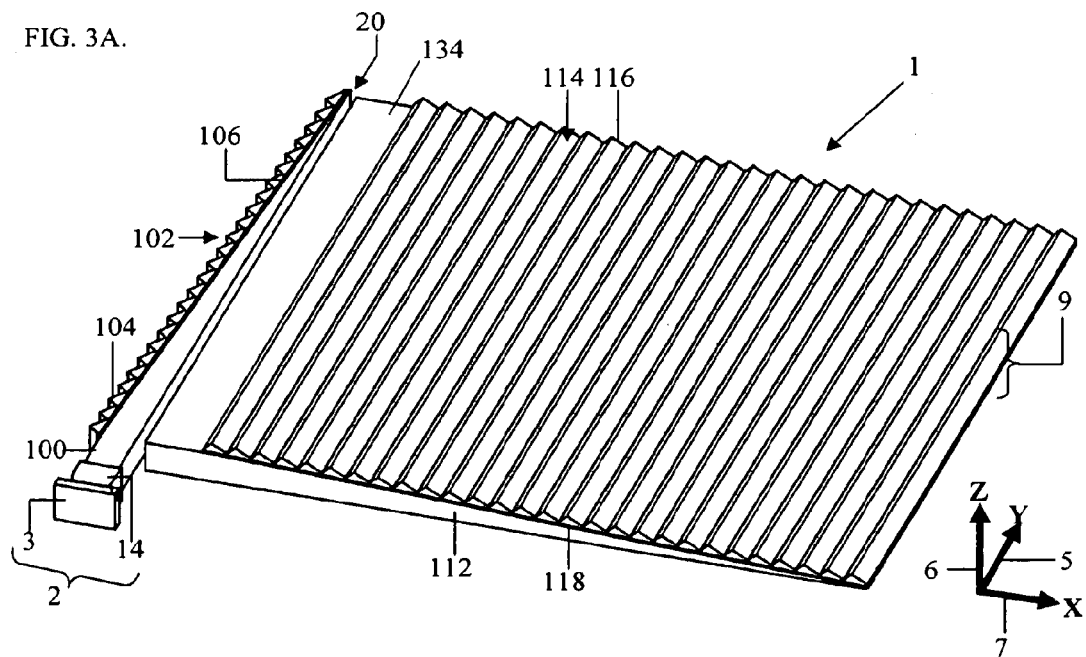
FIG. 3A illustrates a perspective view of a thin profile illumination system containing two interconnected subcomponents, a tapered edge-emitting light bar input engine using a single LED emitter and a tapered light guide plate that outputs a beam of square or rectangular collimated light from one plate surface.

FIG. 3A shows a perspective view of an example of an implementation of the present light distributing engine in its single-emitter square output aperture form, generally shown in FIGS. 1A-1D. LED light emitter 2 in this example includes an LED emitter 3 and an etendue-preserving RAT reflector form of coupling optic 14 as shown in FIGS. 1A-1D, but the generalized edge-emitting light guiding bar (or pipe) 18 can be formed by a tapered light guiding pipe 100 and a separately facetted (micro-structured) light extraction film 102 that is optically coupled in this example to the tapered backside edge of pipe 100 by transparent coupling layer 106. The output edge of tapered light guiding pipe 100 emits pre-collimated output light across air gap 20 into the input edge of light distributing optic 9, which can be a tapered light guiding plate 112 having a separately facetted (micro-structured) light extraction film 114 (substantially the same micro-structure as light extraction film 102) and optically coupled in this example to the tapered backside edge of plate 112 by transparent coupling layer 118 (substantially the same as transparent coupling layer 106).

Figure 3B:
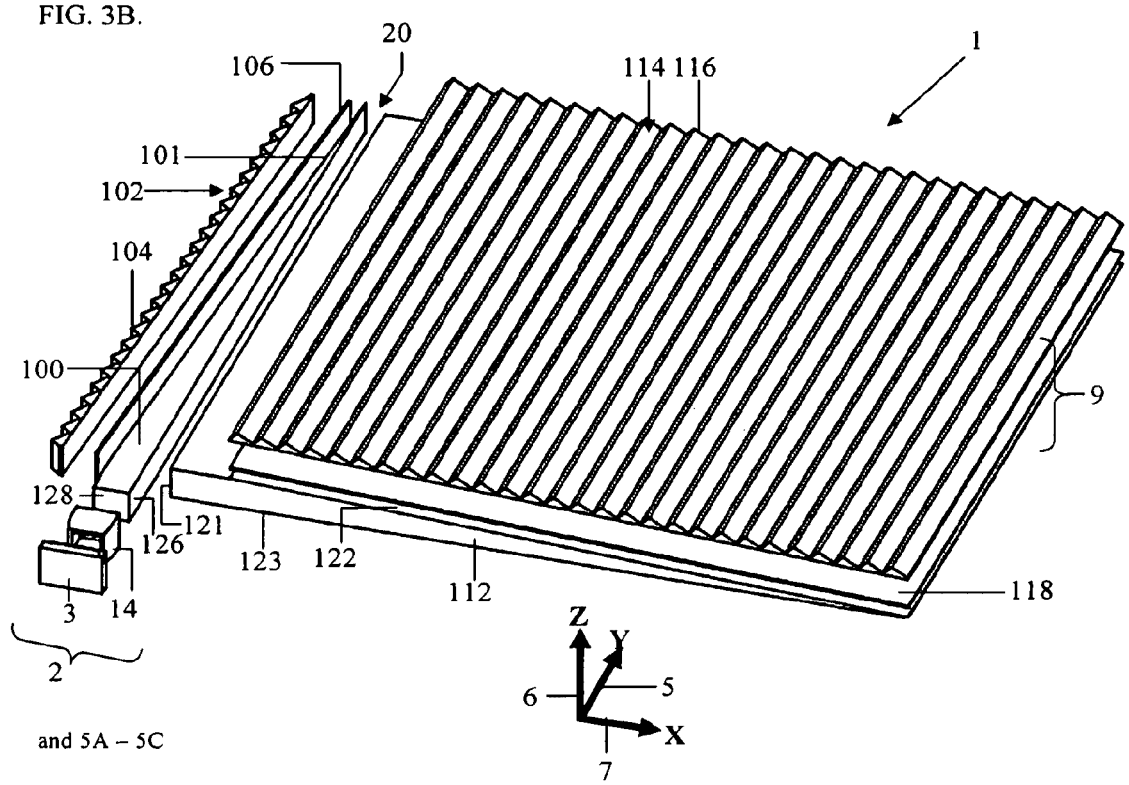
FIG. 3B contains an exploded view of the illumination system illustrated in the perspective view of FIG. 3A.

FIG. 3B is an exploded version of the elements shown in the perspective view of FIG. 3A that reveals previously hidden structural details.

Figure 3C:
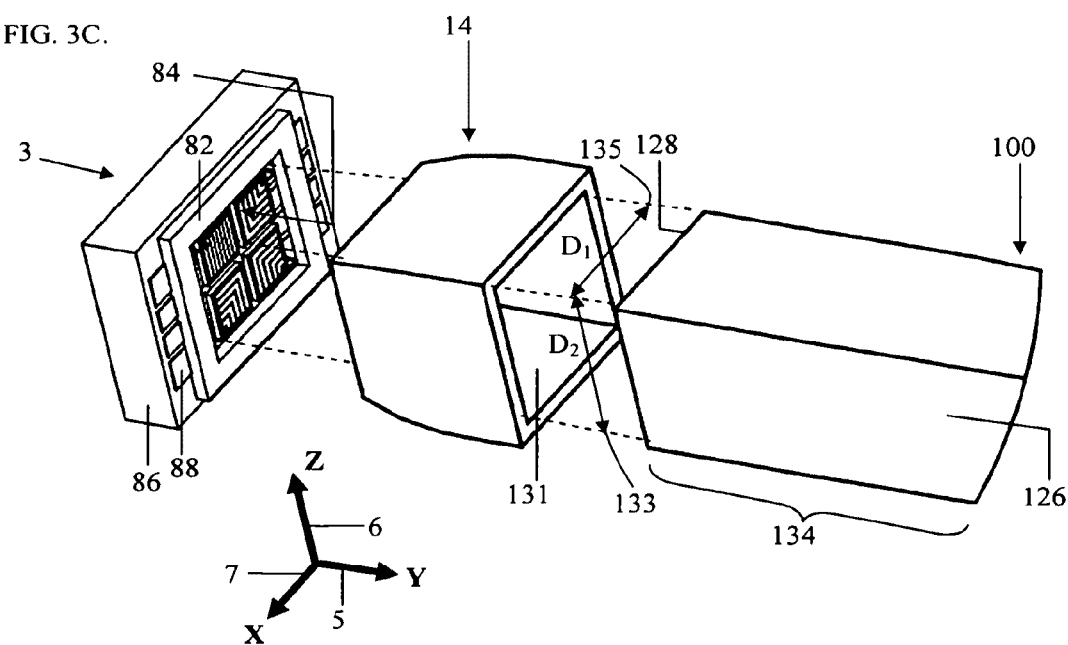
FIG. 3C contains an exploded perspective view of the LED emitter, the rectangular angle-transforming reflector, and the input aperture of the tapered edge-emitting light bar input engine.

FIG. 3C provides a magnified exploded view of the geometrical relationships between LED emitter 3 (as illustrated in FIG. 2D), etendue-preserving RAT reflector 14 (in this example illustrated as a hollow 4-sided reflecting bin having symmetrically shaped reflecting sidewalls 131) and the corresponding input portion of tapered light guiding pipe 100, including its square (or rectangular) input face 128 (sized generally to match the $D_1$ by $D_2$ output aperture dimensions (133, 135) of RAT reflector 14 as explained above).

Figure 3D:
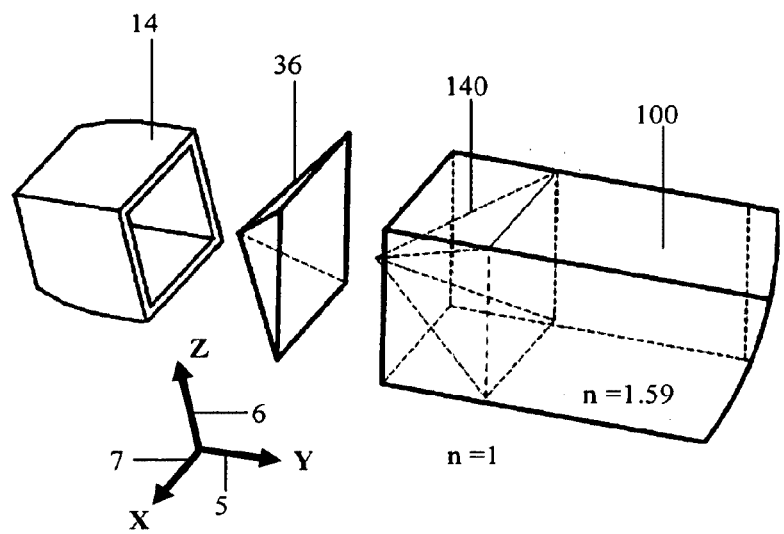
FIG. 3D provides an exploded perspective view isolating on the rectangular angle-transforming reflector, and the input aperture of the tapered edge-emitting light bar input engine, including a light cone involved.

FIG. 3D is a perspective view illustrating the relationship between the light-cone 36 (as in FIG. 1C) output from illustrative RAT reflector 14, and the reduced-angle optical coupling to the dielectric medium of light guiding pipe 100, shown as (dotted) cone 140. In some implementations, light guiding pipe 100 can be made of low optical loss sources of either poly methyl methacrylate (for example, PMMA or acrylic) or polycarbonate. Generally, lowest loss is possible when using optical grade PMMA. When light guiding pipe 100 has a 3 mm×3 mm square cross-section, and is made, for example, of polycarbonate, refractive index 1.59, coupling performance can be achieved, for example, when dotted light cone 140 is approximately in the range of +/−30 degrees in both meridians (X and Z). This requires the angular extent of light cone 36 in air to be +/−$\text{Sin}^{-1}$ [1.59 Sin(30)] or +/−52.6 degrees in each meridian. Coupling performance can be achieved with a slightly wider angular range when using PMMA and its lower (1.49) refractive index, in some implementations.

Figure 3E:
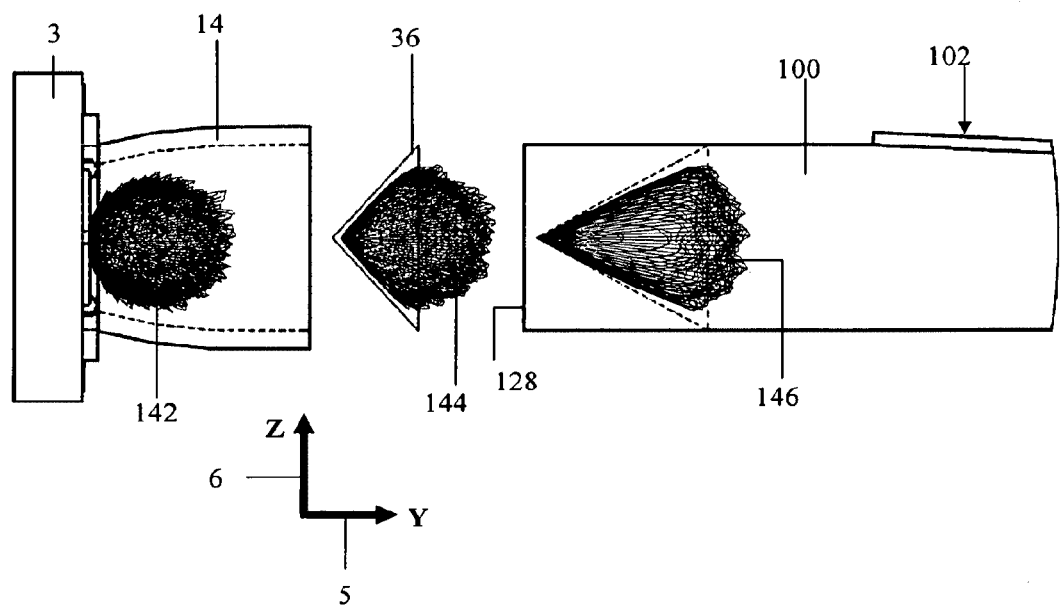
FIG. 3E illustrates in exploded schematic cross-section the relationship between the elements shown in FIG. 3D, including the simulated angular light distributions developed in between them.

FIG. 3E is a side view of the input elements isolated in FIG. 3D, showing the detailed angular distributions of the light as its conveyed from LED emitter 3, through illustratively hollow etendue-preserving RAT reflector 14, and across a small air gap (exaggerated in scale for visual convenience) into the initial region of light guiding pipe 100. Radiation pattern 142 corresponds to the light output from the outer surface of the LED chips of LED emitter 3, and from its nearly circular cross-section, indicating an almost perfect +/−90-degree Lambertian light distribution. As this wide angular distribution passes through illustrative RAT reflector 14 it is concentrated slightly in angular extent to one having in this example, +/−52.6-degree extent 144 in air by its etendue-preserving passage through RAT reflector 14. Then, once coupled into light guiding pipe 100, this light distribution compresses by Snell's Law to one having about a +/−30-degree extent 146 within the dielectric medium (taken as polycarbonate just for this example).

Figure 4:
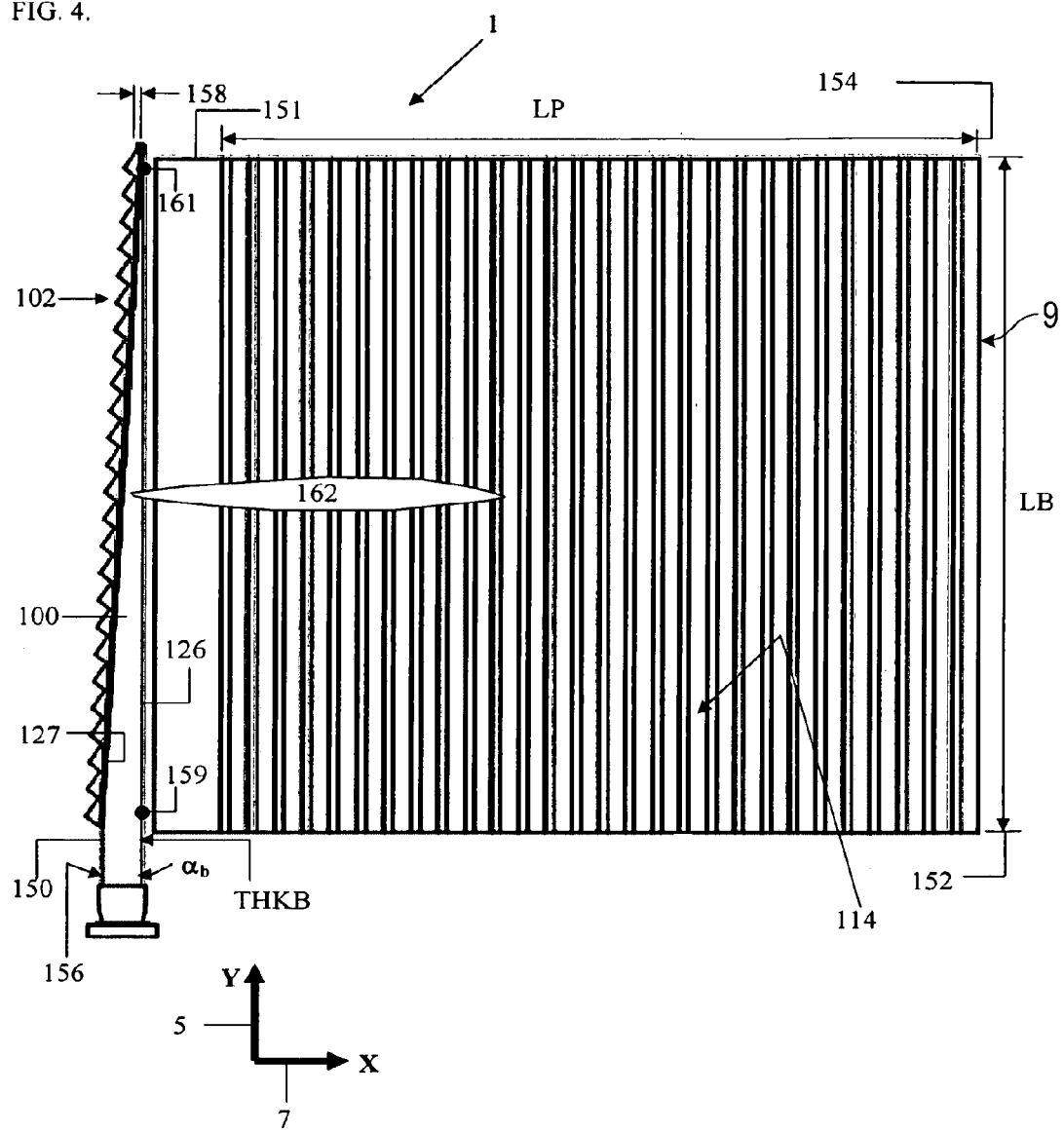
FIG. 4 provides a top view of the thin-profile illumination system of FIG. 3A illustrating the dimensions and their relations to each other.

FIG. 4 is a top view of the complete doubly-collimating square aperture light distributing engine system 1, as depicted in the perspective views of FIG. 3A-3B, showing the associated symmetry-driven geometrical relationships in existence between the LED light emitter 2, a tapered light guiding pipe (or bar) 100 attached to facetted light extraction film 102 and the light distributing optic 9, which can be a tapered light guiding plate 112 attached to facetted light extraction film 114. Equation 1 relates the prevailing geometrical relationships between tapered light guiding pipe 100 thickness 150 (along X-axis 7) expressed as THKB, tapered light guiding pipe 100 length 152 (along Y-axis 5) expressed as LB, tapered light guiding plate 114 length 154 (along X-axis 7) expressed as LP, the taper angle 156 of tapered light guiding pipe 100 expressed as $\alpha_b$, the corresponding taper angle 157 (not shown in FIG. 4) expressed as $\alpha_p$, the knife edge thickness 158 of tapered light guiding pipe 100, and the corresponding knife edge thickness 159 (along Z-axis 6) expressed as KP (not shown in FIG. 4). In the present example for simplicity, $\alpha_p = \alpha_b$ and THKB=THKP.

$$THKP = TKHB = (LP)\text{Tan } \alpha_p + KP \qquad (1)$$

FIG. 4 also shows a top view of the highly collimated edge-emitted light distribution 162 produced (generally directed along X-axis 7) and spread over most of the output edge 126 (see FIG. 3B) of tapered light guiding pipe 100 within LED light emitter 2 as the light couples efficiently across air gap 20 into the body of tapered light guiding plate 112. Light distribution 162 is thereby representative of a continuum of substantially equivalent light distributions 162 running parallel to each other along edge plane 126 passing through points 159 and 161.

One example optical element utilized in this implementation of thin-profile light distributing engine 1 is the tapered light guide, whether deployed in its rod, bar, pipe or steeple-like form within LED light emitter 2 as tapered light guiding pipe 100, or in its larger rectangular area tapered plate form as light guiding plate 112 as part of light distributing optic 9. The ability to collimate light in one meridian (and not the other) stems from the light spreading brought about by total internal reflections of light inside the tapered light guides (whether 100 or 112) combined with interactions between the guided light and the facetted light extraction films (102 or 114) attached to (or placed in optical proximity with) one of the tapered light guide faces (as shown in FIG. 3B). But the ability to collimate light in both meridians (e.g., producing the narrowly defined square and rectangular far-field output beam profiles shown in FIGS. 1C, 1D, 2A, 2C, and 2E), stem from the sequential use of two tapered light guide-extraction film combinations, one for each orthogonal meridian. Substantially un-collimated light from LED emitter 3 is first pre-collimated in one meridian by the first tapered light guide system (guide 100 plus film 102). This processed light is received by the second tapered light guide system (guide 112 plus film 114), which collimates the light in the substantially un-collimated meridian, while transmitting light in the pre-collimated meridian without change. This two-step processing results in output light that is collimated in both orthogonal output meridians.

In other words, the LED light emitter 2 within this form of light distributing engine collimates in one output meridian only, while the light distributing optic 9 collimates in the other output meridian only, while simultaneously turning (or redirecting) the doubly-collimated output light direction at some desired angle to the output aperture's surface normal.

The two communicating subsystems, LED light emitter 2 and light distributing optic 9 are separated from each other by a small air-gap 20, with output edge 126 of one well-aligned with input edge 121 of the other.

Explicit examples are provided in FIGS. 5-20 below to explain (and provide means for optimizing) the underlying physical mechanisms responsible for the double collimation (and angular redirection) critical to this form of the present light distributing engine.

As described above, the light emission from single LED emitter 3 (which may contain one or more individual LED chips) couples emitted light to input face 128 of tapered (dielectric) light guiding pipe (bar or rod) 100 by means of a coupling optic 14, that can be a square or rectangular (etendue-preserving) angle-transforming (RAT) reflector, whose four specularly reflecting sidewalls are mathematically shaped at every point to reflect light at an angle to preserve etendue from the LED emitter's square or rectangular output aperture (as in 82 of FIG. 2B) to the square or rectangular input face 128 of tapered light guiding pipe 100 (according to the Sine Law cited above), while converting the LED emitter's near Lambertian input angles to an angular range more suited to efficient light coupling to tapered light guiding pipe 100.

Tapered light guiding pipe 100 is made using a suitable molding process such as casting, injection, or compression-injection whose tooling enables formation of the flat plane mirror-quality edge surfaces illustrated, for example, using a transparent optical quality dielectric material having an optical absorption coefficient in the visible wavelength band that is as low as possible. Two suitable choices are polycarbonate, refractive index 1.59 and polymethyl methacrylate (also referred to as PMMA or acrylic), refractive index 1.49. Of these two light guiding materials, PMMA can be for its lower level of optical loss. Arbitrarily, polycarbonate is used in the following examples.

More details on the pipe's tapered geometry are provided further below, but for the present example, the pipe's input face 128 is 3 mm×3 mm, it's effective taper length 154 (designated as $\alpha_b$ in FIG. 4) is 57 mm, so that by geometry, its associated taper angle 156 (designated as $\alpha_b$ in FIG. 4), is $\alpha=\mathrm{Tan}^{-1}(3/57)=3$ degrees, independent of the refractive index of the material used. With an illustrative 3-degree taper angle and 3 mm by 3 mm input face cross-section, light guiding pipe 100 draws down to knife-edge or peripheral edge 158, which can be limited to a 50 μm thickness or less, to maximize the effective output efficiency of LED light emitter 2. Light guiding pipe 100, as illustrated in these examples, begins with a linear extension 150 not counted in its illustrative 57 mm effective taper length, as seen most clearly in FIG. 4.

The tapered light guiding plate 112 can be sized to match (or substantially match) the rectangular geometry of the tapered portion of tapered light-guiding pipe 100. That is, edge face 126 of light guiding pipe 100 and corresponding edge face 121 of light guiding plate 112 can have substantially the same rectangular length and thickness so as to maximize their optical overlap and coupling efficiency. These conditions are generally satisfied when tapered light guiding plate 112 has a cross-sectional thickness matching the corresponding thickness of tapered light guiding pipe 100 (for example, in this case 3 mm), and when tapered light guiding plate is sized to match the effective length 154 (designated LB in FIG. 4), making it in this case 57 mm by 57 mm. The taper planes (101 and 122) in both the tapered light guiding pipe (taper plane 101) and tapered light guiding plate (taper plane 122) of the examples contained herein are oriented so their outside surfaces are each facing in the opposite direction of the intended direction of output light. The reverse orientations are also acceptable.

The two light extraction films (102 and 114) can be formed using an optical material having the same or higher refractive index as the tapered light guiding pipe (or plate) they are being combined with. The facetted microstructures of the two light extraction films may be identical, or made to be different (as will be illustrated in an example discussed below). In all ensuing examples, however, both light extraction films (film 102 for pipe 100 and film 114 for plate 112) are illustrated as being laminated (i.e., optically coupled) to their associated taper plane (plane 101 for extraction film 102 and plane 112 for film 114) which can be accomplished using an optical coupling layer (layer 106 for extraction film 102 and layer 118 for extraction film 114), the optical coupling layers having substantially lower refractive index than either surrounding extraction film, guiding pipe or guiding plate material.

One material combination for light guides and extraction films for both light extraction films (102 and 114) and both light guides (light guiding pipe 100 and light guiding plate 112) can include polycarbonate, refractive index 1.59. For this combination each light extraction film (film 102 and film 114) can be laminated to its light guiding counterpart using an optical coupling layer made of a PMMA or silicone-based adhesive (i.e., layer 106 and layer 118) having a refractive index no greater than that of pure PMMA, 1.49 or lower. The 0.1 refractive index difference between polycarbonate and pure PMMA facilitates light extraction, as illustrated below. Adhesives Research manufactures a wide range of suitable commercially available optical coupling layer materials under their brand names ARclad™ and ARclear™.

Another material combination for light guides and extraction films for both light extraction films (102 and 114) and both light guides (light guiding pipe 100 and light guiding plate 112) can include PMMA, refractive index 1.49. For this combination, each light extraction film (film 102 and film 114) can be laminated to its light guiding counterpart, for example, using an optical coupling layer made of a lower refractive index PMMA-based or silicone-based adhesive (i.e., layer 106 and layer 118). One example of a low-index PMMA optical coupling layer is 50-μm thick ARclear™ 8932 with refractive index 1.41. This choice of pressure sensitive laminating adhesive is also manufactured by Adhesives Research and designated as an optically clear silicone transfer adhesive having low haze and high clarity. The 0.08 refractive index difference between polycarbonate and standard PMMA, and between standard PMMA and the low-index form of PMMA, equally facilitates light extraction.

The tapered light guide (whether pipe 100 or plate 112) can be an important building block because, along with the angular preconditioning of input light which can be from LED emitter 3 provided by the etendue-preserving RAT reflectors 14, the tapered light guide enables uniform output luminance to be achieved along its edge length for the pipe and the length of its cross-sectional area for the plate, with approximately equal division of light between its two plane boundary surfaces.

Although the general properties of tapered light guides have already been described and have been utilized in a few early fluorescent lighting applications, prior art descriptions are insufficiently prepared for present purposes. No prior art teaching has ever anticipated the deliberate combination of a tapered light guiding pipe with a tapered light guiding plate in a conjunctively orthogonal manner that provides well-collimated output light from the system in both its output meridians (see FIGS. 1A-1D, 3A-3B and 4). Prior art teaching has not anticipated the unique angular input requirements that arise when combining two tapered light guides according to the constraints of equation 1 (see FIG. 4). Prior art examples have not provided a suitable means for coupling wide emitting angle LEDs to tapered light guiding bars so as to output collimated light evenly and homogeneously along the bar's entire aperture length (see FIGS. 3C-3E and 5A-5C). And, prior art teaching has not anticipated the underlying relationships between input coupling conditions and the resulting near field spatial uniformity of the tapered light guide system that takes place in practical implementations, unique to such double-collimating illumination systems (see for example FIGS. 48A-48C, 49, 50A-50H, 51A-51C, and 52).

For these reasons, the underlying tapered light guide behaviors pertinent to this disclosure will be established and then some example implementations will be discussed.

All results provided herein, including the typical angular distributions shown in FIGS. 1C and 3E above as initial examples, represent those obtained from realistic non-sequential optical ray-trace simulations made using the optical system modeling software called ASAP™ 2006, version 2, release 1 and ASAP™ 2008 version 1, release 1, manufactured by the Breault Research Organization, Tucson, Ariz., which has been arranged to allow correctly for multiple splits of the implicit Fresnel reflections that occur at all light guiding boundaries, with the dielectric media surrounding these boundaries, taken as air, ($n_{MED}$=1) as a typical example.

Figure 5A:
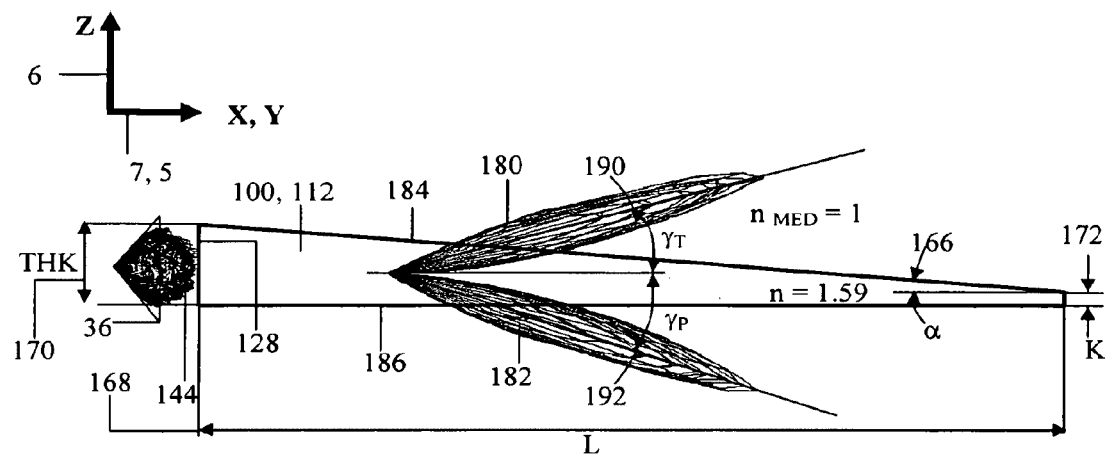
FIG. 5A illustrates in schematic cross-section the side view of a tapered light guide pipe or plate, showing the corresponding angular far field profiles of both input and output light beams.

The schematic cross-section of the tapered light guide that underlies the simulated behavior of both light guiding pipe 100 (Z-Y plane) and light guiding plate 112 (Z-X plane) is given in FIG. 5A. Illustrative values are taken from the example described above. The prevailing taper angle 166, $\alpha=\alpha_p=\alpha_b$, is 3 degrees, taper length 168, L=LB=LP, is 57 mm, light guide thickness 170, THK=THKP=THKB, is 3.037 mm, knife-edge thickness 172, K=KB=KP, is 50 μm, and the dielectric light guide material (medium), illustratively polycarbonate, has a refractive index of 1.59. Comparable examples could be based on PMMA. The angular cross-section of simulated input light 144 (as in FIG. 3E) is applied uniformly over input face 128. When taper angle 166, knife edge thickness 172 and guide length 168 are fixed, the expression for guide thickness 170 follows from equation 1, THK=L Tan α+K. So, for the illustrative values, THK is geometrically, 3.037 mm (approximately 3 mm).

FIG. 5A also shows the simulated (computer generated) output beams 180 (upward taper side) and 182 (downward plane side), and their respective angular inclinations $\gamma_T$ (upward taper side) and $\gamma_P$ (downward plane side) 190 and 192 that arise from total internal reflection failures of light rays transmitting within tapered light guide (whether 100 or 112) along both tapered mirror plane 184 (top side) and its flat mirror plane 186 (bottom side). Topside output beam 180 is found to incline at about a 16.5-degree angle 190 to the axis parallel to the guide's plan flat boundary plane 186, whereas bottom side output beam 182 is found to incline at a 19.5-degree angle 192 (for the illustrative case of polycarbonate, n=1.59). The approximately 3-degree difference between these two results is due primarily to the tapered light guide's 3-degree taper angle α, 166. The angular width (or extent) of each beam, FWHM, is about +/−6 degrees. Approximately 50% of input light 144, in lumens, is found within each far field output beam depicted. Changing the guiding medium to a slightly lower refractive material such as PMMA (n=1.49) can reduce each output beam angle only about 1-degree, an has little effect on each beam's angular extent.

Figure 5B:
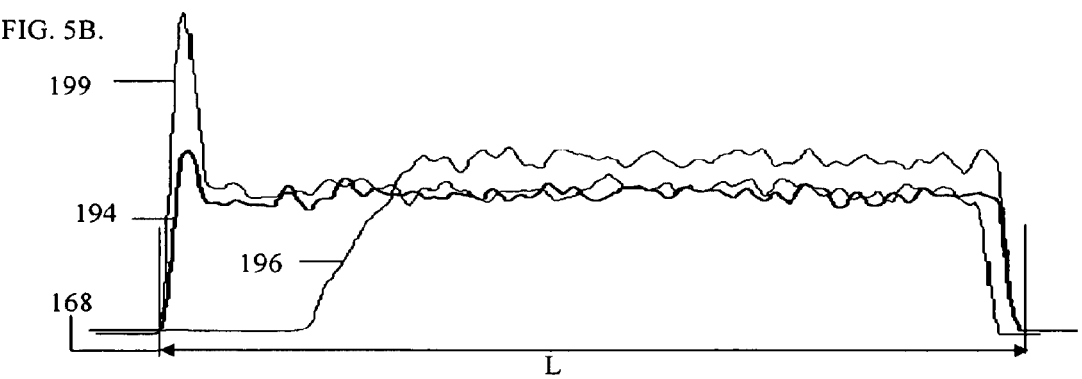
FIG. 5B provides graphic profiles of the associated near field spatial uniformity developed on the tilted topside output face of the tapered light guide of FIG. 5A.

FIG. 5B shows three examples of the near field spatial non-uniformities (194, 196 and 199) that can result on tilted topside taper surface 184 as a consequence of the angular extent of input light that is coupled into entrance face 128 of the light guide cross-section of FIG. 5A. Spatial light profiles (194 and 196) arise on tilted top side taper surface 184 for two illustratively different input light conditions within guide 100 or 112, one example being input light that transmits initially with a +/−52.6-degree cone (in air) in the plane of the cross-section (profile 194) and another example being light that transmits initially with a narrower +/−38.97-degree cone (in air) in the plane of the cross-section (profile 196). The corresponding spatial profiles (194 and 196) indicate the projected near field output brightness corresponding to any point along guide (bar or plate) length 168 just outside the physical boundary of the illustrative polycarbonate media, n=1.59. Spatial profile 199 represents the behavior when input light begins with a widened +/−57-degree cone in air.

Figure 5C:
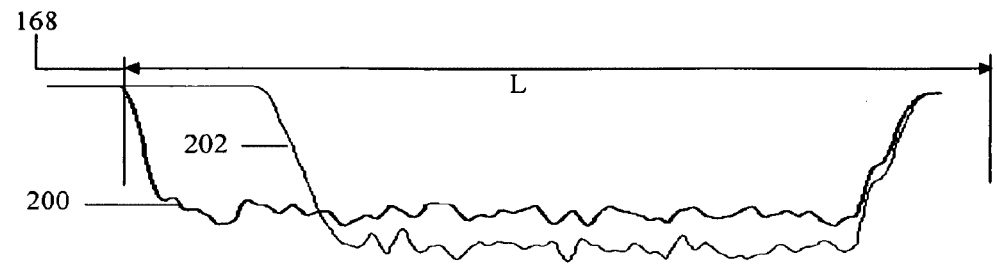
FIG. 5C provides graphic profiles of the associated near field spatial uniformity developed on the flat bottom side output face of the tapered light guide of FIG. 5A.

FIG. 5C shows the corresponding spatial light profiles (200 and 202) that arise on flat plane bottom side guide surface 186 for two illustrative input light conditions within guide 100 or 112, light transmitting with a +/−52.6-degree cone in the plane of the cross-section (profile 200) and light transmitting with a +/−38.97-degree cone in the plane of the cross-section (profile 202). The corresponding spatial profiles indicate the projected near field output brightness corresponding to any point along guide (bar or plate) length 168 just outside the illustrative polycarbonate media, n=1.59.

Spatial light distributions (e.g., 194, 196, 199, 200, and 202) record the relative near field brightness uniformity of the illumination provided by the tapered light guide in the present example, and can give an indication of the guide's aperture appearance when viewed directly (from above or below). The narrower the angular width (extent) of input light provided within the guide's cross-section, the more skewed is the appearance of its light output to the tapered (right hand) end of the plate, producing a dark zone (or band) closest to the source of light input. Conversely, input light cones wider than +/−53 degrees within the guide cross-section give rise to progressively more aggressive early emission and the corresponding appearance of a bright zone (or band) in the vicinity of the guide's input face 128.

This more impulsive behavior is illustrated in FIG. 5B by profile 199 for +/−57 degree input light (in air) to show one example of the strong effect that can occur when the angular extent of the input light is improperly arranged, for the guide's tilted topside plane 184. Even though the +/−57-degree input cone is only +/−4 degrees larger than the +/−53 degree cone giving rise to relatively uniform light distribution 194, all the higher light angles extract immediately, and give rise to a sizeable brightness peak. The wider the input angular cone, the more severe the bright region becomes, and the darker the guide's tail section output becomes. Despite such changes to near field aperture appearance, far field beam profiles 180 and 182 can remain reasonably unaffected.

Equally impulsive non-uniformity is observed for the more narrowly confined +/−38.97 degree input light, as revealed by spatial light distributions 196 (top side, FIG. 5B) and 202 (bottom side, FIG. 5C). In both cases, the more collimated input light within the guide delays the occurrence of output and is associated with a visibly dark region in the vicinity of input face 128. Although the tapered guide eventually achieves a region of spatial brightness uniformity, this region only occurs in the second ⅔rds of the guide length. The narrower the input angular cone, the more extensive the input end dark region becomes.

The significance of the differences between spatial light distributions 194, 196, 199, 200, and 202 as represented in FIGS. 5A-B is that they reveal a dependence between the uniformity of the light guide's output brightness and the angular width of input coupled light. The profiles 194 and 200 indicate that spatial uniformity is achieved over the entire guide length in this particular example when input light is held to an angular extent of about +/−53 degrees (in air, just outside the illustrative polycarbonate medium).

It is impractical to derive an analytical equation for the input angular extent corresponding to widest output uniformity, as this result depends on the guide's specific boundary conditions and on the complex Fresnel reflections that arise because of them (and the refractive index of the guiding medium). One example of an optimization method for a different tapered light guide structure is the stochastic, non-sequential optical ray trace performed noting the input angular extent that gives rise to the widest and smoothest region of output uniformity that is possible for the prevailing materials and their geometric parameters.

Accordingly, best practice of this disclosure arises when the angular extent of input light 146 coupled just inside the tapered light guide's cross-section (as in the example of FIG. 3E) gives rise to substantially homogeneous near-field brightness uniformity illustrated by profiles 196 in FIG. 5N and profile 200 in FIG. 5C.

Far field output beams 180 and 182 are composed of the ensemble of individual light rays that have failed conditions for total internal reflection at the corresponding surface planes 184 or 186 within tapered light guide. Total internal reflection behavior is illustrated more completely in FIGS. 6A-6B, for light guide sections taken relatively near input face 128, and for ray trajectories at or near the prevailing critical angle for the polycarbonate guide medium being illustrated. Similar behavior is illustrated when the guide medium is PMMA or another suitably transparent optical material.

The effects of adding a specular reflecting mirror plane (274 or 275) just beyond the tapered light guide's tapered boundary surface 184 or just beyond the tapered light guide plane boundary surface 186 are illustrated in FIGS. 7A-7C and 8A-8D for the example of a polycarbonate guide medium and dielectric bounding layers existent between guide and mirror plane that are either air or PMMA.

Figure 6A:
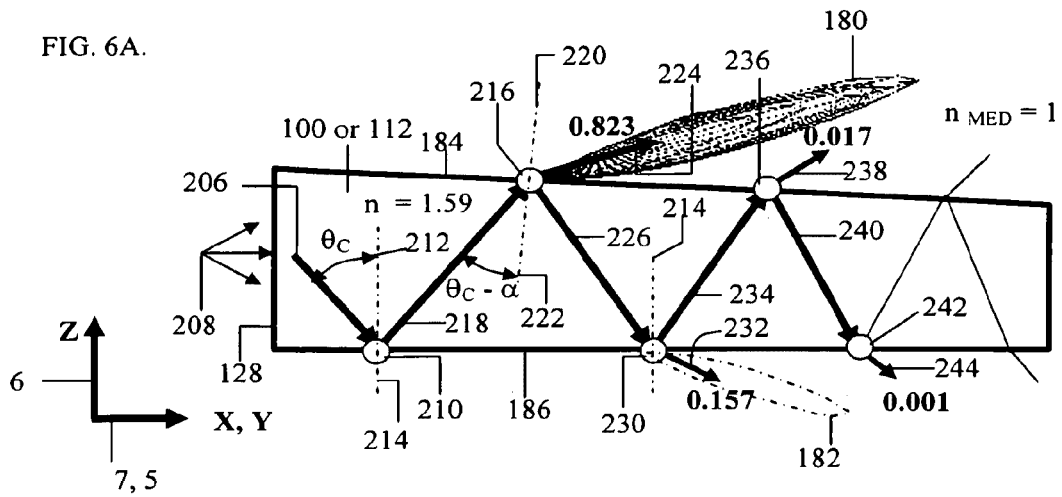
FIG. 6A illustrates the optical paths taken by a single paraxial test ray undergoing total internal reflection inside a tapered light guide.

FIG. 6A illustrates the optical paths taken by a single paraxial test ray undergoing total internal reflection inside a tapered light guide. The ray path of single illustrative ray 206 from symbolic input source 208 is traced from its point of entry just inside input face 128 of the light guide's the refractive medium (i.e., polycarbonate, n=1.59, in the present example). Illustrative ray 206 strikes plane surface 186 at point 210, making critical angle 212 ($\theta_c=\text{Sin}^{-1}[1/n]$) with surface normal 214, which is 38.97 degrees for the polycarbonate light guide medium of the present example. This ray 206 makes a total internal mirror reflection about surface normal 214 and is redirected towards point 216 on tilted plane surface 184 (tilted 3 degrees from horizontal in this example) as total internally reflected ray segment 218. Accordingly, the surface normal 220 at point 216 is tilted correspondingly by 3 degrees with respect to plane surface normal 210, and because of this, ray 218 arrives 3 degrees short of the critical angle 222. Since ray 218 arrives with an angle of incidence less that the critical angle, it refracts as output ray segment 224 into the dielectric medium (air in the present case) surrounding the representative light guiding cross-section according to Snell's Law. Ray 218 is said to fail the condition for total internal reflection at point 216, and as such refracting ray segment 224 is extracted as output illumination within far field output beam 180 as was shown previously in FIG. 5A. This illustrative TIR failure is not 100% efficient because of the refractive index discontinuity that exists between the surrounding medium air and polycarbonate in this example, which gives rise to a Fresnel reflection at point 216 as reflected ray segment 226.

Fresnel reflections of this sort are conventionally calculated using the Fresnel equations for reflection and transmission coefficients of the orthogonal (parallel and perpendicular) electric field components of an electromagnetic wave, which are provided in most standard textbooks on electromagnetic waves (for a more rigorous discussion, see for example, Jenkins and White, Fundamentals of Optics, 4E, McGraw-Hill, Section 25.2.) In the present example, light is un-polarized, and ray trace simulations assign proper light flux to each ray depending on its complex angular direction and the prevailing surface boundary conditions according to an incoherent average of the two electromagnetic polarizations, as in equations 2 and 3, where $\theta_i$ and $\theta_1$ are the respective angles of incidence and transmission with respect to the prevailing surface normal from Snell's Law. The closer the angle of incidence becomes to the critical angle, $\theta_c$, at any surface boundary like point 216 in FIG. 6A, the larger is the amount of light flux contained in the Fresnel reflected rays. If light flux in total internally reflected ray segment 218 of FIG. 5A is 1 lumen, about 0.815 lumens are transmitted into air (81.5%) as ray 224 and 0.175 lumens are reflected at point 216 (17.5%) as ray 226. The splitting ratio between transmitted and reflected rays changes according to the angles of incidence involved.

$$R_{AVE} = 0.5\left(\frac{\text{Tan}^2(\theta_i - \theta_t)}{\text{Tan}^2(\theta_i + \theta_t)} + \frac{\text{Sin}^2(\theta_i - \theta_t)}{\text{Sin}^2(\theta_i + \theta_t)}\right) \quad (2)$$

$$T_{AVE} = 0.5\left(\frac{4\text{Sin}^2(\theta_t)\text{Cos}^2(\theta_i)}{\text{Sin}^2(\theta_i + \theta_t)\text{Cos}^2(\theta_i - \theta_t)} + \frac{4\text{Sin}^2(\theta_t)\text{Cos}^2(\theta_i)}{\text{Sin}^2(\theta_i + \theta_t)}\right) \quad (3)$$

When Fresnel reflected ray segment 226 reaches point 230 in FIG. 6A, its angle of incidence has moved further away from critical angle 212 as a result of the reflection at tilted mirror plane 184. Its angle of incidence with respect to dashed surface normal 214 is about 33 degrees, which is the critical angle, 38.97 in this case, minus two sequential 3-degree angular reductions, one occurring on arrival at point 216 and the second occurring on arrival at point 230. In this instance, the average transmission and reflection coefficients correspond to transmitted ray segment 232 contributing about 0.16 output lumens and Fresnel reflected ray segment 234 containing about 0.02 lumens. Subsequent internal Fresnel reflections show diminishing contributions as ray segment 238, 240 and 242 at points 236 and 242. The 1 lumen of initial light flux assumed in single illustrative probe ray 206 contributes about 0.84 lumens (84%) to far field beam 180 and 0.16 lumens (16%) to far field beam 182 in FIG. 5A.

The asymmetric flux splitting (as indicated by the net from an ensemble of the single-ray results illustrated in FIG. 6A) favoring contributions to the upper far field beam 180 is significant only for this particular type of single ray path, initially incident at (or near) point 214 and at incident angles at (or near) the critical angle for the guiding medium used.

Figure 6B:
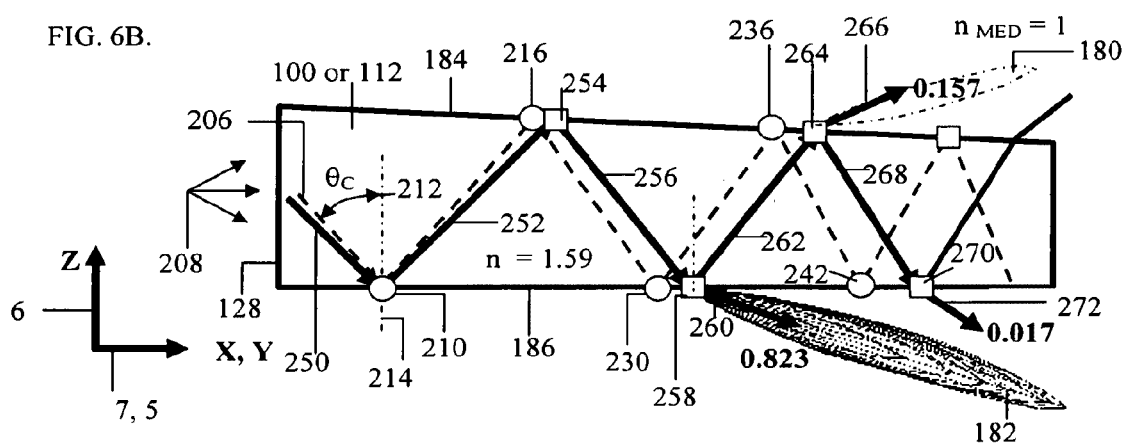
FIG. 6B illustrates the optical paths taken by a single paraxial test ray undergoing total internal reflection inside a tapered light guide, choosing a slightly different start trajectory than the one shown in FIG. 6A.

FIG. 6B illustrates the optical paths taken by a single paraxial test ray undergoing total internal reflection inside a tapered light guide, choosing a slightly different start trajectory than the one shown in FIG. 6A. FIG. 6B traces the corresponding behavior of illustrative input ray 250, which arrives at point 214 with an angle of incidence 3 degrees greater than illustrative ray 206. The internal transmission path of ray 206 from FIG. 6A is shown as dotted for purposes of comparison. Accordingly, ray 250 in exceeding critical angle 212, makes a total internal reflection about surface normal 214 and is redirected towards tilted mirror plane 184 as ray segment 252, reaching it at shifted point 254. Because the tilt of plane 184 in this example is 3 degrees and ray 250 exceeded critical angle 212 by 3 degrees, ray 252 arrives at point 254 with an incidence angle exactly equal to critical angle 212, and because of this, makes an efficient total internal reflection with essentially all its original flux remaining in reflected ray segment 256 (i.e., no light transmission into the surrounding medium, illustratively being air).

When ray 256 arrives at point 258, however, it has gained another 3 degrees relative to the prevailing surface normal and as such falls 3 degrees inside the critical angle. In this instance, the condition for total internal reflection is not satisfied, and refracted ray 260 is transmitted into the surrounding medium (air, in this example). As in the case of ray 226 above, there is a Fresnel reflection at point 258, reflected ray segment 262 heading towards point 264 on surface 184. Arrival at point 264 also involves refractive transmission into the surrounding medium as ray segment 266 and another Fresnel reflection, ray segment 268 along with transmitted component 272 at point 270.

Notice that in this example of FIG. 6B, despite being so close in starting trajectory to that in FIG. 6A, the majority of transmitted flux is contained within output beam 260 (FIG. 6B) on the lower (or flat plane) side of light guiding cross-section. In fact, the output flux contributions (shown emboldened in both FIGS. 6A and 6B) are nearly identical, except for their side of escape. Other illustrative ray trajectory examples, if chosen, would be seen to cause a wide variety of intermediary flux distributions between outputs from surface 184 and 186.

When all rays within the angular extent of symbolic input light source 208 are superimposed on each other, as in FIG. 5A, the average output flux resulting on each side of bare light guide are contained in the equally energetic far field output beam profiles 180 and 182.

A specularly reflecting mirror-plane on one side of the tapered light guide (or the other) is used to redirect light flux from one side of the light guide to the other, so that effectively all extracted light is made available through a solitary output aperture. The development of this basic behavior is illustrated by the same means in FIGS. 7A-7C.

Figure 7A:
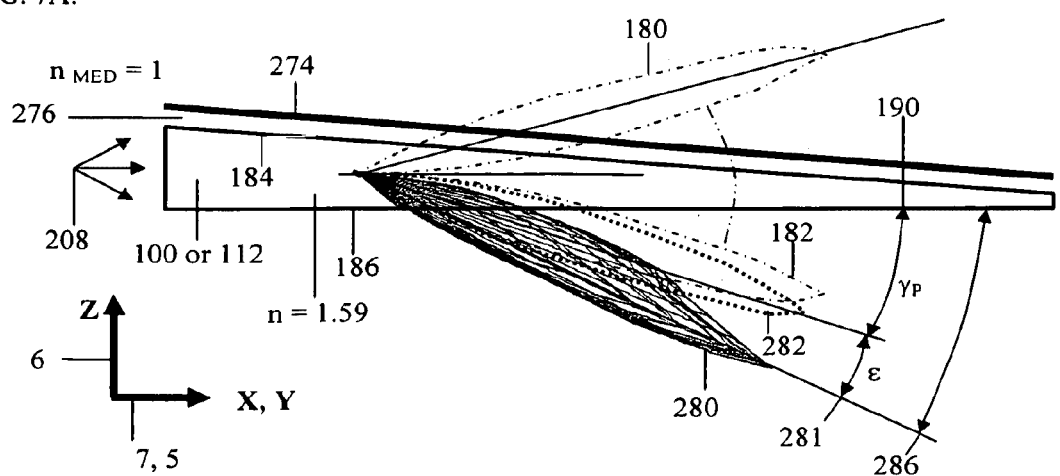
FIG. 7A shows the effect on light extraction by adding a tilted reflecting plane in air just above the tilted surface of the tapered light guide illustrated in FIG. 5A.
Figure 7B:
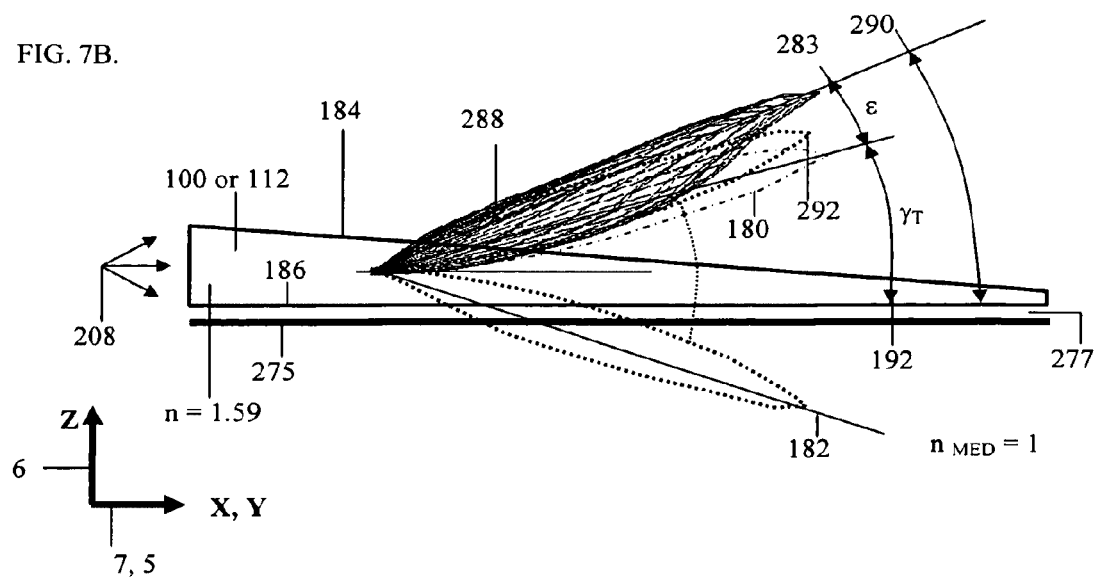
FIG. 7B shows the effect on light extraction by adding a flat reflecting plane in air just below the flat surface plane of the tapered light guide illustrated in FIG. 5A.

FIG. 7A shows the effect on net output light extracted when adding a tilted reflecting plane in air just above the tilted surface of the tapered light guide illustrated in FIG. 5A. When specular reflecting plane 274 (or 275) is placed near (or directly upon) either top or bottom surface 184 or 186 of the representative light guide (100 or 112), the corresponding output light extracted from that light guide surface is forced back into the guiding medium from whence it came by a combination of internal reflections and refractions, becoming a part of the collective output beam on the opposing side of the guide from that of the reflecting plane's location. This behavior is illustrated by the side views of FIG. 7A (for tilted taper plane reflector 274) and 7B (for plane mirror reflector 275). The air-gaps between the light guide medium and reflector 274 (FIG. 7A) and 275 (FIG. 7B) are 276 and 277 respectively (but could in general be any transparent dielectric medium, for example, a medium having a lower refractive index than that of the guide medium itself). In each case, the composite output beam (downward beam profile 280, FIG. 7A, and upward beam profile 282, FIG. 7B) is directed away from the horizontal X-Y plane illustrated by a wider angle, E, 284, than would be expected from either of the intrinsic output beam angles ($\gamma_T$ 190 and $\gamma_P$ 192) associated with the 2-sided-extractions of FIG. 5A. Both single-sided beam extractions represented by realistic beam profiles 280 and 282 are seen as being tilted by an additional 8 degrees in the present example over the purely geometrical expectation. Phantom two-sided beam profiles 180 and 182 representing the far field beam profile results of FIG. 5A are included in dotted form for purposes of comparison. Phantom profiles 282 (FIG. 7A) and 284 (FIG. 7B) are the mirror reflections of 180 and 182 respectively and each is seen to differ from the actual double-sided beam profile phantoms by the taper angle α, which remains 3 degrees in the present example. Output beam 280 as shown in FIG. 7A projects downwards at approximately a 27.5-degree angle, 286, measured from horizontal. Output beam 288 as shown in FIG. 7B projects upwards at approximately a 24-degree angle, 290, also measured from horizontal. Corresponding angles from 2-sided extraction were about 19 degrees downwards and about 16 degrees upwards (as determined in FIG. 5A).

Figure 7C:
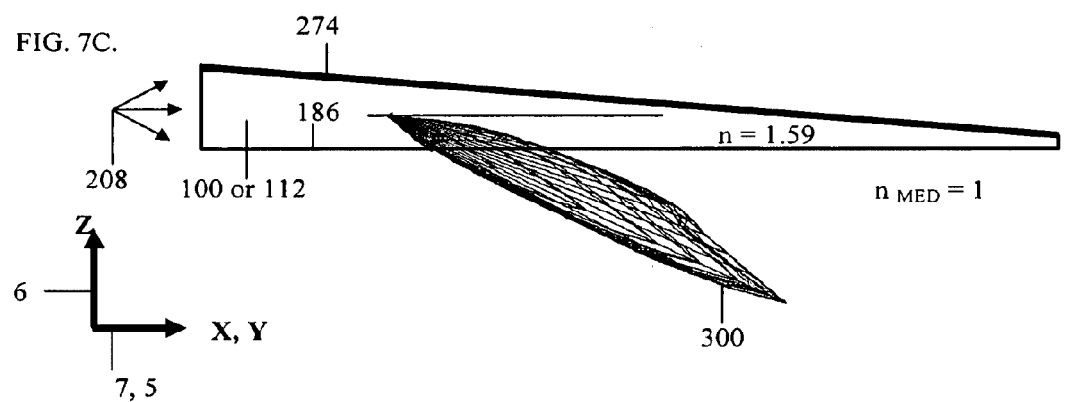
FIG. 7C shows the effect on light extraction by adding a tilted reflecting plane that is optically coupled to the tilted surface of the tapered light guide illustrated in FIG. 5A.

FIG. 7C shows the effect on light extraction by adding a tilted reflecting plane that is optically coupled to the tilted surface of the tapered light guide illustrated in FIG. 5A. Air gaps 276 (FIG. 7A) and 276 (FIG. 7B) between reflector and light guide plate as used in light distributing engines 1 are optional. Contrary to prior art, reflector 274 may be applied directly to surface 184 of the representative tapered light guides without significant compromise in efficiency (assuming reflectivity of the reflecting material is sufficiently high). Reflector 274 is applied either by vapor deposition (as in the case of high reflectivity silver or aluminum) or as a separate layer attached directly by means of a thin optical adhesive whose refractive index nearly matches or is lower than the refractive index of the representative polycarbonate light guide material of this example. A direct reflector attachment method is used to advantage when the reflectivity of reflector 274 exceeds about 95%. One such excellent high-reflectivity reflector material available commercially for direct attachment is ESR™ as supplied by Minnesota Mining & Manufacturing (3M). 3M's so-called ESR™ mirror film material exhibits exceptionally high reflectivity (>0.98) for both polarizations of light over the entire visible light spectrum regardless of angle of incidence. Elimination of air-gap 276 in this manner sacrifices only a small amount of total light output in beam profile 300. When ESR™ is separated from tapered light guide surface 184 by a small air gap, about 95.8% of the input flux results in far field output beam 300. When ESR™ is optically coupled to the plate, as with an index-matching pressure sensitive adhesive, output conversion efficiency decreases only slightly to about 92%.

FIG. 8A-8D show perspective views of simulated performance for one possible realistically constructed form of the tapered edge-emitting light guide pipe introduced earlier. Far field light output in this case, as anticipated by the mechanisms illustrated in FIGS. 5A-5C, 6A-6B and 7A-7B above, is well-collimated in one output meridian and not the other as intended, while the output beam is directed obliquely from the light guide pipe's output aperture plane 126. In this elemental example, plane reflector 274 is applied directly to tapered face 184 of light guiding pipe 100. Light extracting and redirecting plane reflector 274 is configured smoothly for purposes of this example, with light extracting prisms 104 of light extracting film 102 as shown in FIGS. 3A-B given peak angles approaching 180 degrees.

Figure 8A:
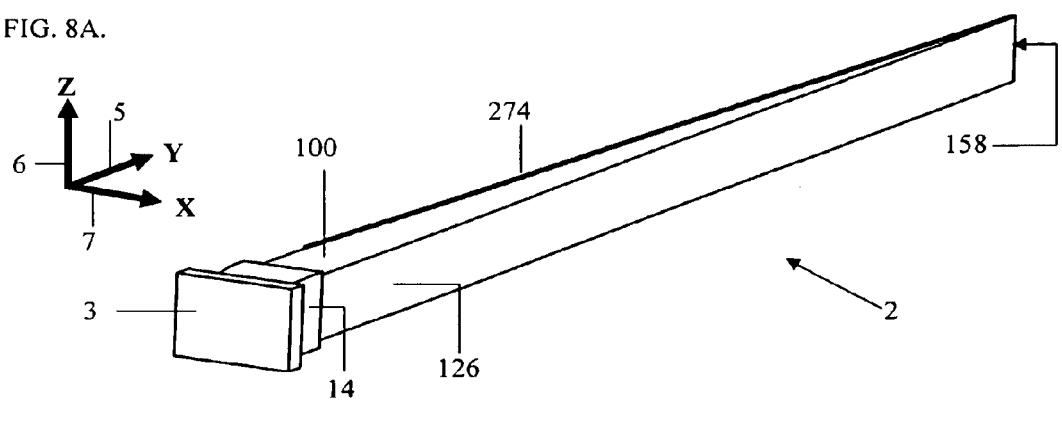
FIG. 8A is a perspective view illustrating the single LED light emitter serving as the input portion of the double collimating light distributing engine examples of FIGS. 3A-3B and 4, as seen from its output edge for the special case where its light extracting prisms facets have collapsed to the unstructured form of a smooth mirror plane.

FIG. 8A is a perspective view illustrating the single LED light emitter 2 serving as the input portion of the double collimating light distributing engine examples of FIGS. 3A-3B and 4, as seen from its output edge 126, for the special case where its light extracting prisms facets have collapsed to the unstructured form of a smooth mirror plane 274. This LED light emitter example comprises single LED emitter 3, pre collimating etendue-preserving RAT reflector 14 described above, and light guiding pipe (bar or rod) 100. Illustrative light guiding pipe 100 is made of polycarbonate, but could also be made of any other low-loss transparent optical material including PMMA, Zeonex, and non-absorptive glasses such as quartz, Pyrex and Boro-silicates. Pipe 100 has a 3 mm×3 mm input aperture, and a 57 mm taper length 168 (as in FIG. 5A). Its taper angle 156 as previously shown (e.g., see FIG. 4), can be about 3 degrees, for example. The pipe's top and bottom planes 184 and 186 are flat and parallel. The 3 degree taper is cutoff with a 50-μm thick knife-edge or peripheral edge 158. The RAT reflector's input aperture is sized and shaped to match the emission aperture of LED emitter 3, which is sized 2.4 mm by 2.4 mm so as to receive substantially all the light from a 2×2 array of 1 mm by 1 mm LED chips. Two of many possible commercially available 4-chip LED emitters meeting this particular illustrative condition include various configurations of LED emitters manufactured by Osram Opto Semiconductor under trade names OSTAR™ Lighting and Osram OSTAR™ Projection. The RAT reflector's corresponding output aperture is made 3 mm×3 mm, so as to match the light guide pipe's 3 mm×3 mm input aperture, while also supplying the approximately the +/−52.6 degree angular distribution (in air) associated with the results of FIG. 5A-5B.

FIG. 8B provides a topside view of the edge-emitting LED light emitter 2 of FIG. 8A, showing the obliquely directed far field beam cross-section that results. The actual computer-simulated far field output beam 310 for the example conditions is superimposed accurately in cross-section, and found to make in air a 27 degree angle 312 (as shown) with the light guiding pipe's output aperture plane 126. This far-field beam's cross-section has about a +/−8 degree angular extent, FWHM (e.g., full width half maximum).

FIG. 8C provides a front view illustrating the light beam cross-section that is emitted from the output edge of the system of FIG. 8B. The computer-simulated far field beam 310 is superimposed accurately in this different cross-section, and found to make in air the unmodified 53-degree out angle 316 that was established by design at the pipe's input by RAT reflector 14.

FIG. 8D illustrates the LED light emitter of FIGS. 8A-8C in a topside perspective view showing the highly asymmetric nature of its obliquely directed output illumination. As in FIGS. 8B-8C, far field beam profile 310 as illustrated was obtained by computer simulation and is superimposed in its corresponding perspective as emanating from output edge 126 of light guiding pipe 100 within LED light emitter 2.

Extending the light extraction behavior to the steeper output angles better suited to down lighting can require an additional light processing mechanism within the tapered light guide's underlying extraction mechanism.

Figure 9:
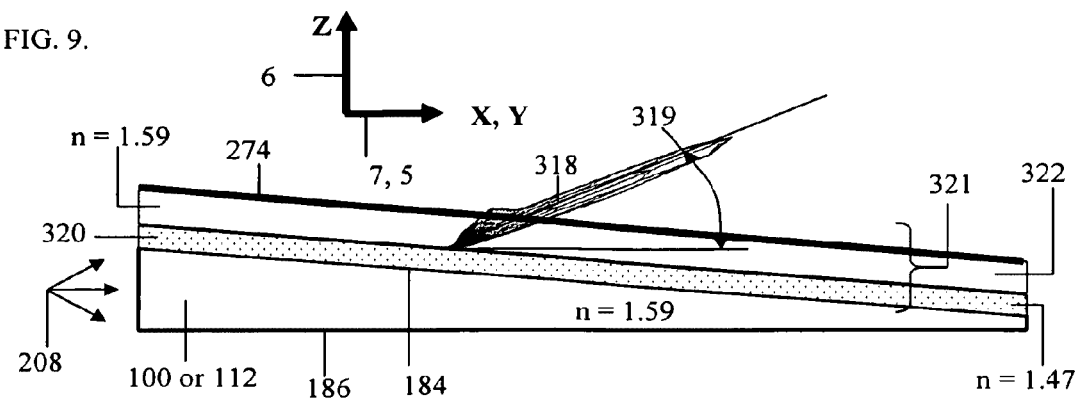
FIG. 9 illustrates the side cross-section of a tapered light guiding pipe (or plate) whose tilted (taper) plane is modified to include an optical film stack having two different dielectric layers and a plane mirror, also containing a superimposed simulation of the extracted output light's angular cross section.

FIG. 9 illustrates the side cross-section of a tapered light guiding pipe 100 (or plate 112) whose tilted (taper) plane 184 is modified to include an optical film stack 321 having two different dielectric layers (320 and 322) and a plane mirror 274, with a superimposed simulation of the extracted output light's angular cross section. The addition of optical film stack 321 introduces an initial step in this important mechanistic variation for the tapered light guide configuration as illustrated schematically in FIG. 7A. This modification applies equally whether the tapered light guiding member is a pipe 100 or a plate 112, and whether the guiding material is polycarbonate (as in the ongoing example, PMMA, or some other optical material such as PMMA having higher transparency). It further applies whether the light guiding plate has been extruded linearly, as in the present example, or extruded radially, as discussed further below (e.g., see FIGS. 34A-34F, 35A, 38A-38B, and 39A-39C). The side cross-sectional view of FIG. 9 shows two thin optically transparent dielectric layers substituted for the air-gap 276 as shown in FIG. 7A. The first of these layers, layer 320, is chosen to have a lower refractive index than that of the material used to form the light guiding pipe or plate to which it is coupled. In the example of FIG. 9, the light guide material is taken illustratively as being polycarbonate, n=1.59, and the refractive layer 320 which is attached to tilted boundary plane 184, has a refractive index which can be less than 1.49. Were the light guide material made of acrylic (poly methyl methacrylate), n=1.49, the refractive layer 320 which is attached to tilted boundary plane 184, has a refractive index which can be less than 1.41. The second of these layers, layer 322, attached to the first, can have a refractive index equal to or higher than that of the refractive index of the light guiding member (100 or 112). When the light guide is polycarbonate, layer 322 can have a refractive index greater than or equal to 1.59, and when the light guide layer is acrylic, layer 322 can have a refractive index greater than or equal to 1.49. Reflector plane 274 is applied directly for this example to the upper surface of layer 322. Layer 320 may be any optically transparent material having a refractive index between about 1.35 and 1.55, whose thickness can be less than 100 μm, but may range upwards from as little as about 50 μm. In practice, layer 320 can be made of an adhesive material formulated from acrylic (poly methyl methacrylate), refractive index between 1.47 and 1.49 when the light guide is made of polycarbonate and between 1.39 and 1.41 when the light guide is made of pure acrylic (e.g., see Adhesives Research Inc, Philadelphia, Pa.). Layer 322 can be made of the same material as light guide (100 or 112) in practice, but may also be any polymeric or glass material with equal or greater refractive index than that of the light guide. The thickness of layer 322 is can be less than 250 μm, but may range upwards from about 50 μm to thousands of microns and more depending on the intended purpose. FIG. 9 also shows, in cross-sectional view, one possible far field beam simulation 318 that results from transmission of input light 208 through the tapered light guide (100 or 112) right up to reflector plane 274, and just inside the dielectric medium of layer 320.

Figure 10:
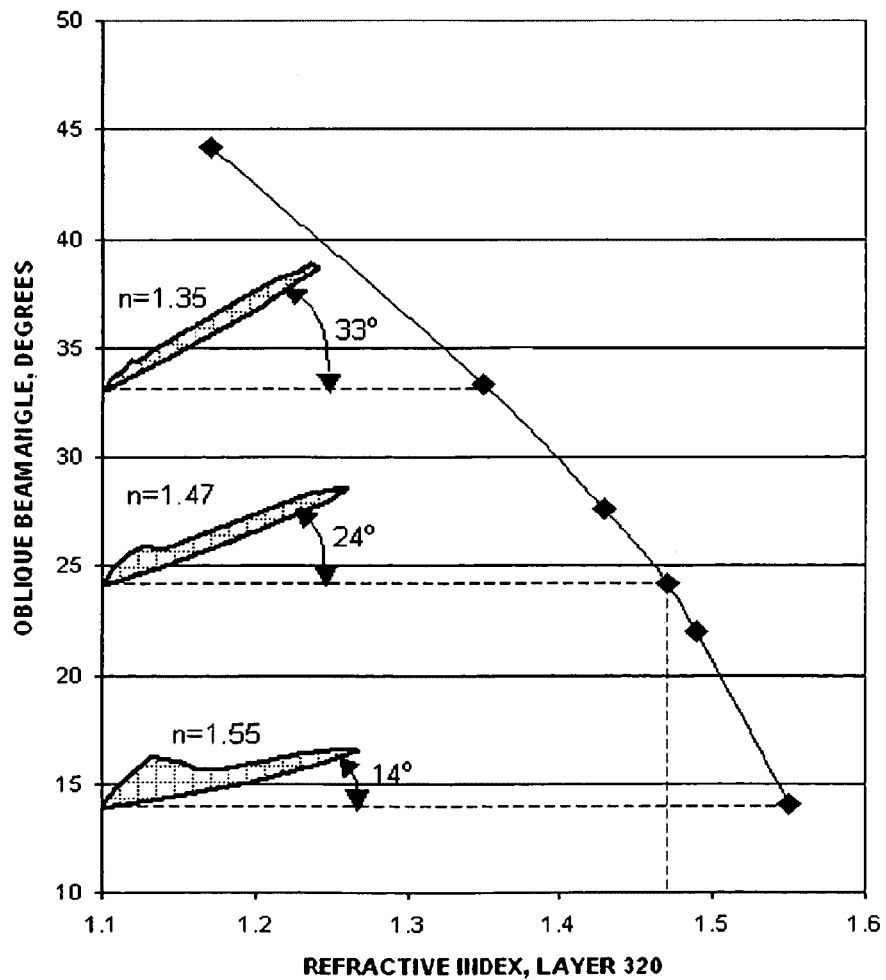
FIG. 10 provides a graph detailing the quantitative relationship between the angle of light extraction and the prevailing refractive indices causing it.

FIG. 10, is based on a set of computer ray-trace simulations, and plots out the quantitative relationship existing between the refractive index chosen for transparent dielectric layer 320 and the internal far field beam angle that results in transparent dielectric layer 322 just before plane reflector 274. The internal angle produced using acrylic as layer 320 is 24 degrees away from output aperture plane 186. More ideal beam shape is associated with a refractive index value closer to 1.35, which produces a far field angle of 33 degrees. The results of FIG. 10 apply to the example using a polycarbonate light guide. A similar trend is observed when the light guide is made of a lower index material such as acrylic.

The relationship between capture angle and the refractive index of medium 320 that is set forth in FIG. 10 indicates that the lower the refractive index of medium 320, the cleaner and narrow is extracted light beam 318, and the greater is its angle with horizontal. The smaller the refractive index difference between tapered light guide pipe (100) or plate (112) and medium 320, the shallower the extraction angle and the more distorted is the extracted beam profile.

Turning the refracted light in layer 322 into a steeper angle than provided by its Law of Reflection angle from tilted plane mirror 274 requires installing an even steeper mirror angle than that of the light guide's natural 3 degree taper angle. Rather than doing this by simply increasing the steepness of tilt for the entire reflector plane 274 from 3 degrees to an angle as high as about 40 degrees, the steeper mirror can be Fresnelized as a sequence of substantially identical reflecting facets, as anticipated earlier by light extraction films 102 shown in FIGS. 3A-3B and 4 above. The process of Frenelizing a thick spherical or cylindrical optical surface shape is standard practice in the optics industry as a practical means of reducing an optical element's net thickness (e.g., the field of Fresnel lenses). Its usage is equally appropriate in reducing the thickness of an otherwise steep plane mirror surface. Such is the case with the light reflecting facets that are applied in this disclosure to achieve more desirable output angles in conjunction with the tapered light guiding pipe 100 and the tapered light guiding plate 112, and their conjunctive applications.

Figure 11A:
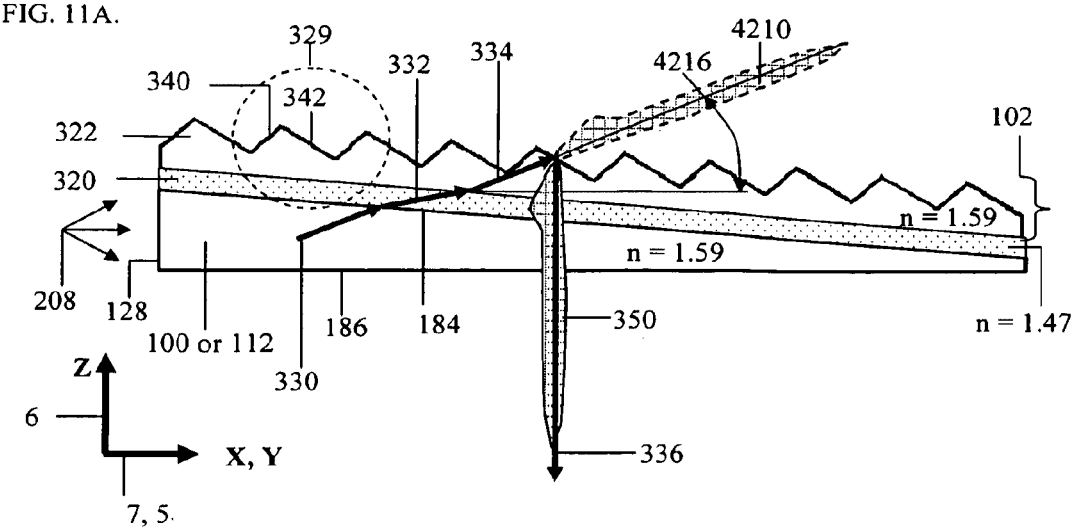
FIG. 11A illustrates optical behavior in the side cross-section of a tapered light guide structure similar to that of FIG. 9, but having a prismatic mirror plane composed of more steeply tilted mirror sections.
Figure 11B:
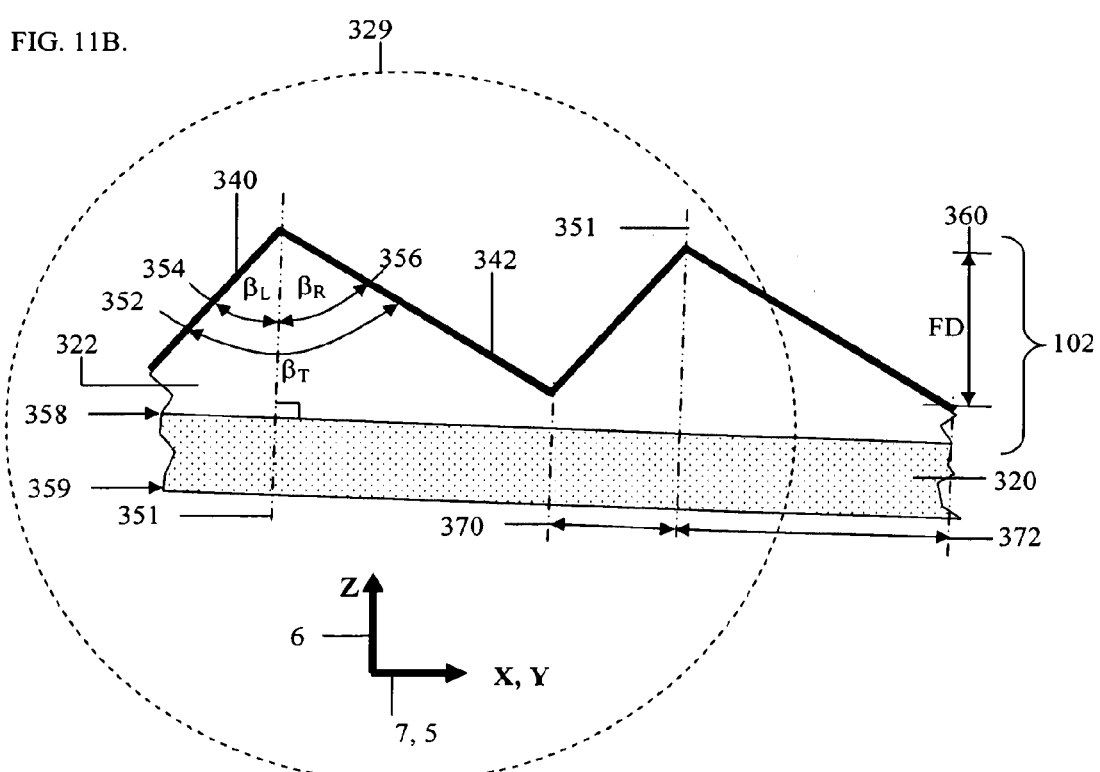
FIG. 11B provides a magnified side cross-section of a portion of the prismatic mirror plane of FIG. 11A.

The basic light extraction mechanism involved, whether applied to the tapered light guide pipe (100) or plate (112) is illustrated by way of the cross-sectional view provided in FIG. 11A and the magnified cross-sectional view of FIG. 11B for material and geometric values of the ongoing example. In this example, both the tapered light guide and faceted dielectric layer 322 are made of polycarbonate, refractive index 1.59, and dielectric coupling layer 320 is made of an optically clear acrylic adhesive, refractive index 1.49. Left side apex facet angle, $\beta_L$, 350 and right side apex facet angle $\beta_R$, 352, are illustrated in the magnified detail of FIG. 11B. They are respectively, 38 degrees and 60 degrees in the present example, but many other suitable illustrative combinations will be established. The array of facetted-prisms is a regular one in this example, but a wider variety of prism compositions may be blended into a more complex array for special applications. And while the basic light extraction mechanisms apply to light guiding pipes 100 and light guiding plates 112, they also apply to light guiding disks formed by rotating the tapered cross-section of FIG. 11A about an axis parallel to input face 128.

FIG. 11A shows the underlying behavior by tracing the path of one illustrative light guiding probe ray 330 (plus sequential segments 332, 334 and 336), and also by showing the resulting redirection of the collective far field output beam 336 representing an ensemble of all output rays.

Full extraction of internal beam 330 from generically tapered light guide pipe (100) or plate (112) while simultaneously changing beam direction can be achieved in cross-sectional view with facetted redirection layer 102 which is composed of a sequential series of left hand and right hand reflective facets (340 and 342) made in layer 322 placed just above lower index layer 320, as shown in the side view of FIG. 11A. The asymmetric facets 340 and 342 are formed, for example, in a clear polymeric medium such as polycarbonate, and surface-coated with metallically reflective, pinhole-free film, such as silver, which also could be aluminum or another high-reflectivity coating.

By this design, light extraction occurs predominately, if not exclusively, on right hand facets 342 in this arrangement. Extractable rays such as 4240 in tapered light guide 4100 pass through low index layer 4212 (ray segment 4242) and then through facetted medium 4236 (ray segment 4244) along the direction of extracted beam 4210 in FIG. 41A. Redirection occurs by reflection at the tilt of right hand facets 4234, as illustrated for one facet in FIG. 42A. Redirected beam 4246 contains ray segment 4248 along with all other redirected rays surrounding it.

FIG. 11B provides a magnified view 329 of the asymmetric facet geometry applied in this illustrative example. The total included apex angle 352 ($\beta_T$) is the sum of left hand facet angle 354 ($\beta_L$) and right hand facet angle 356 ($\beta_R$), each defined with respect to surface normal 351 for the interface 358 between film layer 322 and lower index layer 320. When output light is directed normal to the associated tapered light guide's output face (126 for pipe 100 and 123 for plate 112), the total included apex angle 352 is about 98 degrees, left hand facet angle 354 is about 38 degrees and right hand facet angle 356 is about 60 degrees, as mentioned above for values used in the ongoing. The facet depth 360 (FD), along with the respective facet angles determines prism pitch, which is by geometry, FD [Tan ($\beta_L$)+Tan($\beta_R$)], where FD [Tan ($\beta_L$)] is sub-length 370 and where FD [Tan ($\beta_L$)] is sub-length 372. Redirection of extracted light is controlled predominately (if not exclusively) by the right hand facet angle 342.

Figure 11C:
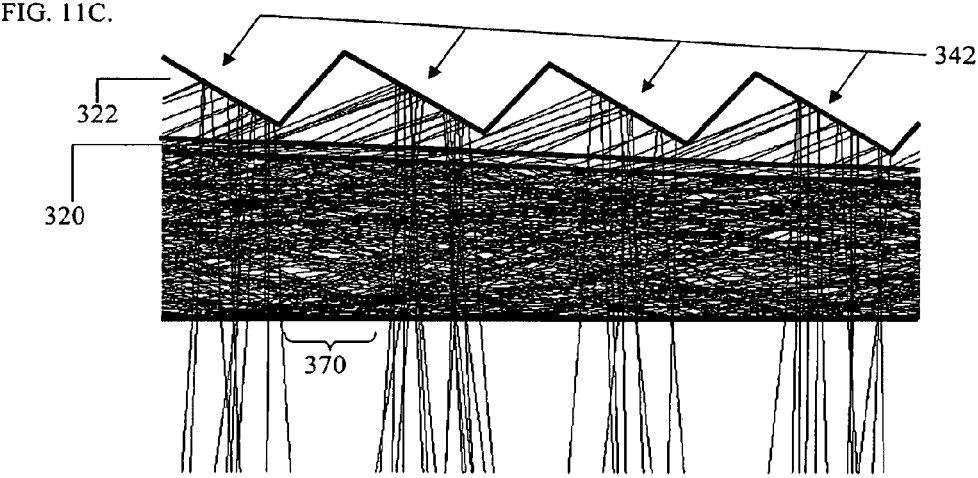
FIG. 11C illustrates in schematic cross-section, the results of an optical ray-trace simulation of light transmission within the tapered light guiding structure of FIGS. 11A and 11B.

FIG. 11C supports this description by showing the corresponding cross-sectional side view of a ray-trace simulation of 500,000 input rays 208 for this illustrative configuration, plotting every $1000^{th}$ ray for viewing simplicity. It's easy to see from this presentation that the array of right hand facets (342) serve as the source of down-directed illumination, while the left hand facets appear only as intervening dark stripes. With these introductory elements as a foundation, some illustrative examples will be given.

The first example will provide additional performance details of the single LED form of tapered edge-emitting light bar input engine 120 introduced earlier in FIGS. 3A-3E and 4, using facetted multi-layered light extraction film 102.

Figure 12A:
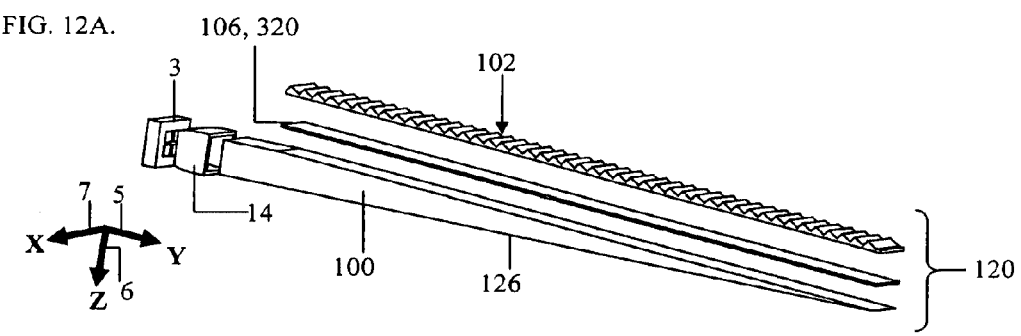
FIG. 12A provides an exploded perspective view of the edge-emitting input engine that is a part of the illumination system of FIGS. 3A and 4.

FIG. 12A provides another exploded view of the tapered edge-emitting light bar input engine 120 clearly showing the construction of its multi-layer light extracting, turning and collimating film 102.

Figure 12B:
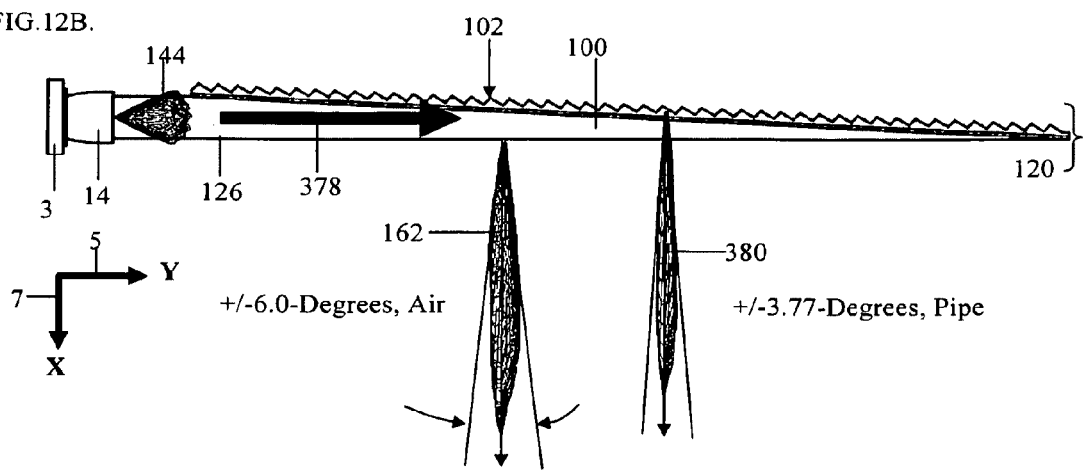
FIG. 12B provides a top view of the edge-emitting input engine that is a part of the illumination system of FIGS. 3A and 4, illustrating the collimated output beams that are produced both just inside the light guiding pipe comprising it, and as output in air.

FIG. 12B shows a top view of input engine system 120 including its far field output beam pattern, a +/−6 degree collimated beam 162 that is extracted into air. Also shown is the internally pointing far field beam cross section just inside output aperture 126 of tapered light guiding pipe 100, +/−3.77 degree collimated beam 380. Using the values of the ongoing example, as provided above, the output beam from this engine is directed along the system's X-axis 7. As will be shown further below, different facet angle combinations may yield a wide variety of output pointing directions other than the axial one.

Figure 12C:
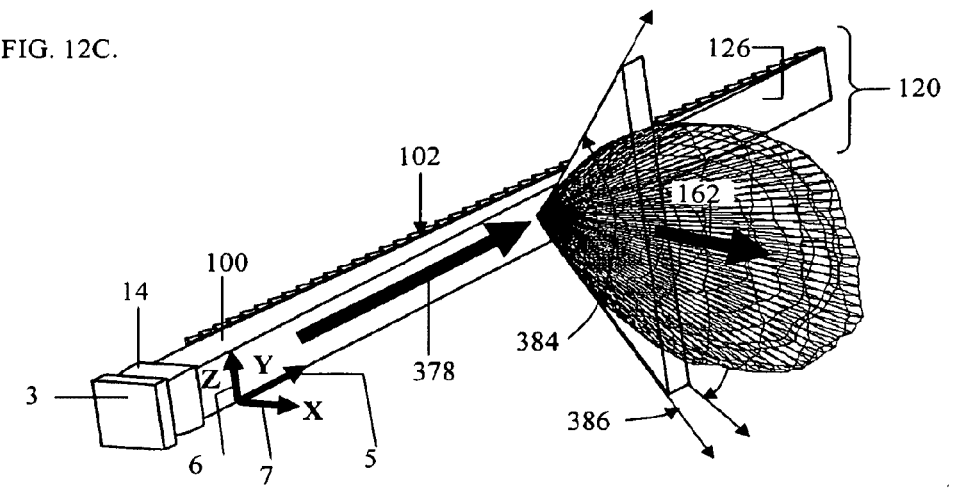
FIG. 12C is a perspective view showing the edge-emitting output aperture of the edge-emitting input engine described in FIG. 12A showing a perspective view of the output emission that is well-collimated along the edge of the engine and significantly wider angled in the orthogonal meridian.

FIG. 12C shows the information contained in FIG. 12B, but in a perspective view that shows the Z-meridian angular extent 384 of far field output beam 162, as well as the high degree of comparative Y-meridian angular collimation 386.

Figure 12D:
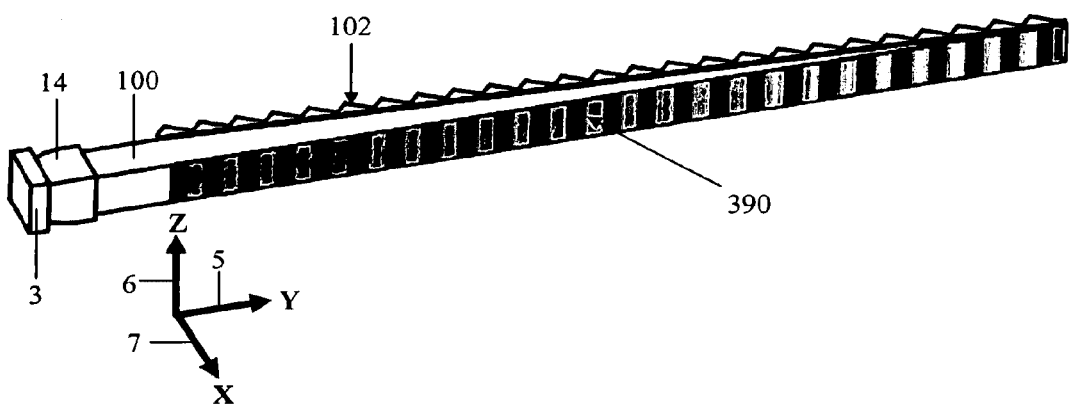
FIG. 12D provides yet another perspective view of the engine of FIG. 12A, this one containing a visualization of its coarse near-field spatial uniformity.
Figure 12E:
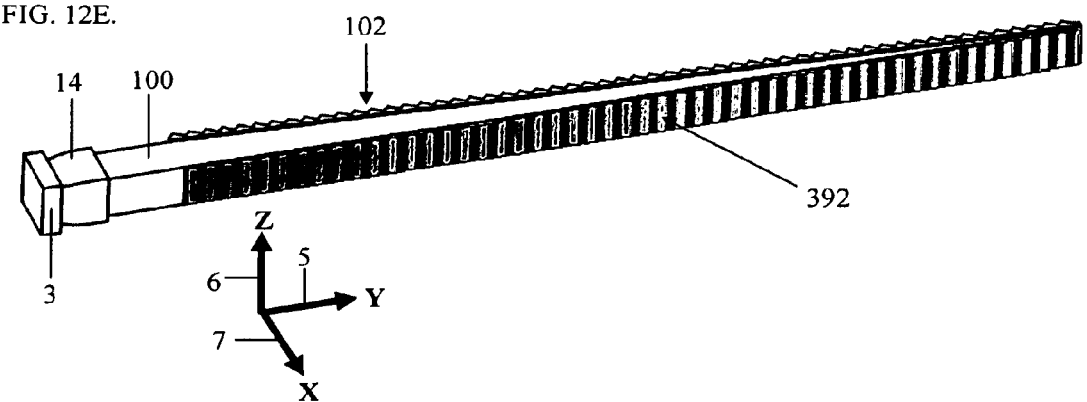
FIG. 12E illustrates still another perspective view of the engine of FIG. 12A containing a visualization of its improved near uniformity associated with its higher density of light extracting prism facets.

FIGS. 12D and 12E are both perspective views of input engine 120 that show the near field spatial uniformities 390 and 392 resulting from two different coarsenesses of prism period for prismatic light extraction film 102. The finer (smaller) the prism pitch, the finer is the resulting near field brightness non-uniformity.

Figure 12F:
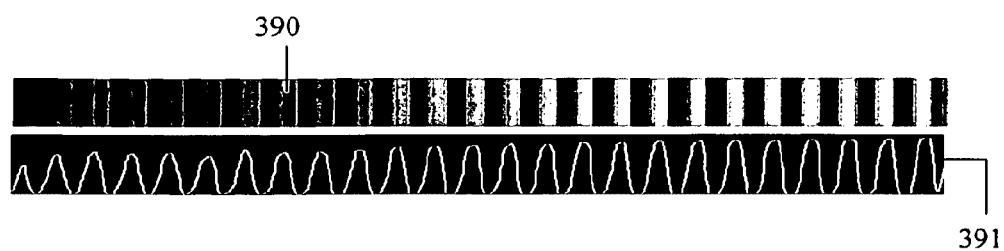
FIG. 12F represents the light distribution shown in FIG. 12D occurring on the output edge face of the input engine of FIG. 12A, when its light extracting prism facet spacing is relatively large.
Figure 12G:
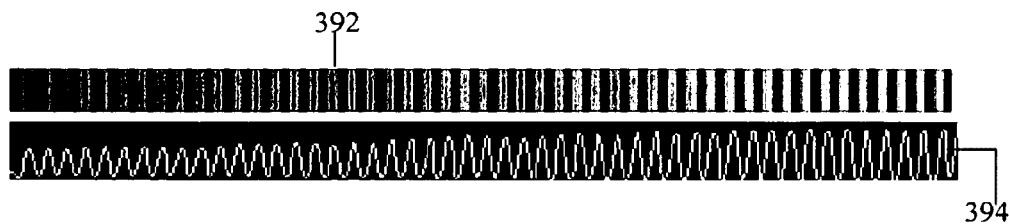
FIG. 12G illustrates the light distribution shown in FIG. 12F occurring on the output edge face of the input engine of FIG. 12A, when its light extracting prism facet spacing has been reduced, but is still visible to human vision.
Figure 12H:
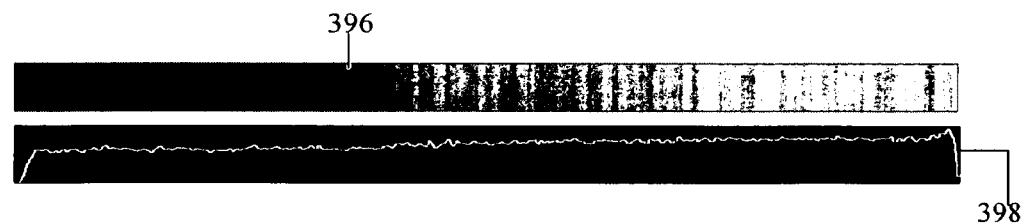
FIG. 12H illustrates the light distribution occurring on the output edge face of the input engine of FIG. 12A, when the spacing of its light extracting prism facets has been reduced, to dimensions not visible to human vision.

FIGS. 12F-12H explore this trend clearly from the distinct black and white bars of the 57 mm long edge uniformity pattern 390, to the smaller bars in pattern 392, and then to the practically indistinguishable bars of pattern 396, which represents 160 μm prism periods.

FIGS. 13A-13C emphasize the relationship, discussed preliminarily above, existent between the input angular distribution (400, 402 and 404) provided in the X-meridian by RAT reflector 14 coupling LED input light to input aperture 128 of the tapered light guiding pipe 100, and the near field spatial uniformity pattern resulting along the tapered pipe's 57 mm output length (410, 412, and 414). These results use the 160-μm period form of prismatic light extraction film 104, isolated as 406.

Input angular distributions 400, 402 and 404 in air prior to coupling across input aperture 128 are shown separately as FIGS. 14A, 14C and 14D, and are approximately +/−33.6 degrees, +/−52.6 degrees and +/−65.0 degrees respectively. The input angular extent that is shown in FIG. 14B is approximately +/−41 degrees. It is easy to see that the best near field uniformity is achieved in FIG. 13B, as a result of +/−52.6 degree input light distribution 402.

Figure 15:
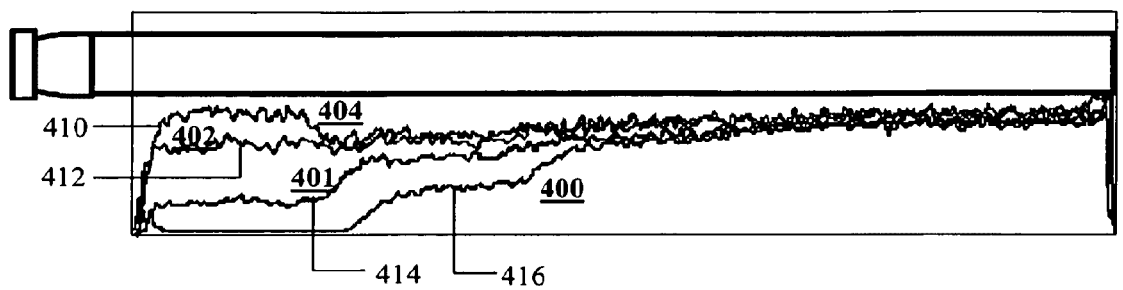
FIG. 15 provides four comparative graphics plots of the input engines near field spatial uniformity as a function of distance from the input aperture of the light guiding pipe involved, each corresponding to the input light distributions of FIGS. 14A-14D.

FIG. 15 is a graphical representation of four illustrative near field spatial uniformity profiles, 410, 412, 141, and 416 as a function of the four angular distributions, 400, 401, 402 and 404 shown in FIGS. 14A-14D. The angular distribution patterns responsible for the four illustrative near field spatial uniformity profiles are superimposed on FIG. 15 emboldened and underlined as 400, 401, 402, and 404.

Figure 16A:
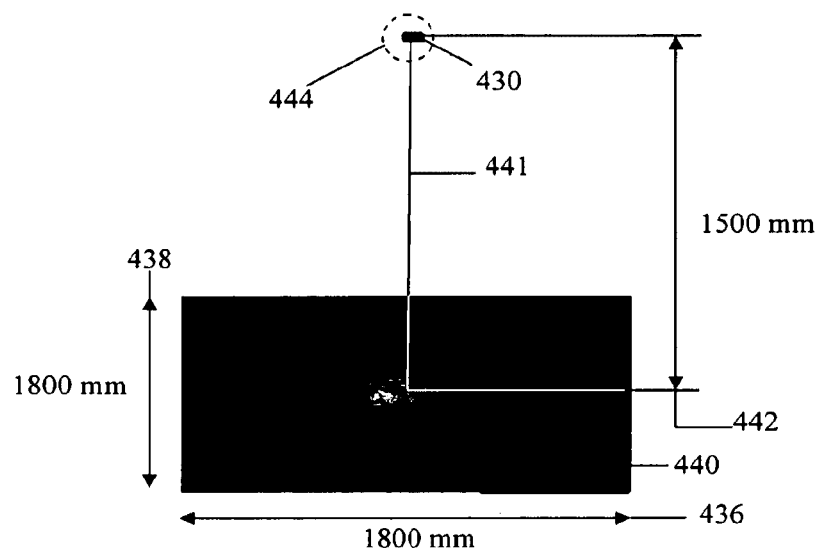
FIG. 16A provides a perspective view of the dimensional relations existent between a thin-profile single-emitter tapered light guiding illumination system, in its single-emitter form of FIG. 3A, elevated above a far field surface area to be illuminated.
Figure 16B:
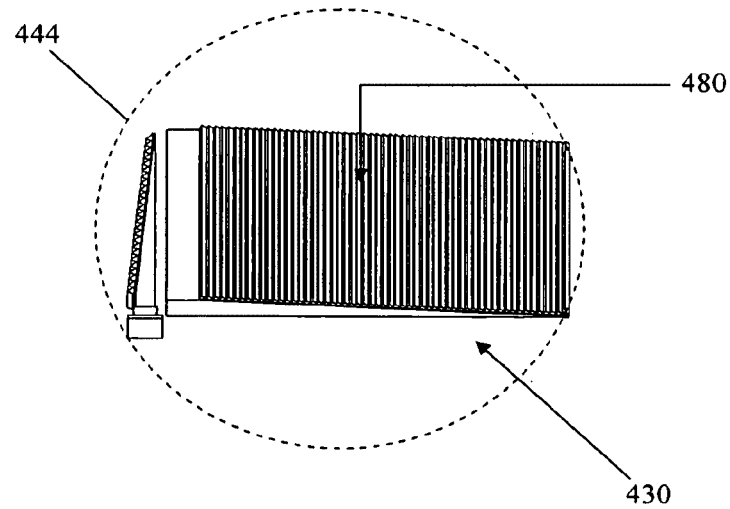
FIG. 16B provides a magnified perspective view of the tapered light guiding illumination system as is shown in FIG. 16A.

The second example, FIGS. 16A-16B, shows the conjunctive far field illumination patterns that result when tapered edge-emitting input engine 120 is combined with tapered light guiding plate 112, as shown earlier in FIGS. 3A-3E and FIG. 4, but with the finer pitch (period) prismatic light extraction film shown above. The distance between this thin-profile illumination system 1 and the 1800 mm×1800 mm far-field surface illuminated is 1500 mm.

FIG. 16A shows a perspective view of the geometry involved, including the computer simulated far field beam pattern that results. The illustrative 57 mm×57 mm×3 mm dimensions of illumination system 1, the complete system noted as 430 in this example, is rendered exactly to scale with respect of the 1800 mm×1800 mm length 436 and width 438 of the surface 440 to be illuminated from a height 442 that's 1500 mm away.

FIG. 16B provides magnified view 444 of the thin-profile doubly collimating illumination system noted at 430 in FIG. 16A.

Figure 17:
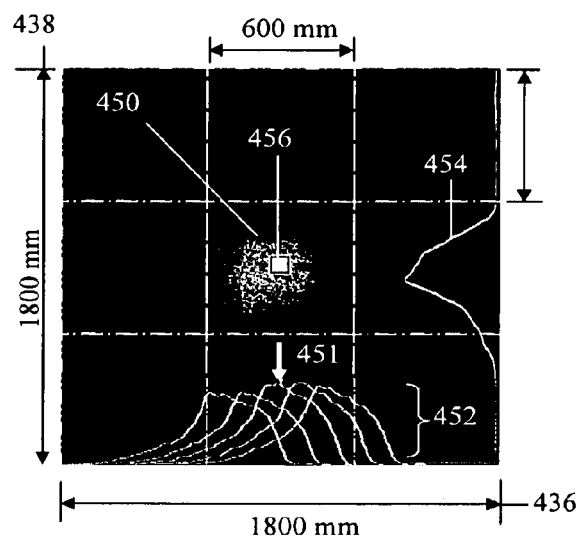
FIG. 17 is a graphic representation of the far field illumination pattern made on the surface illuminated in the perspective view of FIG. 16A.

FIG. 17 is a computer simulated 2D graphic representation of the far field illumination pattern 450 made on far field surface 440 as illuminated in the perspective view of FIG. 16A. The angular extent of beam pattern 450 in this example is approximately between +/−5 degrees and +/−6 degrees full width half maximum (FWHM) in both meridians shown (X meridian along length 436 and Y meridian along width 438. The line width profiles in each meridian are shown as the set 452 and the single profile 454. White arrow 451 denotes the X meridian line width profile corresponding to the pattern shown, 450. The other X meridian line width profiles correspond to additional simulation runs with different values of right hand facet angle 352 (see FIG. 11B). A slight change in the far field angular pointing direction results from slight changes in the nominally 60-degree apex angle, $\alpha_R$.

Figure 18:
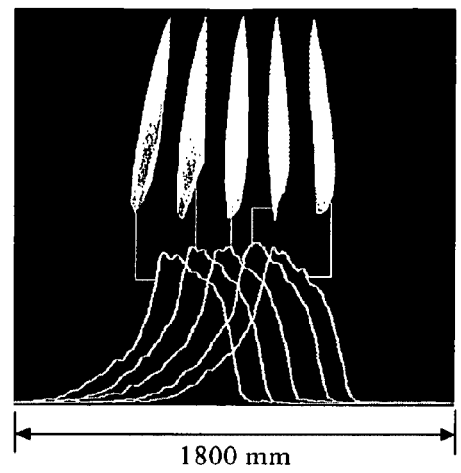
FIG. 18 is a graphic representation of a set of differently tilted far field beam cross-sections generated by the illumination system of FIG. 16A in response to five slightly different choices of facet angles within the prisms applied to the surface of its tapered light guiding plate.

FIG. 18 is a graphic representation of a set of differently tilted far field beam cross-sections generated by the illumination system of FIG. 16A in response to five slightly different choices of facet angles within the prisms applied to the surface of its tapered light guiding plate.

This facet-angle means of controlling the illumination system pointing direction is a very powerful feature of some implementations of this disclosure. Flat mounted illumination systems 430 of FIG. 16A can be deployed to provide various normal and off normal pointing illuminating beams and far field patterns with the degree of beam pointing direction set by choosing the extracting film's prismatic facet angles appropriately.

The spatial overlap of the five far field beams caused by a distribution of the same five choices of facet angles within a single 57 mm×57 mm light extraction film may be applied to tapered light guiding plate 112, resulting in uniformly widened far field beam profile. For smoother (less discrete) beam distributions, a greater number of facet-angle choices may be included.

Figure 19:
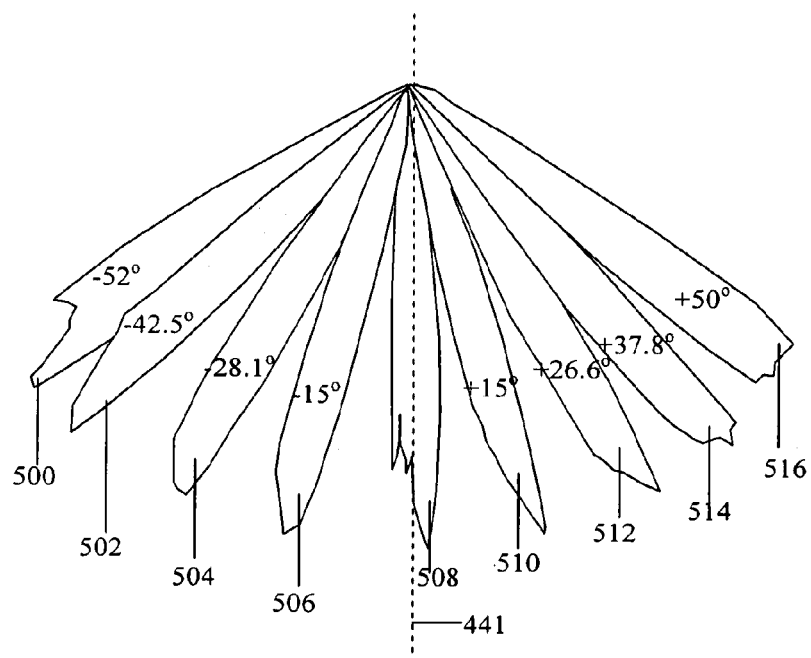
FIG. 19 is a graphic representation showing nine different far field beam cross-sections to demonstrate the +60 degree to −60 degree range of beam directions that are accessible by means of varying internal light redirecting prism angles within the thin-profile light guiding illumination system's plate.

FIG. 19 is a graphic representation showing nine different far field beam cross-sections to demonstrate the +60 degree to −60 degree range of beam directions that are accessible by means of varying internal light redirecting prism angles within the thin-profile light guiding illumination system's light distributing plate 112. FIG. 19 shows the power of this means of facet-angle tailored angle spreading for the nine widely different far field beam directions (500, 502, 504, 506, 508, 510, 512, 514, and 516) each created in the X meridian about system surface normal 441 by merely changing the right hand facet angles ($\beta_R$) in the 57 mm×57 mm light extraction film 480 of the present example as referenced by the arrangement shown in the perspective view of FIG. 16B.

Figure 20:
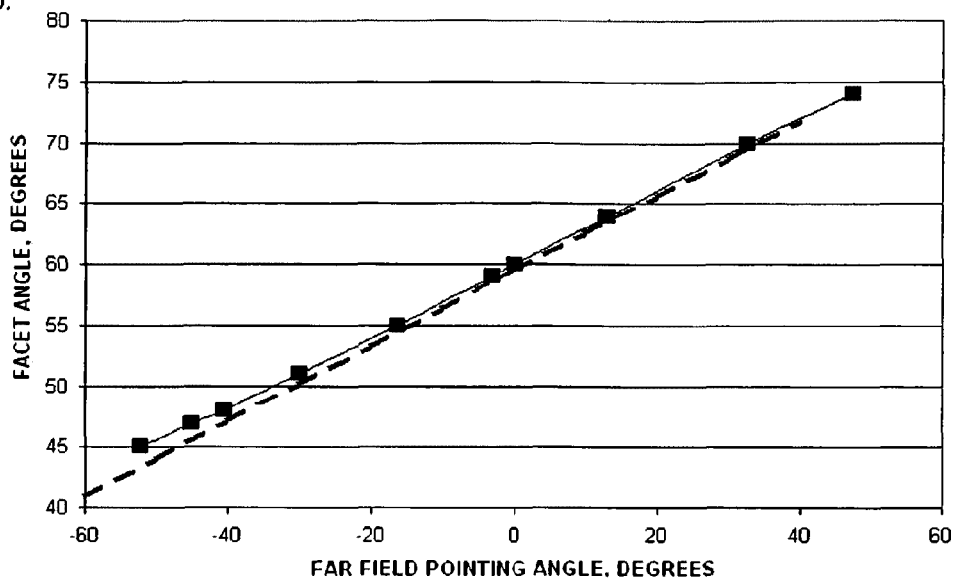
FIG. 20 contains a graph of prismatic facet angles within light extraction and turning film versus the far field beam-point angle it creates, for the thin-profile light guiding illumination system of FIG. 3A.

FIG. 20 contains a graph of prismatic facet angles within light extraction and turning film versus the far field beampoint angle it creates, for the thin-profile light guiding illumination system of FIG. 3A. While the functional relationship expressed in FIG. 20 is for the polycarbonate light guiding plate 112 of the present example, a similar functional relationship exists for other material combinations such the one associated with an acrylic light guiding plate 112. FIG. 20 reveals the underlying physical relationship existent between the right hand facet-angle, in degrees from apex normal 441 as discussed earlier, and the far field beam pointing angle measured from the normal to the system's output aperture plane. It is seen that by this method, beam pointing may be varied over the full angular range from −60 degrees to +60 degrees. The dotted line in FIG. 20 is a linear fit to the simulated data and has an intercept value, b=59.5 and a slope value, m=0.309, in the equation $\alpha_R = m\phi_P + b$, with $\phi_P$ being the pointing angle in degrees measured from the system's surface normal.

The far field illumination pattern's angular diversity is expanded within this disclosure in several other ways, applied separately or in combination. A first means of output angle control, mentioned earlier with regard to the implementation of FIG. 1D, involves use of one or two output light conditioning layers 52 and 54 in the form of a lenticular type of angle-spreading diffusers. The second means of output angle control involves use of collimated edge light sources whose degree of input collimation may be adjusted in a way that alters the angular extent of far field illumination (as described above as in FIGS. 2A-2C. The third means of output angle control involves the variation on the distribution of prism facet structures within the light extracting redirection layer as shown just above.

Of these approaches for widening the illumination system's angular extent beyond the nominally +/−5 degrees illustrated above, adding one or two angle-spreading diffuser sheets (for example, lenticular angle spreading sheets 52 and 54) across system's square or rectangular output aperture (e.g., as illustrated earlier in FIGS. 1D, 2D and 4) may be the most easily applied, in some implementations. As reasonably well-collimated light beams of the instant invention pass through any one or two-dimensional angle spreading diffusing sheet their beam profile is broadened by the angle spreading mechanism involved. Substituting one set of light spreading films for another makes the desired changes to the light engine's output light distribution.

Several prior art light diffusing sheets may be used in this manner, including bulk scattering-type diffusers, spherical lenticular type lens sheets, and various diffractive type light shaping diffuser sheets. Yet one particular variation of lighting spreading diffuser sheet, a lenticular lens sheet with parabolic lens elements, will be shown as having unique attributes.

Figure 21:
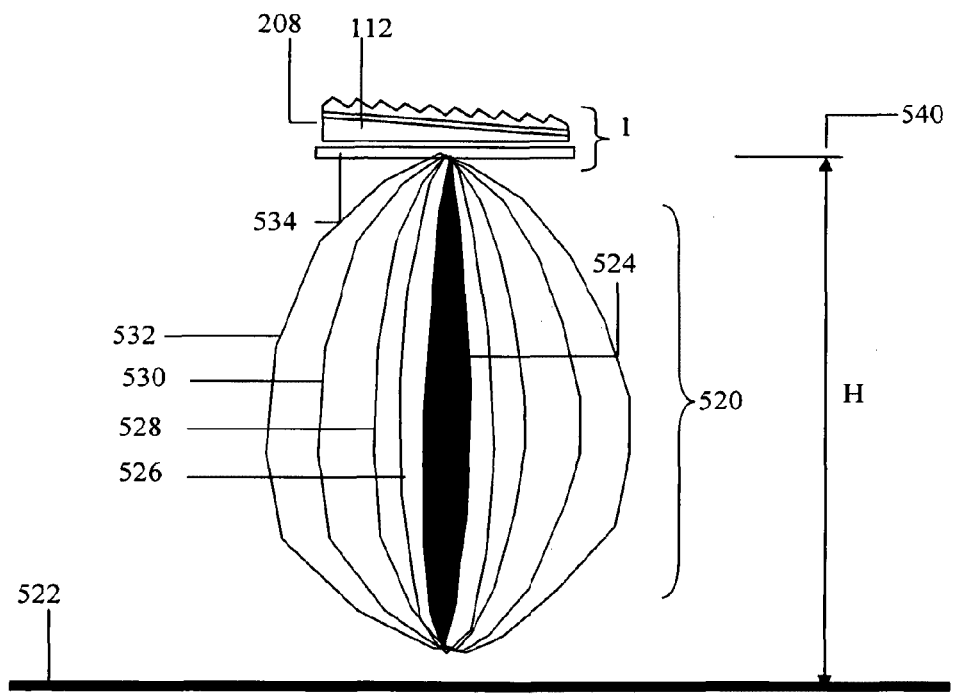
FIG. 21 is a side cross-section illustrating the computer ray-trace simulated far field angle spreading behavior of a prior art form of bulk scattering-type diffusing sheet applied in the output aperture of the thin-profile light guiding illumination system of FIG. 3A.

FIG. 21 is a side cross-section illustrating the computer ray-trace simulated far field angle spreading behavior of a prior art form of bulk scattering-type diffusing sheet applied in the output aperture of the thin-profile light guiding illumination system of FIG. 3A. FIG. 21 superimposes a family of typical diffusively broadened far field beam profiles 520, shown for visual convenience as being normalized with respect to their on axis intensity. Each profile actually distributes approximately the same number of output lumens to field surface 522. Silhouette 524 (shown in black) represents the far field beam profile of thin-profile illumination system 1 without any external light spreading diffusion. Far field beam profiles 526, 538, 530 and 532 are illustrative of the type of beam spreading that is possible, 526 (+/−10 degrees), 528 (+/−15 degrees), 530 (+/−25 degrees) and 532 (+/−30 degrees). In addition to widening the light emitting engine's angular extent, diffuser 534 also hides a wide variety of inhomogeneities in brightness uniformity caused by manufacturing defects or tolerance violations. A system height 540 of 1500 mm was taken for this comparison.

Luminit LLC of Torrance, Calif. (formerly Physical Optics Corporation) manufactures one line of diffractive light diffusing sheets made for this purpose. Their commercial light-shaping diffusers scatter collimated input light (by means of holographic diffraction) predominately in the forward direction, with a wide range of selectable angular cones (e.g., +/−10 degrees, +/−15 degrees, +/−20 degrees, +/−30 degrees and +/−40 degrees in circularly symmetric cones, and +/−5 degrees by +115 degrees, +/−5 degrees by +/−20 degrees, +/−5 degrees by +/−30 degrees, +/−17.5 degrees by +/−37.5 degrees, +/−17.5 degrees by +/−47.5 degrees and +/−30 degrees by +/−47.5 in asymmetric cones).

Other conventional diffuser sheets 534 that can be used in this same manner within this disclosure include, whether individually or in combination, adhesive resins or polymer sheets loaded with scattering powders such as for example titanium dioxide or fluorescent oxides, clear plates coated with opalescent or fluorescent material, and roughened sand blasted glass or plastic plates.

Another way of widening the nominally +/−5 degree angular extent output is by adding one or two spherical lenticular lens sheets across the light emitting engine's output aperture. Lenticular lens sheets are thin transparent elements formed by a linear array of nominally identical lenses. Lenticular lenses in the prior art are most commonly spherical ones, but have also been prismatic. For example, see the schematic cross-sectional side view in FIG. 22A and the perspective view of FIG. 22B.

Other prior art light spreading diffuser examples have included two-dimensional arrays of micro lenses and two-dimensional arrays of pyramidal cones. However, most of the associated prior art teaching has been concerned with using such micro lens sheets for near field light diffusing applications such as homogenizing and expanding the angular cone of the general back illumination provided by so-called backlights to the rear side of directly viewed liquid crystal display (LCD) screens, as in cell phone displays, laptop computer displays and desk top monitor displays, not large area lighting or illumination.

Figure 22A:
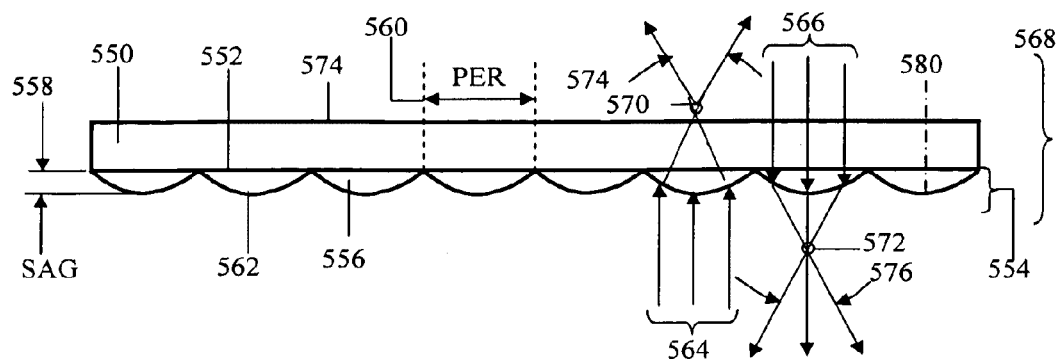
FIG. 22A represents a schematic cross-sectional side view of a prior art form of a cylindrical lens array film containing spherically shaped lens elements known as a lenticular diffuser.
Figure 22B:
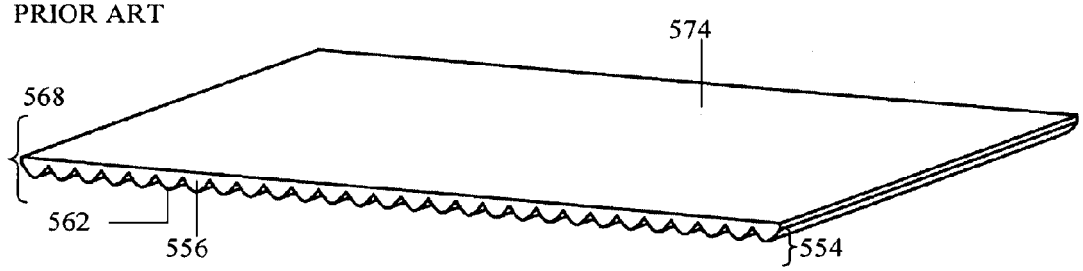
FIG. 22B provides a perspective view of the cross-sectional lenticular structure shown in FIG. 22A.
Figure 22C:
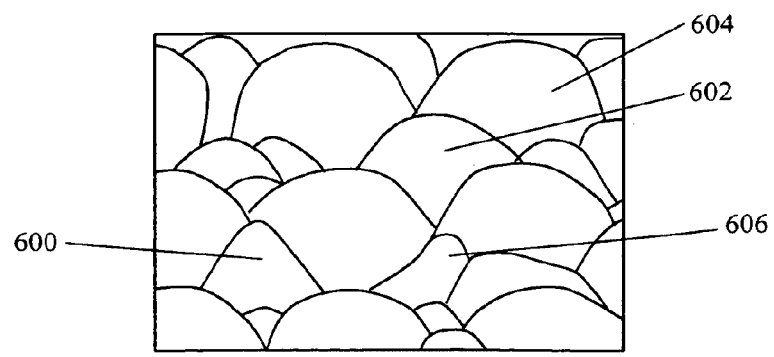
FIG. 22C provides a topographic schematic perspective view of the pebbled surface morphology of a prior art angle spreading diffuser film structure containing mathematically developed two-dimensional distributions of micro-sized lens elements.

One company, RPC Photonics of Rochester, N.Y. produces a line of Engineered Diffusers™ using various mathematically developed two-dimensional distributions of micro-sized lenslets of considerable shape diversity (see topographic schematic representation of a typical surface region for this type of diffuser in FIG. 22C). In this case, the clear optical lens sheet material has a pebbled morphology composed of nominally 1-100 μm, sized lens elements varying from the steeper-walled cone-like shapes 600, and spherical shapes 602, to even distorted spheroids 604 and 606. Tooling masters for such complex microstructures are laser written in photo-resist and then delineated photolithographically. Commercial RPC Photonics products are made by casting and curing, by compression molding and by injection molding. Such distributed lens light shaping diffuser products could be designed for effective use as an angle spreading diffuser sheet 534. The pebble-lens Engineered Diffuser™ approach provides convenient means to realize a much wider range of far field light distributions from the well-collimated light-emitting engine than with any other prior art lenticular type micro lens sheet approach.

While this method may be applied to some implementations of light emitting engines, a simple variation of the lenticular-type angle spreading lens sheet has been found that is less costly to fabricate and has an equally customizable light-spreading performance as compared with the more expensive and complicated approach of FIG. 22C.

Since the far field output beams from illumination systems 1 are intrinsically well collimated in two orthogonal meridians, less complicated lenticular sheets or films can be used and still achieve customizable results similar to these achievable by the approach of FIG. 22C. While some applications may benefit from the implied randomness of pitch in this approach, the simpler stripe-like lens elements of a lenticular sheet, with stripe axes made orthogonal to the plane or planes of collimation, may be quite sufficient, yet far cheaper, for the various best mode light distributions needed in down and wall lighting applications.

Manufacturing processes for lenticular lens sheets are readily available and offer lowest possible manufacturing costs. Lenticular sheets can be formed by low-cost plastic extrusion because of their longitudinally grooved nature. In addition, 3M's prolific brightness enhancing film products (e.g., BEF-T™) are lenticular structures of nominally 50 μm wide Porro prism grooves with internal prism angles being 45 degrees, 90 degrees and 45 degrees. Such prism sheets are routinely manufactured today by high volume roll-to-roll acrylate-based casting and curing processes in very high volumes with intrinsically low manufacturing cost (per square foot). The same materials are also readily manufactured by hot embossing. Manufacturing qualities of these effectively embossed microstructures are best when the lenticular grooves run down the length of the processed rolls of the continuously replicated material. Micro replication of features having complex shape variations running across the roll as well as down its length (for example, those of the pebble lenses of FIG. 22C) is feasible, but more difficult to produce on a reliable basis. Pebble-type lenses are incompatible with extrusion.

FIG. 22A represents a schematic cross-sectional side view of a prior art form of a cylindrical lens array film containing spherically shaped lens elements known as a lenticular diffuser or lenticular diffuser sheet. The traditional prior art lenticular diffuser sheet, illustrated by schematic cross-section in FIG. 22A, is an optically transparent film or sheet material 550 made of a polymer or glass composition whose plane surface 552 is formed to contain a micro structured array 554 of parallel lens cross-sections, each lens cross-section (sometimes called a lenticule or a lenticular) having generally identical cross-sectional shape 556, SAG 558 and a corresponding pitch or repeat-period PER 560. When the individual lens cross-sections 562 are concave or convex portions of a spherical (or aspheric) cylinder lens, the SAG and the PER are related by simple geometrical expression given in equations 4-7, equation 6 representing the SAG for classical spherical curvature, and equation 7 representing the SAG for a classical aspheric curvature (including all possible polynomial shapes, comprising ellipses, parabolas, hyperbolas, and conic sections). In most cases SD=PER/2, and specifies one half of the lens period PER, RLEN representing the associated radius of curvature, CC representing the conic constant (traditionally −1 for parabolic curve, 0 for a sphere, >1 for elliptical curve, and >1 for hyperbolic curves), and A1L, B1L, C1L and D1L representing the first through fourth aspheric coefficients.

$$KK1L = (SD)^2 / ABS(RLEN) \quad (4)$$

$$KK2L = ((SD)/ABS(RLEN))^2 \quad (5)$$

$$S00 = KK1L / [1 + SQRT(1 - (1 + CC(KK2L))] \quad (6)$$

$$SST = S00 + (A1L(SD^4)) + (B1L(SD^6)) + (C1L(SD^8)) + (D1L(SD^{10})) \quad (7)$$

FIG. 22A shows that ideal illustrative collimated rays 564 or 566 pass through diffuser sheet 568 parallel to surface normal 580 and are refracted by the optical power of the individual lens elements 556 in the array 554 through the corresponding focal points 570 or 572. These refracted light rays then diverge with increased angular extent 574 or 576 that, to only rough paraxial approximation, is a predictable function of the lens' characteristic focal length. Paraxial approximations are unreliable because they represent a very small fraction of the total volume of realistic rays involved, because total internal reflections may occur within the sheet, and because estimation of the collective skew ray transmissions through an asperhically shaped element is extremely challenging, and is generally only addressed by computer based ray tracing.

In addition to this, the prior art stands notably silent on the practical distinctions between far-field illuminating results associated with collimated rays first striking the plane surface 574 of lenticular lens sheet 568 and those first striking the curved lens surfaces 562. While both orientations produce useful results for some illumination applications, the results are in fact strikingly different in quite a few cases, not only in effective transmission efficiency, but also in the far-field light distributions themselves. And, these differences will be shown of significant value when practicing some of the implementations of this disclosure.

Commercially available lenticular lens sheets are primarily spherical in their lens cross-sections and made for use as near field 3D imaging lens overlays on top of suitable images (sized from inches on a side to many feet on a side). They also are used for decorative visual effects on a wide variety of packages. One typical manufacturer of lenticular sheets is PACUR of Oshkosh, Wis. Their lenticular sheet products are made by embossing polyester resin with 40-100 lens elements per inch, corresponding to lenticular widths of PER=0.251 mm to PER=0.635 mm, and lenticular radii of 0.251 mm to 0.371 mm. Lenticular sheets are also made of acrylic and polycarbonate. Other manufacturers include for example, Human Eyes Technologies Ltd. Jerusalem, Israel, Micro Lens Technology (Indian Trails, N.C.). In imaging applications of lenticular lens sheets, the planeside 574 of the lenticular sheet 568 is laminated onto the image layer and reflected light passes outwards through the lenses towards the viewer. The imaging (or viewing) properties of lenticular products cannot be used to predict the effects on far field illumination.

Reliable descriptions of a lenticular diffuser's actual angle widening effects on far field illumination, even those commercially available for other applications, are only possible by direct experiment and, as in the present example, by lab validated computer simulation. When properly implemented, computer simulations of a lenticular lens sheet's optical performance duplicate the results of reference laboratory experiments, and enable discovery of new and useful lenticular implementations.

As an example of a spherical lenticular prior art example that does agree with paraxial theory, we present the far field illumination performance of one of the lenticular products with used in commercial 3D imaging: PACUR's LENSTAR 3D. It has 100 lenticulars per inch, a lenticule radius 4527 of 0.0092" (0.23368 mm) and a lenticule width (PER) 4512 of 0.0101" (0.25654 mm). The associated SAG 558 is 0.3835 mm, and the implied focal length (572 in FIG. 22A) is 0.5842 mm. This focal length predicts a far field illumination cone by the thin lens paraxial approximation of +/−12 degrees (24 degrees full angle). PACUR reports a 30-degree field of view in imaging mode applications.

Figure 23A:
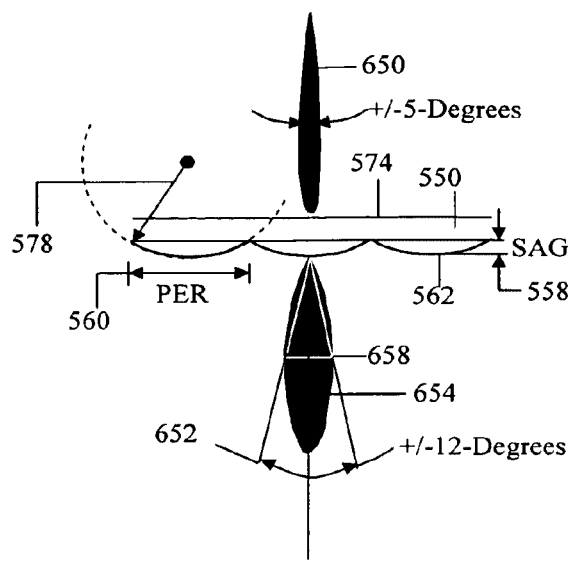
FIG. 23A shows the far field beam cross section that results when +/−5 degree×+/−5 degree collimated light as from the light emitting system of FIG. 3A is applied to the plane side of a lenticular lens sheet having spherically shaped lenticular elements.
Figure 23B:
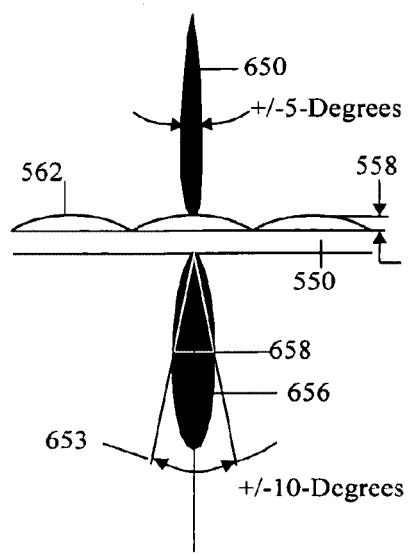
FIG. 23B shows the far field beam cross section that results when +/−5 degree×+/−5 degree collimated light as from the light emitting system of FIG. 3A is applied to the lens side of a lenticular lens sheet having spherically shaped lenticular elements.

FIG. 23A and FIG. 23B show the far field behavior for collimated +/−5-degree input light provided by doubly collimating light emitting system 1 as described earlier, or any other similarly collimated light source. FIG. 23A shows the result when the lenticulars point away from input light 650, and FIG. 23B shows in this case the very similar results when the lenticular vertices point towards input light 650. In both cases the effective transmission efficiencies are about 92% and the angular extents 652 (and 653) of the respective far field light distributions are +/−12 and +/−10 degrees respectively, FWHM as shown from the associated beam silhouettes 654 and 656. The far-field beam profile half width 658 is designated in each case.

Far-field illumination results with lenticular diffusers are only as predictable as this when the lenticular cross-sections are thin spherical shapes. When the lenticulars become aspheric and sag more deeply, the paraxial approximation breaks down, and simple performance predictions prove unsatisfactory. Computer simulations are required in such cases to obtain reliable performance predications.

The actual behavior of aspheric lenticulars within the context of this disclosure is demonstrated by the following set of examples comprising shallow parabolic lenticulars, deeper parabolic lenticulars, prism-like hyperbolic lenticulars, mixed lenticulars and crossed (orthogonal) lenticulars. These examples uncover unique differences in lenticular illumination characteristics, unanticipated by prior art. The examples show that effective practice of this disclosure can optionally depend on not only the selection of certain ranges of lenticular design parameters, but also on the lenticular orientation with respect to input light. The behavioral differences are quite striking, and lead to a subset of useful illumination profiles and patterns accessible within this disclosure.

Figure 24A:
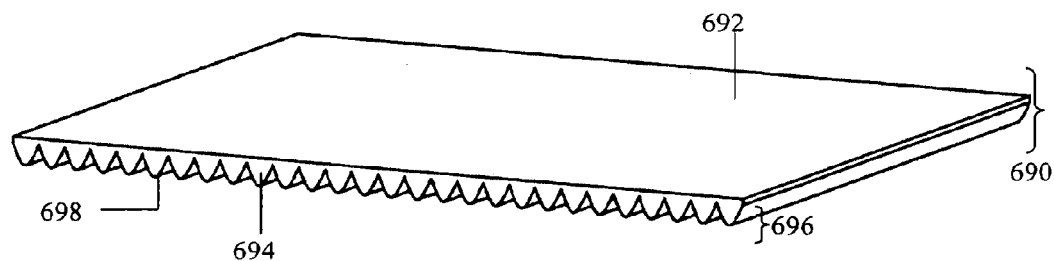
FIG. 24A provides perspective view of a lenticular lens sheet structure having parabollically shaped lenticular elements.
Figure 24B:
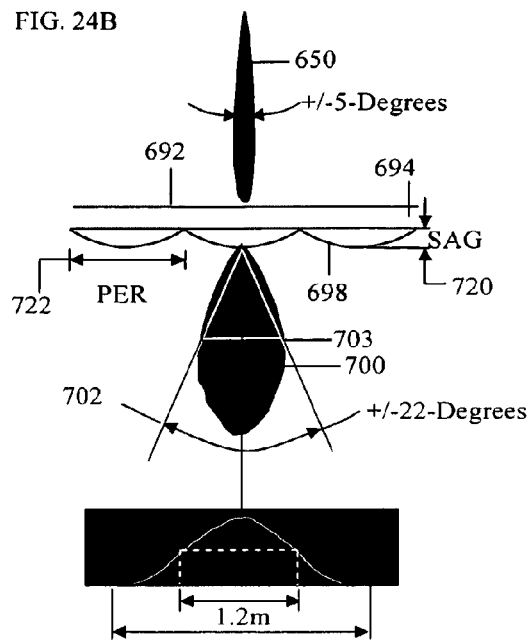
FIG. 24B shows the round-bottomed far field beam cross section that results when +/−5 degree×+/−5 degree collimated light as from the light emitting system of FIG. 3A is applied to the plane side of a lenticular lens sheet having parabollically shaped lenticular elements with a relatively shallow sag.

FIG. 24A provides perspective view of a typical parabolic (or hyperbolic) lenticular diffuser sheet 690 having parabollically-shaped lenticular elements. FIG. 24B shows the round-bottomed far field beam cross section that results when +/−5 degree×+/−5 degree collimated light as from the light emitting system of FIG. 3A is applied to the plane side of a lenticular lens sheet having parabollically shaped lenticular elements with a relatively shallow sag. The lenticular elements 696 in FIG. 24A differ from those in FIG. 23B in that they are non-spherical in cross-section and are somewhat more deeply sagged.

Figure 24C:
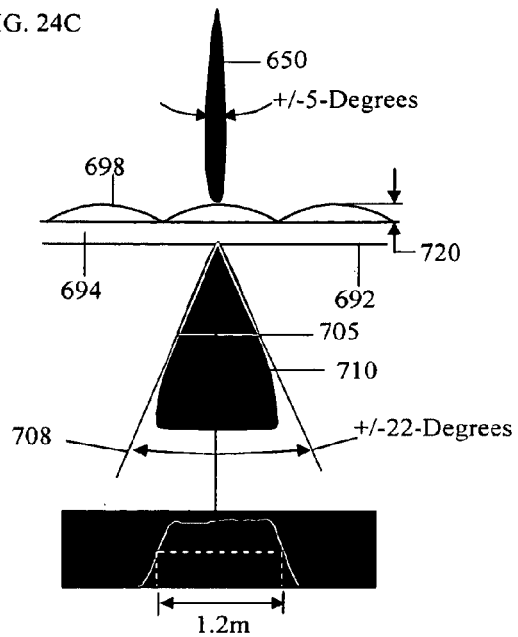
FIG. 24C shows the flat-bottomed far field beam cross section that results when +/−5 degree×+/−5 degree collimated light as from the light emitting system of FIG. 3A is applied to the lens side of a lenticular lens sheet having parabollically shaped lenticular elements with a relatively shallow sag.

FIG. 24C shows the flat-bottomed far field beam cross section that results when +/−5 degree×+/−5 degree collimated light as from the light emitting system of FIG. 3A is applied to the lens side of a lenticular lens sheet having parabollically shaped lenticular elements with a relatively shallow sag.

FIGS. 24B-24C illustrate the side elevations of a parabolic lenticular having peak to base ratio, SAG/PER=0.2. The parabolic focal point for this condition is about 0.62 mm. Far field representations of the input and output light are shown in silhouette above and below the lenticular sheet. When collimated input light 650 first strikes plane surface 692 of the lenticular sheet 690, the resulting far-field output beam silhouette 700 is symmetrical with angular extent 702 being+/−22 degrees FWHM as shown. The corresponding center-weighted illumination pattern on a surface 1.5 m below the lenticular sheet has a width at half peak 4534 of about 1.2 m, in close agreement with the silhouette's+/−22 degree angular extent 702. For this orientation, the processed illumination disperses outwards from its central peak over a 2.6 m wide area 1.5 m below, as shown. When collimated light 650 first strikes lenticular surface 698, however, a quite differently shaped beam profile (and field pattern) results. While the FWHM angular extent 708 remains about the same, the output beam silhouette 710 has a flat-bottomed triangular shape that produces a square (or rectangular) field distribution with sharp angular cutoff. The resulting flat-topped field profile deploys almost all output lumens within a 1.2 m wide region 1.5 m below. This sharp cut-off behavior bares strong resemblance to the light emitting engine implementations employing RAT reflectors by themselves, and is equally useful, in some implementations. In both orientations of this lenticular sheet 690, the effective transmission efficiency is about 92%.

Figure 24D:
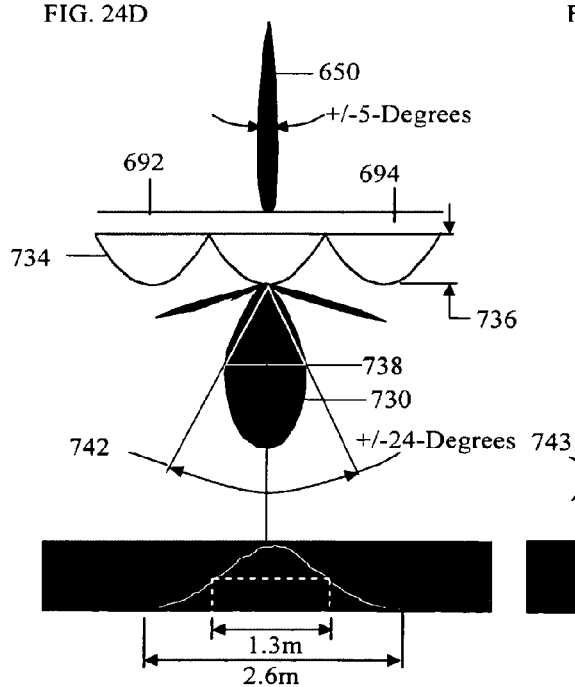
FIG. 24D shows the wider-angled round-bottomed far field beam cross section with satellite wings that results when +/−5 degree×+/−5 degree collimated light as from the light emitting system of FIG. 3A is applied to the plane side of a lenticular lens sheet having parabollically shaped lenticular elements with a moderately deep sag.

FIG. 24D shows the wider-angled round-bottomed far field beam cross section with satellite wings that results when +/−5 degree×+/−5 degree collimated light as from the light emitting system of FIG. 3A is applied to the plane side of a lenticular lens sheet having parabollically shaped lenticular elements with a moderately deep sag.

Figure 24E:
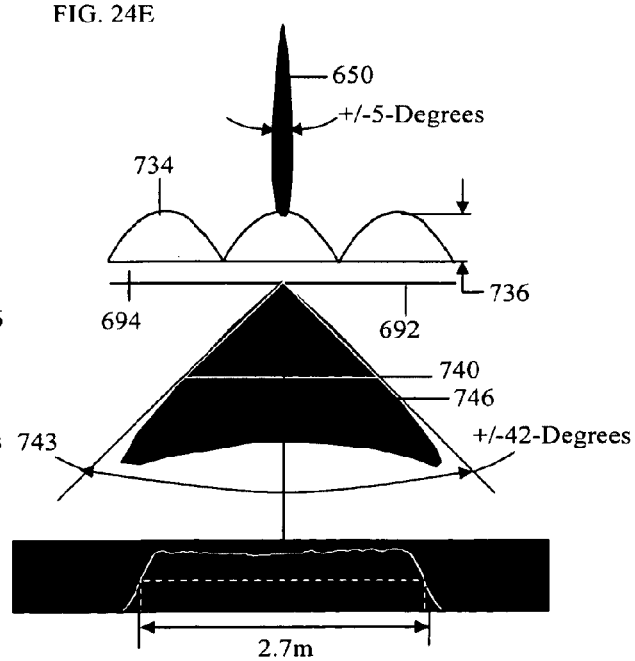
FIG. 24E shows the wide-angle flat-bottomed far field beam cross section that results when +/−5 degree×+/−5 degree collimated light as from the light emitting system of FIG. 3A is applied to the lens side of a lenticular lens sheet having parabollically shaped lenticular elements with a moderately deep sag.

FIG. 24E shows the wide-angle flat-bottomed far field beam cross section that results when +/−5 degree×+/−5 degree collimated light as from the light emitting system of FIG. 3A is applied to the lens side of a lenticular lens sheet having parabollically shaped lenticular elements with a moderately deep sag.

FIGS. 24D-24E illustrate the side elevations of a parabolic lenticular having a somewhat larger peak to base ratio, SAG/PER=0.5. The parabolic focal point for this case is about 0.25 mm. When collimated input light 650 first strikes plane surface 692 this time, the far-field beam silhouette 730 is practically unchanged in appearance, +/24 degrees FWHM as shown, but transmits only 51% of input light 650 in its main output lobe 730. A portion of the remaining 49% is output in the weak high angle rabbit ear pattern shown, with the remainder trapped inside the lenticular sheet by total internal reflections, some back reflected towards the input source. The illumination pattern that results is also about the same as that shown for the shallower parabolic lenticulars in FIG. 24B. No such breakdown occurs when collimated input light 650 first strikes the deeper parabolic lenticulars 734. The deeper parabolic lenses nearly double the far field angular extent from +/−22 degrees in FIG. 24C to +/−42 degrees in FIG. 24E. Moreover, the output beam silhouette retains the flat-bottomed triangular cross-section it showed in FIG. 24C along with the correspondingly sharp angular cutoff. And, despite the considerably widened angular extent, transmission efficiency is not compromised, remaining at 92%.

FIG. 24F shows the wide angle tri-modal far field beam cross section that results when +/−5 degree×+/−5 degree collimated light as illustratively from the light emitting system of FIG. 3A is applied to the plane side of a lenticular lens sheet having parabollically shaped lenticular elements with a very deep sag.

FIG. 24G shows the very wide angle far field beam cross section that results when +/−5 degree×+/−5 degree collimated light as illustratively from the light emitting system of FIG. 3A is applied to the lens side of a lenticular lens sheet having parabollically shaped lenticular elements with a very deep sag.

FIGS. 24F-24G illustrate the corresponding diffusive properties of an even deeper parabolic lenticular design, one having a peak to base ratio, SAG/PER=1.0, twice that of the example shown in FIGS. 24D-24E. The parabolic focal point for this ratio is about 0.125 mm. When input light 650 first strikes plane surface 692, the effects from total internal reflections shown in FIG. 24D continues, with transmission efficiency improving slightly from 51% to about 70%, but with the output beam's cross-section 806 becoming strongly tri-modal showing three distinct illumination peaks in the far field illumination pattern. Tri-modal light distributions may be used to spot light (or flood light) a central location and two satellites. The far field behavior shown with the lens up lenticular orientation in FIG. 24G demonstrates that sharply cutoff even illumination 820 is possible with this lenticular diffuser 808 out to 120 degrees full angle without compromise. Despite so wide an angular cone 813 where some refractive recapture of higher angle output light by neighboring parabolic lenticulars is inevitable, net transmission efficiency only drops to 86% and output light continues to show the characteristic flat-bottomed triangular beam silhouette 820 associated with such lens up lenticular orientation.

FIG. 25 is a graph summarizing the geometric relationship found to exist between total far field angle ϕ870, (measured FWHM 872) and the parabolic lenticular peak-to-base ratios (SAG/PER) between 0.1 and 1.0, for lenticular diffuser sheets 874 of all types. These results occur only for the special case when the lenticular curvatures are made to face towards collimated input light 650. The applicable peak-to-base ratio range, 876, is considered unique in that net transmission efficiency remains above 86% throughout, and is 90% or greater between SAG/PER=0.1 and SGA/PER=0.75. Far field beam cross-sections, represented by silhouettes in FIGS. 24C, 24E, and 24G, maintain their substantially flat-bottomed triangular characteristics throughout the entire range as well.

The functional relationship graphed in FIG. 25 is non-linear and not predicted mathematically by any simple theory. A reasonable linear approximation is provided approximately in equation 8 for lenticular diffuser sheets made of polymethyl methacrylate (acrylic), n=1.4935809, and in equation 9 for sheets made of polycarbonate, n=1.59. Lenticular diffuser sheets 874 used may be made of any suitable optically transparent polymeric (or glass) material, but those with refractive indices nearer to that of acrylic are better at suppressing transmission losses due to total internal reflection. Lenticular diffuser sheets 874 made of polycarbonate, n=1.59, are better at achieving wider far field angles at smaller peak-to-base ratio. One example of this is difference is that a parabolic lenticular made of acrylic achieves a far field angular extent of 120 degrees full angle with a peak-to-base ratio, SAG/PER of about 0.63, whereas its polycarbonate counterpart does so with a SAG/PER of about 0.525, which reduces the necessary parabolic aspect ratio by about 20%. The cost of this particular comparison is only about 2% in net transmission efficiency, which is probably inconsequential for most applications.

$$\phi=172.24[SAG/PER]^{0.38}-48.5 \quad (8)$$

$$\phi=203.15[SAG/PER]^{0.45}-46.66 \quad (9)$$

It is important to point out that hyperbolic lenticulars of any design do not develop the favorable flat-bottomed triangular far field beam cross-sections of FIGS. 24C, 24E, and 24G whether their lenticulars point towards the source of collimated input light 650, or away.

Figure 26:
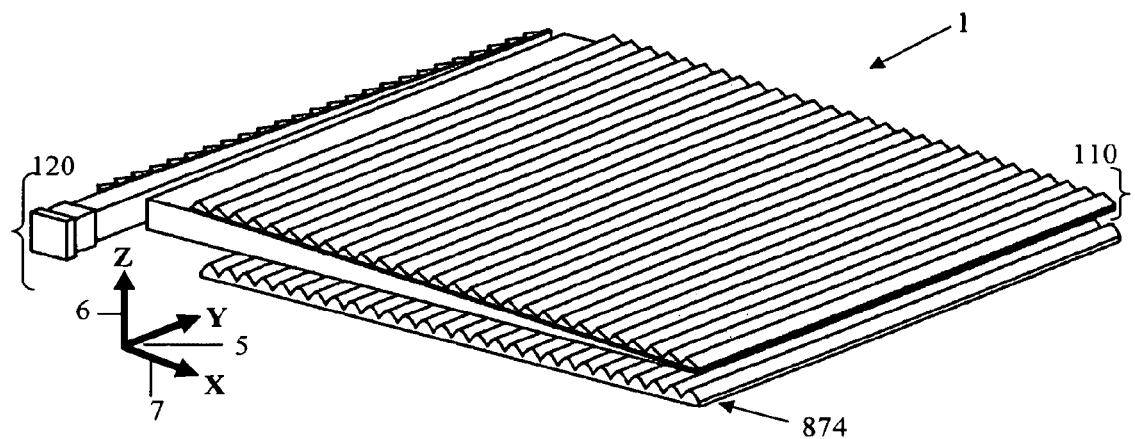
FIG. 26 is a perspective view of the collimated thin-profile illumination system as depicted in FIG. 3A now containing a single parabolic-type lenticular angle-spreading sheet below its output aperture, the lenticular axes running parallel to the illuminator's y-axis oriented input edge.

FIG. 26 shows a perspective view of thin profile illumination system 1 along with one sheet of lenticular angle spreading film 874 with its spreading power in the X meridian, its lenticules facing towards the incoming lighting from light guiding plate subsystem 110, as suggested by the findings of FIGS. 24C, 24E, 24G and the summarizing graph of FIG. 25.

Figure 27:
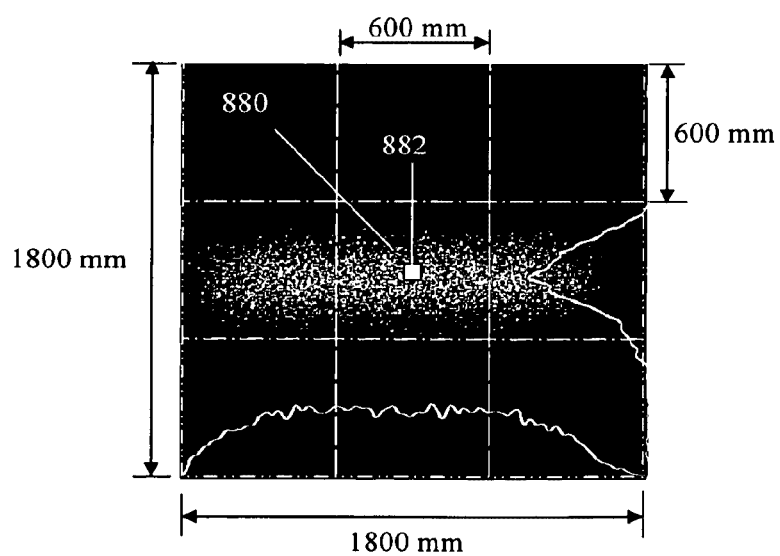
FIG. 27 contains a computer simulation of the rectangular far field beam pattern produced by the illumination system of FIG. 26 on an 1800 mm×1800 mm illumination surface from a height of 1500 mm; the rectangular pattern stretched asymmetrically +/−30-degree along the system's x-axis.

FIG. 27 shows one illustrative result with illumination system 1 of FIG. 26 placed at a 1500 mm height above the 1800 mm×1800 mm surface to be illuminated. The computer simulated field pattern 880 is spread about +/−30 degrees along x-axis 7, but remains about +/−5 degrees along y-axis 5. The center of the 57 mm×57 mm luminaire is shown as 882. This result has been validated experimentally using embossed lenticular film of the equivalent design.

Figure 28:
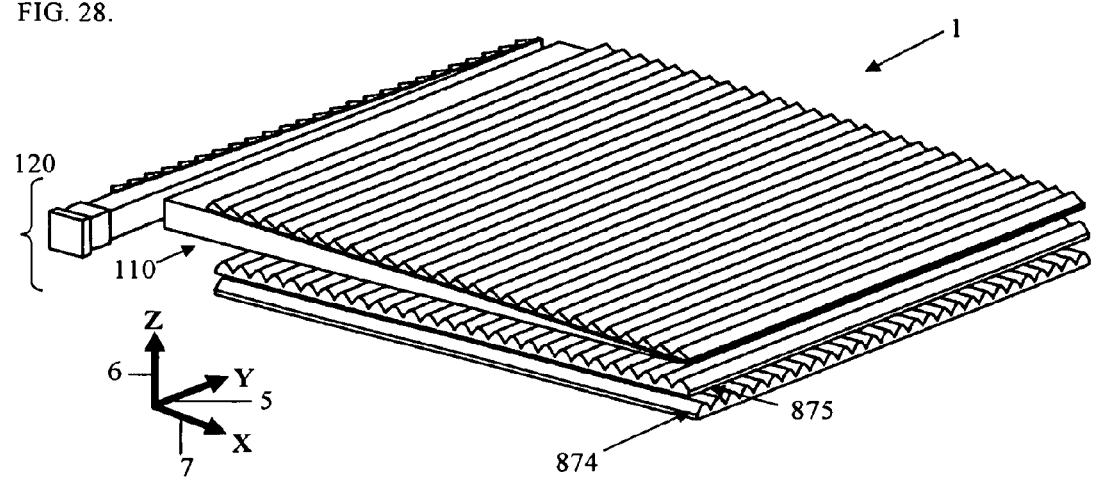
FIG. 28 shows a perspective view of the collimated thin-profile illumination system as depicted in FIG. 3A containing two orthogonally oriented parabolic-type lenticular angle-spreading sheets below its output aperture, the lenticular axis of one sheet running parallel to the illuminator's y-axis oriented input edge, and the lenticular axis of the other, running parallel to the illuminator's x-axis.

FIG. 28 shows a perspective view of thin profile illumination system 1 along with two orthogonally directed sheets of lenticular angle spreading film 874 (and 875 the same design as 874) with its spreading power in the X meridian and in the Y meridian, with both sheet's lenticules facing towards the incoming lighting from light guiding plate subsystem 110, as suggested by the findings of FIGS. 24C, 24E, 24G and the summarizing graph of FIG. 25.

Figure 29A:
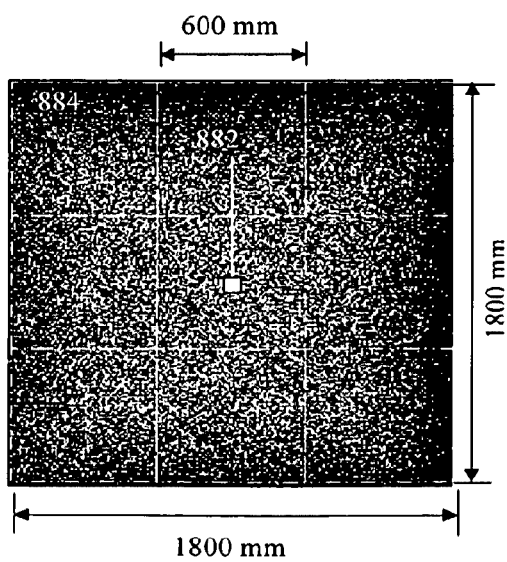
FIG. 29A contains a computer simulation of the square far field beam pattern produced by the illumination system of FIG. 28 on an 1800 mm×1800 mm illumination surface from a height of 1500 mm, the square pattern symmetrically disposed +/−30 degrees along both the system's x and y axes.
Figure 29B:
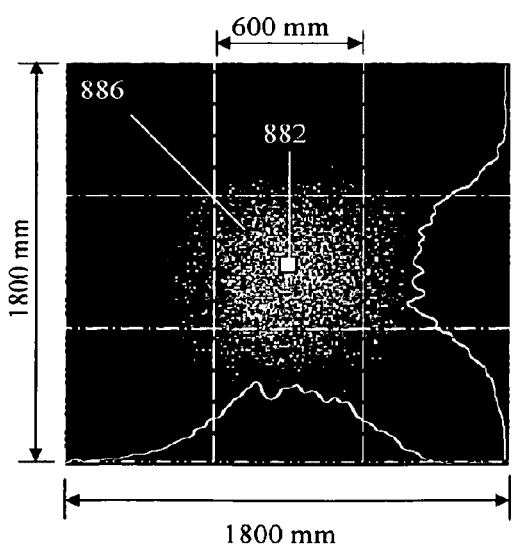
FIG. 29B contains a computer simulation of the tighter square far field beam pattern produced by the illumination system of FIG. 28 on an 1800 mm×1800 mm illumination surface from a height of 1500 mm, the tighter square pattern symmetrically disposed +/−15 degrees along both the system's x and y axes.

FIGS. 29A-29B shows two illustrative results with thin illumination system 1 of FIG. 28 placed at a 1500 mm height above the 1800 mm×1800 mm surface to be illuminated. The computer simulated field patterns 884 (FIG. 29A) and 886 (FIG. 29B) are spread about +/−30 degrees along both x-axis 7 and y-axis 5 in FIG. 29A, and about +/−15 degrees in FIG. 29B. The centers of the 57 mm×57 mm luminaire are shown as 882. These results have also been validated experimentally using embossed lenticular films of the equivalent design.

Total effective field efficiency for the single-emitter luminaire format, without use of angle-spreading film, is 0.74 (0.86 for tapered input bar and 0.86 for tapered plate) with antireflection coatings applied to the input aperture of both bar and plate. Field efficiency drops to 0.67 without input coatings (0.82 for tapered bar and 0.82 for tapered plate). Both types of spreading films (lenticular and diffractive) have net transmission efficiencies of >0.9, and thereby reduce the system's net field efficiencies by 0.9 for one spreading film and by 0.81 for two.

Field efficiency for the higher-output multi-emitter luminaire format as described in FIGS. 2A-2C can be better because the output efficiency of the array-type light engine is about 10%-15% higher than that of the tapered-bar light engine. Net field efficiency for the higher-output system is 0.82 without use of angle-spreading film (0.95 for the array-type light engine and 0.86 for the AR-coated tapered plate).

These field efficiencies are quite comparable to the total luminaire efficiencies provided by the traditional 2'×2' fluorescent troffers used commonly in commercial overhead lighting treatments, ranging between 0.5 and 0.7 depending on design.

A greater efficiency advantage is realized in task lighting applications where premium value can be placed on lumens delivered to a particular circular, square or rectangular field area.

While it may be of growing economic and environmental importance to achieve luminaries with higher energy efficiency, it is also important to enable meaningful reductions in size and weight. Smaller and thinner luminaries provide lighting architects with new design alternatives, but provide commercial builders and their lighting installers with potentially less labor-intensive (and less costly) installation requirements. Along these lines, it can be advantageous to configure such thinner luminaries or illumination devices to fit within the recesses of standard lighting fixtures or fixtures present in a given environment. For example, implementations of lighting or illumination devices described below can be light in weight and thin in profile while having radial or XY cross-sectional dimensions that are sized and shaped to fit within a lighting fixture configured to receive a standardized light device including, but not limited to, PAR64, PAR56, PAR46, PAR38, PAR36, PAR30, PAR20, and/or PAR16-sized lighting devices. That is to say, implementations of illumination devices described below can have maximum radial dimensions that are between 2 inches and 8 inches, for example, 2 inches, 2.5 inches, 3.75 inches, 4.5 inches, 5.75 inches, 7 inches, and/or 8 inches. In this way, implementations provided herein may provide higher efficiency lighting devices that may be installed or retrofit within existing lighting fixtures configured to receive differently configured illumination devices.

FIG. 30A provides an exploded top perspective view 890 of one example of a fully configured light engine implementation based on the functional illustrations of FIGS. 1A-1D, 3A-3E, 4, 16A-16B, 26, and 28. This fully configured light engine form is as also described in U.S. Provisional Patent Application Ser. No. 61/104,606. FIG. 30B provides a magnified perspective view 892 of the coupling region existent between a commercial LED emitter 904 that can be used, the corresponding square or rectangular RAT reflector 906 and tapered light guiding bar 100 with light extraction film 102, as was referenced in U.S. Provisional Patent Application Ser. No. 61/104,606. The core light generating sub-system 900 includes illustrative heat sink element 902, commercial 4-chip LED emitter 904 (OS-TAR™ model LE W E2A as made by Osram Opto Semiconductors), RAT reflector 906, 62 mm long tapered light guiding bar 110 with 57 mm long emitting length, facetted light extraction film 102, 57 mm×57 mm tapered light guiding plate 112, facetted light extraction film 114, illustrative plastic (or metal) chassis frame 908, illustrative attachment hardware 910-918, illustrative heat spreading circuit plate 920, and illustrative electronic circuit elements 921 (with some individual examples being 922-927). This illustrative fully configured light engine implementation as shown is pre-assembled for example by bolting LED emitter 904 to illustrative heat sink element 902 with two pan-head screws 910 (and 911, not labeled). Heat sink element 902 may have any configuration designed for effective heat extraction from LED emitter 904 (effective heat extraction improves LED performance), including, for example, spreading over the entire topside of the light engine much as the heat spreading circuit plate 920.

In some implementations, the RAT reflector 906, and light guiding pipe 100 with attached light extracting film 102, are installed into illustrative plastic (or metal) chassis frame 908, followed by the equivalent insertion of tapered light guiding plate 112 with its pre-attached light extraction film 114. This is followed by the attachment of illustrative heat sink element 902 with pre-attached LED emitter 904 to the edge of illustrative plastic (or metal) chassis frame using illustratively 4-40 screws 912 and 913. Core light generating sub-system 900 is then attached to illustrative heat spreading circuit plate 920 using illustrative hold down hardware 914 and illustrative 4-40 screw 915 as along guideline 932 plus using 4-40 screws 917-918 and pan-head screw 919. The illustrative heat spreading circuit plate may be brought into thermal contact with heat sink element 902, mechanically or via thermal coupling compound, in order to improve dissipation of heat from the LED and/or the other electronic components.

In some implementations, the illustrative heat spreading circuit plate may contain all necessary electronic and electrical interconnection elements, collectively represented as 921, that may be needed to bring either high voltage AC or low-voltage DC power directly to the positive and negative terminals of LED emitter 904, via associated voltage regulation components 927, local power controlling elements 935 and illustrative electrical connection straps 936-940 required to complete the associated circuit involved. In some implementations, the local power controlling elements 935 can be connected to the electrical interconnection elements by a flex connector 941, for example. In this example, electrical components 922-931 are shown illustratively as capacitor 922, microprocessor (integrated circuit or application specific integrated circuit) 923, resistor 924 (not labeled), capacitors 925-926, and voltage regulating MOSFET 927. Various combinations of electronics components like these (and others) may be used discretely or functionally integrated to perform a wide variety of effective power controlling functions for associated LED emitter 904, including digital processing and associated response to internal or external LED emitter power control signals.

FIG. 30A also shows symbolic representation of the light engine's internally interrelated light flows as described earlier in FIG. 1C. The input aperture of RAT reflector 906 collects substantially all output light 950 generated by LED-emitter 904. RAT reflector 906 is shown in this example as a hollow reflector element placed just beyond the illustrative emitter's individual LED chips (but may be replaced by other optical elements including one or more of a lens, a group of lenses, a refractive reflector, a light pipe section, a hologram, a diffractive film, a reflective polarizer film, and a fluorescent resin whose combination transmits substantially all light 950 into light guiding bar 100 with desired control of the associated beam angles).

Furthermore, the LED emitter 904 (and LED emitter 1000 in FIGS. 31A-31C and 33A-33C) may have a different form of light-emitting surface than that shown in the present examples (these light emitting surfaces being the flat exterior surface of a clear encapsulant surrounding the LED chips). The LED emitter's light emitting surface may also be as a raised phosphor coating, a raised clear encapsulant, a raised phosphor or clear encapsulant with micro-structured exterior surface, or a raised phosphor or a clear encapsulant with macro-structured surface. Some of these equally applicable variations may allow for more total emitted light and/or more effective light collection by RAT reflector 906 and/or its optical equivalent. Such a different light-emitting surface may also be a secondary optic coupled to the clear encapsulent around the LED chips, such as, for example, a dome lens like those commonly provided by Osram Opto Semiconductor and many other similar LED manufacturers.

In the manner shown, a substantial percentage of output light 950 from LED emitter 904 can enter the input face of light pipe 100 as light beam 952, and while inside undergoes total internal reflections within it. A high percentage of light 952 is thereby turned 90 degrees by deliberately planned interactions with micro-facetted light extraction film 102 as explained earlier (e.g., FIGS. 11A, 12B and 12C) and is thereby extracted uniformly from the pipe along its associated 57 mm effective running length and ejected into air as beam 954, which in turn enters the input face of light guiding plate 112. These light flows are shown in more detail in the magnified view of FIG. 30B. Light-flow 954 undergoes further total internal reflections within the light guiding plate 112 and its attached facetted light extraction film 114 and is turned 90 degrees and extracted into air evenly across the plate's substantially square light distributing aperture 956 (shown more clearly in the perspective view of FIG. 30C), thereby providing the light engine's practical source of directional output illumination 960.

FIG. 30B is a magnified perspective view of only dotted region 892 as referenced in FIG. 30A, providing a more detailed view of the key elements of the engine's three-part LED light emitter sub-system (comprising illustrative 4-chip LED emitter 904, etendue-preserving RAT reflector 906, and tapered light guiding pipe 100 with facetted light extraction film 102). In this LED emitter example, there are four 1 mm square chips 964 arranged in a 2.1 mm×2.1 mm pattern (inside larger dielectrically-filled cavity frame 963 surrounding the chips). Other LED chip and encapsulating dielectric combinations are as easily accommodated by variations on this design, including Osram's six-chip OSTAR™ versions. Positive and negative electrodes 966 and 967 are connected to the appropriate electronic delivery members provided within illustrative heat spreading circuit plate 920 and its illustrative electronic circuit elements 921, as in FIG. 30A. The commercial OSTAR™ ceramic package 970 is hexagonally shaped as supplied by Osram and has been trimmed to parallel surfaces 971 and 972 without electrical interference to better comply with thinness requirements of some implementations described herein. Mounting holes 975 are used for heat sink attachment, as shown above via low-profile pan-head mounting screws 910-911 (neither shown). This illustrative RAT reflector element 906 has three sequential sections, each having square (or rectangular) cross-section. First section 974, placed only for this illustration only, slightly beyond the four OSTAR™ chips. In some implementations, this section is placed as near to the four OSTAR™ chips as mechanically permitted. Section 974 is etendue-preserving, in that can be designed to collect substantially all light emitted by the group of chips at its input opening, with each of its four reflective sidewalls shaped as dictated by the Sine Law's input and output boundary conditions, to convert the collected angular distribution by internal reflections in each meridian, optimizing the entry angles to the input face (not shown) of tapered light guiding pipe 100. Second section 976 and third section 978 surround the illustrative 3 mm×3 mm entrance face of light guiding pipe 100 as one way of facilitating mechanical mounting and alignment. Neither section 976 or 978 has any optical function or special shape, and may be eliminated.

In some implementations, tapered light guiding pipe 100 is injection molded. All mold tool surfaces in this case are provided a featureless polished mirror finish. Molding materials are of optical grade, for example, optical grade PMMA (i.e., polymethyl methacrylate) or highest available optical grade polycarbonate obtainable to reduce its intrinsically higher bulk absorption loss. In addition, the corners and edges of light guiding pipe 100 can be made as sharply as possible to minimize scattering loss from of by roughened edges, to minimize unwanted TIR failure, and to maximize the edge-to-edge optical coupling with the facetted light extraction film 114. Facetted light extraction film 114 is attached, as described earlier, to the back surface of pipe 100 by means of a thin clear optical coupling medium 320 as in FIG. 11A (e.g., pressure sensitive adhesive). In these implementations, the light extracting facets 322 are made of either PMMA or polycarbonate (e.g., by embossing, casting, or molding) and then coated with high reflectivity enhanced silver (or aluminum) 340.

Figure 30C:
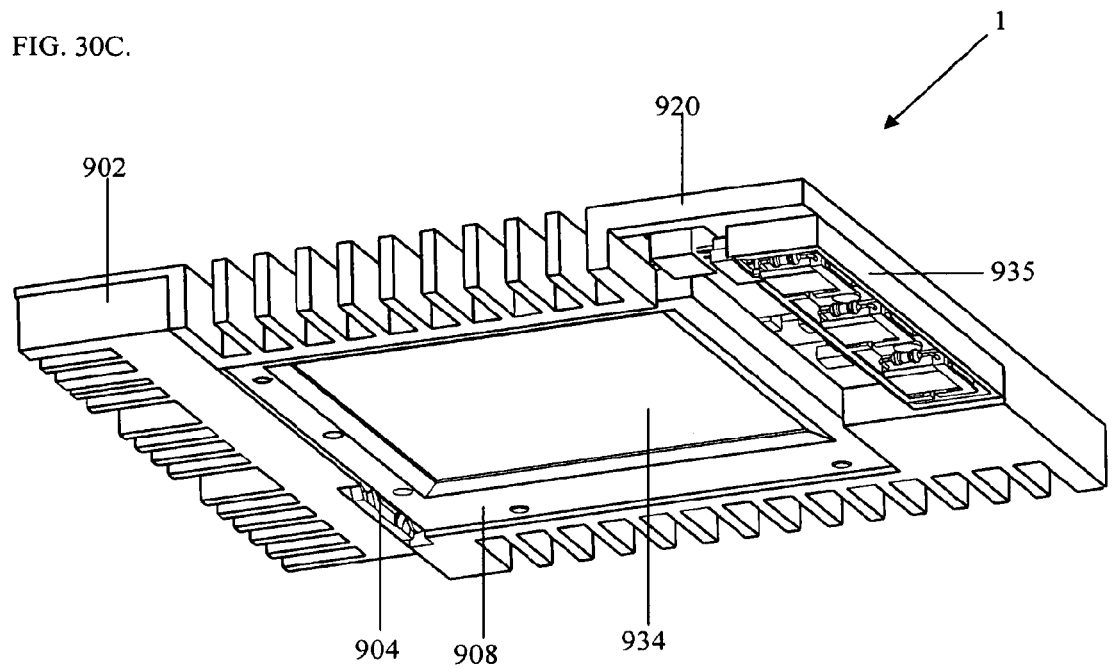
FIG. 30C provides a perspective view of the completely assembled form of the fully-configured light engine implementation shown in exploded detail in FIG. 30A.

FIG. 30C provides a perspective view of the completely assembled form of the fully-configured light engine implementation shown in exploded detail 890 in FIG. 30A, as described in U.S. Provisional Patent Application Ser. No. 61/104,606, which is hereby incorporated by reference in its entirety. Total engine thickness is determined primarily by the thickness of illustrative heat sink element 902 and any additional net thickness associated with the attachment of illustrative heat spreading circuit plate 920. The collimated down light illumination that develops projects evenly from substantially the entire square (or rectangular) output aperture area 934.

Figure 30D:
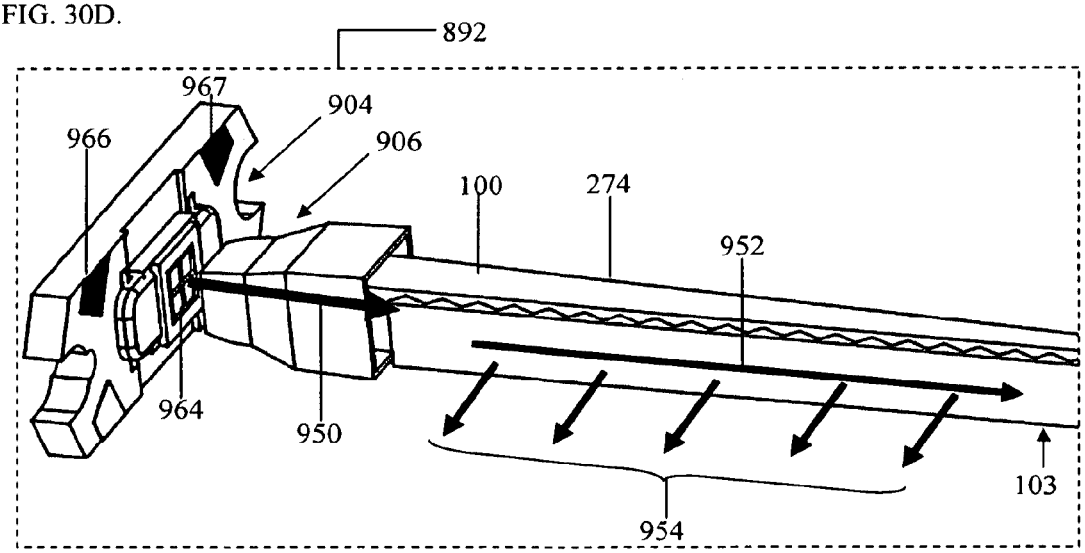
FIG. 30D illustrates a related geometric form in which metal coated facetted layer may be replaced by a plane reflector and a separate facetted light extraction element placed just beyond the front face of pipe (facet vertices facing towards the pipe surface).

FIG. 30D illustrates a related geometric form in which metal coated facetted layer 102 may be replaced by plane reflector 274 (as in FIG. 8A) and a separate facetted light extraction element 103, similar to 104 but having uncoated facets of an appropriately different geometrical design placed just beyond the front face of pipe 100 (facet vertices facing towards the pipe surface). Light flow 952 internal to pipe 100, in either form, induces sequential leakages from the pipe itself that on interaction with the facets 322 (see FIG. 11A-11C) of facetted light extracting film used cause sequentially distributed output light 954 in a direction generally perpendicular to the front face of pipe 100.

Figure 30E:
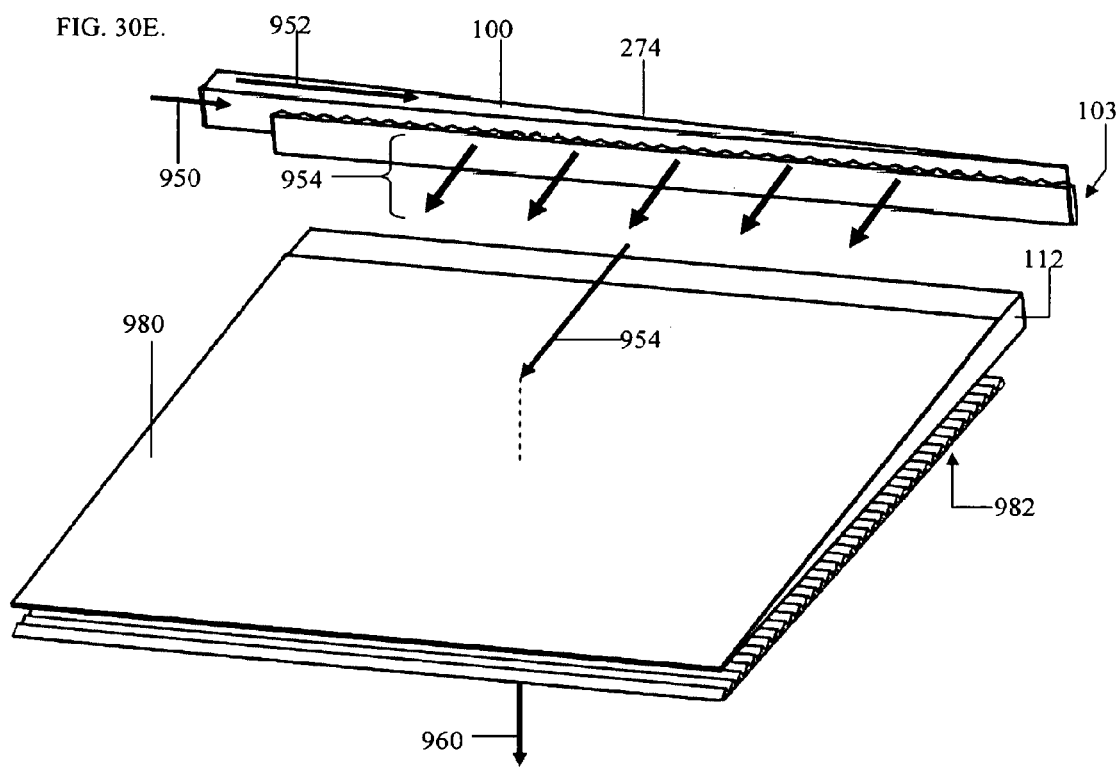
FIG. 30E is a perspective view showing the variation of FIG. 30D applied to light guiding plate.

FIG. 30E is a perspective view showing the variation of FIG. 30D applied to light guiding plate 112. In this implementation, a reflective layer 980 (similar to 274) is placed on (or slightly separated from) the topside surface of light guiding plate 112, and a separate facetted light extraction sheet 982 (similar to 103) is placed just beyond the plate's opposing side light output surface. This illustration is provided to show a variation of the alternative light guiding, extracting and collimating form as illustrated in FIG. 30D applied to a light guiding plate 112 rather than to a light guiding pipe 100. Edge emitted output light beams 954 from the illustrative collimating light bar system example composed of light guiding pipe 100 and light extraction film 103 (or, as another example, from the collimating light bar system illustrated previously in 30B composed of light guiding pipe 100 and light extraction film 114) enter the input edge of light guiding plate 112 and as a result of passage through the plate system, are extracted across nearly the entire output aperture as collimated output beam 960.

In this implementation, collimated light (not shown) extracts obliquely from tapered plate 112 and mirror 980 into the thin air region below plate 980 and above facetted film 982 (as was shown previously in FIGS. 7A-7C), and then redirected or turned as output down light (output beam 960) by passage through facetted film 982, which may serve as a light-turning film.

Another practical form as illustrated in FIG. 30D arises when facetted film 982 is removed. This results in a beam of light emanating from the full surface of plate 112 having the obliquely-angled pointing direction shown in FIG. 7C, a useful behavior that will be described further below.

The implementation illustrated in FIGS. 30A-30D (as in FIGS. 1A-1D, 3A-3E, 4, 16A-16B, 26, and 28) employs a tapered light guiding pipe 100 to collimate LED input light in one meridian while presenting that light as input across the edge of a tapered light guiding plate deployed to preserve the collimation of the light received, while collimating that same light in its orthogonal meridian, so as to produce completely collimated output illumination.

Another implementation was introduced in FIGS. 2A-2E, replacing the tapered light guiding pipe 100 and its associated elements with a reflector-based alternative. A linear array of one or more etendue preserving RAT reflectors was arranged to collimate LED input light in one meridian while presenting that light as input across the edge of a tapered light guiding plate 112 arranged to preserve the reflector-based collimation of the light received, while collimating that same light in its orthogonal meridian, so as to produce completely collimated output illumination.

FIGS. 31A-31D illustrate a practical implementation of this form of this disclosure.

Figure 31A:
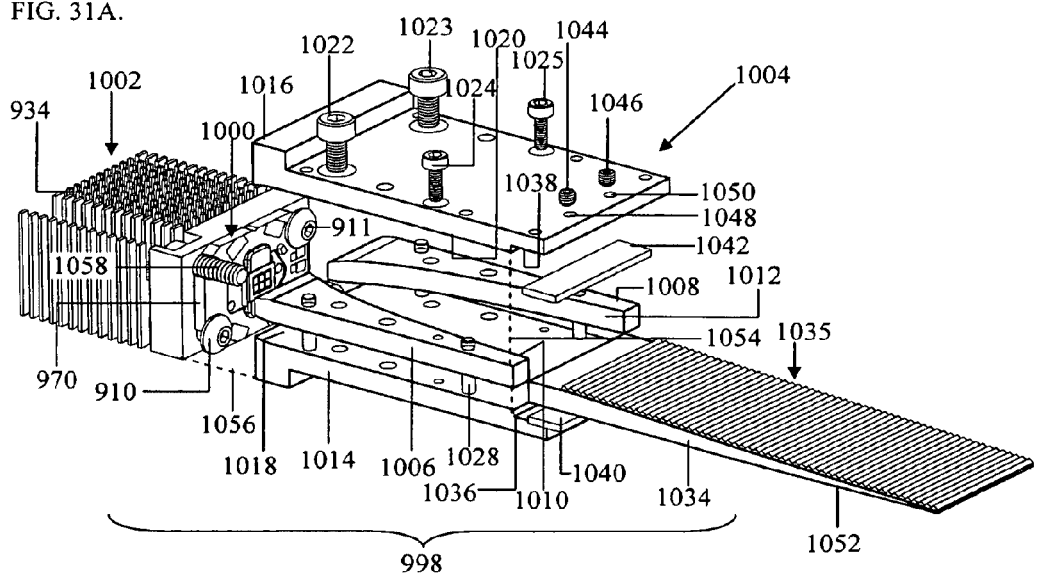
FIG. 31A provides an exploded top perspective view of a practical single emitter segment following FIG. 2A for a fully configured multi-emitter light engine based on a reflector-based means of input to a light guiding plate.

FIG. 31A provides an exploded top perspective view of a practical single emitter segment 998 (following the general example of FIG. 2A) for a fully configured multi-emitter light engine implementation based on this etendue-preserving RAT reflector-based means of providing partially collimated light input to a light guiding plate. This implementation example illustrates use of a six-chip LED emitter 1000 manufactured by Osram Opto Semiconductor, e.g., Model LE CW E3A, mounted on the same hexagonal substrate as shown above, and trimmed to rectangular shape in a manner also shown above. LED emitter 1000 in this an ensuing examples may have a different form of light emitting surface than that shown as was discussed above. Such a different light-emitting surface may be a secondary optic coupled to the clear encapsulent around the LED chips, such as, for example, a dome lens like those commonly provided by OSRAM and many other LED manufacturers. Other variations, too numerous to illustrate, only compliment practice.

In this illustration, LED emitter 1000 is attached to illustrative heat sink element 1002 using two pan-head screws 910 and 911 as was shown in FIG. 30A. The form of heat sink 1002 indicates one possible arrangement of heat extraction fins 1003 for efficient heat removal by ambient air passing between them. Heat sink 1002 may have any configuration designed for effective heat extraction from LED emitter 1000 (effective heat extraction improves LED performance), including, for example, spreading over the entire topside of the light engine and/or along its sides. Wide-angle light emission from the 6 chips of LED emitter 1000 is collected by the similarly sized input aperture of etendue-preserving RAT reflector 1004. RAT reflector 1004 is constructed for this example in four principal parts, two identical side elements 1006 and 1008, whose highly polished sidewall mirrors 1010 and 1012 form two opposing sides of the associated reflector's four-sided rectangular cross-section, and two identical top and bottom elements 1014 and 1016 whose highly-polished reflecting surfaces 1018 and 1020 complete the four-sided reflector's rectangular cross-section. The four constituent parts of RAT reflector 1004 may be attached by adhesive, may be welded or soldered together, and as illustrated, may be bolted together using recessed screws 1022-1025 which pass through through-holes made in top part 1016 and are received by correspondingly tapped holes in bottom part 1014. Four higher precision dowel pins 1028-1031 (within only 1028 labeled) may be used for additional accuracy in reflector alignment. Then, one way of assuring proper alignment between the rectangular output aperture of RAT reflector 1004 and the input edge of tapered light guiding plate 1034 is illustrated in this example by adding reflector overhang portions 1036 and 1038, reflective gripping plates 1040 and 1042, and set screws 1044 and 1046 which apply sufficient holding pressure to gripping plate 1042 (and thereby to light guiding plate 1034) via tapped holes 1048 and 1050.

In the illustration of FIG. 31A, light guiding plate 1034 is similar to plate 112, but in this case is made narrower in width than in length to match the output aperture size of RAT reflector 1004, enabling efficient light power transfer from RAT reflector to light guiding plate and further enabling uniform plate light extraction (compared to, say, a much wider plate which would have dark bands outside the cone of light emitted by the RAT in XY meridian). The example of FIG. 31A shows facetted light extraction film 1035 (similar in design to 114) affixed in the manner described to the topside of light guiding plate 1034. Alternately, as shown in the optional extracting form of FIG. 30D, facetted film 1035 may be replaced by a plane mirror, and another facetted film similar to 982 may be placed instead just below output plane 1052 of light guiding plate 1034. It is understood that light extraction film 1035 may be considered a light turning film, as the light may actually be extracted from the tapered light guiding plate 1034 due to the tapered shape of the light guide and the relationship of the indices of refraction of the light guide and any surrounding material.

Figure 31B:
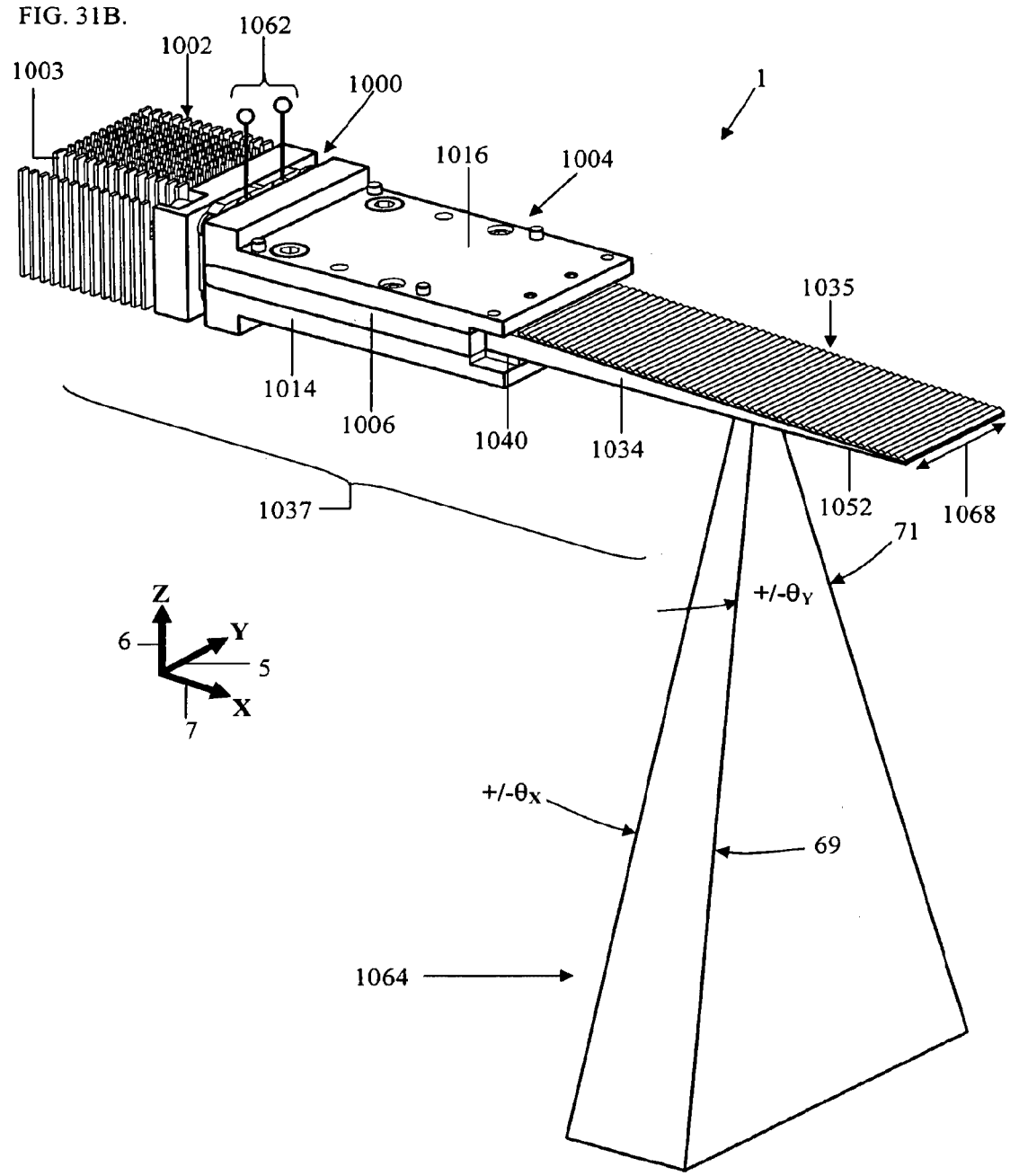
FIG. 31B is a perspective view of the assembled version of the practical light engine example shown exploded in FIG. 31A.

FIG. 31B is a perspective view of the assembled version of the practical light engine example shown exploded in FIG. 31A. Illustrative RAT reflector 1004 assembles along dotted lines 1054 and 1056. Heat sink 1002 with attached LED emitter 1000 bolts to RAT reflector 1004 using, for example, two diagonally deployed attachment screws 1058 (shown) and 1060 (hidden). When positive and negative DC supply voltage is applied to positive and negative terminal wires 1062 of LED emitter 1000, light flows as has been explained from LED emitter 1000 through RAT reflector 1004, into and through light guiding plate 1034, and becomes doubly collimated output beam 1064 (similar to doubly collimated far-field illumination 10 as shown in FIG. 2A) with angular extent in the ZX-meridian, $+/-\theta_X$, being set by the collimating characteristics of tapered light guiding plate 1034 (and any ancillary characteristics imparted by facetted light extraction film 1035), and with angular extent in the ZY-meridian, $+/-\theta_Y$, being set by the collimating characteristics of etendue-preserving RAT reflector 1004 established by its output aperture in the XY plane.

In the present example, RAT reflector 1004 is matched to dimensions of the six-chip Osram OSTAR™ Model LE CW E3A with an input aperture that is approximately 2.2 mm along Z-axis 6 and 3.6 mm along Y-axis 5. It is the 3.6 mm input aperture dimension that drives the RAT reflector's output aperture width that is further matched to width 1068 of light guiding plate 1034 being used to achieve an angular extent 71 that can be desired.

Figure 31C:
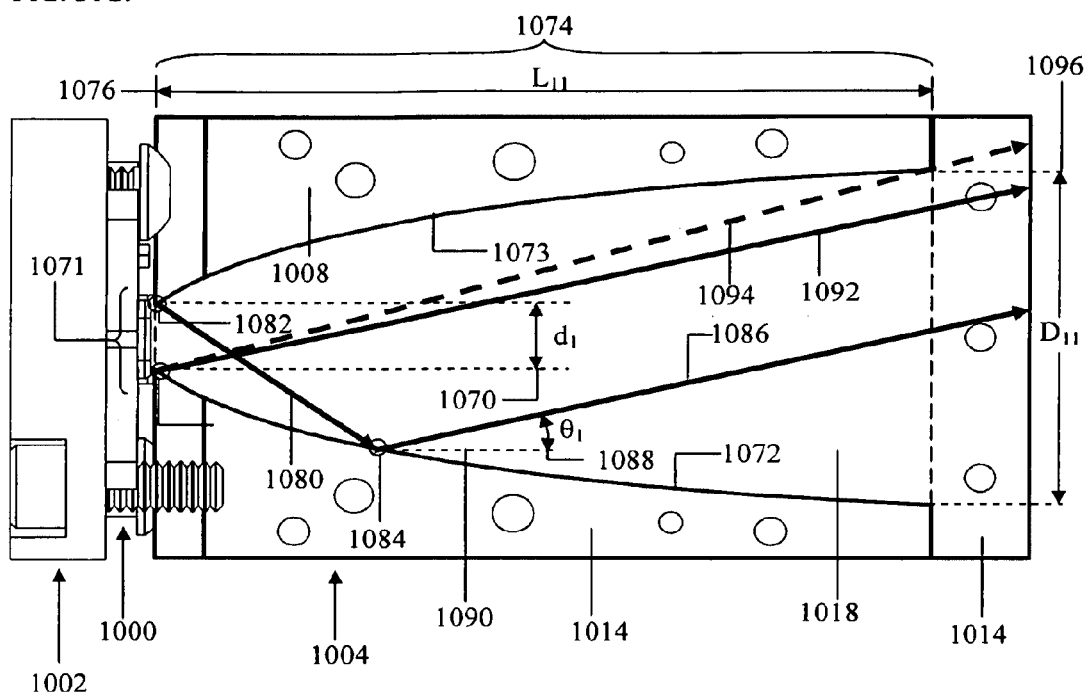
FIG. 31C is a schematic top view providing a clearer description of the underlying geometrical relationships that are involved in matching LED emitter, reflector and light guiding plate.

FIG. 31C is a schematic top view providing a clearer description of the underlying geometrical relationships that are involved in matching LED emitter 1000, RAT reflector 1004 and light guiding plate 1034. FIG. 31C is schematic a top cross-sectional view of the angle transforming reflector arrangement shown in FIGS. 31A-31B along with LED emitter 1000. In this illustration, the reflector's top element 1016 (and its illustrative attachment screws 1022-1025) are removed to reveal the underlying geometrical relationships controlled by equations 10 and 11 (in terms of the reflector element's input aperture width 1070, $d_1$, its ideal output aperture width $D_1$, its ideal length $L_1$, and its ideal output angular extent $+/-\theta_1$), with $+/-\theta_0$ being the effective angular extent of the group of LED six chips 1071 in illustrative LED emitter 1000 (effectively +/−90 degrees). Similar relationships, equations 12 and 13, govern the orthogonal meridian's ideal geometry $d_2$, $D_2$, $L_2$, and $\theta_2$, but are not illustrated graphically. In this case, interchangeably, $\theta_1$ represents $\theta_X$ and $\theta_2$ represents $\theta_Y$. The symmetrically disposed reflector curves 1072 and 1073 of reflector section 1074 as shown in FIG. 31C are ideal in that their curvatures satisfy the boundary conditions given by equations 10 and 11 at every point. Section 1074 only shows the initial length 1076, $L_{11}$, of an otherwise ideal reflector length $L_1$. Initial length $L_1$, is expressed as f $L_1$, where f is a fractional design value typically greater than 0.5 (e.g., f=0.62 in the present illustrative example).

$$d_1 \sin\theta_0 = D_1 \sin\theta_1 \quad (10)$$

$$L_1 = 0.5(d_1+D_1)/\tan\theta_1 \quad (11)$$

$$d_2 \sin\theta_0 = D_2 \sin\theta_2 \quad (12)$$

$$L_2 = 0.5(d_2+D_2)/\tan\theta_2 \quad (13)$$

$\theta_0$ represents the width of the beam, here the beam being emitted by the LED light emitter, measured from the normal. For an LED, it is reasonable to assume a Lambertian distribution and hence it is usually a reasonable approximation in practice that $\theta_0$ can be assumed to be about 90 degrees, especially with the LED light emitters used in accordance with some implementations of this disclosure. The ideal reflector lengths L1 and L2 can be expressed more compactly, in this case, as in equations 14 and 15.

$$L_1 = 0.5 d_1 (\sin\theta_1+1)/(\sin\theta_1 \tan\theta_1) \quad (14)$$

$$L_2 = 0.5 d_2 (\sin\theta_2+1)/(\sin\theta_2 \tan\theta_2) \quad (15)$$

A unique design attribute of this particular reflector fed light engine example is that the angular extents of the output illumination 1064 in each output meridian (+/−$\theta_1$ and +/−$\theta_2$) are completely independent of each other. The reflector geometry developed in FIG. 31C (i.e., meridian 1) determines the engine's output angular extent (+/−$\theta_1$ or +/−$\theta_{11}$) in only that one meridian. The engine's output angular extent in the other meridian (+/−$\theta_2$) is determined substantially by the (independent) behavior of the tapered light guide plate 1034 and associated facetted film sheet 1035).

Matched to the illustrative six-chip Osram LED emitter 1000, $d_1$=3.6 mm, as set by the size, spacing and surrounding cavity of Osram's three inline 1 mm LED chips, +/−$\theta_1$=+/−10.5 degrees by design choice, so $D_1$ (from equation 10) becomes in this case approximately 3.6/Sin (10.5)=19.75 mm, and the ideal reflector length $L_1$ associated with these conditions becomes (from equation 11) 0.5 (3.6+19.75)/Tan(10.5)=63.0 mm. The choice of 10.5 degrees is only illustrative. There are many other practical design angles to choose from, most efficiently those wider than 10.5 degrees.

Optical ray trace simulations (using the commercial ray tracing software product ASAP™ Advanced System Analysis Program, versions 2006 and 2008, produced by Breault Research Organization of Tucson, Ariz.) have shown that ideal reflectors of this type (governed the Sine Law equations 10-13) can be trimmed back in length from their ideal, $L_1$, without incurring a significant penalty in their effective angle transforming efficiency (or output beam quality). As noted above, the light distributing engine arrangements disclosed herein can deploy angle spreading output aperture films (e.g., the parabolic lenticular lens sheets shown FIGS. 24A-24G and 25). Further, the tolerance to such deviations in design from ideal dimensions becomes less critical when used in the present light distributing engine arrangement. Accordingly, in the present example, the etendue-preserving RAT reflector unit (1004) has been reduced in length by 38%, to a total length, $L_{11}$ (as shown in FIG. 31C), of 39 mm. As a result, illustrative LED input ray 1080 is reflected from reflector curve 1073 at point 1082 and strikes symmetrically disposed reflector curve 1072 at point 1084, reflecting ideally outwards without an additional reflection as output ray 1086 of LED light emitter 1000, making the intended output angle $\theta_1$ (1088) with reflector axis line 1090.

The small deviation from ideality tolerated with the reflector length reduction as shown in the example of FIG. 31C is indicated by the trajectory differences between LED input ray segments 1092 and 1094 (dotted). The trajectory of ray 1092 (angle $\theta_1$ with axis line 1088) is determined by the ideal (etendue preserving) reflector length $L_1$ and the ideal output aperture width $D_1$, such that by geometry, Tan $\theta_1 = (D_1/2)/L_1$, set by choice to 10.5 degrees in the present example. The deviant trajectory of ray 1094, however, is set by the reduced length 1074, $L_{11}$, and the proportionally reduced output aperture width 1096, $D_{11}$, as Tan $\theta_{11}=(D_{11}/2)/L_{11}$. In this example, $L_{11}$=39 mm and $D_{11}$=18.75 mm, so $\theta_{11}$=13.5 degrees, which is only a small degree of angular deviation, and inconsequential to most commercial lighting applications. Furthermore, it is only a fraction of the total rays that fall into this deviation, whereas a significant fraction remain within the ideal output range +/.+−.$\theta_1$.

Whenever more sharply cut-off angular illumination is required using this form of thin-profile reflector fed light engine (as in FIGS. 2A-2E, and 31A-31B), a lesser degree of reflector truncation may be employed.

The RAT reflector's design in the orthogonal meridian (+/−$\theta_2$) is made to deliberately pre-condition light for optimum coupling efficiency to the corresponding entrance face of light guide plate 1034 and its associated facetted light extraction film 1035). Example angular conditions for this purpose as described earlier (e.g., FIGS. 3D-3E, and 5A-5C), are +/−50 degrees and +/−55 degrees (in air) for a 3 mm thick tapered light guiding plate 112 having a 3-degree taper-angle made of highest optical grade transparent plastic or glass.

Figure 32A:
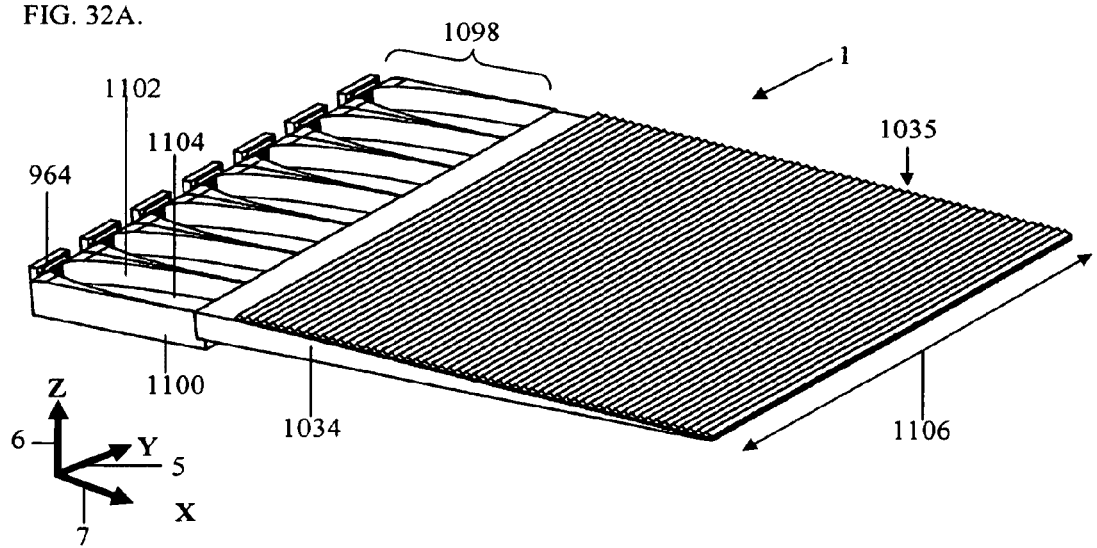
FIG. 32A illustrates a perspective view of a multi-emitter thin illumination system as was generalized in FIGS. 2A-2E and FIGS. 31A-31C shown without top reflector to reveal internal details.

FIG. 32A shows a simplified example of a multi-emitter implementation, following its general introduction in FIGS. 2A-2E, and in FIGS. 31A-31C above. Practical packaging details related to heat sinks, the LED emitter's electrical interconnection substrate, and the means with which each light engine segment is attached to adjacent segments and to the associated light guiding plate 1034 is omitted in this example for visual clarity. This particular example deploys seven parallel input emitting channels, shown co-joined to one another to form a single input source 1098 to the same type of tapered light guiding plate 112 or 1034 illustrated earlier in FIGS. 3A-3B, 4, 26 and 28. The top reflector sheet that covers the seven individual input reflector elements has also been left out for visual simplicity. For this example, the operative RAT reflector is matched for use with the four-chip Osram OSTAR™ model LE W E2A as was used in the example of FIG. 30A. The corresponding input aperture 1070 in FIG. 31C is 2.2 mm. Only the four-chip frame portion 964 (as referenced earlier in FIGS. 30B and 30D) of LED emitter 904 is shown in the present illustration for additional visual clarity. If the associated RAT reflector's design angle, $\theta_1$ as in FIG. 31C, is made a wider one for this example at +/−15 degrees, the corresponding output aperture size, $D_1$, without the reflector length truncation applied in FIG. 31C, becomes by means of equation 10, (2.2)/Sin(15) or 8.5 mm (along the plate system's input edge, also the system's Y axis 5). The orthogonal pair of reflector sidewalls (1014 and 1016 as in the example of FIG. 31C) convert the +/−90-degree input light from the four-chip LED emitter being used to the narrower angular range in the system's XZ meridian (e.g., +/−52.6 degrees). When seven such emitter-reflector combinations are placed adjacent (or nearly adjacent) to each other as illustrated in FIG. 32A, the collective length they occupy along the systems Y-axis 5 is a minimum of 59.5 mm. Matching efficiently to this width requires using a light guiding plate 1034 whose width along the system's Y-axis 5 is at least 59.5 mm.

For those lighting applications requiring higher lumen levels, this segmented array-type input engine 1098 can be especially useful. The 7-emitter example shown is about as thin as earlier single emitter implementations shown. One advantage of this form is that with seven separate LED emitters the collective engine is able to supply up to seven times the net lumens supplied by each LED emitter that is being used. If the total emitted lumen output of the four-chip LED emitter is for example taken as 400 lumens, the net throughput efficiency of each RAT reflector segment, 93%, and the net throughput efficiency of tapered light-guiding plate 1034, 86%, then the total lumen far-field output for the thin illumination system 1 becomes (7)(400)(0.93)(0.86) or 2,240 lumens.

Another advantage of the multiple-emitter system is that the same lumens as a 1-emitter system can be achieved at lower operating current, which results in higher power efficiency (lumens/Watt) operation because LED's generally operate more efficiently at lower currents. This can also improve the system's lifetime, as the LED's will degrade more slowly when operated at lower currents. Furthermore, in a multiple emitter system, some LED's can be left entirely off for some period (as long as uniform emission across the entire plate is not required), thereby saving them for future use, which can further increase the lifetime of the whole system. As one simple example, by using a 7-emitter system in a lighting application where one LED can produce sufficient lumens for the application, the other six LED's can be left off and used sequentially as each LED fails, effectively increasing the lifetime of the system by 700%. Performance consistency can be achieved by turning on one LED gradually as another gradually fails.

Yet a further advantage of a multiple-emitter system is that a wider overall range of dimming levels. Also, a wider overall range of color and color mixing options are possible through use of different color LED's.

Figure 32B:
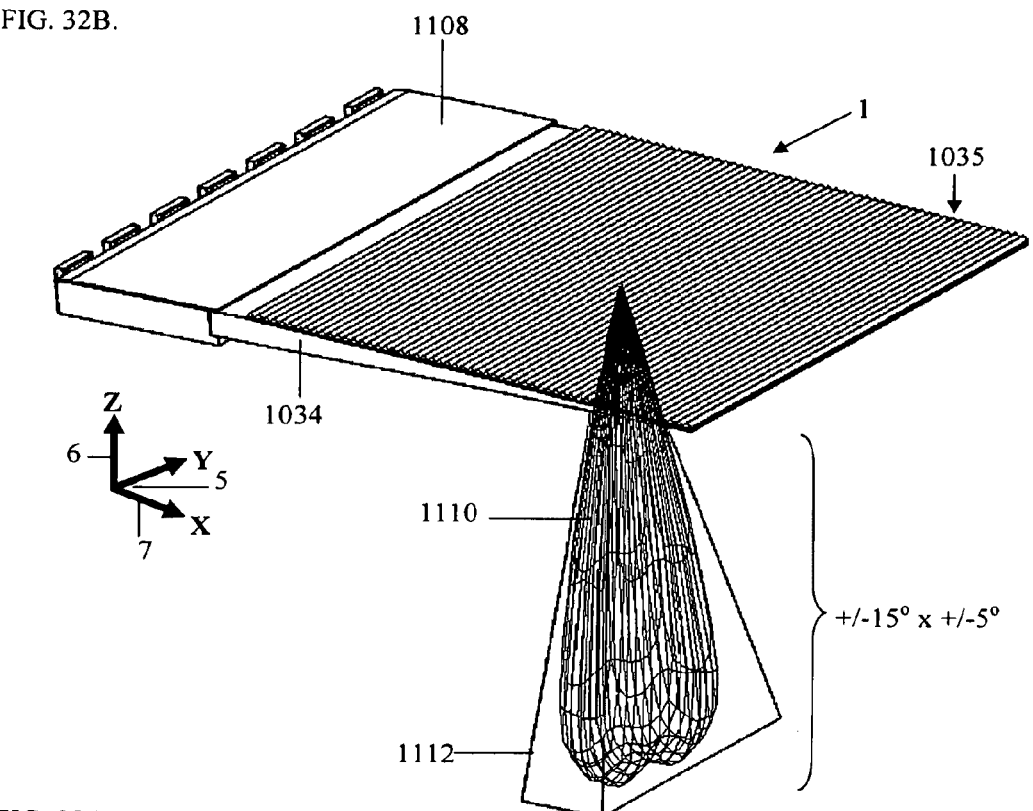
FIG. 32B is illustrates a perspective view of the system in FIG. 30A, with top reflector added, also showing the system's down directed far field output beam profile.

FIG. 32B illustrates a perspective view of the system in FIG. 30A, with top reflector 1108 added, and also includes an example of the system's realistically computer-simulated output beam profile for the design parameters involved. The far field output 1110 developed by this higher output implementation has a net far-field angular distribution that is +/−15 degrees by +/−5 degrees with the same rectangular field pattern characteristics as seen for the earlier illumination system implementations.

Numerous implementations may be developed as various groupings of the basic single-emitter engine segment shown first generally in FIG. 2A, and then as more detailed segment 1037 in FIG. 31B. A few illustrative implementations of engine groupings are shown in FIGS. 33A-33C.

Figure 33A:
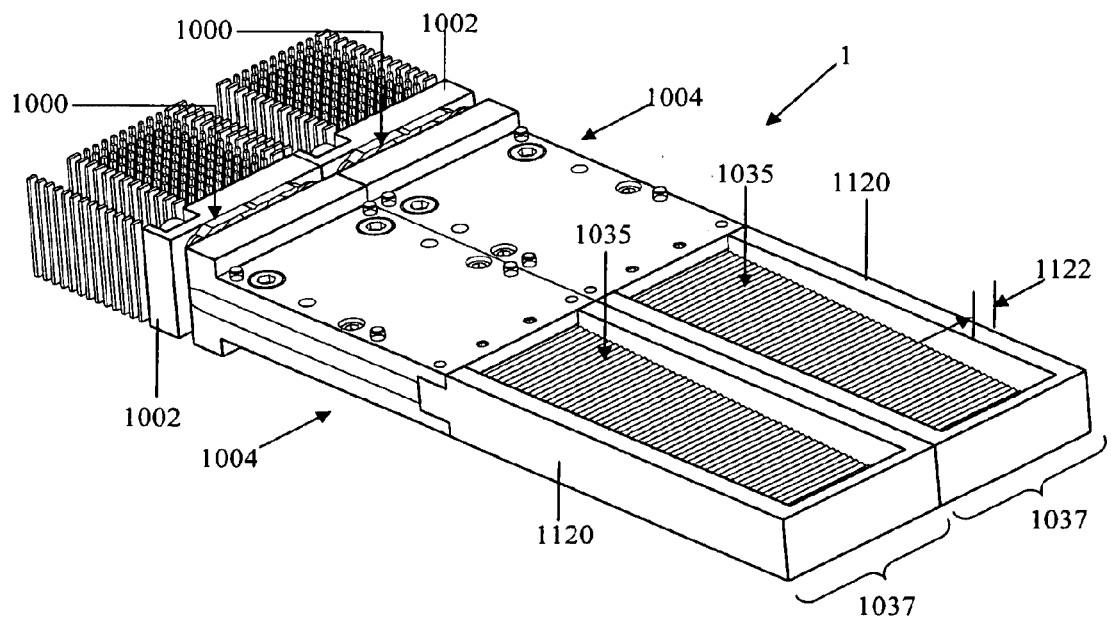
FIG. 33A shows a topside perspective view of two side-by-side down-lighting engine segments of emitter-reflector-light guiding plate thin illumination system variation illustrated in FIG. 31B.
Figure 33B:
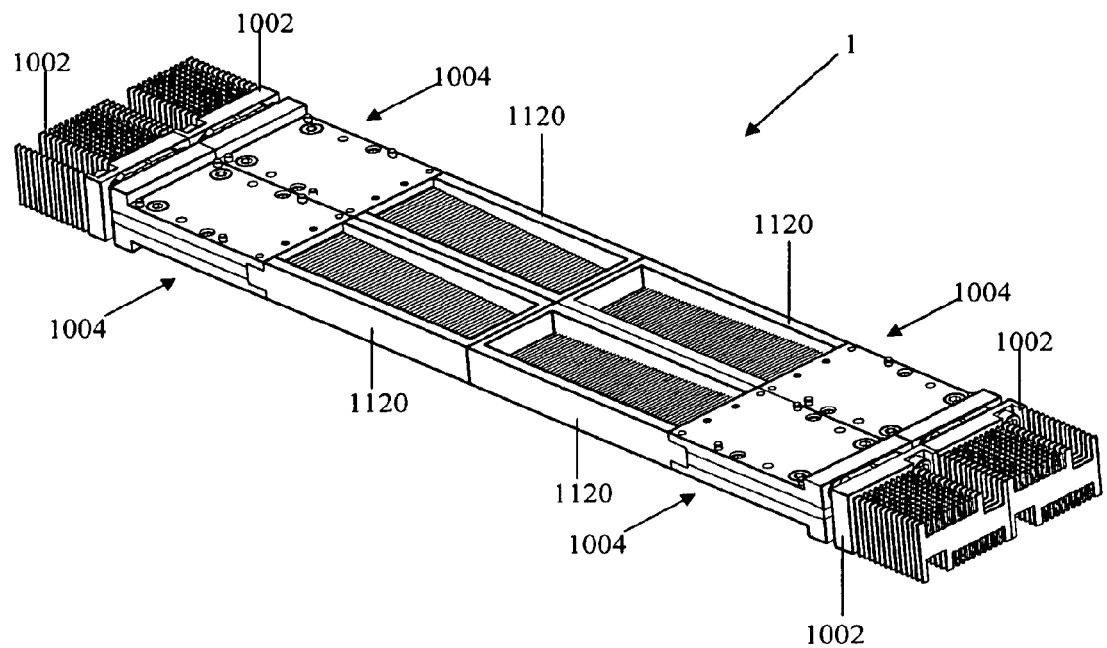
FIG. 33B shows a topside perspective view of two in-line down-lighting two-engine segments of the emitter-reflector-light guiding plate thin illumination system variation illustrated in FIG. 31B.
Figure 33C:
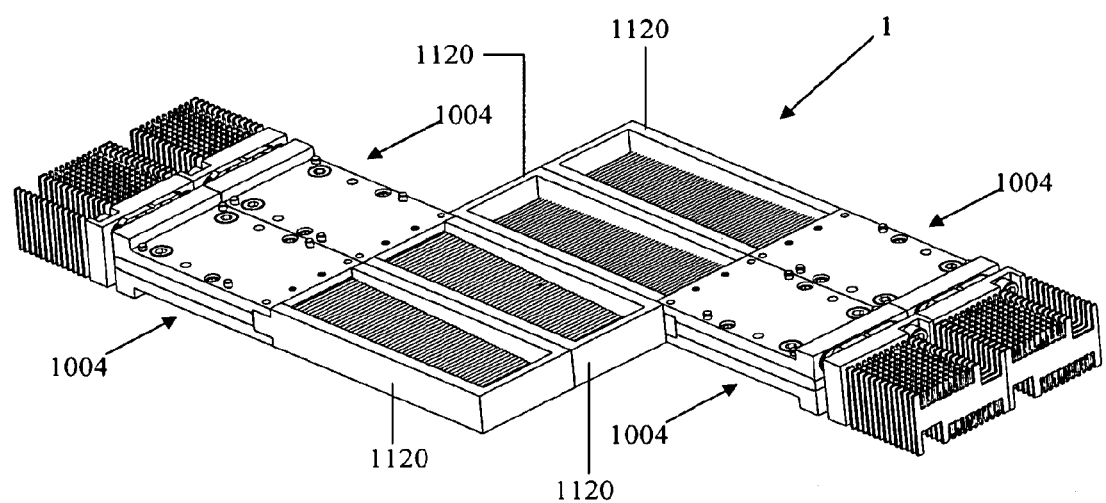
FIG. 33C shows a topside perspective view of two counter-posed two-engine segments of the emitter-reflector-light guiding plate thin illumination system variation illustrated in FIG. 31B.

FIG. 33A shows a topside perspective view of two side-by-side down-lighting engine segments 1037 of emitter-reflector-light guiding plate thin illumination system invention variation as illustrated in FIG. 31B.

Frame 1120 is added as a secure packaging for light guiding plate 1034 and its associated light extraction film 1034, as well as any light shaping films not shown. The uniformity of far-field illumination is unaffected by the framing of the light guiding plate apertures. In the present example, the framing width 1122 is arbitrarily made 3 mm, but could be more or less as desired. The clear illuminating apertures in this illustration are about 57 mm×18.75 mm. Illustrative heat sink elements 1002 each extend 24.35 mm beyond each LED emitter 1000 attached to them but in other configurations could extend longer and/or run over the top of the engine and/or its sides. The total length of this engine example, end-to-end, is about 128 mm, and the total two-engine outside width is 49.54 mm. Maximum thickness, 15 mm in this example, is limited by the mechanical-design of the Osram OSTAR™ ceramic substrates used (which were sliced down to 15 mm as shown).

Actual prototype engines have been made to this exact design, and their measured laboratory performance agrees closely with performance predictions of throughput efficiency and far-field beam profiles made by computer simulation using the salient parameters described above.

FIG. 33B shows a topside perspective view of two in-line down-lighting two-engine segments of the emitter-reflector-light guiding plate thin illumination system invention variation as illustrated in FIG. 31B.

FIG. 33C shows a topside perspective view of two counter-posed two-engine segments 1037 of the emitter-reflector-light guiding plate thin illumination system invention variation as illustrated in FIG. 31B.

Many other combinations and variations are equally possible. The combination of multiple engines (whether of the engine types shown in FIGS. 31-33, or the engine types shown previously or subsequently) also allows variety of functions within a single system, such as variety in pointing direction and angular extent. For example, one of the engines could point light toward a wall while another points light downwards. As another example, one engine could project light in a +/−5 degree square cone, while another projects light in +/−20 degree circular cone. Many multi-functional combinations and variations have been and could be imagined. Some have been described in a related U.S. Provisional Patent Application Ser. No. 61/104,606.

Light guiding plates 112 and 1034 used in all examples of the present thin illumination system invention herein share a tapered cross-section that's been extruded linearly along one Cartesian axis (e.g., Y-axis 5). The associated facetted light extraction films, whether attached to one side of the light guiding plate's tapered cross-section, as shown in FIG. 11A, or as a separate facetted element, separated slightly from the light guiding plate's tapered cross-section, as shown in the perspective view of FIG. 30D, are extruded linearly along the same Cartesian axis (e.g., Y-axis 5). The result in both cases is a constant cross-section along the axis of extrusion.

Figure 34A:
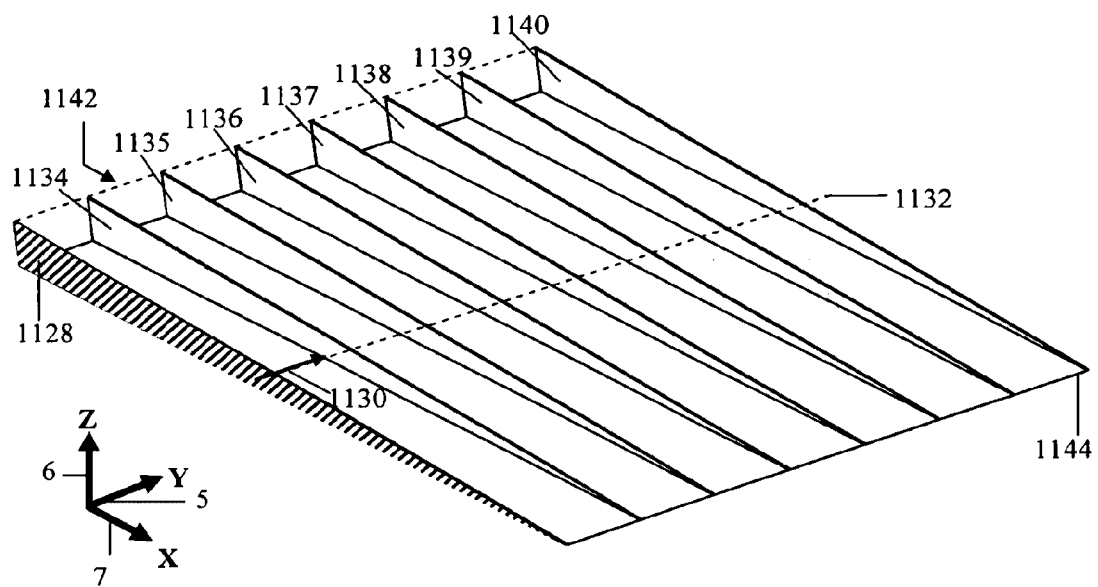
FIG. 34A is a schematic perspective illustrating execution of the global boundary condition for linear extrusion of the tapered light guiding plates introduced in the above examples.

FIG. 34A is a schematic perspective illustrating execution of the global boundary condition for linear extrusion of the tapered light guiding plate (112 and 1034), wherein the normal to prototype tapered cross-section 1128, vector 1130, follows a straight axial extruding line 1132, illustratively parallel to the system's Y-axis 5. Such linearly extruded plates are used in the examples of FIGS. 3A-3B, 5A, 7A-7C, 8A-8D, 9, 11A, 12B-12E, 13A-13C, 16B, 26, 28, 30A, 30E, 31A-31B, 32A-32B, and 33A-33C. Cross-sectional shape and dimensions are held constant, as illustrated by the reference cross-sections 1134-1140. Extruded boundary surface 1142 becomes the light input plane or face of the extruded light guiding plate. Line 1144 is the tapered light guide plate's mathematically idealized knife-edge or peripheral edge. In practical production, the actual knife-edge is an approximation, as was shown in FIG. 5A.

Figure 34B:
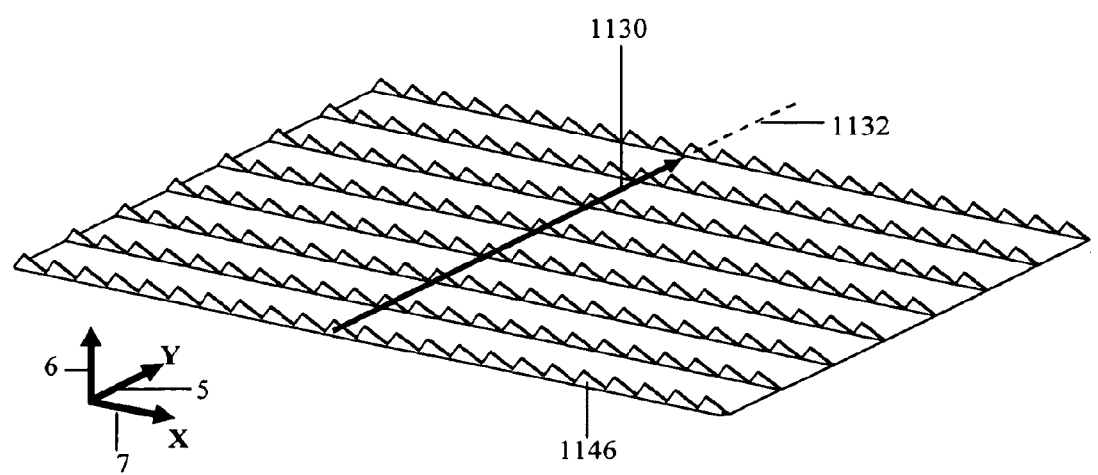
FIG. 34B shows in schematic perspective that the linear boundary condition of FIG. 34A also forms the linearly extruded facetted light extraction films as were shown in the above examples.

FIG. 34B shows in schematic perspective that the linear boundary condition of FIG. 34A also forms the linearly extruded facetted light extraction films as were shown in FIGS. 3A-3B, 4, 26, 28, 30A, 30D, 31A, 31D, 32A-32B, and 33A-33C. Prototype facet cross-section 1146 follows the same direction vector 1130 for its extrusion along straight axial extruding line 1132 as is shown in FIG. 34A for the linearly extruded tapered light guiding plate.

Not all useful light guiding plates and facetted light extraction films (and means to couple the plates and films together) are extruded linearly. Radially extruded light guiding plates and radially facetted light extraction films enable circular, as well as square and rectangular forms of thin illumination systems, for example. In some implementations, irregularly shaped light guides or light guiding plates can be extruded radially. In these radially extruded forms, input light from one or more light sources, for example, one or more LED emitters, is applied to a light entry surface which can be disposed, for example, near a center portion of the light guide, as discussed below. In some implementations, the light entry surface can be formed by a recess or depression in the top and/or bottom surfaces of the light guide. For example, the light entry surface can be formed by a cylindrical recess that extends partially, or completely, through the light guide. In some implementations, a light guide can include more than one light entry surface such that light can be injected radially into the light guide by different light sources that are spaced apart from one another. In this way, light may be injected radially from one or more light sources via the light entry surface.

Figure 34C:
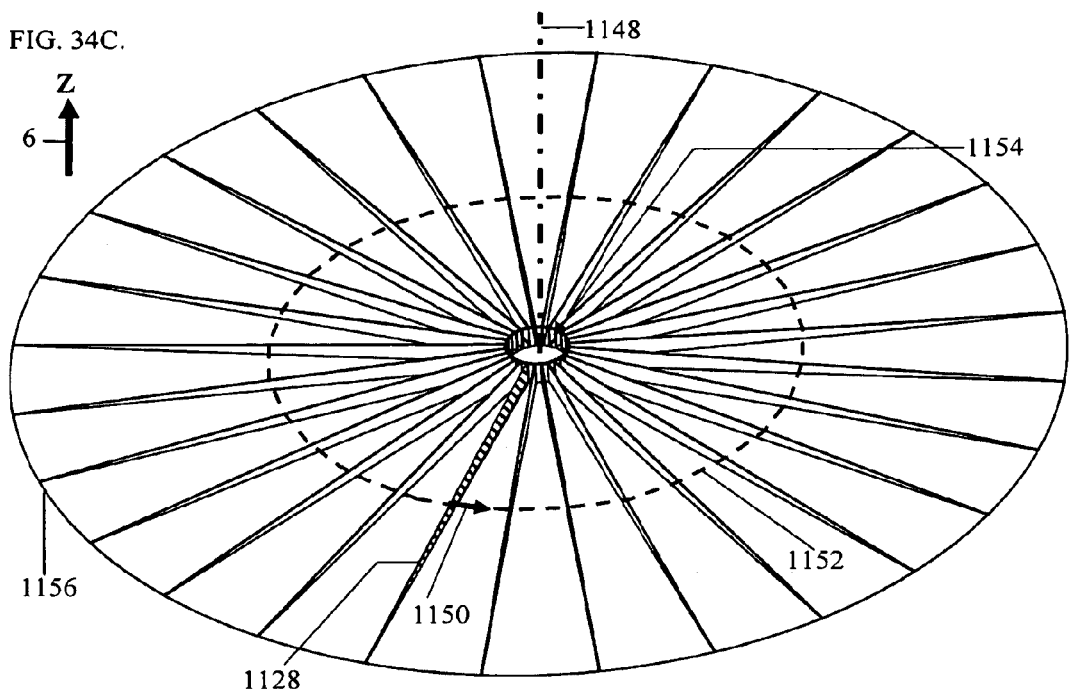
FIG. 34C illustrates in schematic perspective a basic execution of the radially constrained extrusion to form disk-type tapered light guiding plates.

FIG. 34C illustrates in schematic perspective a basic execution of the radially constrained extrusion to form disk-type tapered light guiding plates. Prototype tapered cross-section 1128 is extruded about an axis line 1148 (running parallel to system Z-axis 6) such that the cross-section's prevailing direction vector 1150 follows circular guide path 1152. As this constant cross-section light guiding solid plate is developed, a cylindrical bounding surface 1154 is formed in the center, and a mathematically idealized circular knife-edge or peripheral edge 1156 is formed at the periphery. In some implementations, the guiding plate can be tapered such that the light illumination surface and the upper or top surface of the guiding plate define an angle α therebetween at the peripheral edge of the guiding plate. In some implementations, the angle α can be greater than 1 degree and less than 15 degrees, for example, between about 2 degrees and about 8 degrees (including 2 degrees, 3 degrees, 4 degrees, 5 degrees, 6 degrees, 7 degrees, 8 degrees, or any value between any two of these values). In this way, a maximum longitudinal dimension of the light guiding plate or light guide can be relatively thin, for example, below 50 mm or 2 inches. However, depending upon the taper angle α and the maximum radial dimension, light guiding plates with longitudinal dimensions between about 1 mm and about 16 mm, for example, between about 2 mm and 6 mm, can be made.

Figure 34D:
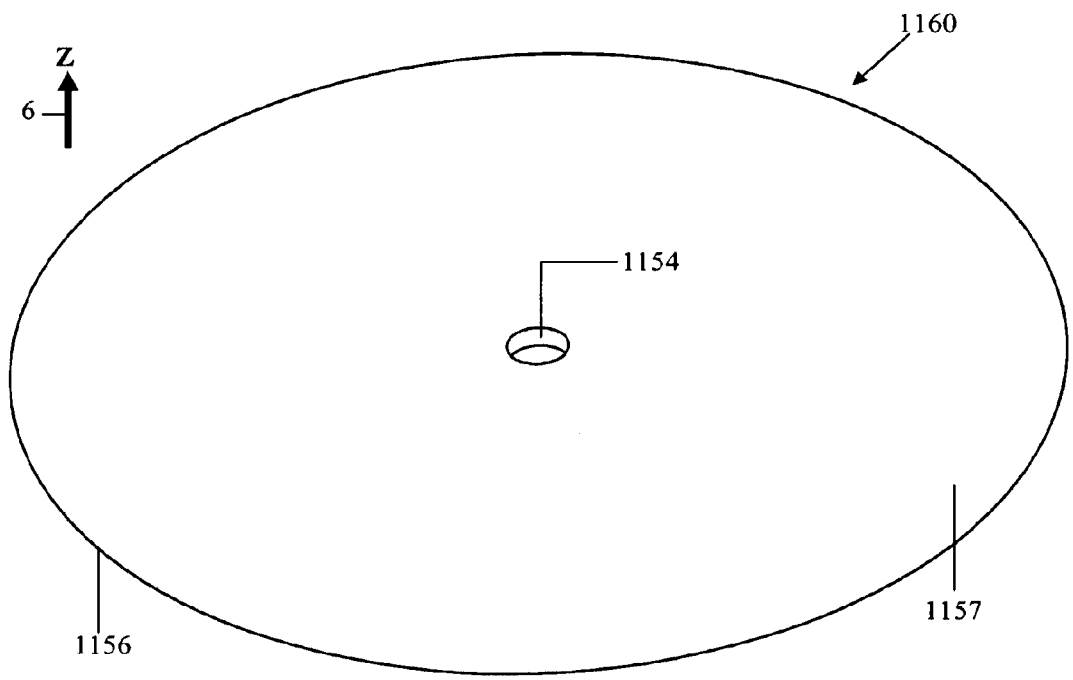
FIG. 34D shows in schematic perspective the circular tapered cross-section light guiding plate that results from executing the radial extrusion illustrated in FIG. 34C.

FIG. 34D shows in schematic perspective the circular tapered cross-section light guiding plate 1160 that results from executing the radial extrusion illustrated in FIG. 34C.

Figure 34E:
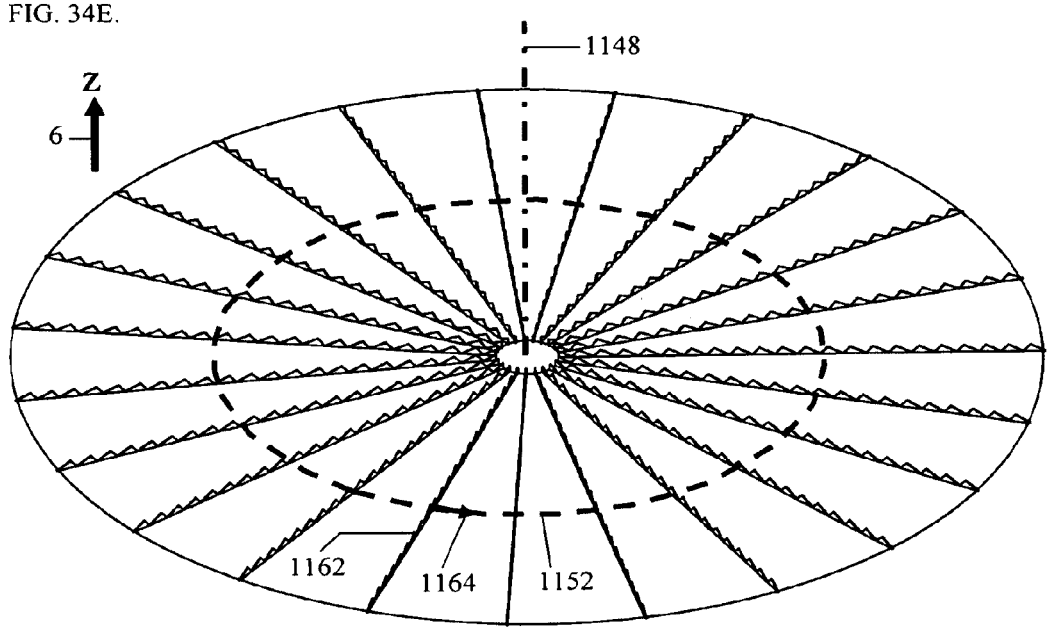
FIG. 34E is a schematic perspective view illustrating the corresponding radial extrusion process for facetted cross-section sweeping about an axis line and circular guide path to form a radially facetted light extraction film.

FIG. 34E is a schematic perspective view illustrating the corresponding radial extrusion process for facetted cross-section 1162 and cross-section normal 1164 sweeping about axis line 1148 and circular guide path 1152 to form radially facetted light extraction film 1166. Central hole 1168 can form a light entry surface to facilitate the incorporation of an LED emitter, or other light source, and a corresponding light reflector or optical coupling which can be derivative of the etendue-preserving RAT reflectors (or functionally equivalent optic) described above, in some implementations.

Figure 34F:
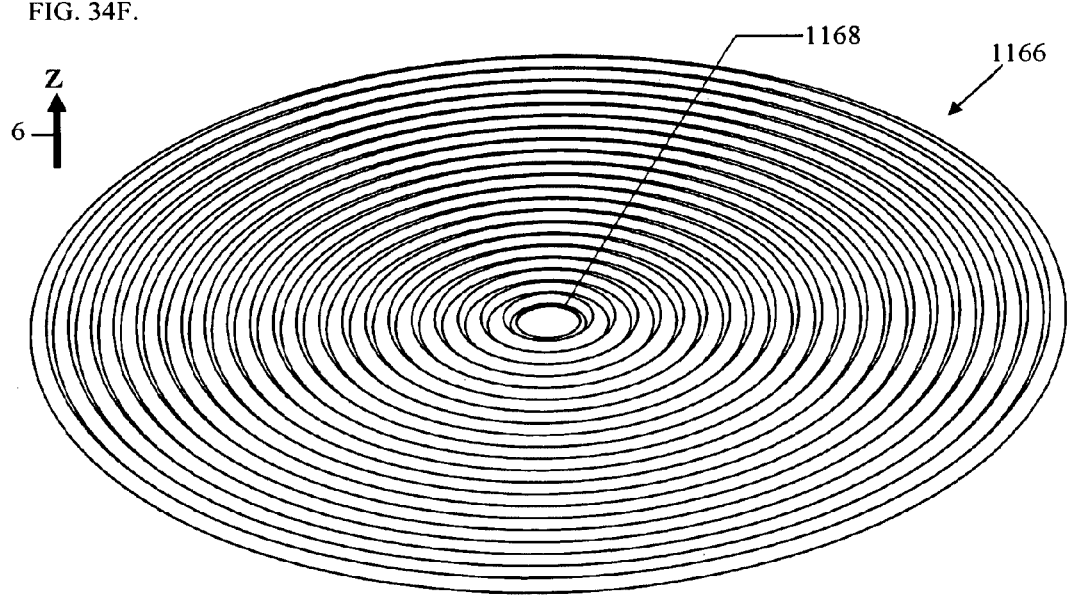
FIG. 34F is a topside schematic perspective illustrating the radial light extracting film that results from executing the radial extrusion illustrated in FIG. 34E.

FIG. 34F is a topside schematic perspective view illustrating the radial light extracting film 1166 that results from executing the radial extrusion illustrated in FIG. 34E. Central hole 1168 facilitates incorporation of an LED emitter and a corresponding light reflector derivative of the etendue-preserving RAT reflectors described above.

Figure 35A:
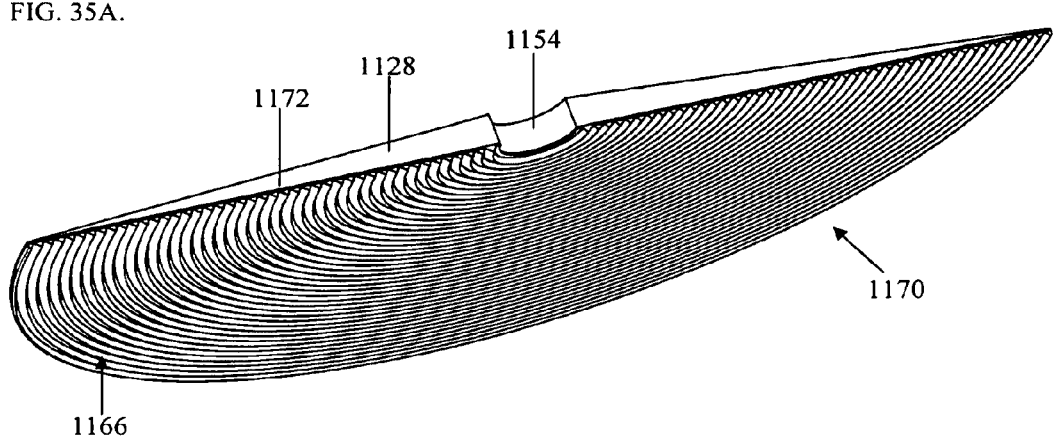
FIG. 35A is a cross-sectional perspective view illustrating radially facetted light extracting film of FIG. 34E and circular light guiding plate of FIG. 34D combined.

FIG. 35A is a cross-sectional perspective view illustrating radially facetted light extracting film 1166 of FIG. 34E and circular light guiding plate or light guide 1160 of FIG. 34D combined in accordance with one additional form of this disclosure. Light entering cylindrical boundary surface 1154 flows radially through the body of plate 1160, interacts with radially facetted light extraction film 1166 in each cross-section just as it did in the equivalent cross-section of FIGS. 11A-11C, and is output from the circular plate's unobstructed surface 1157 along system's Z-axis 6, as equally well-collimated illumination. Layer 1172 is the functional equivalent of optical coupling adhesive 118 as shown for example in FIG. 3B or 320 as shown in FIGS. 11C-11D. In this example of this disclosure, the faceted light extraction film 1166 has been attached for convenience to the plane (or flat) side of the tapered light guiding plate 1160. It may be attached to either side without performance penalties. As discussed below, in some implementations, a light guide can reflect light from a reflective or upper surface through an illumination or output lower surface without a radially facetted light extraction film.

Figure 35B:
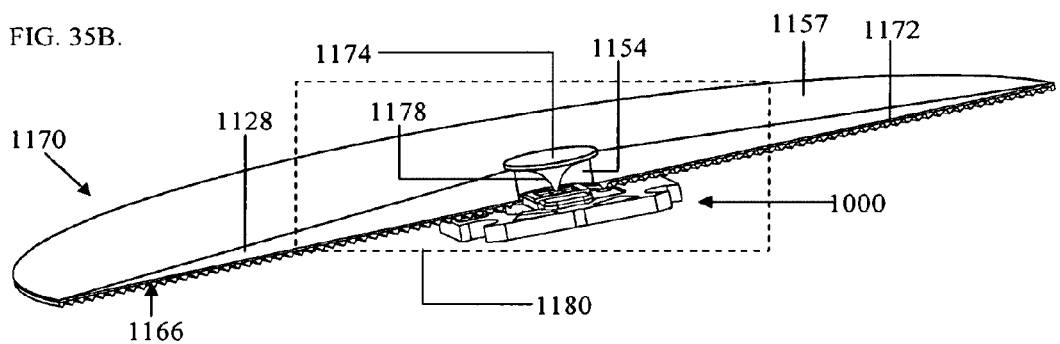
FIG. 35B is a cross-sectional perspective view illustrating the internal details of one example of a practical combination of illustrative LED emitter (as in FIG. 31A) with radial light guiding system of FIG. 35A.

FIG. 35B is a cross-sectional perspective view illustrating the internal details of one example of a practical combination of illustrative LED emitter 1000 (as in FIG. 31A) with radial light guiding system 1170 of FIG. 35A. The linear light guiding system implementation of FIGS. 31A-31B used etendue-preserving RAT reflector 1004 as its means of light coupling from LED emitter 1000 to linear light guiding plate 1034. The one sided radially symmetric equivalent of linearly emitting RAT reflector 1004 is radially symmetric (angle transforming) reflector 1174. The packaging of Osram's six-chip OSTAR™ model LE CW E3A necessitates using a one sided reflector. Sidewall curvature 1178 of reflector 1174, like that of RAT reflector 1004, is driven by the boundary conditions of etendue-preserving equations 10-15, and is thereby related to the linearly extruded sidewall shape of RAT reflector 1004, as in FIG. 31C. The shape of reflector 1174 is meant to be illustrative of its general form and may be implemented in a variety of metal, metal-coated dielectric and total internally reflective dielectric formats. Similarly, the plane cylindrical input face 1154 of tapered light-guiding plate 1034 is also only one example. It may be curved or facetted in some situations, and the taper plane may also be varied in shape nearest input face 1154 as a result. As discussed below, in some implementations, the reflector 1174 can be configured to collimate light radially toward a periphery of the light guide reflective surface of the light guide or a facetted light extraction film. Such collimated light may be further collimated by the tapered radial shape of the light guide reflective surface of the light guide or the facetted light extraction film to provide for an output that is collimated in two orthogonal Cartesian medians through the output or illumination surface 1157.

Figure 35C:
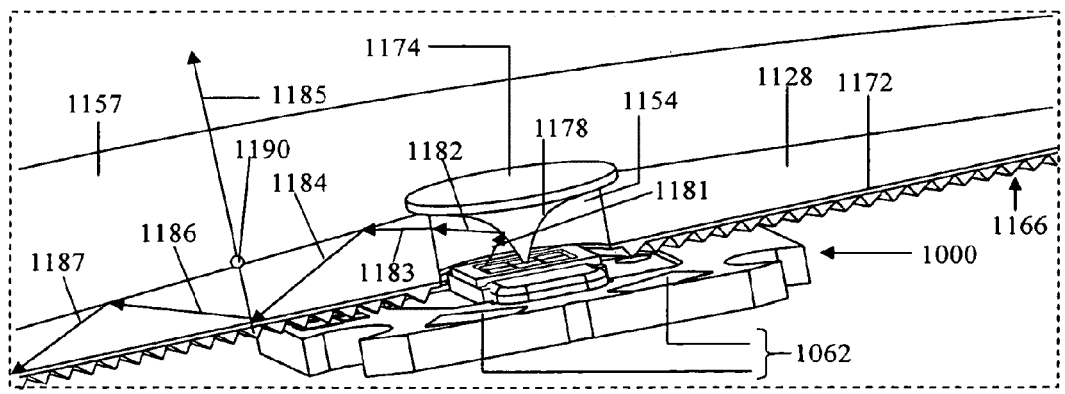
FIG. 35C is a magnified view of the cross-section of FIG. 35B showing finer details of the light input region of this illustrative radial form of the thin emitter-reflector-light guiding plate illumination system.

FIG. 35C is a magnified view 1180 of cross-section of FIG. 35B showing finer details of the light input region of this illustrative radial form of the thin emitter-reflector-light guiding plate illumination system. The process of light transmission and light extraction was explained earlier (e.g., FIGS. 11A-11C and 12B) and applies without modification, to the radial form, as each radial cross-section remains that of FIG. 11A. For convenience, a few illustrative rays 1181-1187 are shown in the cross-sectional plane. With DC operating voltage applied to terminals 1062 of LED emitter 1000, ray 1181 is emitted outwards from one of the emitter's six LED chips. This illustrative ray strikes the reflecting sidewall curvature 1178 of radial angle transforming reflector 1174, and as did RAT reflector 1004, redirects ray 1181 as ray 1182 towards cylindrical entrance face 1154 of the light guiding plate 1160. As described below, in some implementations the radial transforming reflector 1174 may be replaced by other functionally similar coupling optics, including one or more of circularly symmetric reflectors of different surface curvature than 1178, one or more circularly symmetric reflectors of with segmented surfaces, a lens, a group of lenses, a refractive reflector, a light pipe section, a hologram, a diffractive film, a reflective polarizer film, and a fluorescent resin. Furthermore, the LED emitter 1000 may have a different form of light-emitting surface than that shown (the light emitting surface shown being the flat exterior surface of a clear encapsulent surrounding the LED chips), such as a raised phosphor, raised clear encapsulent, raised phosphor or clear encapsulent with micro-structured exterior surface, or raised phosphor or clear encapsulent with macro-structured surface, said different form allowing more total emitted light and/or more effective light collection by reflector 1174 or its coupling optic equivalent. Such a different light-emitting surface may also be a secondary optic coupled to the clear encapsulent around the LED chips, such as, for example, a dome lens like those commonly provided by OSRAM and many other LED manufacturers (as mentioned above).

On entry, illustrative ray 1182 becomes propagating ray 1183 and then propagating ray 1184 which with similarity to ray path 330-332-334-336 in FIG. 11A, generates extracted output ray 1185 (which escapes tapered light-guiding plate 1160 into air at point 1190 on the plate's outer surface 1157. Remaining light energy continues to propagate within tapered light guiding plate 1060 by total internal reflection as illustrative ray segments 1186 and 1187.

FIG. 35D shows a cross-sectional view of an example lighting device or illumination device 2000 including a tapered light guide or guiding plate 2101. To assist in the description of the implementations described herein, the following coordinate terms can be used, consistent with the coordinate axes illustrated in FIG. 35D. A "longitudinal axis" extends generally orthogonally to the light guide 2101 of the illumination device 2000 (similar to the Z axis of FIG. 1A). A "radial axis" is any axis that is normal to the longitudinal axis, for example, any axis that extends in the XY plane of FIG. 1A. In addition, as used herein, "the longitudinal direction" refers to a direction substantially parallel to the longitudinal axis and "the radial direction" refers to a direction substantially parallel to a radial axis.

As shown, the light guide 2101 can be radially tapered from a center portion to a peripheral edge 2109 defined by the joinder of an upper surface 2103 and a lower surface 2105. In other words, where the upper surface 2103 and the lower surface 2105 terminate at their closest proximity, or where they meet. As discussed below, a reflective surface can be disposed adjacent to the upper surface 2103 so as to reflect light propagating within the light guide 2101 towards the lower surface 2105. In some implementations, the upper surface 2105 can include a reflective surface. For example, at least a portion of the upper surface 2105 can be reflective so as to turn or reflect light propagating within the light guide 2101 away from the upper surface 2104. The lower surface 2105 can be referred to as an illumination or output surface based on the light that exits the light guide 2101 through this surface. Of course, the terms upper and lower with respect to the upper surface 2103 and lower surface 2105 are used relative to the schematic depiction of the illumination device 2000 in the figures and a person having ordinary skill in the art will readily appreciate that, in some implementations, the upper surface of a light guide can be an illumination surface and/or that the lower surface of a light guide can be a reflective surface and/or be disposed adjacent to a reflective surface, for example.

Still referring to FIG. 35D, an angle α can be defined between the upper surface 2103 and the lower surface 2105. Because the upper surface 2103 and the lower surface 2105 meet at the peripheral edge 2109, the angle α can define the taper of the light guide 2101. Thus, in some implementations the angle α can be referred to as the taper angle of the light guide. In some implementations, the angle α can be less than 15 degrees, for example, greater than 1 degrees and less than 15 degrees. For example, the angle α can be between about 2 degrees and about 8 degrees. In some implementations, the angle α can be greater than 15 degrees, for example, about 30 degrees.

As shown, the light guide 2100 has a maximum radial dimension D defined between opposing sides of the peripheral edge 2109. The light guide 2100 also has a maximum thickness or longitudinal dimension T. In some implementations, the maximum radial dimension D can be selected such that the illumination device 2000 and light guide 2101 fit within a recess for a given lighting fixture, for example, a recess for a fixture configured to receive a PAR lighting device. For example, the dimension D can be less than 8 inches such that the light guide 2101 may fit within a PAR64 fixture, the dimension D can be less than 7 inches such that the light guide 2101 may fit within a PAR56 fixture, the dimension D can be less than 5.75 inches such that the light guide 2101 may fit within a PAR46 fixture, the dimension D can be less than 4.75 inches such that the light guide 2101 may fit within a PAR38 fixture, the dimension D can be less than 4.5 inches such that the light guide 2101 may fit within a PAR36 fixture, the dimension D can be less than 3.75 inches such that the light guide 2101 may fit within a PAR30 fixture, the dimension D can be less than 2.5 inches such that the light guide 2101 may fit within a PAR20 fixture, and/or the dimension D can be less than 2 inches such that the light guide 2101 may fit within a PAR16 fixture. Of course, in some implementations, the light guide 2101 and illumination device 2000 can be configured to fit within the recesses of other standard fixtures. In this way, the illumination device 2000 may be used with existing lighting fixtures without requiring a retrofit or conversion for the use of the illumination device 2000.

As described above, in some implementations a light guide or light guiding plate may be relatively thin thereby limiting the weight and footprint of a lighting device. Because the angle α of the light guide 2101 can be less than 15 degrees, the maximum longitudinal dimension T of the light guide 2101 can be limited by the angle α and the maximum radial dimension D. In some implementations, the light guide 2101 can have a maximum longitudinal dimension T that is between 1 mm and 16 mm. For example, the light guide 2101 can have a maximum longitudinal dimension T that is between 2 mm and 6 mm.

With continued reference to FIG. 35D, in some implementations the light guide 2101 can include a light entry surface 2107 disposed near the center of the light guide 2101. In this way, light may be injected into the light guide 2101 through the light entry surface 2107 and the injected light may propagate radially toward the peripheral edge 2109. In some implementations, the light entry surface 2107 can be formed by a recess or depression, for example, a columnar recess, that extends at least partially through the light guide 2101 in the longitudinal direction. As shown, the light entry surface 2107 can be formed by a columnar recess that extends between the upper surface 2103 and the lower surface 2105. Such a recess may be formed by etching as described below with reference to the example method of FIG. 54.

In some implementations, the illumination device 2000 can include one or more light sources 2203 disposed within the light guide 2101. The one or more light sources 2203 can include an LED source or LED emitter similar to those described above. For example, the one or more light sources 2203 can be electrically and/or mechanically coupled to a circuit plate 2201 that may be utilized to bring either high voltage AC or low-voltage DC power directly to the one or more light sources 2203 via voltage regulation components, local power controlling elements, and/or illustrative electrical connection straps. Various combinations of electronic components may be used discretely or functionally integrated to perform a wide variety of effective power controlling functions for the one or more light sources 2203, including digital processing and associated response to internal or external power control signals.

As shown, the one or more light sources 2203 can be configured to emit light in an upward or longitudinal direction toward the upper surface 2103 of the light guide 2101 (for example, away from the lower surface 2105). In some implementations, the illumination device 2000 can optionally include an optical coupler 2301 disposed within the light guide 2101 in an optical path between the one or more light sources 2203 and the light entry surface 2107. In this way, the optical coupler 2301 can be configured to couple light emitted from the one or more light sources 2203 into the light guide 2101 through the light entry surface 2107. For example, the optical coupler 2301 can include one or more curved reflective surfaces configured to redirect light travelling in the longitudinal direction that is received from the one or more light sources 2203 toward the light guide 2101 in the radial direction. In some implementations, the optical coupler 2301 can be configured to collimate light, that is to reduce the angular divergence of a beam of light, in the radial direction and the collimated light may be injected into the light guide 2101 via the light entry surface 2107. In some implementations, the optical coupler 2301 can reflect light via TIR, metallic reflection, and/or dielectric reflection. The optical coupler 2301 may be an etendue-preserving reflector similar to reflector 1174 of FIG. 35B, for example. The optical coupler 2301 can include one or more grating or lens based structures to couple light emitted from the one or more light sources 2203 into the light guide 2101.

In some implementations, the illumination device 2000 can include one or more optical conditioners 2501 disposed below the lower surface 2105 of the light guide 2101. The one or more optical conditioners 2501 can receive light that is output from the light guide 2101 through the lower surface 2105 and shape, condition, or redirect the output beam of light. In some implementations, the one or more optical conditioners films 2501 include one or more lenticular structures or films (for example, a structure or film with one or more elongated lenticules, or one or more symmetric or asymmetric lenses or lenslets, such as angle-spreading film sheets 52 and 53 of FIG. 1D or other similar films disclosed herein) and/or one or more light turning films (for example, a prismatic type film with the apex of each prismatic feature facing the light guide 2101, such as facetted film 982 of FIG. 30E or other similar films disclosed herein). In some implementations, an optical conditioner 2501 can include one or more layers or structures. For example, an optical conditioner 2501 can be a stack.

As mentioned above, in some implementations, the illumination device 2000 can be configured to doubly collimate light emitted from the one or more light sources 2203. For example, light ray segments 2401 may be emitted by the one or more light sources 2203 toward the optical coupler 2301. Thereafter, the curved sidewalls or surfaces 2303 of the optical coupler 2301 may redirect the light collimate the ray segments 2401 in a radial direction to inject the light into the light guide 2101 so that the light propagates toward the periphery of the light guide. The light continues to propagate inside the light guide 2101 via total internal reflection until the light exits as described in reference to FIG. 35C. As disclosed elsewhere herein, in the absence of a light-turning or light-extracting sheet, the light will exit the light guide at an oblique angle. Therefore, in some implementations, a reflective surface may be disposed adjacent to the upper surface 2103. For example, a reflectorized light-turning film having prism-like facets may be disposed adjacent to the upper surface. In other implementations, at least a portion of the upper surface 2103 may be reflectorized without prism-like facets. A light-turning film may then be disposed at the output surface, illustrated here as the lower surface 2105. In such an implementation, light exiting the light guide 2101 at an oblique angle is then turned by the light-turning film to exit the illumination device 2000 at a desired angle, for example, as illustrated by ray 2405, orthogonal to the lower surface 2105.

As discussed herein, the light guide 2101 can be tapered to provide for collimation of the beam in a meridional plane along a radial direction. For a radially symmetric light guide 2101, the light is therefore collimated along a large number of intersection meridional planes. In some implementations, the ray segments 2405 exiting the light guide 2101 may by disposed within an angular range $+/-\phi$, measured as full width half maximum, relative to the longitudinal axis. The angular range $+/-\phi$ can be based at least in part on the taper angle $\alpha$. For example, assuming no etendue preserving angle transformers pre-collimating the light, and assuming no output angle spreading film (such as a lenticular film) and ignoring the effect of any light-turning films, when the taper angle is between about 1 and 4 degrees, the output beam full width at half maximum may be between $\pm 2$ and $\pm 4$ degrees. If the input light is pre-collimated in a range between $\pm 15$ to $\pm 30$ in the light guide, the output beam width may be even narrower.

FIG. 35E shows a cross-sectional view of an example lighting device 3000 including the tapered light guide 2101 of FIG. 35D. As with the illumination device 200 of FIG. 35D, the light guide 2101 of the illumination device 3000 includes a light entry surface 2107 formed by a columnar recess 2106 disposed near a center portion of the light guide 2101. However, in this implementation, the illumination device 3000 includes a plurality of light sources 2203 offset angularly from one another about the longitudinal axis of the illumination device 2101. In this way, each light source 2203 is configured to emit light directly into the light guide 2101 through the light entry surface 2107.

Figure 35F:
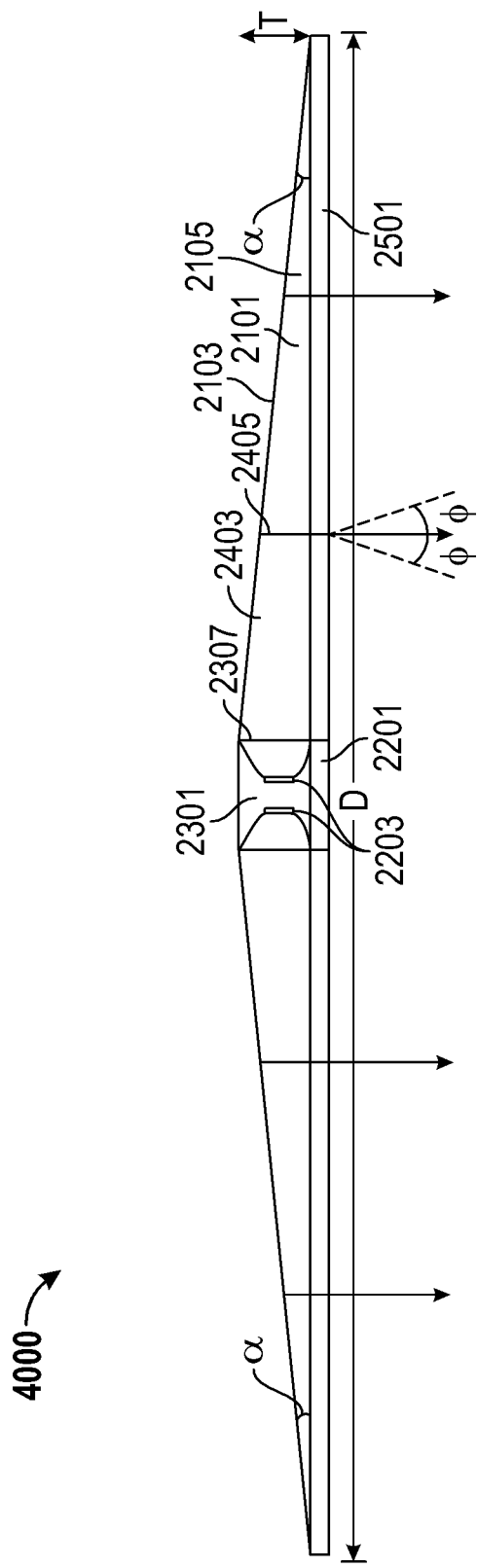
FIG. 35F shows a cross-sectional view of an example illumination device including the tapered light guide of FIGS. 35D and 35E.

FIG. 35F shows a cross-sectional view of an example lighting device 4000 including the tapered light guide 2101 of FIGS. 35D and 35E. In this implementation, the illumination device 4000 includes a plurality of light sources 2203 disposed angularly about the longitudinal axis of the illumination device 2101. In some implementations, the plurality of light sources 2203 can be mounted on an optical coupler 2301 including a plurality of curved surfaces 2303. As illustrated, the plurality of light sources 2203 can each face in a radial direction and the curved surfaces 2303 of the optical coupler 2301 can shroud the light sources 2203 to direct ray segments 2403 emitted from the light sources 2203 in the radial direction. Each optical coupler 2301 can include a reflector, for example, an etendue preserving reflector. In some implementations, the reflector can improve the collimation of light for injection into the light guide 2101 through the light entry surface 2107. In this way, light emitted from the light sources 2203 can be injected directly into the light guide 2101 in a radial direction from the light sources 2203 and/or can be coupled into the light guide 2101 in a radial direction by the optical coupler 2301.

Figure 36A:
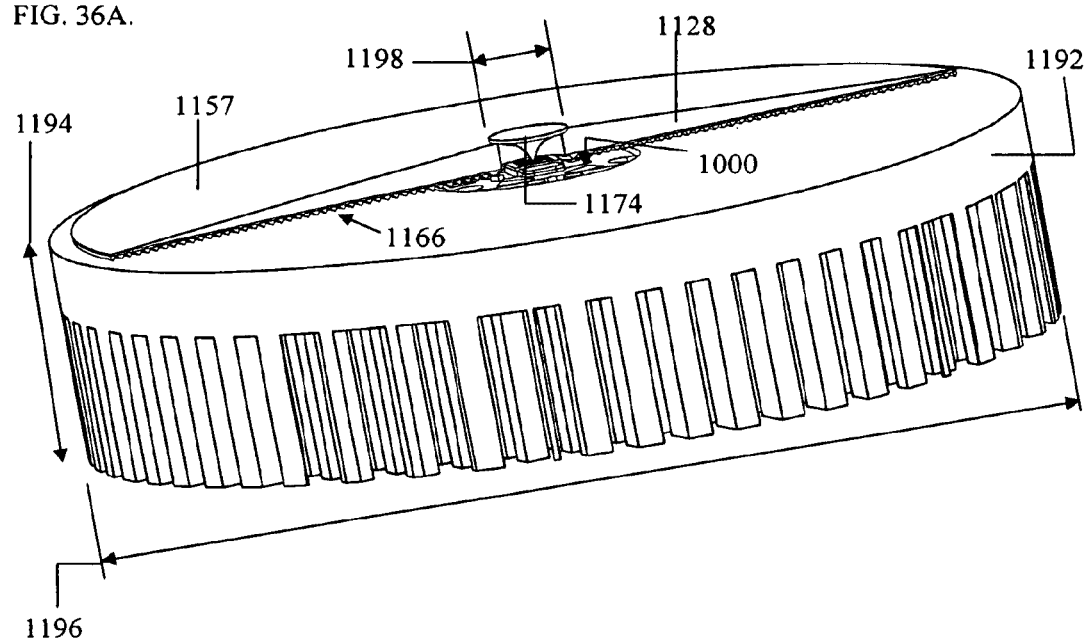
FIG. 36A is a partial cross-sectional perspective view revealing internal details of the thin emitter-reflector-light guiding plate illumination system of FIG. 35A, but with an example of a radial heat-extracting element useful in such configurations.

FIG. 36A is a partial cross-sectional perspective view revealing internal details of the thin emitter-reflector-light guiding plate illumination system 1 elements of FIG. 35A, but along with an example of one type of radial heat extracting element 1192 useful in such configurations. Thickness 1194 of radial heat extracting element 1192 is only meant illustratively, and depends on the operating wattage of LED emitter 1000, the efficiency with which sink and emitter substrate are thermally attached, the sink material, the dynamics of ambient airflow, and the details of the extracting element's thermal design. The diameter 1196 of this particular light engine example of this disclosure is chosen as 95.25 mm (3.75 inches), which is a common diameter for traditionally circular light bulbs. The central coupling diameter 1198 in this example, 7.2 mm, has been matched to the characteristics of the six-chip Osram OSTAR™ model LE CW E3A being used as an example, and could be made smaller or larger with other LED emitter designs and coupling arrangements.

Figure 36B:
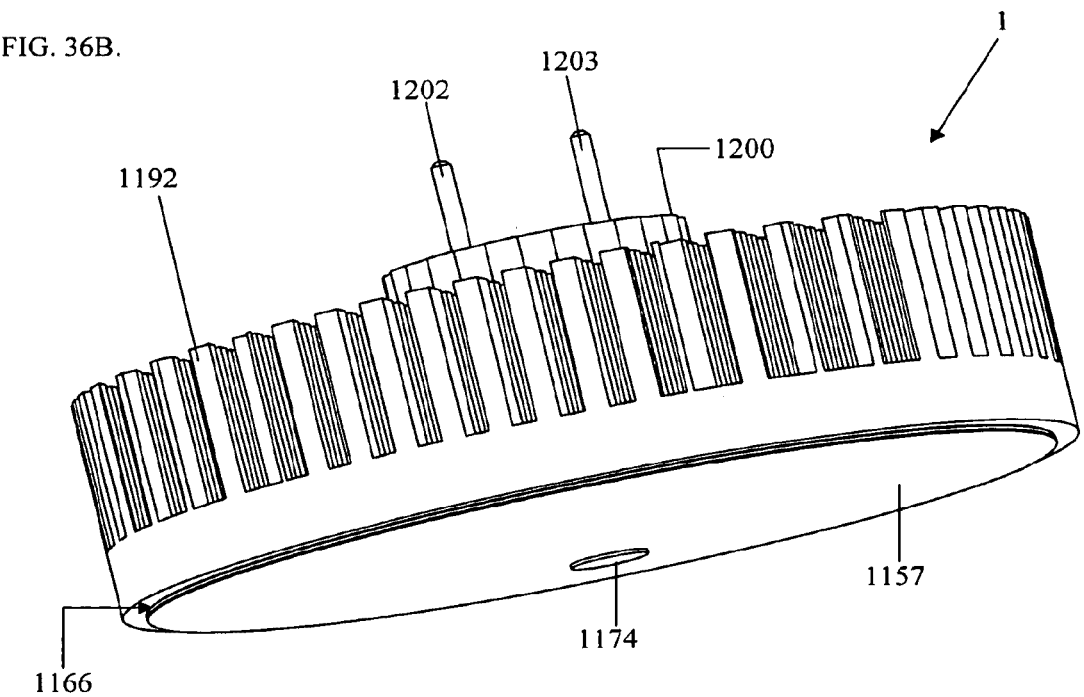
FIG. 36B is a schematic perspective view of the illustrative light engine implementation represented in FIG. 36A, without the cross-sectional detail of FIG. 36A, and in a down-lighting orientation.
Figure 36C:
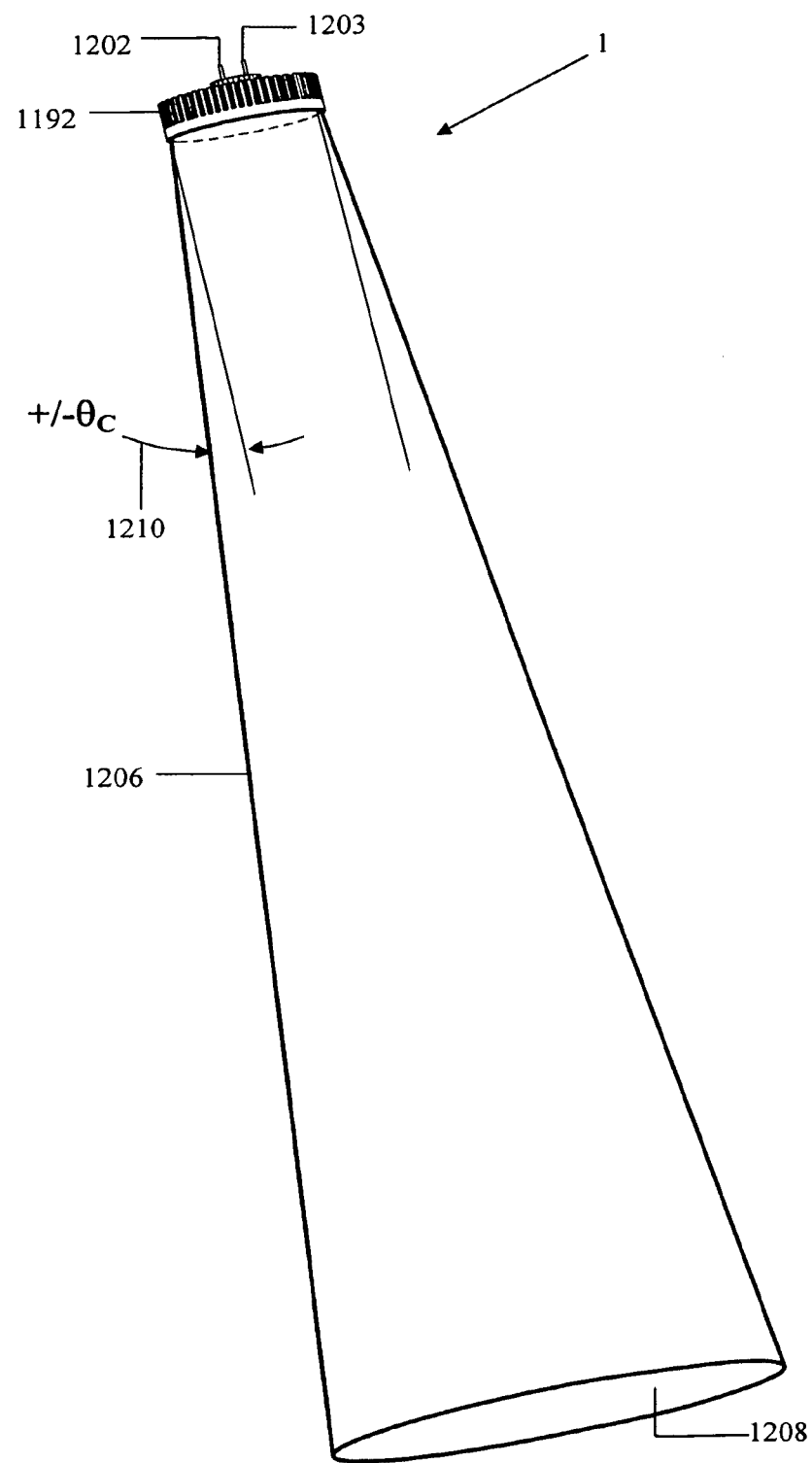
FIG. 36C is a schematic perspective view similar to that of FIG. 36B showing the illustrative light engine implementation of FIGS. 35A-35C and 36A-36B and it's intrinsically well-collimated far-field output illumination.

FIG. 36B is a schematic perspective view of the illustrative light engine implementation represented in FIG. 36A, without the cross-sectional detail of FIG. 36A, and in a down-lighting orientation. This perspective reveals an illustrative means of providing insulated tubular electrical conduit 1200 for electrical interconnections to and from the interior terminals 1062 of LED emitter 1000, and the associated electrical connecting pins 1202 and 1203. Tubular conduit 1200 may be substantially hollow, and may be an integral part of heat extracting element. FIG. 36C is a schematic perspective view similar to that of FIG. 36B showing the illustrative light engine implementation of FIGS. 35A-35C and 36A-36B and its intrinsically well-collimated far-field output illumination 1206. Computer ray trace simulations of this design show a circular beam profile 1208 in the far field with angular extent 1210, $+/-\theta_c$ being approximately $+/-6$ degree (FWHM), with a soft halo out to about $+/-9$ degrees.

Figure 36D:
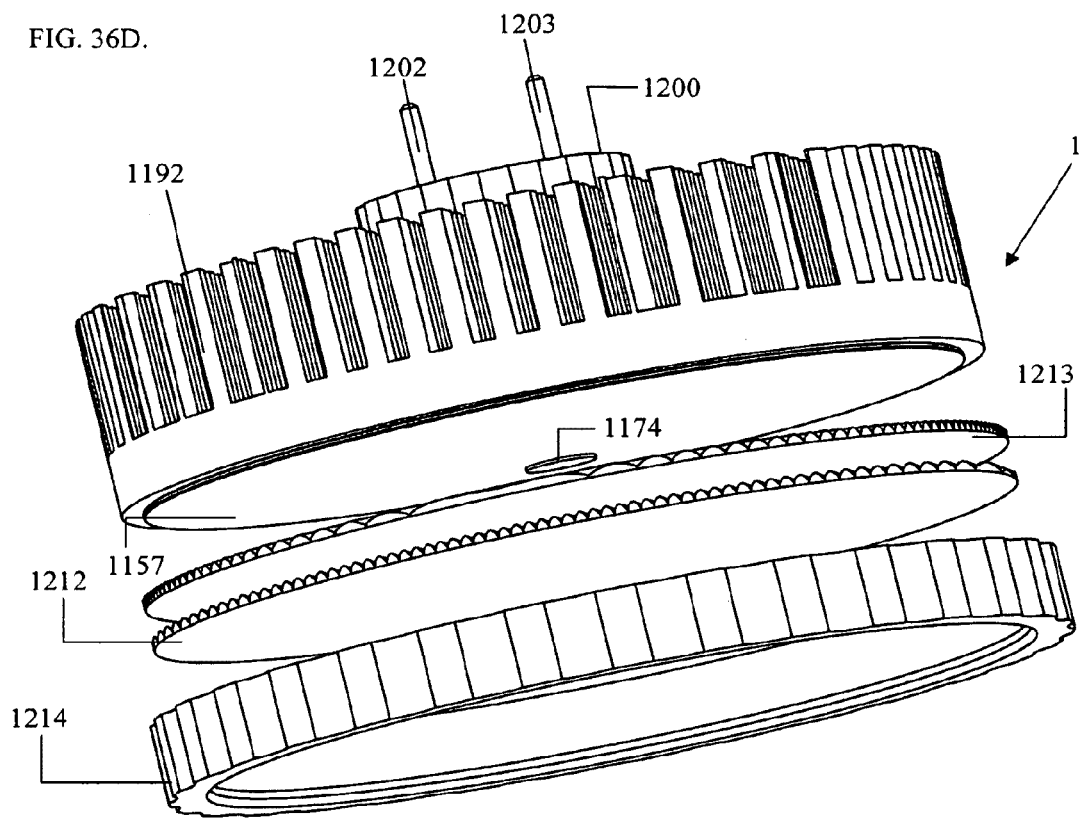
FIG. 36D is an exploded perspective view of the light engine represented in FIG. 36B, adding parabolic lenticular film sheets and a circular frame to retain them.

FIG. 36D is an exploded perspective view of the light engine represented in FIG. 36B, adding parabolic lenticular film sheets (1212 and 1213) plus a circular frame 1214 to retain them. The parabolic lenticular lens sheets 1212 and 1213 are the same orthogonally-crossed angle-changing elements described earlier (for example, film elements 874 and 875, FIG. 28) with the lenticules of each film sheet 1212 and 1213 which can face towards the light engine's output surface 1157. Circular frame 1214 is added to retain the two sheets. In this example, linear extruded film sheets 1212 and 1213 are cut into circular disks for easiest mounting.

Figure 36E:
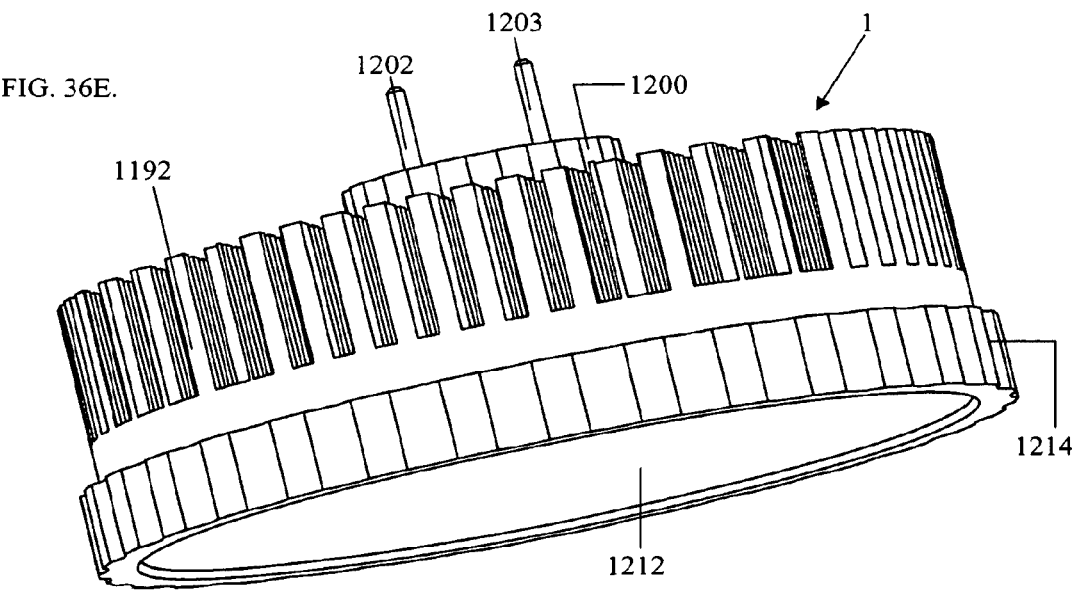
FIG. 36E shows the unexploded view of the thin system of FIG. 36D.

FIG. 36E shows the unexploded view of the thin system 1 of FIG. 36D.

Figure 36F:
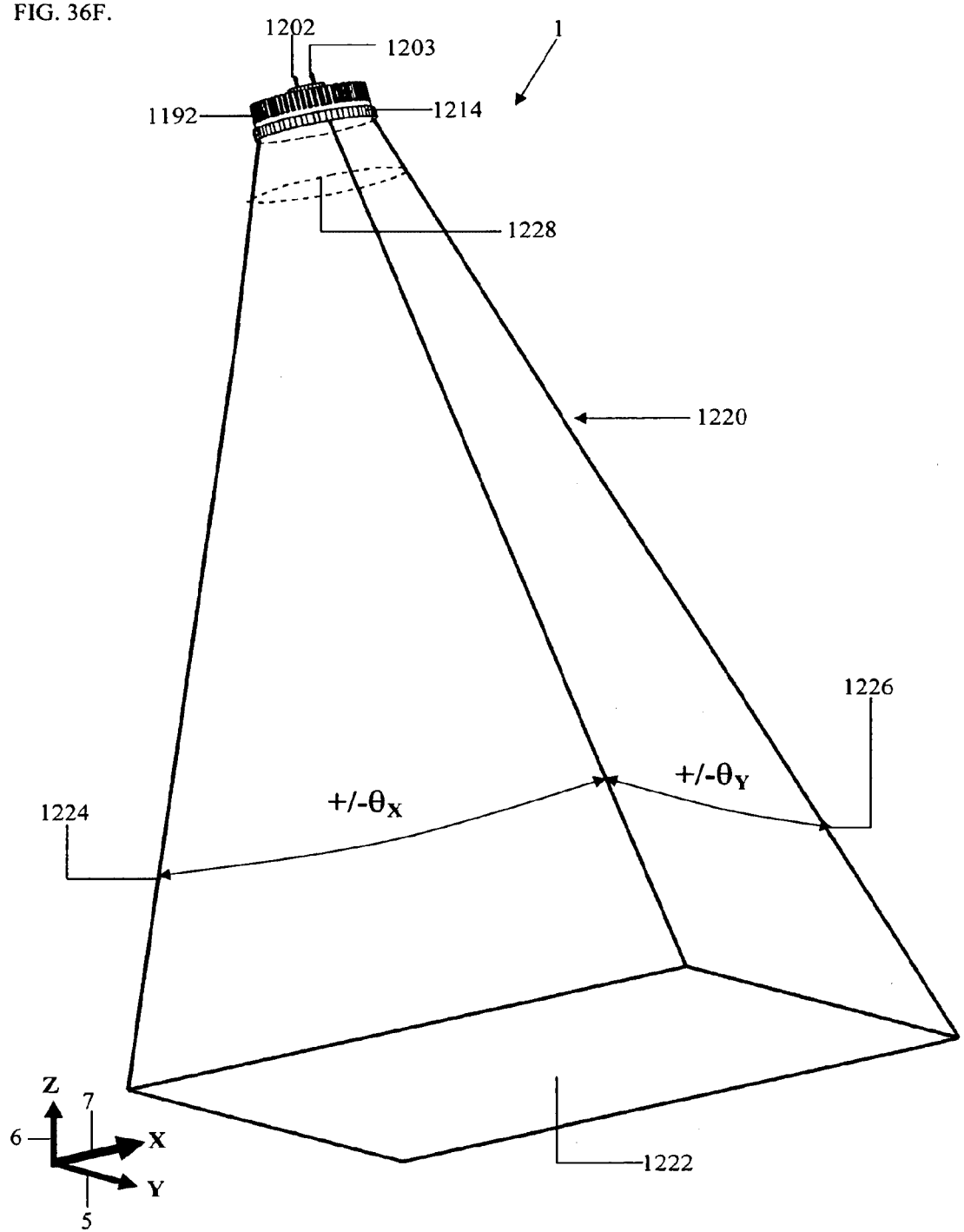
FIG. 36F is a schematic perspective view similar to that of FIG. 36C but showing the asymmetrically widened far field output illumination of the thin illumination system shown in FIG. 36E.

FIG. 36F is a schematic perspective view similar to that of FIG. 36C but showing the asymmetrically widened far field output illumination 1220 of the thin illumination system 1 shown in FIG. 36E. Computer ray trace simulations of this design, show that the addition of the two crossed lenticular angle changing films of this disclosure, in this example each having deliberately different angle-changing characteristics (one widening the intrinsic $+/-6$ degree illumination to $+/-30$ degrees in the ZX meridian, and the other widening the $+/-6$ degree illumination to only $+/-15$ degrees in the orthogonal ZY meridian) produce the intended substantially rectangular beam profile 1222 in the far field with angular extents 1224 and 1226, $+/-\theta_X$ being approximately $+/-30$-degree (FWHM), with practically no halo beyond that, and $+/-\theta_Y$ being approximately $+/-15$-degree (FWHM), with practically no halo beyond that. In this implementation, the crossed linear extruded lenticular lens sheets 1212 and 1213 (hidden in FIG. 36F), transform the circularly symmetric near field light 1228 into rectangular far field light 1222.

FIG. 36G shows the illustrative far field beam pattern from the thin illumination system 1 of FIG. 36F placed at a 1500 mm height above the 1800 mm×1800 mm surface to be illuminated. The computer simulated field pattern 1230 spreads about $+/-30$ degrees along x-axis 7 $+/-15$ degrees about y-axis 5, both FWHM.

Some examples of the thin illumination systems disclosed herein can utilize one or more low-voltage DC operating LED emitters as their internal source of light. It is feasible to use any of the foregoing light engine examples (e.g., FIGS. 1A-1D, 2A-2E, 3A-3B, 4, 12B-12C, 26, 28, 30A, 30C, 31A-31B, 32A-32B, 33A-33C, 35A-35F, 36B-36F, and 37A-37G) with a high voltage AC power source, provided the high voltage AC power source is properly converted to low-voltage DC and suitably regulated, prior to its interconnection with LED emitters 3, 904 and 1000.

A potentially practical commercial reason for doing this is presented by the light engine example of FIGS. 36B-36F. Such a thin circular directional illumination system when fitted with a suitable AC-to-DC converting stem attachment terminated with standard light-bulb style screw cap, may be deployed usefully as a screw-in retrofit type LED light bulb. Although some implementations disclosed herein illustrate illumination devices having multiple electrical connections (for example, FIGS. 35D-35F and FIGS. 37B-37G), a person having ordinary skill in the art will appreciate that such electrical connections can be electrically coupled to a screw cap or other electrical coupling for connecting the device to a source of power. The far field illumination from at least some of the thin light engines made according to this disclosure can exhibit particularly sharp angular cutoff outside the intended angular extent. This behavior is associated generally with reduced off-angle glare and more efficient field utilization in light bulbs used in spot and flood lighting applications.

Figure 37B:
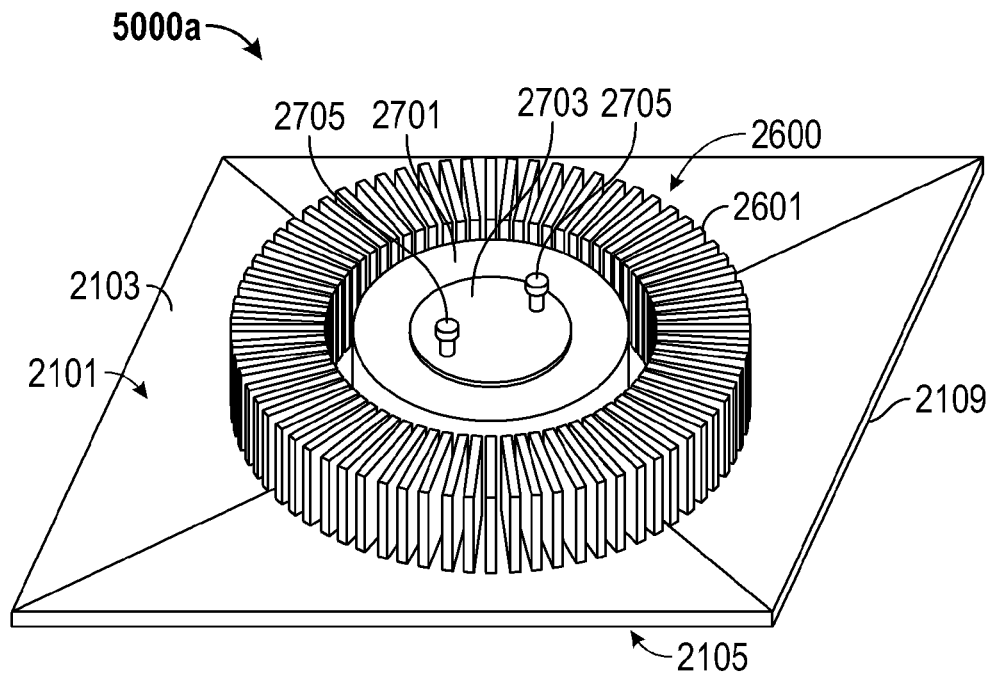
FIG. 37B shows a perspective view of an example illumination device including a heat extracting element, an electronics frame, and a light guide having a polygonal cross-sectional shape.

FIG. 37A is a schematic perspective view illustrating one possible way of adapting the thin profile light engine example of FIG. 36E as a screw-in style light bulb. In this illustration, the necessary AC-to-DC conversion electronic parts are housed (and not shown) within adapter stem 1232. Adapter stem 1232 is thermally coupled to radial heat extracting element 1192, electrically interconnected to insulated tubular electrical conduit 1200 and fitted with standard light bulb styled screw cap 1234. The thin profile light engine example of FIG. 36E modified only with decorative bezel and affixation hardware may be applied directly in conventional recessed can applications. Of course, other thin profile light engines disclosed herein can be coupled to the adapter stem 1232. For example, the implementations of FIGS. 37B-37F can optionally be coupled to an adapter stem or installed directly within a light fixture recess.

The radially constrained extrusion of tapered light guiding plate 1160, as described by FIGS. 34C-34D, leads to the circular light guiding plate geometries illustrated. As mentioned above, it is both possible and practical, however, to convert the circular light guiding plate form of this disclosure into a related square and rectangular form. The linearly extruded square and rectangular light guiding plates 112 and 1034 used in the light engine examples of FIGS. 30A, 30C, 31A-31B, 32A-32B, and 33A-33C must have a linear LED emitter input coupling means, which in turn extends the resulting light engine's lateral dimensions proportionally. The radial form described by FIGS. 36A-36F serves to encapsulate the LED emitter between the tapered light guiding plate and the heat extractor, which can be a desirable feature.

FIG. 37B shows a perspective view of an example illumination device 5000a including a heat extracting element 2600, an electronics chassis 2701, and a light guide 2101 having a polygonal cross-sectional shape. In some implementations, the light guide 2101 can have a square or rectangular cross-sectional shape and can be tapered in a radial direction similar to the illumination devices discussed above with reference to FIGS. 35A-35F. That is to say, the light guide 2101 can include an upper surface 2103 and a lower or illumination surface 2105. The upper surface 2103 and the lower surface 2105 can meet at a peripheral edge 2109 (schematically depicted as having a thickness for illustrative purposes) and can define a taper angle therebetween. In some implementations, the taper angle can be between 1 degrees and 15 degrees, for example, between 2 degrees and 8 degrees. One implementation of a square-shaped, radially-tapered light guide is illustrated in FIGS. 39A-39D.

In some implementations, the electronics frame or chassis 2701 can be disposed between the light guide 2101 and an electrical coupling 2703. The electrical coupling 2703 can include two electrical connections 2705, for example, and may be configured to electrically and/or mechanically couple the illumination device 5000a to an electrical connection of a lighting fixture, for example, an electrical socket. In some implementations, the electrical coupling 2703 can include a GU sized connector or Edison screw-type connector. In some implementations, the electrical frame or chassis 2701 can house and/or contain individual components of the illumination device 5000a. For example, the electronics chassis 2701 can house power controlling electronic circuits that are electrically coupled to the electrical coupling 2703 and to positive and negative electrical connections of one or more light sources of the illumination device 5000a.

In some implementations, the electronics chassis 2701 can house the one or more light sources of the illumination device 5000a. For example, the electronics chassis 2701 can house one or more LED sources configured to input light into the light guide 2101. In other implementations, the electronics chassis 2701 can be disposed between the one or more light sources of the illumination device 5000a and the electrical coupling 2703.

As shown, the heat extracting element 2600 can include a plurality of fins 2601 configured to dissipate heat from the one or more light sources and/or from the light guide 2101 of the illumination device 5000a. In some implementations, the fins 2601 can include pins or rods protruding upwards. In some implementations, the fins 2601 are sized and shaped to provide sufficient surface area to dissipate heat generated by the illumination device 5000a. Further, in some implementations, the heat extracting element 2600 can include one or more channels or passages to allow for the passage of a heat transfer fluid, for example, air, between the fins 2601. In this way, the one or more channels or passages may allow for convective heat transfer between the heat extracting element 2600 and the fluid passing there over. In some implementations, the device 5000a may include one or more active heat transfer structures, for example, one or more fans or piezoelectric devices. Such structures can mechanically flap, flex, or otherwise actuate to create a current or flow of fluid through and/or over at least a portion of the illumination device 5000a.

As discussed below, the illumination device 5000a may be installed within confined recesses of a light fixture and the heat extracting element 2600 may prevent the illumination device 5000a from overheating within the recess, in some implementations. Although illustrated on the periphery of the electronics chassis 2701, in some implementations the heat extracting fins 2601 can be disposed in the middle of the illumination device 5000a and the components housed within the electronics chassis 2701 can be disposed on the periphery of the device.

Figure 37C:
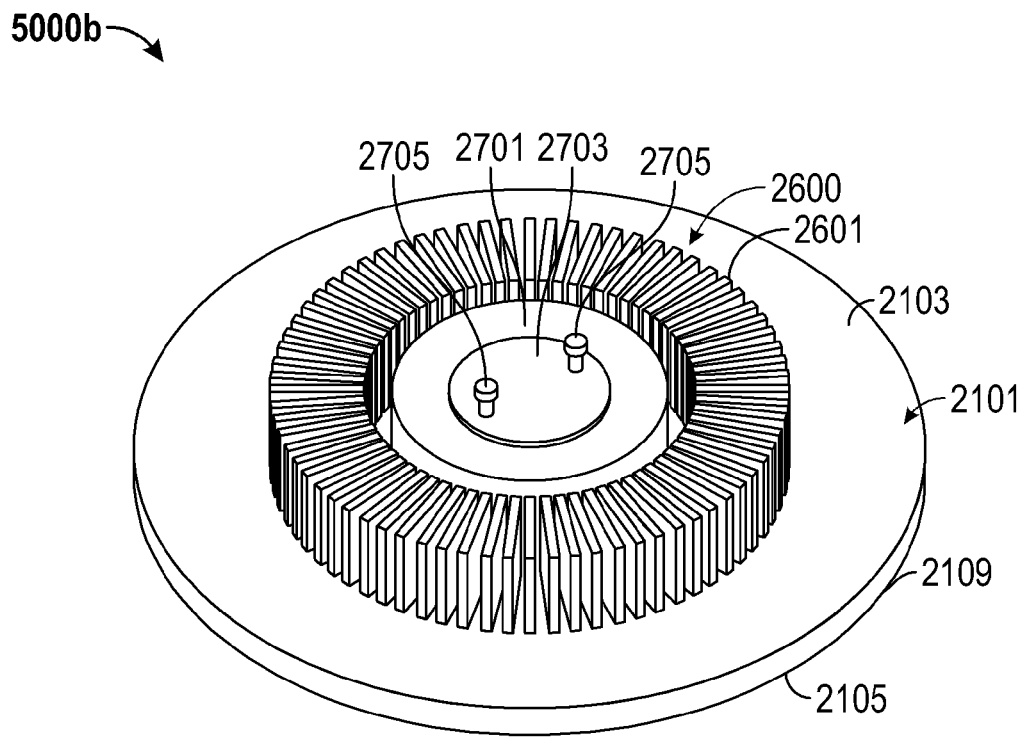
FIG. 37C shows a perspective view of an example illumination device including the heat extracting element of FIG. 37B, the electronics chassis of FIG. 37B, and a light guide having a curvilinear cross-sectional shape.

FIG. 37C shows a perspective view of an example illumination device 5000b including the heat extracting element 2600 of FIG. 37B, the electronics chassis 2701 of FIG. 37B, and a light guide 2101 having a curvilinear cross-sectional shape. In some implementations, the light guide 2101 can have a circular or round cross-sectional shape.

As with the light guide 2101 of the illumination device 5000a, the light guide 2101 of the illumination device 5000b can be tapered (radially relative to the longitudinal-radial plane). In some implementations, the upper surface 2103 and the lower surface 2105 can define a taper angle therebetween along a peripheral edge 2109. In some implementations, the taper angle can be between 1 degree and 15 degrees, for example, between 2 degrees and 8 degrees.

In the illumination devices 5000a and 5000b of FIGS. 37B and 37C, the light guides 2101 can have maximum radial dimensions that are greater than maximum radial dimensions of the heat extracting element 2600. In this way, the light guides 2101 can extend outwardly in the radial direction from the heat extracting elements 2600 and from the electronics chasses 2701. In some implementations, the heat extracting elements 2600 and electronics chasses 2701 may be sized and shaped to fit within the recess of a given lighting fixture while the light guides 2101 may not fit within the recess and may extend outwardly in the radial direction from an opening to the recess.

Figure 37D:
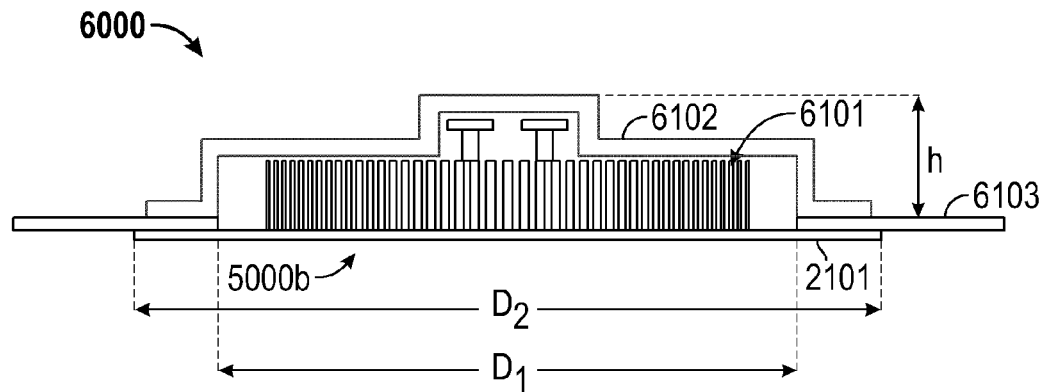
FIG. 37D shows a side view of the example illumination device of FIG. 37H illustrated with an example light fixture.

FIG. 37D shows a side view of the example illumination device 5000b of FIG. 37C illustrated with an example light fixture 6000. In this implementation, the example light fixture 6000 can include a can 6102 that is recessed relative to tiles 6103 to form a recess 6101. Thus, the light fixture 6000 can be considered a "can fixture." In some implementations, the tiles 6103 can form part of a ceiling to provide overhead lighting from an illumination device, for example, illumination device 5000a or 5000b, installed within the light fixture 6000. As shown, an electrical connection can be disposed at an end of the recess 6101 that is opposite to the surface 2101 and the electrical connection can electrically and/or mechanically engage the electrical connections of the illumination device 5000b to electrically and/or mechanically couple the illumination device 5000b to the light fixture 6000.

Still referring to FIG. 37D, the light fixture 6000 can have an opening that is defined by an opening between the tiles 6103 of the light fixture 6000. The opening can have a maximum radial dimension $D_1$. In some implementations, the light guide 2101 can have a maximum radial dimension $D_2$ that is greater than the maximum radial dimension $D_1$ of the opening of the can 6102. In this way, the illumination device 5000b can be electrically and/or mechanically coupled with an electrical connection of a given light fixture 6000 even though the light guide 2101 may not fit within the can 6102 of the light fixture 6000. Accordingly, an existing lighting or illumination system or architecture may be retrofit or converted to use the illumination devices provided herein even through a light guide of such an illumination device does not fit within the can or recess of the light fixture. As a result, in some implementations, an illumination device having a light guide that is larger than a recess or can of a light fixture may be utilized to provide a larger and/or more luminous output beam than a lighting device that is configured to fit within the recess.

Further, the can recess 6101 can have a height or depth dimension h measured between a surface of the can 6102 that contacts the electrical connections of the illumination device 5000b and the tiles 6103. In some implementations, the height h of the recess 6101 can be less than 2 inches, for example, less than 1 inch, less than 0.5 inches, or between 0.25 and 0.5 inches. In some implementations, the electrical connections of the illumination device 5000b can be disposed on one or more sides of the device, for example. In this way, the height h of the can 6102 can be further limited. In some implementations, a can may be modified with a stem, for example, the stem illustrated in FIG. 37A, such that a can having a height or depth dimension greater than the depth dimension h of the can 6102 can be electrically coupled to the illumination device 5000b with the light guide 2101 disposed outside of the opening.

Figure 37E:
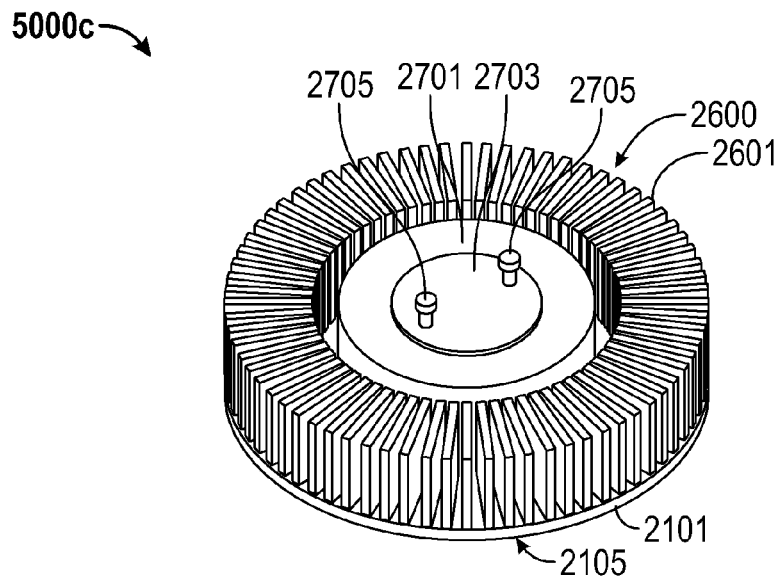
FIG. 37E shows a perspective view of an example illumination device 5000*c* including the heat extracting element 2600 of FIG. 37B, the electronics chassis 2701 of FIG. 37B, and a light guide 2101 having a size and shape that matches the light guide 2101.
Figure 37F:
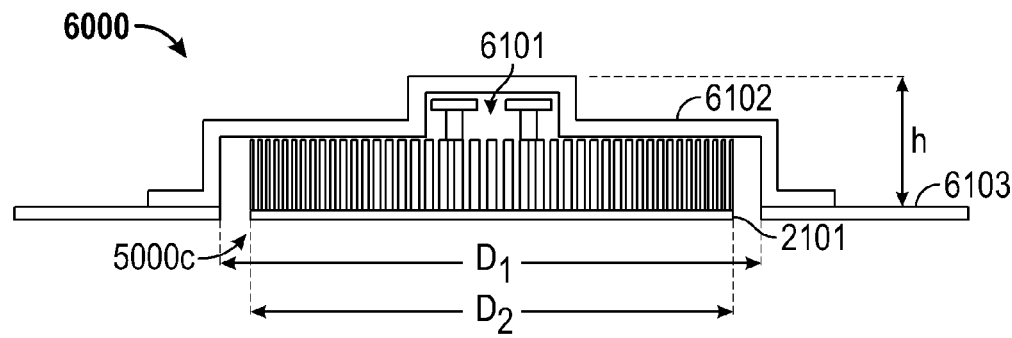
FIG. 37F shows a side view of the example illumination device of FIG. 37E illustrated with the example light fixture of FIG. 35D.

FIG. 37E shows a perspective view of an example illumination device 5000c including the heat extracting element 2600 of FIG. 35G, the electronics chassis 2701 of FIG. 37B, and a light guide 2101 having a size and shape that matches the profile of the electronics chassis 2701. FIG. 37F shows a side view of the example illumination device 5000c of FIG. 37E illustrated with the example light fixture 6000 of FIG. 37D. As shown, in some implementations, the light guide 2101 can have a maximum radial dimension $D_2$ that is less than the maximum radial dimension $D_1$ of the opening of the can 6102. In this way, the illumination device 5000c can fit within the recess of the light fixture 6000. In some implementations, the light guide 2101 may be sized and shaped such that the illumination device 5000b can be installed within a light fixture intended to receive another illumination device, for example, a PAR64, PAR56, PAR46, PAR38, PAR36, PAR30, PAR20, and/or PAR16 device, and the light guide 2101 can provide an output beam that matches another illumination device configured to fit within the can 6102. Accordingly, an existing lighting or illumination system or architecture may be retrofit or converted to use the illumination devices provided herein without changing the illumination properties or characteristics of the system even through the light fixtures were initially intended to be used with differently configured lighting devices. As mentioned above, in some implementations, a can may be modified with a stem, for example, the stem illustrated in FIG. 37A, such that a can having a height or depth dimension greater than the depth dimension h of the can 6102 can be used with the example illumination device 5000c.

Figure 37G:
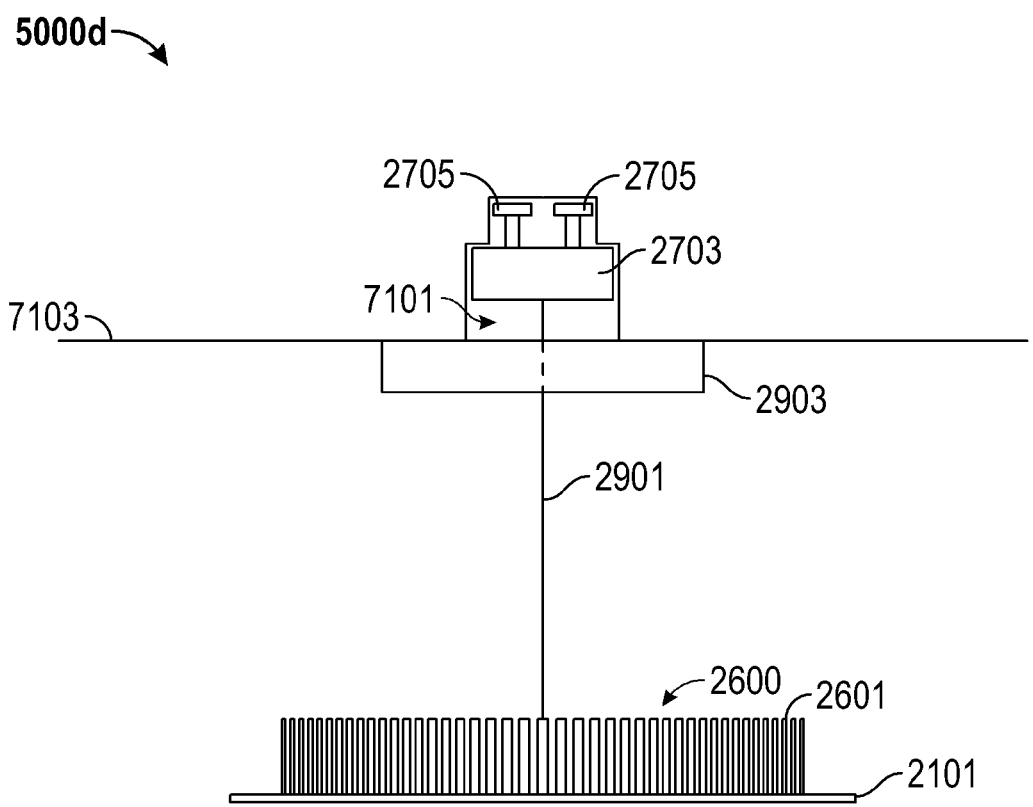
FIG. 37G shows a side view of an example illumination device illustrated with an example light fixture.

FIG. 37G shows a side view of an example illumination device 5000d illustrated with an example light fixture 7100. The light fixture 7000 includes a recess 7101 formed relative to a decorative ceiling surface 7103. The illumination device 5000d includes a heat extracting element, and a light guide 2101. In some implementations, the illumination device 5000d can also include one or more light sources (not shown) configured to emit light into the light guide 2101, for example, as discussed herein with respect to any light guide that is configured to receive light from one or more light sources. The one or more light sources may be electrically and/or mechanically coupled to the light fixture 7100 by a pendant, chain, or wire 2901 that extends at least partially between the one or more light sources and an electrical coupling 2703. As shown, the electrical coupling 2703 can be disposed within the recess 7101 of the light fixture 7000 and can be electrically and/or mechanically coupled to a socket 7105 of the light fixture 7000 by one or more electrical connections 2705. In this way, the light guide 2101 of the illumination device 5000d can be suspended or hung from the decorative ceiling surface 7103 of the light fixture 7000. Thus, in some implementations the illumination device 5000d can be utilized as a chandelier, for example.

As discussed above, the light guide 2101 may be tapered and may be relatively thin. For example, the light guide 2101 may have a maximum longitudinal dimension that is between about 1 mm and about 16 mm, for example, between about 2 mm and about 6 mm. Thus, the light guide 2101 may weigh less than existing chandeliers that do not include the thin-profile tapered light guides disclosed herein.

In some implementations, the light weight of the light guide 2101 can allow the illumination device 5000b to be suspended or hung directly from the decorative ceiling surface 7103, such as a ceiling tile, for example, rather than a structural utility ceiling. For example, a mounting plate 2903 can be coupled with the decorative ceiling surface 7103 by one or more fasteners and/or adhesive materials. The mounting plate 2903 can serve to distribute the relatively low load of the light guide 2101 and heat extracting element 2600 to the decorative ceiling surface 7103 without requiring an engagement within a utility ceiling disposed above the decorative ceiling surface 7103. In this way, the illumination device 5000d can be used as a chandelier with existing light fixtures configured to receive and support non-chandelier type lighting devices without requiring structural modifications to the light fixtures.

Unfortunately, simply trimming the circular light guiding plate to a square or a rectangle form, sacrifices a substantial percentage of light output efficiency. The reason for this truncation inefficiency can be seen in the illustrations of FIGS. 38A and 38B.

Figure 38A:
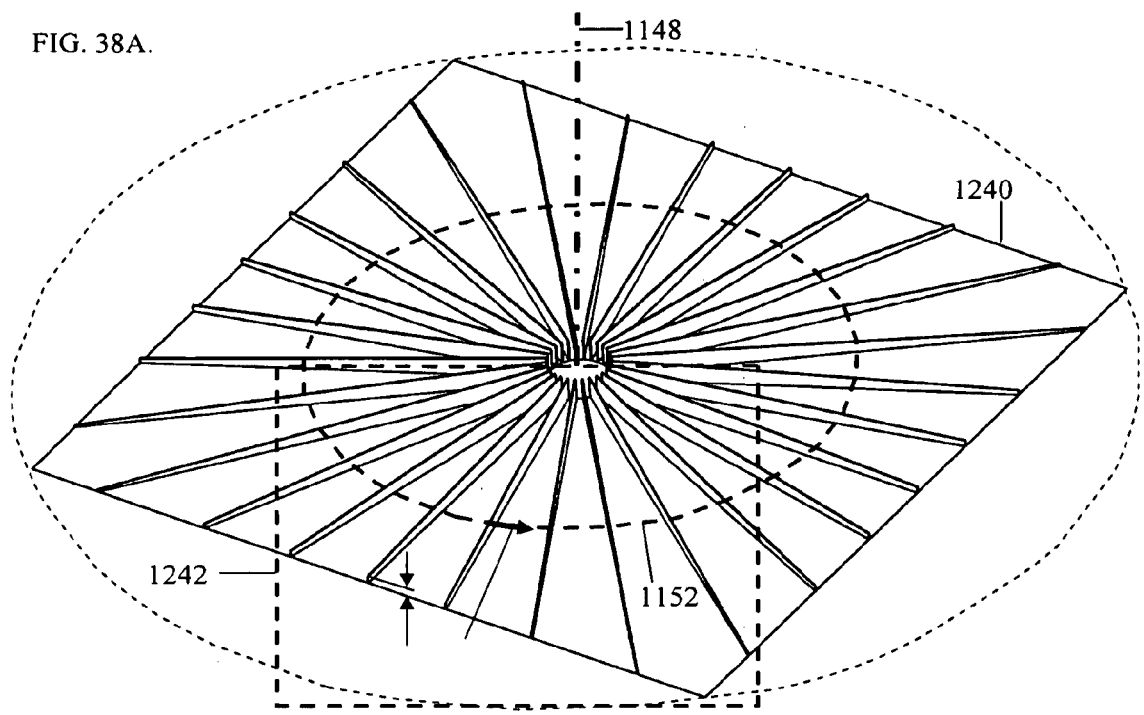
FIG. 38A is a schematic perspective view of a square truncation of the radially constrained light guiding plate extrusion illustration shown previously in FIG. 34C.

FIG. 38A is a schematic perspective view of a square truncation 1240 of the radially constrained light guiding plate extrusion illustration shown previously in FIG. 34C. It can be seen that many of the tapered cross-sections are clipped off prematurely by this truncation before they can reach their full taper length when the taper becomes an idealized knife-edge like those in the linear extrusions of FIG. 34A or the radial extrusions of FIG. 34C. In the truncation of FIG. 38A, ideal cross-sectional behavior only occurs on the diagonals of the inscribed square. Elsewhere, the tapered cross-sections are clipped off earlier. The consequence of having truncated cross-sections in an efficiently made light guiding plate is undesirable light loss from thickened edges of the truncated plate.

Figure 38B:
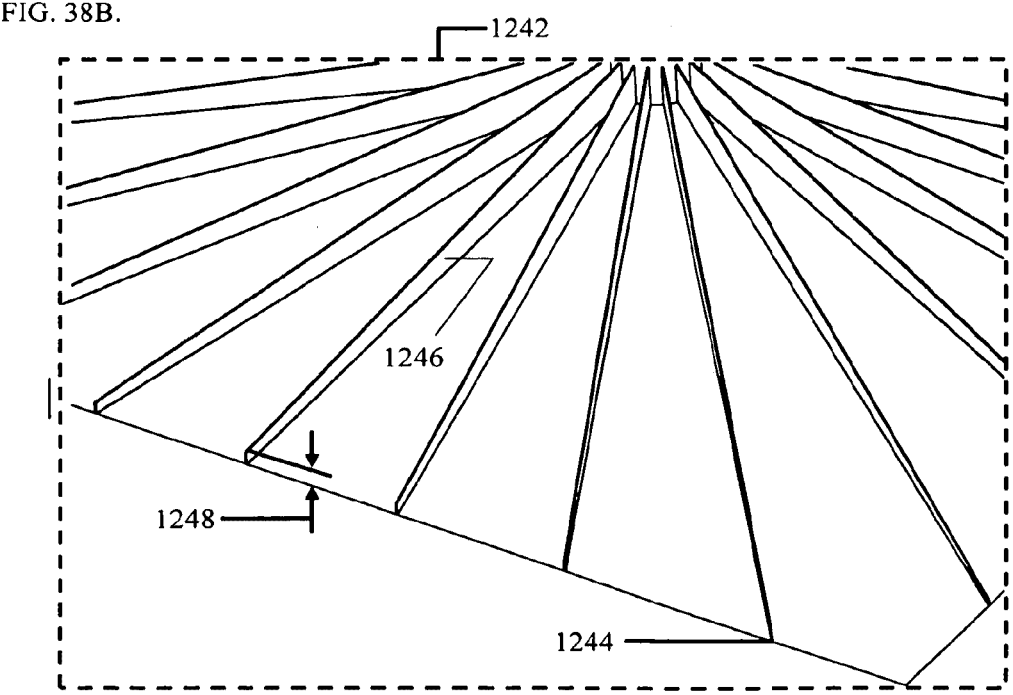
FIG. 38B is magnified section view of the complete schematic perspective provided in FIG. 38A, better illustrating the significance of edge-thickening defects caused by premature truncation.

FIG. 38B is magnified section view 1242 of the complete schematic perspective provided in FIG. 38A, better illustrating the significance of edge-thickening defects caused by premature truncation. It is readily seen that tapered cross-section 1244 come to almost an ideal knife-edge, but that tapered cross-section 1246 is truncated to substantially greater edge thickness 1248.

The remedy for this inefficient taper truncation is a combination of radial and linear boundary constraints, enabled by a variable taper length and taper angle. Rather than forcing the taper cross-section to remain constant in length (and associated taper angle), both the taper length and angle are permitted to vary subject to corresponding radial and linear extrusion constraints. In this manner a radially extruded square (or rectangular) light guiding plate joins light guiding plates.

FIG. 39A illustrates a radially and linearly constrained extrusion with five prototype taper cross-sections 1250-1254, swept in a 90-degree radial arc segment 1256 about axis line 1148 (running parallel to system Z-axis 6). While the taper cross-sections sweep radially about axis line 1148 and arc 1256, their zero-thickness idealized knife-edges are constrained to follow linear extrusion axis 1258.

Figure 39B:
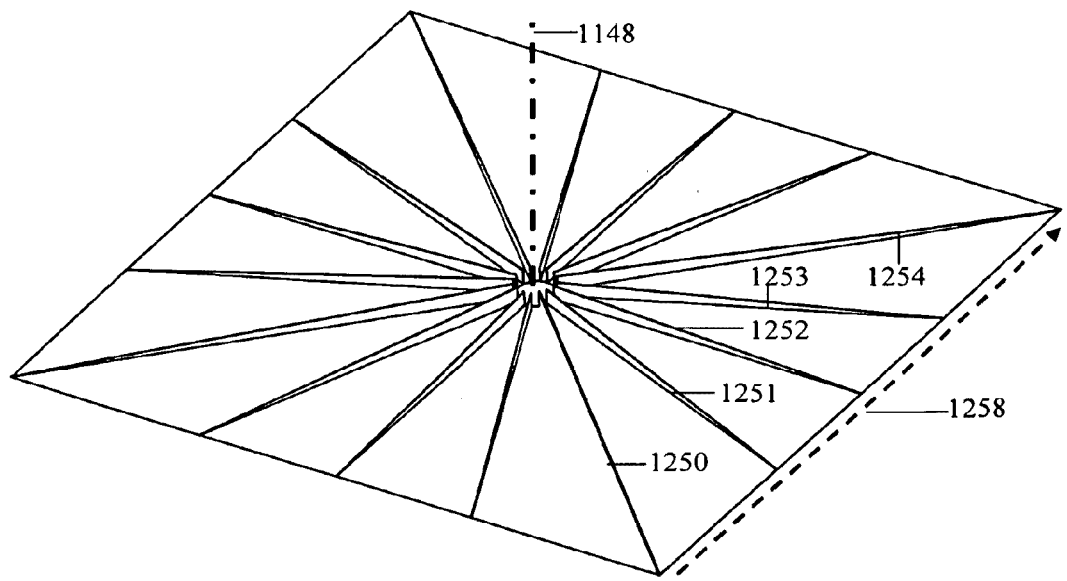
FIG. 39B is a perspective view illustrating the extrusive combination of four of the 90-degree segments as developed in FIG. 39A.

FIG. 39B is a perspective view illustrating the extrusive combination of four of the 90 degree segments as developed in FIG. 39A.

Figure 39C:
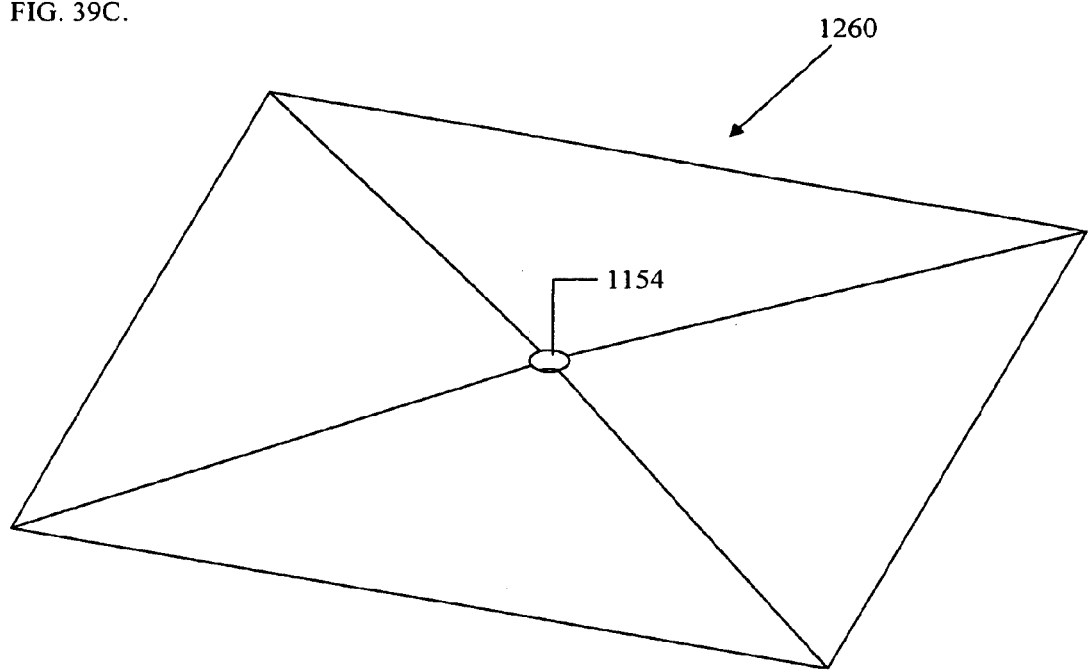
FIG. 39C is a perspective view, similar to that of FIG. 34D, but illustrating the quad-sectioned square tapered light guiding plate that results from the radially and linear constrained extrusion of FIG. 39C.

FIG. 39C is a perspective view, similar to that of FIG. 34D, but illustrating the quad-sectioned square tapered light guiding plate 1260 that results from the radially and linear constrained extrusion of FIG. 39C. This square light guiding plate 1260 is radially fed with LED emitter input light through the same cylindrical entry surface 1154 as developed for circular light guiding plate 1160 in FIG. 34D. Similarly, pentagonal, hexagonal, and octagonal shaped tapered light guiding plates can be made using five-, six-, and eight-sectioned light guide plates in ways similar to those discussed above for a square shaped light guide plate.

One implementation resembling the quadrant shown in FIG. 39A, can be produced by linearly extruding cross section 1252 along Y-axis 5 in both directions (as if creating a rectangular plate) and then chopping it along the planes defined by 1254 and 1250. This extrusion would by default create a linear input face rather than one curved about axis 1148, though the input face could be easily made curved by simple cut-out. Four of these quadrants could then go together just as in FIGS. 39B-39C, with somewhat simpler surface topology but still meeting the knife edge requirement required for maximum efficiency and still having similar appearance.

Another implementation uses just the one quadrant of FIG. 39A combined with a source and coupling optic that send light substantially into the input face of that one quadrant.

Yet another implementation can be created simply by bifurcating the quadrant of FIG. 39A at the plane defined by cross section 1252, creating two substantially triangular half-quarters, and joining the two half-quarters at the surfaces defined by 1250 and 1254 to create one square quadrant (as opposed to the triangular quadrant shown). This can be combined with a source and coupling optic that send light substantially into the input face of that one quadrant.

In each of the latter three implementations, the plates can be combined with substantially the same circular turning films (cut to size) introduced in FIGS. 34E-34F to produce highly collimated light. While the collimated far-field pattern in each case will not be identical to that of the circular disk of FIG. 35A-35C, the use of previously discussed beam-spreading films (for example, shown in 36D) can produce substantially many of the same far-field patterns possible with the other linearly and radially extruded engines described above.

Figure 39D:
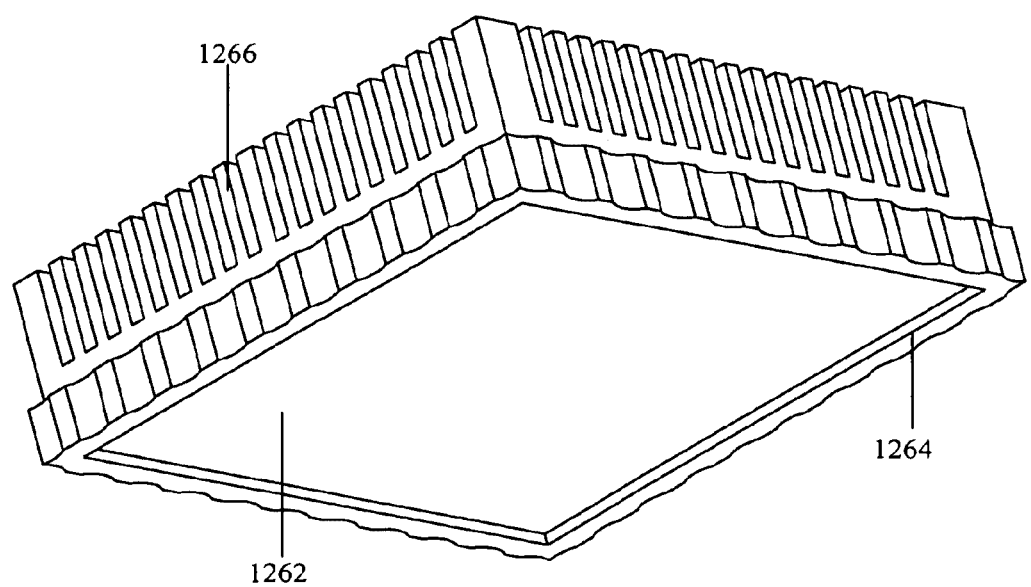
FIG. 39D is a perspective view of a thin square light engine form that uses a square lighting guiding plate, and an otherwise similar internal arrangement to that of the circular light engine example shown in FIG. 36E.

FIG. 39D is a perspective view of a thin square light engine form that uses a square lighting guiding plate 1260 (hidden), and an otherwise similar internal arrangement to that of the circular light engine example shown in FIG. 36E. Square cut lenticular film sheets 1262 are retained in frame 1264. Radial heat extracting element 1192 is deployed in this example as square heat extracting element 1266. While implementations based on radially extruded light guiding plates and light extraction films can be useful, there is one illumination attribute that is unique to the linearly extruded light guiding and light extracting forms described above. The linearly extruded light guiding systems (for example, those represented in FIGS. 3A-3B, 4, 26, 28, 30A, 30D, 31A, 31D, 32A-32B, and 33A-33C) have the capacity to provide collimated illumination at an oblique angle to the light guiding plane, potentially providing an unobtrusively compact means of oblique illumination.

Figure 40A:
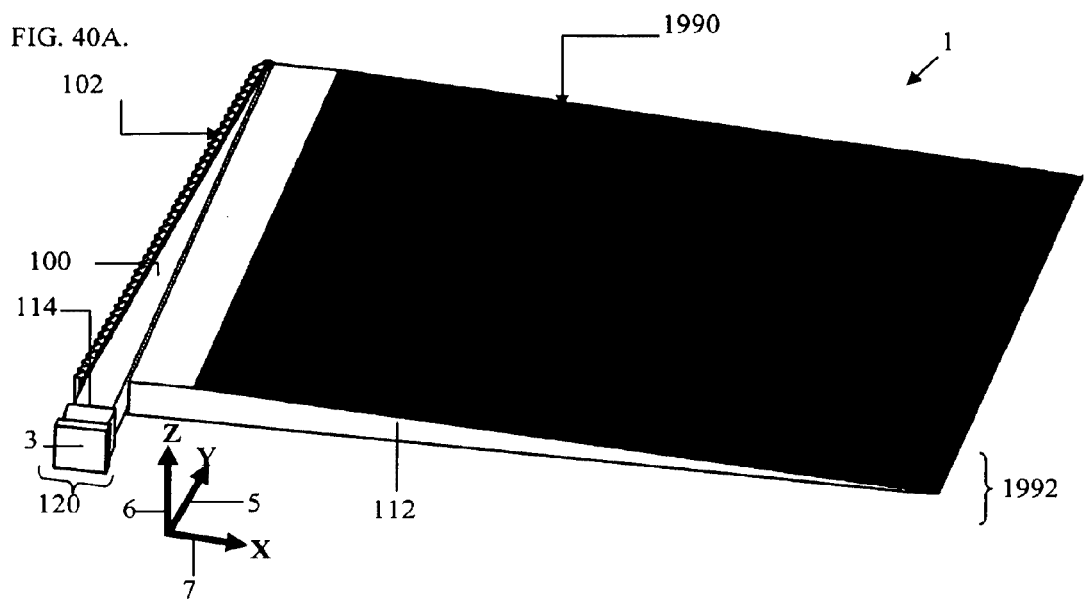
FIG. 40A shows a perspective view of another implementation of the single-emitter form of the thin illumination system 1 deploying a tapered light guiding pipe system as its input engine cross-coupled with a tapered light guiding plate system using a plane top mirror.

FIG. 40A shows a perspective view of another implementation of the single-emitter form of the thin illumination system 1 deploying a tapered light guiding pipe system 120 as its input engine that is cross-coupled with tapered light guiding plate system 1992 using a plane top mirror 1990. A generalized description of tapered light guiding system 1990 was shown earlier in FIG. 3A as 110 with a facetted light extraction film. In this particular example, the system's facetted reflecting prisms 116 (as in FIG. 3A) are replaced with a specularly reflecting plane mirror 1990. This modification is equivalent to making the total included apex angle 352 of the reflecting prisms used in FIG. 3A and described in the details of FIG. 11A approach 180 degrees.

Figure 40B:
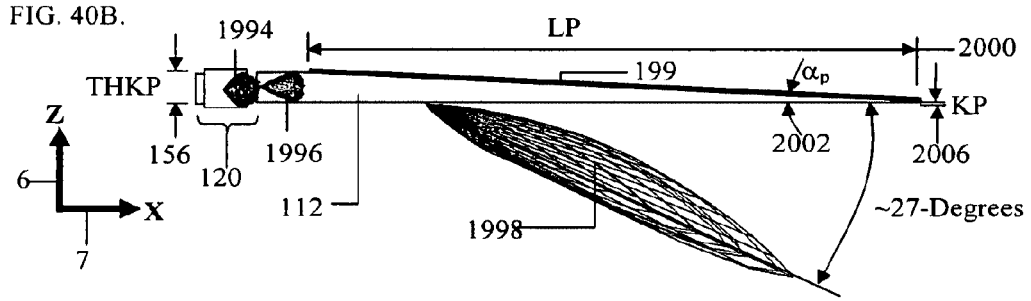

FIG. 40B is a side cross-sectional view of FIG. 40A, similar to that shown earlier in FIG. 8B, except that FIG. 8B applied only to the input engine, collimating light in just the one meridian shown. This implementation collimates output light in both meridians, and along with use of optimized input light 1994 (in air) and 1996 (in light guide 112) from RAT reflector 114 (illustratively +/−52.5 degrees in air) the overall illumination system 1 develops a more smoothly shaped far field output beam profile 1998. All dimensions and materials follow the previously established ongoing example, which set illustrative 3 mm plate thickness (THKP 156) and illustrative 3 mm pipe thickness (THKB 150), both as in FIG. 4, 3 degree pipe and plate taper angles, approximately 50 μm knife edge thickness, polycarbonate pipe 100 and polycarbonate plate 112 (which as described above, may be made of PMMA). Reflector 1990 is attached to the illustrative 57 mm×57 mm tapered light guiding plate 112 as discussed earlier, by an acrylic layer having refractive index between 1.47 and 1.49.

Figure 40C:
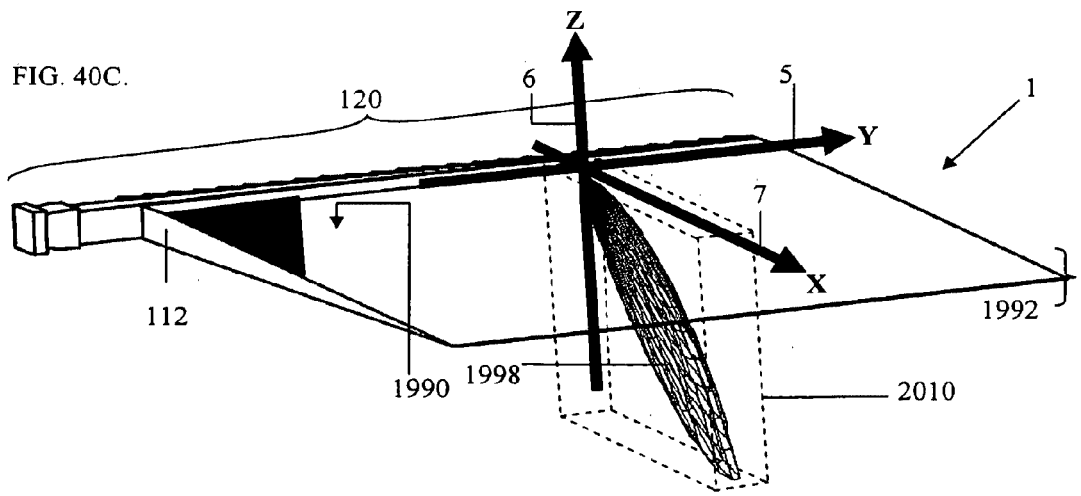

FIG. 40C is a perspective view of the illumination system of FIGS. 40A and 40B showing the collimated nature of the obliquely directed far field output beam the system produces. Dotted outline 2010 helps in visualizing the beam character.

FIG. 41A is a side elevation showing the deployment of the illumination system 1 of FIGS. 40A-40C mounted a vertical distance of 10 feet (about 3000 mm) 2020 above ground level 1022 and a horizontal distance of 3 feet (about 900 mm) 2024 from a vertical wall surface 2026 to be illuminated by the obliquely-directed far field output beam 1990 coming from this type of thin-profile illumination system 1. The associated beam pattern on wall surface 2026 is displaced downward from the luminaire system's horizontal mounting plane by 1.82 feet (about 550 mm) 2028 because of the approximately 27-degree beam direction established in FIG. 40B (for the illustrative conditions).

FIG. 41B shows a front view of wall surface 2026 and beam pattern 2030 made by illumination system 1 of the present example. Beam pattern 2030 retains its approximately +/−5-degree angular extent in the horizontal plane, but is broadened in the vertical direction to about +/−10 degrees by the projection caused by its oblique angle of incidence. The associated horizontal and vertical brightness profiles are designated 2032 and 2034.

FIG. 42 is a perspective view of another implementation similar to FIG. 31C, but adding one variation, the application of a one-dimensional angle-spreading lenticular filmstrip 1036 to input edge 121 of light guiding plate 112 to widen the outgoing beam's 2038 horizontal angular extent.

FIG. 43A illustrates the side elevation of a wall and floor system including the illumination system of FIG. 42. It further illustrates that despite the addition of angle-spreading film 2036 to the input edge of light guiding plate 112, the obliquely directed far field beam cross section 2038 and the rest of the side elevation layout, is identical to that of FIG. 41A in this example.

FIG. 43B shows a front view of wall surface 2026 and beam pattern 2040 made by illumination system 1 of the present example. Beam pattern 2040 is broadened in the vertical direction to about +/−10 degrees, as before, by the projection caused by its oblique angle of incidence, but has been broadened deliberately to +/−24 degrees as shown by the lenticular angle-spreading film that is used. The associated horizontal and vertical brightness profiles are designated 2042 and 2044.

FIG. 44 is a side view of yet another implementation based on the variations of FIGS. 40A-40C, 41A, 42 and 43A, but adding an external tilt mirror, 2050, to receive the obliquely-directed output illumination 1998 (or 2038) from this variation of illumination system 1, and redirecting that illumination 2038 back towards another vertical surface 2052 to be illuminated, as in redirected beam profile 1052. The mathematical relationship between all elements is based on geometry, and the necessary symbols are provided clearly on FIG. 44 in full detail. The mirror length (BD+DF), LM, is determined by the extreme field angle, $P_k$, which for the present example is $\beta_f=\theta_w+\in_b$, $\in_b$ being the extracted beam's half width, 32.8 degrees. Length BC=LP (Tan $\beta_f$). Offset length CE=LP (Tan $\beta_f$) Tan $\gamma_T$, CD=BC (Sin $\gamma_T$). BD=BC (Cos $\gamma_r$). Then in triangle CEF, the third angle is 180 −$\beta_f$−(90+$\gamma_T$)=90 −$\beta_f$−$\gamma_T$. So, DF=CD (Tan 90 −$\beta_f$−$\gamma_T$). And, LM=BD+DF=(BC)(Cos $\gamma_T$)+(BC(Sin $\gamma_T$))(Tan 90 −$\beta_f$−$\gamma_T$)=LP Tan($\beta_f$) [Cos($\gamma_T$)+Sin $\gamma_T$ Tan(90 −$\beta_f$−$\gamma_T$)]. The numerical values shown in FIG. 44 are for an illustrative mirror tilt, $\gamma_T$, of 12 degrees.

The degree to which tilt mirror 2050 is tilted with respect to the system's vertical z-axis 6, $\gamma_T$ above, and the separation distance 2054 between the system's tilt mirror and the surface to be illuminated, collectively determine how far down the opposing vertical surface will the resulting illumination pattern be situated.

Figure 45A:
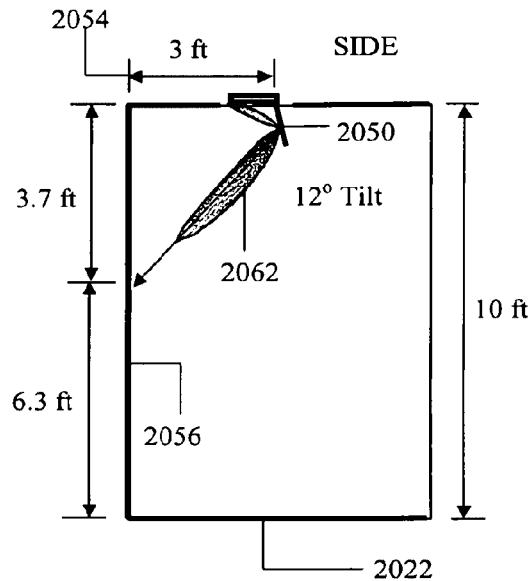

FIG. 45A is a side elevation showing the deployment of this variation on illumination system 1 mounted 10 feet above ground level 2022 and a horizontal distance of 3 feet from a left hand vertical wall surface 2060 to be illuminated by the obliquely-directed far field output beam 2062 coming from this tilted-mirror version of this thin-profile illumination system 1. The associated beam pattern 2064 on wall surface 2060 is displaced downward about 3.7 feet from the luminaire system's horizontal mounting plane because of the 12-degree tilt placed on tilt mirror 2050. The resulting pattern shift for this 12-degree tilt is approximately 3 Tan(2$\gamma_T$+$\phi_W$)=3 Tan(51)=3.7 feet.

Figure 45B:
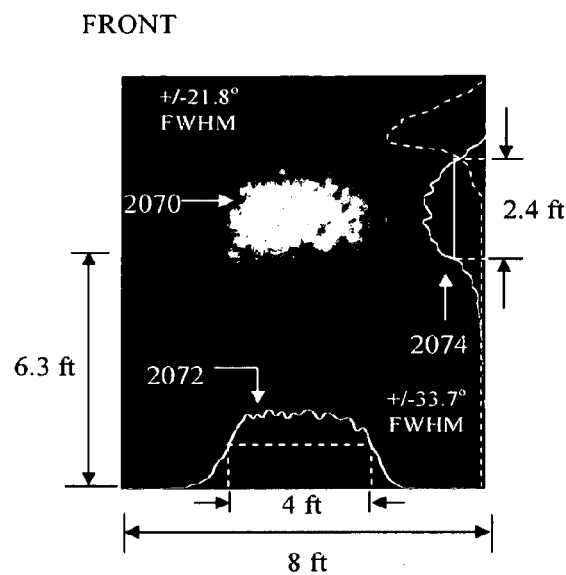

FIG. 45B shows a front view of left-side wall surface 2056 and beam pattern 2070 made by illumination system 1 of the present example. Beam pattern 2070 retains its horizontal plane broadening from lenticular input film 2036, but shifted downward by the action of tilt mirror 2050 and its 12-degree tilt in this example. The associated horizontal and vertical brightness profiles are designated 2072 and 2074.

FIG. 46A is a side elevation identical to FIG. 45A, but for the case of a 16 degree mirror tilt. The associated beam pattern 2080 on wall surface 2060 is displaced downward about 5 feet from the luminaire system's horizontal mounting plane because of the 16 degree tilt placed on tilt mirror 2050.

FIG. 46B is the same representation as FIG. 45B, but for the case of a 16 degree mirror tilt and its associated beam pattern 1080. The associated horizontal and vertical brightness profiles are designated 2082 and 2084.

FIG. 47 is a perspective view of the corner of a room, showing two walls, a floor, and a framed painting illuminated obliquely by the thin-profile tilted mirror illumination system for the case illustrated in FIGS. 46A and 46B representing a 16 degree mirror tilt.

The implementations shown in FIGS. 40A-40C, 41A, 42, 43A, 44, 45A, 46A and 47 represent just one of numerous possible examples. Rather than using plane mirror 1990 (FIG. 44), in combination with tilted mirror 2050 (FIGS. 44, 45A and 46A), faceted prism sheet 114 could be arranged with the equivalent facet angles to generate the same illuminating output beam direction (via the beam redirecting implementations of FIGS. 11A, 11B, 18, 19 and 20). Moreover, the multi-element array-type input engine (FIGS. 2A-2C, 31A, 31B, 32A, 32B, and 33A-33C) may be substituted when applications call for higher lumen output from a single luminaire unit, as they might in various high intensity spot lighting uses, or a differently arranged grouping of light engines facilitated by individualized LED emitter engine segments.

FIG. 48A shows yet another implementation similar to that of FIG. 42, adding a one-dimensional angle-spreading lenticular filmstrip 2036 to input edge 121 of light guiding plate 112 to widen the outgoing beam's 2100 horizontal angular extent, but using a prism sheet rather than a plane mirror atop tapered light guiding plate 112.

FIG. 48B shows the configuration of FIG. 48A in perspective view.

FIG. 48C is another perspective view of FIG. 48A, showing the illumination system's underside output aperture, along with its resulting near field spatial brightness uniformity 2104 and the dark field area 2106 occurring nearest the beginning region of its LED input engine.

FIG. 49 is a perspective view illustrating the behavior of the tapered-version of the light guiding input engine 120, showing graphic simulation 2110 of angular extent of a light condition at the start of light guiding pipe 100, and a graphic simulation sequence 2111-2115 of the subsystem's output light at various points along the light guiding pipe's output edge. It can be seen that despite the optimum choice of the angular distribution of input light at the start of the light guiding pipe, the subsystem fails to maintain constancy of the output light angular extent. Output light nearest the start of the light guiding pipe shows a substantially reduced angular range, and doesn't stabilize the expected angular distribution until nearly the midpoint. This misbehavior (or deviation from ideality) gives rise to the near field non-uniformity shown in FIG. 48C.

One solution to the near field spatial non-uniformity comes from FIGS. 42 and 48A and 48B. These illustrations show that the deployment of a lenticular lens sheet, lens axes aligned perpendicularly to the long length of the light guide plate's edge, is successful in widening the outgoing beam's corresponding angular extent. It stands to reason that because of this, smaller portions of lenticular lens film may be applied to boost the angular content of a deficient angular width just enough to make it right.

FIGS. 50A, 50B, 50D, 50F and 50G all show various lenticular film section configurations that have been simulated. In each case, not only has the size and shape of the lenticular section been varied, but so has the strength (optical power) of the parabolic lenticules.

The success of this idea in improving the evenness of near field uniformity is demonstrated in the perspective views FIGS. 50E and 50H. The optimization shown in FIGS. 50A-50D, 50F and 50G all show various lenticular film section configurations that have been simulated.

For specialty applications such as LCD backlighting, where visual appearance of the near field illumination is more critical, improvements such as are summarized in FIGS. 51A-51C are available as well. In this sequence, the spacing of the prisms in light extraction film applied to the light guiding plate is adjusted to fine tune the degree of near field spatial non-uniformity.

FIG. 51A shows the underlying concept of this variable prism spacing method, using a conveniently enlarged prism coarseness to help display the design intent. The bands without prisms do not extract output light, and can be used to dilute regions having excess brightness. Since prism periods are best below the levels of visual acuity, the use of dark bands will not interfere with viewing quality.

FIG. 51B shows a perspective view of the design concept illustrated in FIG. 52A.

FIG. 51C shows a perspective view of a thin illumination system 1 with successfully homogenized near field using the variable prism spacing method.

FIG. 52 shows a graphical comparison of near field spatial non-uniformity of one thin profile illumination system partially successful angular input edge correction as in FIG. 50H and one with the complete correction illustrated in FIG. 51C via the variable-prism spacing-method. A graphic simulation of the near field uniformity 2146 shows considerable smoothness compared with simulation 2130 if FIG. 52E.

FIGS. 53A-53E show examples of cross-sectional schematic illustrations of various stages in a method of manufacturing an illumination device including a transparent structure. While particular parts and steps are described as suitable for fabricating certain implementations of an illumination device, for other implementations, different parts and steps, and materials can be used, or parts can be modified, omitted, or added.

Figure 53A:
Figure 53B:
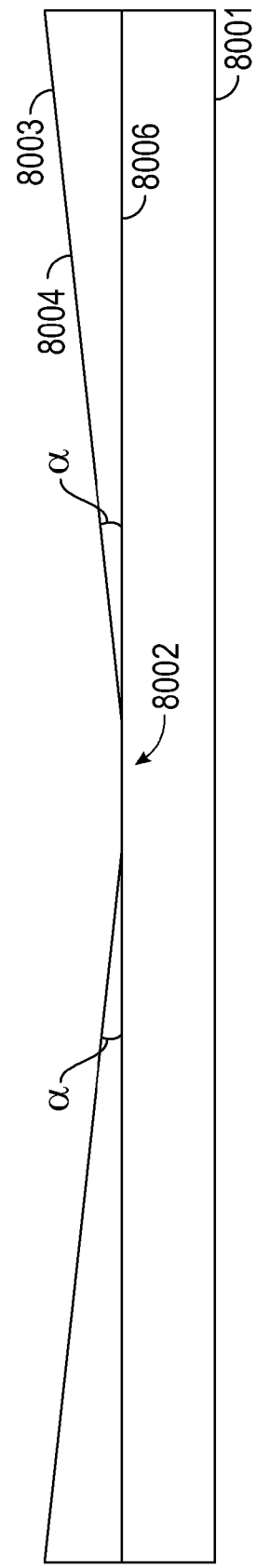

In FIG. 53A, a substrate layer 8001 has been provided and in FIG. 53B a backing layer 8003 has been provided and patterned on the substrate layer 8001. As shown, the backing layer 8003 can be formed to include a lower surface 8006 and an upper surface 8004. The upper surface 8004 and the lower surface 8006 can meet near a center portion 8002 of the backing layer 8003 and define a taper angle α therebetween. In some implementations, where the backing layer 8003 will remain attached to a transparent layer for support, the backing layer 8003 can be a highly reflective material, for example, a silver coated or high reflectivity film such as 3M ESR film coated structure. In some implementations, an optically clear epoxy or optically coupling/clear epoxy can be used to bone the transparent layer to the backing layer 8003 to reduce air gaps therebetween. Also, clear bonding agents, for example, silicone or PSA having a refractive index between 1.42 and 1.47 could be used. In some implementations, the backing layer 8003 can be part of a chuck used to form the transparent structure. In other implementations, the backing layer 8003 and the transparent structure can be removed together from the substrate layer 8001. In such implementations, the transparent structure can remain tapered by virtue of a reflective surface between the backing layer 8003 and the transparent structure, but physically, the transparent structure and backing layer 8003 may appear together as a disk or truncated column to support a narrow, low angle tapered transparent structure.

Figure 53C:
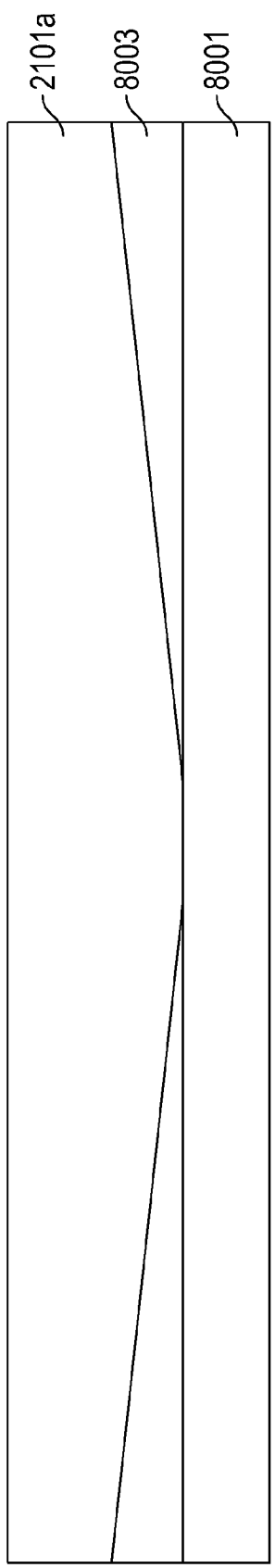

FIG. 53C illustrates providing a transparent layer 2101a over the backing layer 8003 and the substrate layer 8001. In some implementations, the transparent layer 2101a includes a transparent optical quality dielectric material, for example, polycarbonate or polymethyl methacrylate (also referred to as PMMA or acrylic). In some implementations, the transparent layer 2101a can be formed using a molding process, for example, casting, injection, or compression-injection.

Figure 53D:
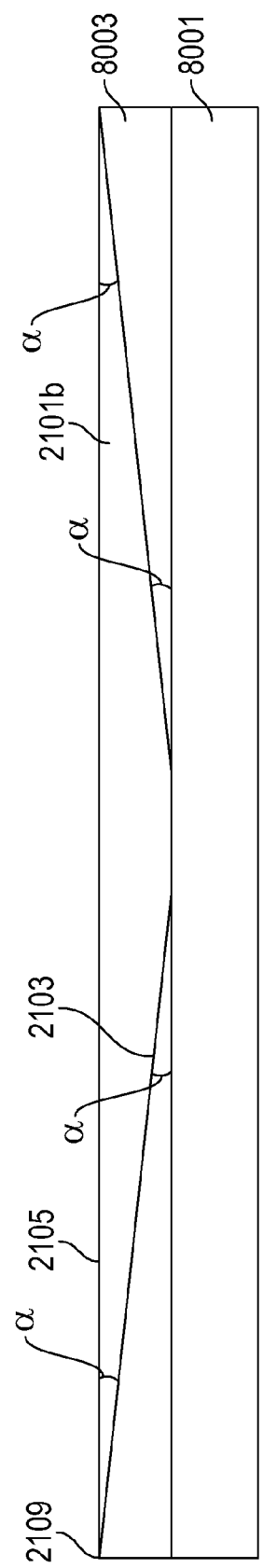

Turning now to FIG. 53D, the transparent layer 2101a has been polished to remove a portion of the transparent layer 2101a such that the surface 2105 of transparent layer 2101a disposed opposite the backing layer 8003 is moved closer toward the backing layer 8003. As shown, the polished transparent layer 2101a, has a planar surface 2105 disposed parallel to the lower surface 8006 of the backing layer and an opposing slanted surface 2103 (that is, slanted relative to the planar surface 2105). After polishing, the planar surface 2105 and the slanted surface 2103 can meet along a peripheral edge 2109 and define a taper angle α therebetween. In some implementations, the planar surface 2105 and the slanted surface 2103 do not meet but instead terminate at the peripheral edge prior to actually meeting. In such implementations, the taper angle α can still be defined to be the angle of the orientation of the planar surface 2105 with respect to the orientation of the slanted surface 2103. As illustrated in FIG. 53D, because the planar surface 2105 and the lower surface 8006 are parallel, the taper angle α matches the angle α of the backing layer 8003. In some implementations, the taper angle α can be between, for example, about 1 degree and 15 degrees, for example, between about 2 degrees and 8 degrees.

Figure 53E:
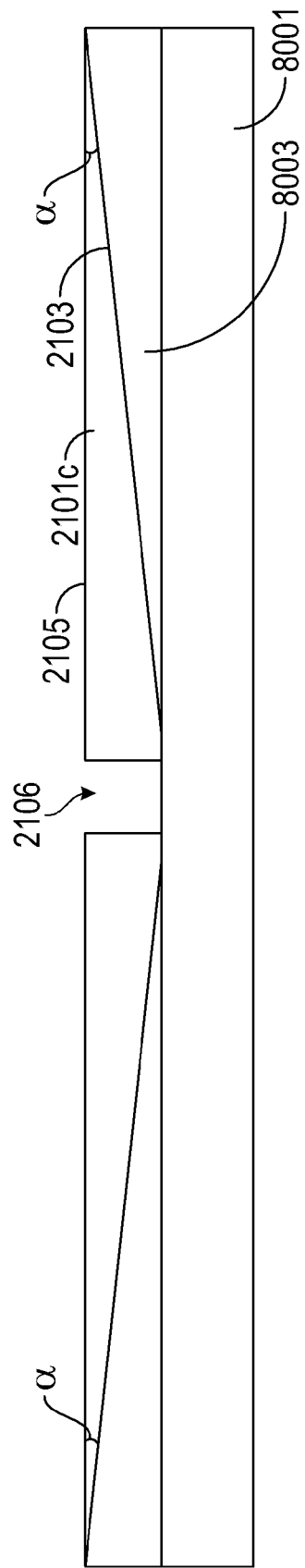

FIG. 53E illustrates the transparent layer 2101c with a columnar recess 2106 formed near a center portion of the transparent layer 2101c. The columnar recess can be patterned and etched to form a light entry surface 2107 near the center portion of the transparent layer 2101c. The light entry surface 2107 can be used to inject light into the transparent layer 2101c as discussed above with reference to FIGS. 35D-35F. In this way, the transparent layer 2101c of FIG. 53E can be used as a light guide in an illumination device. In some implementations, the transparent layer 2101c can be incorporated into an illumination device along with the backing layer 8003 and in other implementations, the transparent layer 2101c can be separated from the backing layer 8003 for use in an illumination device. In some implementations, substrate layer 8001 and backing layer 8003 can be integrated to form a single integrated structure.

FIG. 54 shows an example of a flow diagram illustrating a method 9000 of manufacturing an illumination device. The method 9000 includes forming a transparent structure including a tapered upper surface and a lower surface, as shown in block 9001. In some implementations, at least a portion of the upper surface can be a reflective surface or the upper surface may be reflectorized after method 9000 is completed. In some implementations, the transparent structure can be formed by placing a transparent material over a substrate layer and backing layer as shown and described in FIGS. 53A-53E. In some implementations, the substrate layer and backing layer can be integrated and form a single structure. As shown in block 9003, the method 9000 also includes polishing the lower surface of the transparent structure to reduce a longitudinal dimension between the lower surface and the upper surface. In some implementations, the transparent structure can be polished to reduce the longitudinal dimension between the lower surface and the upper surface to a value between 2 mm and 6 mm, for example. In some implementations, polishing the lower surface can result in the formation of a peripheral edge between the lower surface and the upper surface and a taper angle defined between the lower surface and the upper surface. The taper angle can range between about 1 degree and 15 degrees, for example, between about 2 degrees and 8 degrees.

In some implementations, the method 9000 can include forming a light entry surface in a center portion of the transparent structure. The light entry surface can be defined by a recess, for example. In some implementations, the method 9000 can also include positioning a light source near the center portion of the transparent structure. In this way, light emitted from the light source can be received into the transparent structure through the light entry surface and propagate in a radial direction from the light source toward the upper surface of the transparent structure. Thus, the method 9000 can be utilized to form many of the illumination devices disclosed herein where a thin tapered waveguide can be useful, especially when the dimensions of the waveguide are such that injection molding techniques make it difficult to form an edge with a very low taper angle. In such a case, a transparent layer 2101*a* can be formed by, for example, injection molding, and the transparent layer 2012*a* can then be polished down to form the waveguide with the desired edge profile.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An illumination device, comprising:
   a light source;
   a tapered light guide including
      a light input surface on an end of the light guide,
      a light output surface extending away from the light input surface along a plane at an angle to the light input surface, and
      an inclined surface opposite the light output surface, the inclined surface being at an angle $\alpha$, with respect to the light output surface, of less than 15 degrees, the light source and the tapered light guide aligned such that light emitted from the light source propagates into the light guide through the input edge surface and exits the light guide through the light output surface;

an optical layer coupled to the light output surface of the light guide, the optical layer including at least one light redirecting element; and a light reflecting layer adjacent to the inclined surface such that the inclined surface is located between the light reflecting surface and the light output surface, wherein the light reflecting layer is configured to reflect the light emitted from the light source towards the light output surface into the tapered light guide.

2. The illumination device of claim 1, wherein the light reflecting layer is spaced apart from the inclined surface by a gap.

3. The illumination device of claim 2, wherein the gap includes air.

4. The illumination device of claim 2, wherein the gap includes a dielectric.

5. The illumination device of claim 2, wherein the gap includes a material having an index of refraction that is less than an index of refraction of the light guide.

6. The illumination device of claim 1, wherein, light exiting the light guide through the light output surface is collimated and the optical layer is configured to redirect light exiting the light output surface along a desired direction.

7. The illumination device of claim 1, further comprising a light coupling system between the light source and the light input surface.

8. The illumination device of claim 7, wherein the light coupling system includes an angle transforming reflector.

9. The illumination device of claim 7, wherein the light coupling system includes an etendue preserving reflector.

10. The illumination device of claim 7, wherein the light coupling system includes a curved reflector.

11. The illumination device of claim 7, wherein the light coupling system includes a light guiding pipe.

12. The device of claim 1, wherein the light source includes one or more light emitting diodes (LEDs).

13. The device of claim 1, wherein the light source includes an array of LEDs.

14. A method of manufacturing an illumination device, the method comprising:
providing a light source;
providing a tapered light guide including
a light input surface on an end of the light guide,
a light output surface extending away from the light input surface along a plane at an angle to the light input surface, the light guide configured such that light propagating in the light guide exits through the light output surface; and
an inclined surface opposite the light output surface, the inclined surface being at an angle α with respect to the light output surface of less than 15 degrees;
aligning the light source and the tapered light guide such that light emitted from the light source propagates into the light guide through the input edge surface;
coupling an optical layer to the light output surface of the light guide, the optical layer including at least one light redirecting element; and
providing a light reflecting layer adjacent the inclined surface, wherein the light reflecting layer is configured to reflect the light emitted from the light source to the light output surface into the tapered light guide.

15. The method of claim 14, further comprising providing a light coupling system between the light source and the light input surface.

16. The method of claim 15, wherein the light coupling system includes an angle transforming reflector.

17. The method of claim 15, wherein the light coupling system includes an etendue preserving reflector.

18. The method of claim 15, wherein the light coupling system includes a curved reflector.

19. The method of claim 14, wherein the light source includes one or more light emitting diodes (LEDs).

20. The method of claim 14, wherein the light reflecting layer is spaced apart from the inclined surface by a gap.

21. The device of claim 1, wherein the light reflecting layer is parallel to the inclined surface.

* * * * *